US010827216B2

(12) United States Patent
Kwon et al.

(10) Patent No.: US 10,827,216 B2
(45) **Date of Patent: *Nov. 3, 2020**

(54) APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

(71) Applicant: LG ELECTRONICS INC., Seoul (KR)

(72) Inventors: Woosuk Kwon, Seoul (KR); Sungryong Hong, Seoul (KR); Kyoungsoo Moon, Seoul (KR); Woosuk Ko, Seoul (KR); Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/405,366

(22) Filed: May 7, 2019

(65) Prior Publication Data

US 2019/0261047 A1 Aug. 22, 2019

Related U.S. Application Data

(63) Continuation of application No. 15/656,296, filed on Jul. 21, 2017, now Pat. No. 10,334,310, which is a (Continued)

(51) Int. Cl.

*H04N 21/434* (2011.01)
*H04N 21/236* (2011.01)

(Continued)

(52) U.S. Cl.

CPC ......... *H04N 21/4345* (2013.01); *G11B 27/10* (2013.01); *H04L 12/1836* (2013.01);

(Continued)

(58) Field of Classification Search

CPC ........... H04N 21/4345; H04N 21/6125; H04N 21/234; H04N 21/64322; H04N 21/8456;

(Continued)

(56) References Cited

U.S. PATENT DOCUMENTS

| | | | |
|---|---|---|---|
| 7,529,244 | B2 | 5/2009 | Tabu |
| 7,747,853 | B2 | 6/2010 | Candelore |

(Continued)

FOREIGN PATENT DOCUMENTS

| | | | |
|---|---|---|---|
| CN | 102106109 | A | 6/2011 |
| CN | 102577403 | A | 7/2012 |

(Continued)

OTHER PUBLICATIONS

Park et al., "Text of ISO/IEC 2nd CD 23008-1 MPEG Media Transport," MPEG-H Systems, ISO/IEC JTC1/SC29/WG11 "Coding of Moving Pictures and Audio," MPEG/N13293, Jan. 2013, pp. 1-144 (152 pages total).

(Continued)

*Primary Examiner* — Kunal Langhnoja

(74) *Attorney, Agent, or Firm* — Birch, Stewart, Kolasch & Birch, LLP

(57) ABSTRACT

An apparatus for receiving a broadcast signal, includes a receiver configured to receive the broadcast signal, a parser configured to parse signaling information for a service scan included in the broadcast signal, a link layer processor configured to process a link layer packet included in the broadcast signal, and an audio/video (A/V) processor configured to present broadcast contents based on the signaling information for the service scan and the link layer packet.

16 Claims, 145 Drawing Sheets

Related U.S. Application Data continuation of application No. 14/912,583, filed as application No. PCT/KR2014/007690 on Aug. 19, 2014, now Pat. No. 9,749,680.

(60) Provisional application No. 61/867,163, filed on Aug. 19, 2013.

(51) Int. Cl.

| | |
|---|---|
| ***H04N 21/2385*** | (2011.01) |
| ***H04L 29/06*** | (2006.01) |
| ***H04L 12/18*** | (2006.01) |
| ***G11B 27/10*** | (2006.01) |
| ***H04N 21/234*** | (2011.01) |
| ***H04N 21/643*** | (2011.01) |
| ***H04N 21/845*** | (2011.01) |
| ***H04N 21/854*** | (2011.01) |
| ***H04N 21/61*** | (2011.01) |
| ***H04H 20/28*** | (2008.01) |
| ***H04H 60/73*** | (2008.01) |

(52) U.S. Cl.

CPC ........ *H04L 65/4076* (2013.01); *H04L 65/608* (2013.01); *H04L 65/80* (2013.01); *H04L 69/04* (2013.01); *H04L 69/22* (2013.01); *H04L 69/24* (2013.01); *H04N 21/234* (2013.01); *H04N 21/2385* (2013.01); *H04N 21/23614* (2013.01); *H04N 21/6125* (2013.01); *H04N 21/64322* (2013.01); *H04N 21/8456* (2013.01); *H04N 21/854* (2013.01); *H04N 21/85406* (2013.01); *H04H 20/28* (2013.01); *H04H 60/73* (2013.01)

(58) Field of Classification Search

CPC ........... H04N 21/854; H04N 21/85406; H04N 21/23614; H04N 21/2385; H04N 19/39; H04N 21/2343; H04N 21/236; H04N 21/434; H04N 21/64784; H04L 65/80; H04L 69/24; H04L 69/04; H04L 69/22; H04L 65/4076; H04L 65/608; H04L 12/1836; H04L 49/9042; G11B 27/10; H04H 60/73; H04H 20/28

See application file for complete search history.

(56) References Cited

U.S. PATENT DOCUMENTS

| | | | | |
|---|---|---|---|---|
| 8,290,035 | B2 | 10/2012 | Limberg | |
| 8,537,815 | B2 * | 9/2013 | DiMambro | H04L 49/9042 370/389 |
| 9,407,966 | B2 | 8/2016 | Hwang et al. | |
| 10,158,449 | B2 | 12/2018 | Hwang et al. | |
| 2004/0073939 | A1 | 4/2004 | Ayyagari | |
| 2008/0080516 | A1 | 4/2008 | Sammour et al. | |
| 2008/0192777 | A1 | 8/2008 | Choi et al. | |
| 2008/0225958 | A1 * | 9/2008 | Park | H04L 1/0045 375/240.25 |
| 2008/0310452 | A1 | 12/2008 | Vedantham et al. | |
| 2008/0313678 | A1 | 12/2008 | Ryu et al. | |
| 2009/0034442 | A1 | 2/2009 | Song et al. | |
| 2009/0080452 | A1 | 3/2009 | Ra et al. | |
| 2009/0116490 | A1 | 5/2009 | Charpentier et al. | |
| 2009/0290598 | A1 * | 11/2009 | Pani | H04L 1/0007 370/473 |
| 2009/0296624 | A1 | 12/2009 | Ryu et al. | |
| 2010/0166017 | A1 | 7/2010 | Na et al. | |
| 2010/0195712 | A1 | 8/2010 | Yu et al. | |
| 2011/0200128 | A1 | 8/2011 | Ko et al. | |
| 2011/0242975 | A1 | 10/2011 | Zhao et al. | |
| 2011/0310892 | A1 | 12/2011 | DiMambro | |
| 2011/0317719 | A1 | 12/2011 | Vedantham et al. | |
| 2012/0011547 | A1 | 1/2012 | Ansari | |
| 2012/0042092 | A1 | 2/2012 | Hong et al. | |
| 2012/0240174 | A1 | 9/2012 | Rhyu et al. | |
| 2012/0311011 | A1 * | 12/2012 | Appleby | H04L 12/1886 709/201 |
| 2012/0324521 | A1 | 12/2012 | Rhyu et al. | |
| 2013/0039278 | A1 | 2/2013 | Bouazizi et al. | |
| 2013/0086213 | A1 | 4/2013 | Rhyu et al. | |
| 2013/0094502 | A1 | 4/2013 | Hwang | |
| 2013/0094563 | A1 | 4/2013 | Bae | |
| 2013/0235871 | A1 | 9/2013 | Brzozowski et al. | |
| 2013/0279380 | A1 | 10/2013 | Hong et al. | |
| 2013/0297822 | A1 | 11/2013 | Park et al. | |
| 2016/0044532 | A1 | 2/2016 | Champel | |
| 2016/0182976 | A1 | 6/2016 | Kwon et al. | |

FOREIGN PATENT DOCUMENTS

| | | | |
|---|---|---|---|
| EP | 2424239 | A2 | 2/2012 |
| EP | 2555510 | A2 | 2/2013 |
| JP | 2009-284170 | A | 12/2009 |
| KR | 10-2009-0004663 | A | 1/2009 |
| KR | 10-2013-0087584 | A | 8/2013 |
| WO | WO 2011/096706 | A2 | 8/2011 |
| WO | WO 2012/070859 | A2 | 5/2012 |
| WO | WO 2012/099408 | A2 | 7/2012 |

OTHER PUBLICATIONS

Park et al.,"Study of ISO/IEC CD 23008-1 MPEG Media Transport", MPEG/N13089, MPEG-H Systems, ISO/IEC JTC1/SC29/WG11, Coding of Moving Pictures and Audio, Shanghai, China, Oct. 2012, pp. 1-117 (124 pages total).

* cited by examiner

FIG. 22
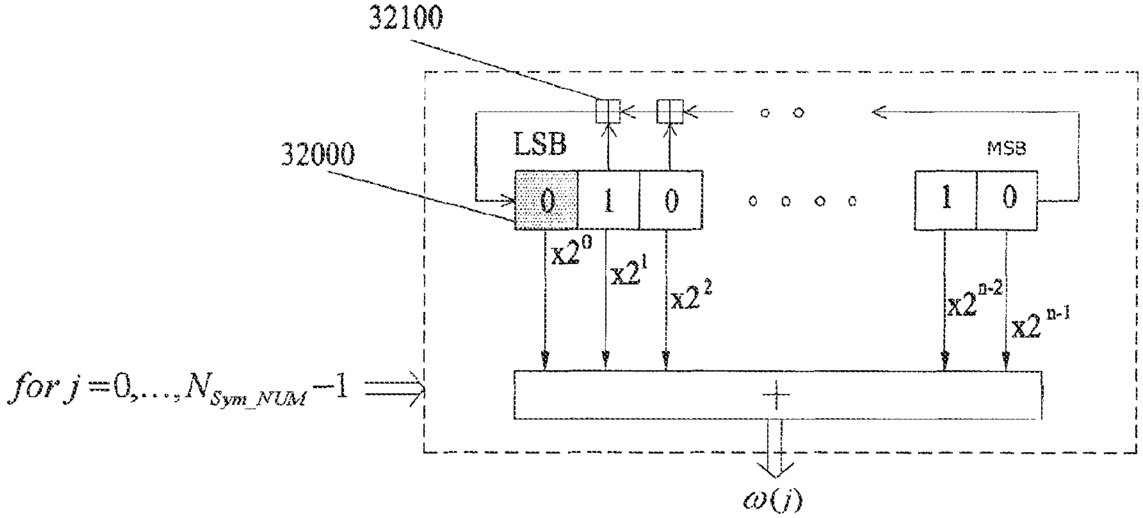
FIG. 23
| Order (n) | LI-PPG |
|---|---|
| 9 | 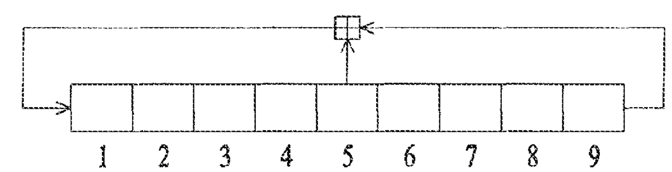 |
| 10 | 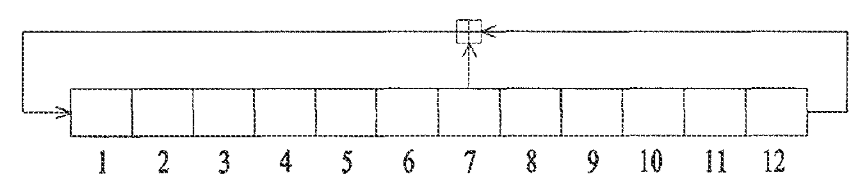 |
| 11 | 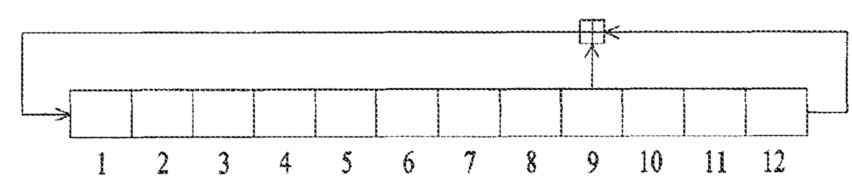 |
| 12 | 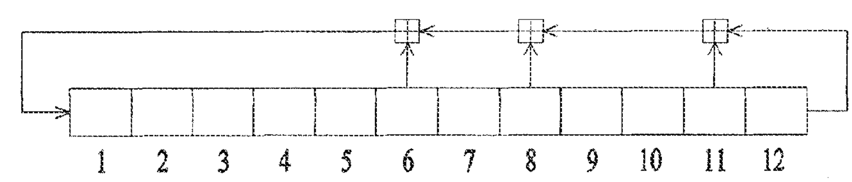 |

FIG. 24
| Order (n) | LI-PPG |
|---|---|
| 13 | 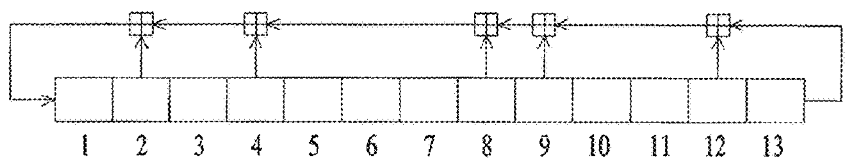 |
| 14 | 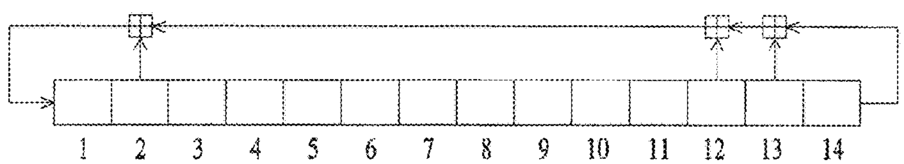 |
| 15 | 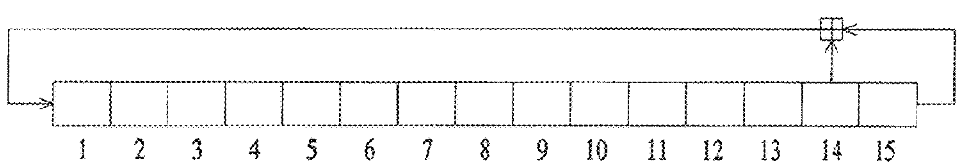 |

FIG. 35
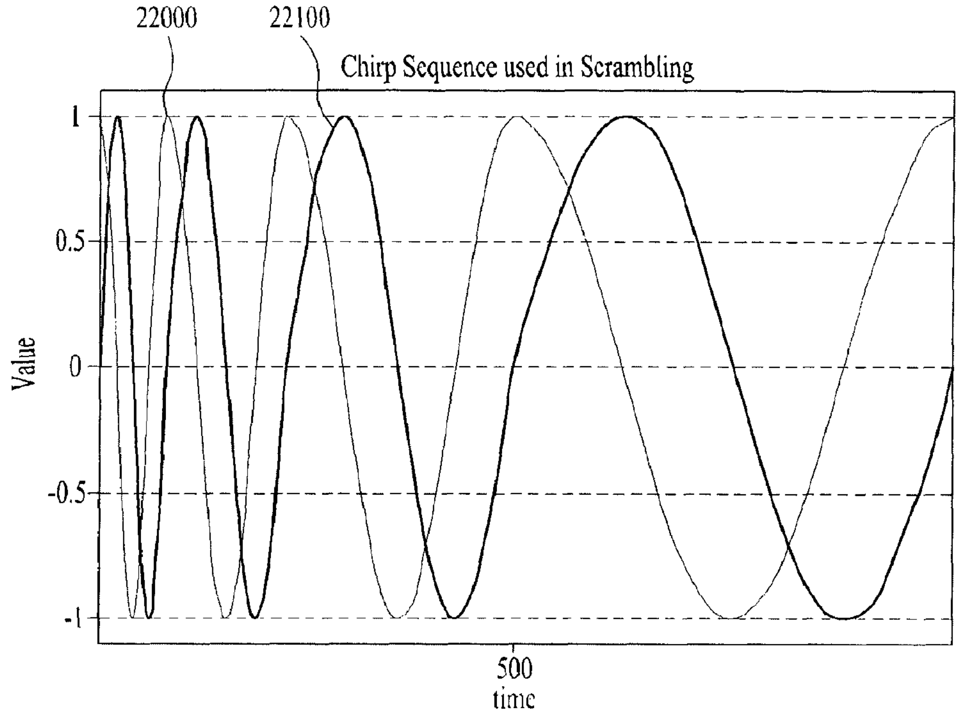
(a)
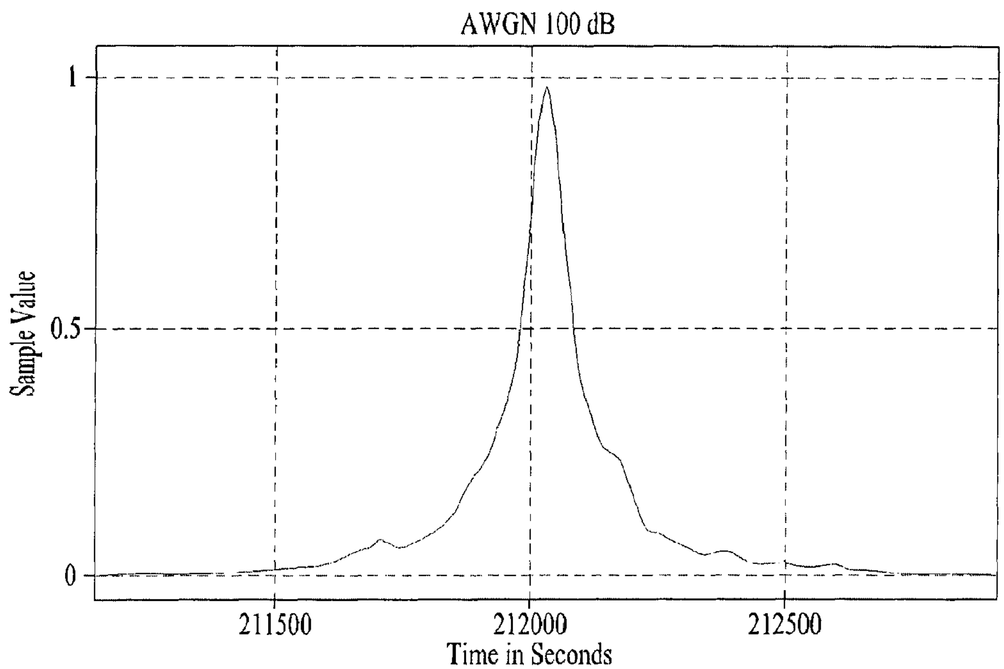
(b)

FIG. 36
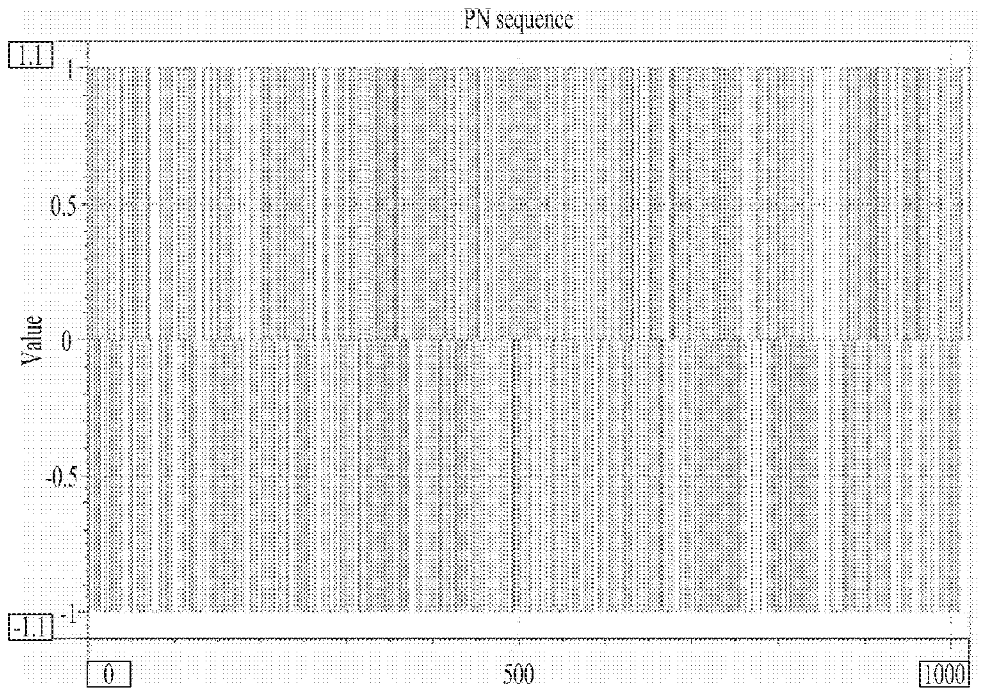
( a )
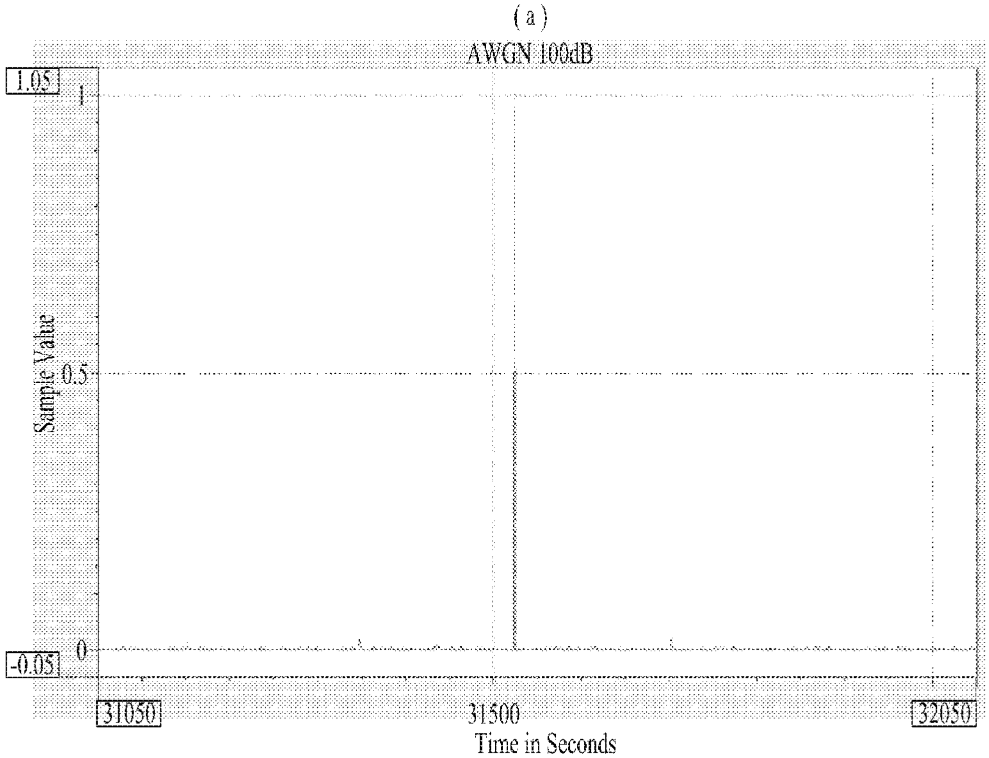
( b )

(a) 14bit signaling with 64bit Reed Muller FEC block case (b) 21bit signaling with 64bit Reed Muller FEC block case $N\_Slot=4$ $L\_Slot=L\_Frame/N\_Slot=5$ $N\_RB=L\_Frame*N\_RB\_Sym=80$ $N\_RB\_Slot=N\_RB/N\_Slot=20$ RB input order : $i=0,1,2,\ldots,N\_RB-1$ RB mapping address : $j = \begin{cases} (i*N\_RB\_Slot) \bmod N\_RB & \text{if } i<N\_RB-1 \\ i & \text{else} \end{cases}$ $N\_Slot=4$ $L\_Slot=L\_Frame/N\_Slot=5$ $N\_RB=L\_Frame*N\_RB\_Sym=80$ $N\_RB\_Slot=N\_RB/N\_Slot=20$ RB input order: $i=0,1,2,\ldots,N\_RB-1$ RB mapping address:

$$j=\left[(i)\bmod L\_Slot+L\_Frame*\lfloor i/L\_Slot\rfloor\right]\bmod N\_RB+\lfloor i/N\_RB\_Slot\rfloor*L\_Slot$$

FIG. 68

```
PLS Signaling Field
    N_Slot                    (2 bits)
    DP_Type                   (3 bits)
    for i=N_DP -1 loop {
        DP_N_Block_Max        (10 bits)
        DP_RB_St              (8 bits)
        DP_FEC_St             (13 bits)
        DP_N_Block            (10 bits)
    }
```

(a)

```
In-Band Signaling Field
    N_Slot                    (2 bits)
    DP_Type                   (3 bits)
    DP_N_Block_Max            (10 bits)
    DP_RB_St                  (8 bits)
    DP_FEC_St                 (13 bits)
    DP_N_Block                (10 bits)
```

(b)

(a)

8K

| | | | |
|---|---|---|---|
| 15 | 1981 | 81 | 3223 |
| 99 | 2845 | 129 | 5635 |
| 3435 | 4321 | 969 | 2468 |
| 3519 | 1490 | 5385 | 4604 |
| 3591 | 2006 | 5877 | 1390 |
| 3915 | 4994 | 5961 | 3370 |
| 2262 | 4852 | 948 | 3418 |
| 3462 | 6052 | 1644 | 3323 |
| 3726 | 149 | 1800 | 5159 |
| 4302 | 1013 | 1824 | 6239 |
| 5178 | 2645 | 6264 | |
| 5730 | 559 | | |

| (Reception Mode) | | (Network Configuration) |
|---|---|---|
| (Fixed Rooftop)<br>(Directional-ant., 10m) | | MFN, SFN |
| (Handheld)<br>Portable | Fixed<br>(Omi-ant., ~1.5m) | MFN, SFN |
| | Pedestrian<br>(Omi-ant., ~1.5m) | MFN, SFN |
| (Handheld) Mobile :<br>(Omi-ant., ~1.5m) | | MFN, SFN |

| (Reception Mode) | | (Network configuration) | (Guard interval) | (Guard interval (a)) | (Guard interval (b)) |
|---|---|---|---|---|---|
| (Fixed Rooftop) (Directional-ant., 10m) | | MFN | $N_{G\_a1}, N_{G\_a2}, \cdots$ | (25us,50us) + $L_{alpha1}$ | (30us,60us) + $L_{beta1}$ |
| | | SFN | $N_{G\_b1}, N_{G\_b2}, \cdots$ | (200us,400us) + $L_{alpha2}$ | (240us,480us) + $L_{beta2}$ |
| (Handheld) Portable | Fixed : (Omi-ant., ~1.5m) | MFN | $N_{G\_c1}, N_{G\_c2}, \cdots$ | 100us + $L_{alpha1}$ | 120us + $L_{beta1}$ |
| | | SFN | $N_{G\_d1}, N_{G\_d2}, \cdots$ | (200us,400us) + $L_{alpha2}$ | (240us,480us) + $L_{beta2}$ |
| | Pedestrian : (Omi-ant., ~1.5m) | MFN | $N_{G\_e1}, N_{G\_e2}, \cdots$ | 100us + $L_{alpha1}$ | 120us − $L_{beta1}$ |
| | | SFN | $N_{G\_f1}, N_{G\_f2}, \cdots$ | (200us,400us) + $L_{alpha2}$ | (240us,480us) + $L_{beta2}$ |
| (Handheld) Mobile : (Omi-ant., ~1.5m) | | MFN | $N_{G\_g1}, N_{G\_g2}, \cdots$ | 100us + $L_{alpha1}$ | 120us + $L_{beta1}$ |
| | | SFN | $N_{G\_h1}, N_{G\_h2}, \cdots$ | (200us,400us) + $L_{alpha2}$ | (240us,480us) + $L_{beta2}$ |

(B)

| (Reception Mode) | | (Network configuration) | (Vehicle speed) | (a) (Vehicle speed (a)) |
|---|---|---|---|---|
| (Fixed Rooftop) (Directional-ant., 10m) | | MFN | Quasi static | Quasi static |
| | | SFN | Quasi static | Quasi static |
| (Handheld) Portable | Fixed : (Omi-ant., ~1.5m) | MFN | Quasi static | Quasi static |
| | | SFN | Quasi static | Quasi static |
| | Pedestrian : (Omi-ant., ~1.5m) | MFN | $<V_{p\_a1}$ km/h | $<3$km/h+$V_{alpha1}$ |
| | | SFN | $<V_{p\_b1}$ km/h | $<3$km/h+$V_{betha1}$ |
| (Handheld) Mobile : (Omi-ant., ~1.5m) | | MFN | $V_{m\_a1}$ km/h ~ $V_{m\_a2}$ km/h | 3km/h + $V_{alpha1}$ ~ 200km/h + $V_{alpha2}$ |
| | | SFN | $V_{m\_b1}$ km/h ~ $V_{m\_b2}$ km/h | 3km/h + $V_{betha1}$ ~ 200km/h + $V_{betha2}$ |

| | (Example (A)) | | | | | | | | | | | | | |
|---|---|---|---|---|---|---|---|---|---|---|---|---|---|---|
| Channel BW | 6MHz | | | | | | | | | | | | | |
| NFFT | 8192 | | | | 16384 | | | | | 32768 | | | | |
| Nwaveform_scaling | 1 | | | | 2 | | | | | 4 | | | | |
| Npilotdensity | 20 | 40 | 80 | 160 | 20 | 40 | 80 | 160 | 320 | 20 | 40 | 80 | 160 | 320 |
| NeBW | 336 | 168 | 84 | 42 | 688 | 344 | 172 | 86 | 43 | 1392 | 696 | 348 | 174 | 87 |
| $\alpha$ | 1 | | | | 1 | | | | | 1 | | | | |
| NoC | 6721 | | | | 13761 | | | | | 27841 | | | | |
| Fs (MHz) | 6.9063 | | | | 6.9063 | | | | | 6.9063 | | | | |
| fc (KHz) | 0.8430 | | | | 0.4215 | | | | | 0.2108 | | | | |
| Tu (us) | 1186.2 | | | | 2372.3 | | | | | 4744.7 | | | | |
| eBW (MHz) | 5.6661 | | | | 5.8006 | | | | | 5.8678 | | | | |
| eBW/BW | 0.9444 | | | | 0.9668 | | | | | 0.9780 | | | | |

$Fs = 221/32\ MHz = 6.9063\ MHz$ (B)

| | (Example (B)) | | | | | | | | | | | | | |
|---|---|---|---|---|---|---|---|---|---|---|---|---|---|---|
| Channel BW | 6MHz | | | | | | | | | | | | | |
| NFFT | 8192 | | | | 16384 | | | | | 32768 | | | | |
| Nwaveform_scaling | 1 | | | | 2 | | | | | 4 | | | | |
| Npilotdensity | 16 | 32 | 64 | 128 | 16 | 32 | 64 | 128 | 256 | 16 | 32 | 64 | 128 | 256 |
| NeBW | 424 | 212 | 106 | 53 | 864 | 432 | 216 | 108 | 54 | 1760 | 880 | 440 | 220 | 110 |
| $\alpha$ | 1 | | | | 1 | | | | | 1 | | | | |
| NoC | 6785 | | | | 13825 | | | | | 28161 | | | | |
| Fs (MHz) | 6.8477 | | | | 6.8477 | | | | | 6.8477 | | | | |
| fc (KHz) | 0.8359 | | | | 0.4179 | | | | | 0.2090 | | | | |
| Tu (us) | 1196.3 | | | | 2932.6 | | | | | 4785.3 | | | | |
| eBW (MHz) | 5.6716 | | | | 5.7781 | | | | | 5.8849 | | | | |
| eBW/BW | 0.9453 | | | | 0.9630 | | | | | 0.9808 | | | | |

$Fs = 1753/256\ MHz = 6.8477\ MHz$ (GI duration for combination of FFT and GI mode)

| | 1/160 | 1/80 | 1/40 | 1/20 | 1/10 | 1/5 |
|---|---|---|---|---|---|---|
| 8192 | - | - | 25us | 50us | 100us | 200us |
| 16384 | - | 25us | 50us | 100us | 200us | 400us |
| 32768 | 25us | 50us | 100us | 200us | 400us | - |

(A')

| | 1/160 | 1/80 | 1/40 | 1/20 | 1/10 | 1/5 |
|---|---|---|---|---|---|---|
| 8192 | - | - | 29.9us | 59.8us | 119.6us | 239.3us |
| 16384 | - | 29.9us | 59.8us | 119.6us | 239.3us | 478.5us |
| 32768 | 29.9us | 59.8us | 119.6us | 239.3us | 478.5us | - |

| | (Example (A)) | | | | | | | | | | | | | |
|---|---|---|---|---|---|---|---|---|---|---|---|---|---|---|
| Channel BW | 6MHz | | | | | | | | | | | | | |
| NFFT | 8192 | | | | 16384 | | | | | 32768 | | | | |
| Nwaveform_scaling | 1 | | | | 2 | | | | | 4 | | | | |
| Npilotdensity | 20 | 40 | 80 | 160 | 20 | 40 | 80 | 160 | 320 | 20 | 40 | 80 | 160 | 320 |
| NeBW | 336 | 168 | 84 | 42 | 688 | 344 | 172 | 86 | 43 | 1392 | 696 | 348 | 174 | 87 |
| $\alpha$ | 1 | | | | 1 | | | | | 1 | | | | |
| NoC | 6721 | | | | 13761 | | | | | 27841 | | | | |
| Fs (MHz) | 6.9063 | | | | 6.9063 | | | | | 6.9063 | | | | |
| fc (KHz) | 0.8430 | | | | 0.4215 | | | | | 0.2108 | | | | |
| Tu (us) | 1186.2 | | | | 2372.3 | | | | | 4744.7 | | | | |
| eBW (MHz) | 5.6661 | | | | 5.8006 | | | | | 5.8678 | | | | |
| eBW/BW | 0.9444 | | | | 0.9668 | | | | | 0.9780 | | | | |

*Fs = 221/32 MHz = 6.9063 MHz*

(B)

| | (Example (B)) | | | | | | | | | | | | | |
|---|---|---|---|---|---|---|---|---|---|---|---|---|---|---|
| Channel BW | 6MHz | | | | | | | | | | | | | |
| NFFT | 8192 | | | | 16384 | | | | | 32768 | | | | |
| Nwaveform_scaling | 1 | | | | 2 | | | | | 4 | | | | |
| Npilotdensity | 16 | 32 | 64 | 128 | 16 | 32 | 64 | 128 | 256 | 16 | 32 | 64 | 128 | 256 |
| NeBW | 424 | 212 | 106 | 53 | 864 | 432 | 216 | 108 | 54 | 1760 | 880 | 440 | 220 | 110 |
| $\alpha$ | 1 | | | | 1 | | | | | 1 | | | | |
| NoC | 6785 | | | | 13825 | | | | | 28161 | | | | |
| Fs (MHz) | 6.8477 | | | | 6.8477 | | | | | 6.8477 | | | | |
| fc (KHz) | 0.8359 | | | | 0.4179 | | | | | 0.2090 | | | | |
| Tu (us) | 1196.3 | | | | 2392.6 | | | | | 4785.3 | | | | |
| eBW (MHz) | 5.6716 | | | | 5.7781 | | | | | 5.8849 | | | | |
| eBW/BW | 0.9453 | | | | 0.9630 | | | | | 0.9808 | | | | |

*Fs = 1753/256 MHz = 6.8477 MHz*

(GI duration for combination of FFT and GI mode)

| | 1/160 | 1/80 | 1/40 | 1/20 | 1/10 | 1/5 |
|---|---|---|---|---|---|---|
| 8192 | - | - | 25us | 50us | 100us | 200us |
| 16384 | - | 25us | 50us | 100us | 200us | 400us |
| 32768 | 25us | 50us | 100us | 200us | 400us | - |

(A')

| | 1/160 | 1/80 | 1/40 | 1/20 | 1/10 | 1/5 |
|---|---|---|---|---|---|---|
| 8192 | - | - | 29.9us | 59.8us | 119.6us | 239.3us |
| 16384 | - | 29.9us | 59.8us | 119.6us | 239.3us | 478.5us |
| 32768 | 29.9us | 59.8us | 119.6us | 239.3us | 478.5us | - |

| | (Example (B-2)) | | | | | | | | | | | | | |
|---|---|---|---|---|---|---|---|---|---|---|---|---|---|---|
| Channel BW | 6MHz | | | | | | | | | | | | | |
| NFFT | 8192 | | | | 16384 | | | | | 32768 | | | | |
| Nwaveform_scaling | 1 | | | | 2 | | | | | 4 | | | | |
| Npilotdensity | 16 | 32 | 64 | 128 | 16 | 32 | 64 | 128 | 256 | 16 | 32 | 64 | 128 | 256 |
| NeBW | 424 | 212 | 106 | 53 | 864 | 432 | 216 | 108 | 54 | 1760 | 880 | 440 | 220 | 110 |
| $\alpha$ | 1 | | | | 1 | | | | | 1 | | | | |
| NoC | 6785 | | | | 13825 | | | | | 28161 | | | | |
| Fs (MHz) | 6.84375 | | | | 6.84375 | | | | | 6.84375 | | | | |
| fc (KHz) | 0.8354 | | | | 0.4177 | | | | | 0.2089 | | | | |
| Tu (us) | 1197.00 | | | | 2394.01 | | | | | 4788.02 | | | | |
| eBW (MHz) | 5.6683 | | | | 5.7748 | | | | | 5.8816 | | | | |
| eBW/BW | 0.9447 | | | | 0.9625 | | | | | 0.9803 | | | | |

*Fs = 219/32 MHz = 6.84375 MHz*

| | 1/160 | 1/80 | 1/40 | 1/20 | 1/10 | 1/5 |
|---|---|---|---|---|---|---|
| 8192 | - | - | 29.9us | 59.9us | 119.7us | 239.4us |
| 16384 | - | 29.9us | 59.9us | 119.7us | 239.4us | 478.8us |
| 32768 | 29.9us | 59.9us | 119.7us | 239.4us | 478.8us | - |

| | 5MHz | 6MHz | 7MHz | 8MHz |
|---|---|---|---|---|
| Scaling factor | 5/6 | 1 | 7/6 | 8/6 |
| Fs (A) | 1105/192 | 221/32 | 1547/192 | 221/24 |
| Fs (B - 1) | 8765/1536 | 1753/256 | 12271/1536 | 1753/192 |
| Fs (B - 2) | 365/64 | 219/32 | 511/64 | 73/8 |

(B)

| BW (MHz) | 5 | | | 6 | | | 7 | | | 8 | | |
|---|---|---|---|---|---|---|---|---|---|---|---|---|
| NFFT | 8192 | 16384 | 32768 | 8192 | 16384 | 32768 | 8192 | 16384 | 32768 | 8192 | 16384 | 32768 |
| Fs (MHz) | 5.7552 | 5.7552 | 5.7552 | 6.9063 | 6.9063 | 6.9063 | 8.0573 | 8.0573 | 8.0573 | 9.2083 | 9.2083 | 9.2083 |
| fc (KHz) | 0.7025 | 0.3513 | 0.1756 | 0.8430 | 0.4215 | 0.2108 | 0.9836 | 0.4918 | 0.2459 | 1.1241 | 0.5620 | 0.2810 |
| Tu (us) | 1423.4 | 2846.8 | 5693.6 | 1186.2 | 2372.3 | 4744.7 | 1016.7 | 2033.4 | 4066.9 | 889.6 | 1779.3 | 3558.5 |
| NoC | 6721 | 13761 | 27841 | 6721 | 13761 | 27841 | 6721 | 13761 | 27841 | 6721 | 13761 | 27841 |
| eBW (MHz) | 4.7218 | 4.8338 | 4.8899 | 5.6661 | 5.8006 | 5.8678 | 6.6105 | 6.7674 | 6.8458 | 7.5548 | 7.7341 | 7.8238 |
| eBW/BW | 0.9444 | 0.9668 | 0.9780 | 0.9444 | 0.9668 | 0.9780 | 0.9444 | 0.9668 | 0.9780 | 0.9444 | 0.9668 | 0.9780 |

| BW (MHz) | 5 | | | 6 | | | 7 | | | 8 | | |
|---|---|---|---|---|---|---|---|---|---|---|---|---|
| NFFT | 8192 | 16384 | 32768 | 8192 | 16384 | 32768 | 8192 | 16384 | 32768 | 8192 | 16384 | 32768 |
| Fs (MHz) | 5.7064 | 5.7658 | 5.7658 | 6.8477 | 6.8477 | 6.8477 | 7.9889 | 7.9889 | 7.9889 | 9.1302 | 9.1302 | 9.1302 |
| fc (KHz) | 0.6966 | 0.3519 | 0.1760 | 0.8359 | 0.4179 | 0.2090 | 0.9752 | 0.4876 | 0.2438 | 1.1145 | 0.5573 | 0.2786 |
| Tu (us) | 1435.6 | 2841.6 | 5683.2 | 1196.3 | 2392.6 | 4785.3 | 1025.4 | 2050.8 | 4101.7 | 897.2 | 1794.5 | 3589.0 |
| NoC | 6785 | 13825 | 28161 | 6785 | 13825 | 28161 | 6785 | 13825 | 28161 | 6785 | 13825 | 28161 |
| eBW (MHz) | 4.7263 | 4.8652 | 4.9551 | 5.6716 | 5.7781 | 5.8849 | 6.6168 | 6.7411 | 6.8657 | 7.5621 | 7.7042 | 7.8466 |
| eBW/BW | 0.9453 | 0.9730 | 0.9910 | 0.9453 | 0.9630 | 0.9808 | 0.9453 | 0.9630 | 0.9808 | 0.9453 | 0.9630 | 0.9808 |

| BW (MHz) | 5 | | | 6 | | | 7 | | | 8 | | |
|---|---|---|---|---|---|---|---|---|---|---|---|---|
| NFFT | 8192 | 16384 | 32768 | 8192 | 16384 | 32768 | 8192 | 16384 | 32768 | 8192 | 16384 | 32768 |
| Fs (MHz) | 5.7031 | 5.7031 | 5.7031 | 6.8438 | 6.8438 | 6.8438 | 7.9844 | 7.9844 | 7.9844 | 9.1250 | 9.1250 | 9.1250 |
| fc (KHz) | 0.6962 | 0.3481 | 0.1740 | 0.8354 | 0.4177 | 0.2089 | 0.9747 | 0.4873 | 0.2437 | 1.1139 | 0.5569 | 0.2785 |
| Tu (us) | 1436.4 | 2872.8 | 5745.6 | 1197.0 | 2394.0 | 4788.0 | 1026.0 | 2052.0 | 4104.0 | 897.8 | 1795.5 | 3591.0 |
| NoC | 6785 | 13825 | 28161 | 6785 | 13825 | 28161 | 6785 | 13825 | 28161 | 6785 | 13825 | 28161 |
| eBW (MHz) | 4.7236 | 4.8124 | 4.9013 | 5.6683 | 5.7748 | 5.8816 | 6.6130 | 6.7373 | 6.8618 | 7.5578 | 7.6998 | 7.8421 |
| eBW/BW | 0.9447 | 0.9625 | 0.9803 | 0.9447 | 0.9625 | 0.9803 | 0.9447 | 0.9625 | 0.9803 | 0.9447 | 0.9625 | 0.9803 |

FIG. 98

| (Reception Mode) | | (Network configuration) | NFFT | (Guard interval (a)) | (Guard interval (b)) | Vehicle speed |
|---|---|---|---|---|---|---|
| (Fixed Rooftop) | | MFN | 16k, 32k | $(25us,50us) + L_{alpha1}$ | $(30us,60us) + L_{beta1}$ | Quasi static |
| | | SFN | | $(200us,400us) + L_{alpha2}$ | $(240us,480us) + L_{beta2}$ | Quasi static |
| (Handheld) Portable | Fixed | MFN | 8k,16k, 32k | $100us + L_{alpha1}$ | $120us + L_{beta1}$ | Quasi static |
| | | SFN | | $(200us,400us) + L_{alpha2}$ | $(240us,480us) + L_{beta2}$ | Quasi static |
| | Pedestrian | MFN | | $100us + L_{alpha1}$ | $120us + L_{beta1}$ | $<3km/h + V_{alpha1}$ |
| | | SFN | | $(200us,400us) + L_{alpha2}$ | $(240us,480us) + L_{beta2}$ | $<3km/h + V_{betha1}$ |
| (Handheld) Mobile : (Omi-ant., ~1.5m) | | MFN | 8k,16k | $100us + L_{alpha1}$ | $120us + L_{beta1}$ | $3km/h + V_{alpha1}$ ~ $200km/h + V_{alpha2}$ |
| | | SFN | | $(200us,400us) + L_{alpha2}$ | $(240us,480us) + L_{beta2}$ | $3km/h + V_{betha1}$ ~ $200km/h + V_{betha2}$ |

(Pilot Pattern)

| Density | PP pattern | Dx | Dy (SISO, MIXO-1) | Dy (MIXO-2) |
|---|---|---|---|---|
| 16 | PP5 - 4 | 5 | 4 | 8 |
| | PP10 - 2 | 10 | 2 | 4 |
| 32 | PP5 - 8 | 5 | 8 | 16 |
| | PP10 - 4 | 10 | 4 | 8 |
| | PP20 - 2 | 20 | 2 | 4 |
| 64 | PP10 - 8 | 10 | 8 | 16 |
| | PP20 - 4 | 20 | 4 | 8 |
| | PP40 - 2 | 40 | 2 | 4 |
| 128 | PP20 - 8 | 20 | 8 | 16 |
| | PP40 - 4 | 40 | 4 | 8 |
| | PP80 - 2 | 80 | 2 | 4 |
| 256 | PP40 - 8 | 40 | 8 | 16 |
| | PP80 - 4 | 80 | 4 | 8 |
| | PP160 - 2 | 160 | 2 | 4 |

(B)

(Pilot pattern configuration for SISO and MIXO-1 (more overhead version) )

| PP mode | 30us | 60us | 120us | 240us | 480us |
|---|---|---|---|---|---|
| 8192 | PP40 - 2 | PP20 - 2 | PP10 - 2 | - | - |
| | PP40 - 4 | PP20 - 4 | PP10 - 4 | PP5 - 4 | - |
| | PP40 - 8 | PP20 - 8 | PP10 - 8 | PP5 - 8 | - |
| 16384 | PP40 - 2 | PP20 - 2 | PP10 - 2 | - | - |
| | PP80 - 2 | PP40 - 2 | PP20 - 2 | PP10 - 2 | - |
| | PP80 - 4 | PP40 - 4 | PP20 - 4 | PP10 - 4 | PP5 - 4 |
| 32768 | PP160 - 2 | PP80 - 2 | PP40 - 2 | PP20 - 2 | PP10 - 2 |

(C)

(Pilot pattern configuration for MIXO-2 (less mobility version ))

| PP mode | 30us | 60us | 120us | 240us | 480us |
|---|---|---|---|---|---|
| 8192 | PP40 - 4 | PP20 - 4 | PP10 - 4 | - | - |
| | PP40 - 8 | PP20 - 8 | PP10 - 8 | PP5 - 8 | - |
| | PP40 - 16 | PP20 - 16 | PP10 - 16 | PP5 - 16 | - |
| 16384 | PP40 - 4 | PP20 - 4 | PP10 - 4 | - | - |
| | PP80 - 4 | PP40 - 4 | PP20 - 4 | PP10 - 4 | - |
| | PP80 - 8 | PP40 - 8 | PP20 - 8 | PP10 - 8 | PP5 - 8 |
| 32768 | PP160 - 4 | PP80 - 4 | PP40 - 4 | PP20 - 4 | PP10 - 4 |

Pilot Pattern)

| Density | PP pattern | Dx | Dy (SISO, MIXO-1) | Dy (MIXO-2) |
|---|---|---|---|---|
| 16 | PP4-4 | 4 | 4 | 8 |
| | PP8-2 | 8 | 2 | 4 |
| 32 | PP4-8 | 4 | 8 | 16 |
| | PP8-4 | 8 | 4 | 8 |
| | PP16-2 | 16 | 2 | 4 |
| 64 | PP8-8 | 8 | 8 | 16 |
| | PP16-4 | 16 | 4 | 8 |
| | PP32-2 | 32 | 2 | 4 |
| 128 | PP16-8 | 16 | 8 | 16 |
| | PP32-4 | 32 | 4 | 8 |
| | PP64-2 | 64 | 2 | 4 |
| 256 | PP32-8 | 32 | 8 | 16 |
| | PP64-4 | 64 | 4 | 8 |
| | PP128-2 | 128 | 2 | 4 |

(B)

(Pilot pattern configuration for SISO and MIXO-1 (more overhead version))

| PP mode | 30us | 60us | 120us | 240us | 480us |
|---|---|---|---|---|---|
| 8192 | PP32-2 | PP16-2 | PP8-2 | - | - |
| | PP32-4 | PP16-4 | PP8-4 | PP4-4 | - |
| | PP32-8 | PP16-8 | PP8-8 | PP4-8 | - |
| 16384 | PP32-2 | PP16-2 | PP8-2 | - | - |
| | PP64-2 | PP32-2 | PP16-2 | PP8-2 | - |
| | PP64-4 | PP32-4 | PP16-4 | PP8-4 | PP8-4 |
| 32768 | PP128-2 | PP64-2 | PP32-2 | PP16-2 | PP16-2 |

(C)

(Pilot pattern configuration for MIXO-2 (less mobility version))

| PP mode | 30us | 60us | 120us | 240us | 480us |
|---|---|---|---|---|---|
| 8192 | PP40-4 | PP20-4 | PP10-4 | - | - |
| | PP40-8 | PP20-8 | PP10-8 | PP5-8 | - |
| | PP40-16 | PP20-16 | PP10-16 | PP5-16 | - |
| 16384 | PP40-4 | PP20-4 | PP10-4 | - | - |
| | PP80-4 | PP40-4 | PP20-4 | PP10-4 | - |
| | PP80-8 | PP40-8 | PP20-8 | PP10-8 | PP5-8 |
| 32768 | PP160-4 | PP80-4 | PP40-4 | PP20-4 | PP10-4 |

(c)

$$DNP1 = \left\lfloor \left( \sum_{i=1}^{N_{TSP}} DNP_{old}(i) \right) \Big/ N_{TSP} \right\rfloor \qquad DNP2 = N_{NP} - DNP1\,(N_{TSP} - 1)$$

FIG. 130

| Packet Type Value | Meaning |
|---|---|
| 000 | IPv4 |
| 001 | IPv6 |
| 010 | Compressed IP Packet |
| 011 | MPEG-2 Transport Stream |
| 100 | Reserved |
| 101 | Pacettized stream (e.g MPEG media transport packet , etc ) |
| 110 | Signaling |
| 111 | Framed_Packet_Type |

FIG. 132

| C/S field value | Meaning | Next Field | Extended Header Size | Extended Header Field | Total Header Length |
|---|---|---|---|---|---|
| 00 | Normal Packet | Reserved | - | - | 1 byte |
| 01 | Concatenated Packet | Count | - | - | 1 byte |
| 10 | Segmented Packet | Seg_ID | 1 byte | Seg_SN , Seg_Len_ID | 2 bytes |
| 11 | Segmented Packet | Seg_ID | 2 bytes | Seg_SN , L_Seg_Len | 3 bytes |

FIG. 133

| Count (3bits) | No. of Concatenated IP packets |
|---|---|
| 000 | 2 |
| 001 | 3 |
| 010 | 4 |
| 011 | 5 |
| 100 | 6 |
| 101 | 7 |
| 110 | 8 |
| 111 | 9 |

FIG. 134

| Seg_Len_ID | Segment Length (byte) |
|---|---|
| 0000 | 512 (= min_ Len) |
| 0001 | 768 |
| 0010 | 1024 |
| 0011 | 1280 |
| 0100 | 1536 |
| 0101 | 1792 |
| 0110 | 2048 |
| 0111 | 2304 |
| 1000 | 2560 |
| 1001 | 2816 |
| 1010 | 3072 |
| 1011 | 3328 |
| 1100 | 3584 |
| 1101 | 3840 |
| 1110 | 4096 |
| 1111 | 4352 |

Segment Length = Seg_Len_ID × Len_Unit + min_Len bytes $L_T = L_H + L_{IPv4}$ Bytes $L_T = L_H + 40 + L_{IPv6}$ Bytes $$L_T = L_H + \sum_{k=1}^{n} L_k \text{ bytes}$$

FIG. 143

| Count (2bits) | No. of Concatenated MPEG -2 TS packets | Size (except sync byte) |
|---|---|---|
| 00 | 8 | 1496 |
| 01 | 16 | 2992 |
| 10 | 24 | 4488 |
| 11 | 32 | 5984 |

FIG. 144

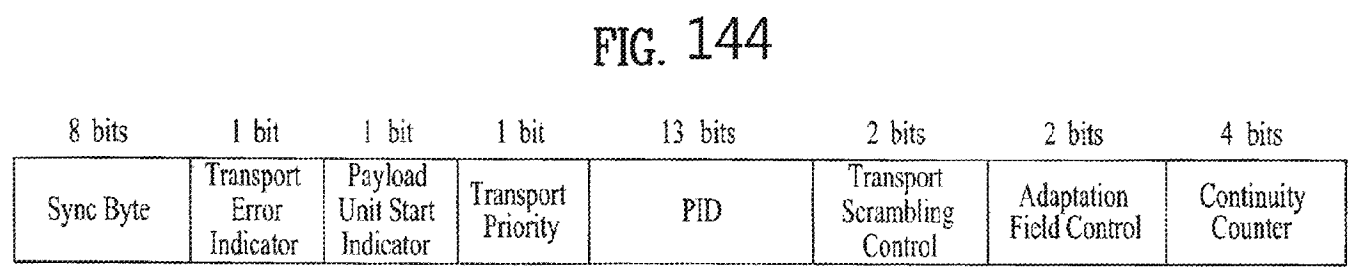

| 8 bits | 1 bit | 1 bit | 1 bit | 13 bits | 2 bits | 2 bits | 4 bits |
|---|---|---|---|---|---|---|---|
| Sync Byte | Transport Error Indicator | Payload Unit Start Indicator | Transport Priority | PID | Transport Scrambling Control | Adaptation Field Control | Continuity Counter |

$$L_T = L_H + L_{CPID} + \frac{n \times 11}{8} - n \times 184 \text{ bytes}$$

FIG. 149

| Count (2bits) | No. of Concatenated MPEG-2 TS packets | Link Layer Packet Length |
|---|---|---|
| 00 | 8 | 1486 |
| 01 | 16 | 2969 |
| 10 | 24 | 4452 |
| 11 | 32 | 5935 |

FIG. 154

$$L_T = L_H + p \times L_{count} + L_{CPID} + \frac{n \times 11}{8} + n \times 184 \quad \text{bytes}$$

FIG. 157

| Syntax | No. of Bits | Format |
|---|---|---|
| framed_packet () { | | |
| ethernet_type | 16 | uimsbf |
| length | 16 | '11' |
| packet() | Var. | bslbf |
| } | | |

APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

CROSS-REFERENCE TO RELATED APPLICATIONS

This application is a Continuation of U.S. patent application Ser. No. 15/656,296 filed on Jul. 21, 2017, which is the Continuation of U.S. patent application Ser. No. 14/912,583 filed on Feb. 17, 2016 (now U.S. Pat. No. 9,749,680 issued on Aug. 29, 2017), which is the National Phase of PCT International Application No. PCT/KR2014/007690 filed on Aug. 19, 2014, which claims the benefit under 35 U.S.C. § 119(e) to U.S. Provisional Application No. 61/867,163 filed on Aug. 19, 2013, all of these applications are hereby expressly incorporated by reference into the present application.

BACKGROUND OF THE INVENTION

Field of the Invention

The present invention relates to an apparatus for transmitting broadcast signals, an apparatus for receiving broadcast signals and methods for transmitting and receiving broadcast signals.

Discussion of the Related Art

Transmission/reception (Tx/Rx) of IP-based broadcast signals has been extended in digital broadcast systems. Specifically, the importance of IP-based broadcast signal Tx/Rx environments has been emphasized in the mobile digital broadcast schemes, for example, DVB-NGH from among European broadcast standards or ATSC-MH from among North American standards. In addition, it is expected that a hybrid broadcast system designed to be interoperable with the broadcast network or the Internet network will be constructed in the next generation broadcast system.

Meanwhile, it will take a long time to fully switch from the legacy MPEG-2 TS based broadcast system to the IP broadcast system in terms of industrial or political aspects, and there is a need to develop a new broadcast system capable of simultaneously supporting IP and MPEG-2 TS schemes.

SUMMARY OF THE INVENTION

An object of the present invention is to provide a structure of a link layer packet that is capable of being processed irrespective of packet types received from a higher layer in the next generation broadcast system.

Another object of the present invention is to provide a method for allowing information contained in packets of a higher layer in a protocol stack to be used in the packet processing of a lower layer.

Another object of the present invention is to provide a method for reducing overhead during transmission of higher layer packets.

The object of the present invention can be achieved by providing a method for receiving a broadcast signal comprising: receiving a broadcast signal, parsing a second packet at the received broadcast signal, wherein the second packet includes a fixed header, an extended header having a variable length, and a payload including the first packet, wherein the fixed header includes a packet type element for identifying a category of the first packet and an indicator part element for identifying a construction of the payload, wherein the indicator part element includes a C/S (Concatenation/Segmentation) field for identifying a format of the first packet contained in the payload of the second packet, parsing the first packet using the fixed header and/or the extended header and displaying broadcast contents by processing the parsed first packet.

Preferably, the packet type element identifies that the first packet is an IPv4 (Internet Protocol version 4) packet.

Preferably, the parsing of the second packet at the received broadcast signal includes: if the C/S field indicates that a general IPv4 packet is contained in the payload of the second packet, parsing a length field contained in a header of the first packet that is spaced apart from a payload start point of the second packet by a predetermined offset and identifying a total length of the second packet by adding a header length of the second packet to a length of the first packet indicated by the length field.

Preferably, if the C/S field indicates that a plurality of concatenated IPv4 packets are contained in the payload of the second packet, the indicator part element further includes a count field indicating the number of first packets contained in the payload.

Preferably, the parsing of the second packet at the received broadcast signal includes: if the C/S field indicates that a plurality of concatenated IPv4 packets are contained in the payload of the second packet, parsing a length field contained in a header of the first packet that is spaced apart from a payload start point of the second packet by a predetermined offset, and parsing a length field contained in a header of a next first packet that is spaced apart from a payload end point of the first packet identified by the parsed length field by the predetermined offset, repeating the parsing step of the length field until all the length fields contained in the headers of as many first packets as the number of first packets identified by the count field are completely parsed and identifying a total length of the second packet by adding a header length of the second packet to the lengths of the IPv4 packets indicated by the parsed length fields.

Preferably, the packet type element identifies that the first packet is an IPv6 (Internet Protocol version 6) packet.

Preferably, the parsing of the second packet at the received broadcast signal includes: if the C/S field indicates that a general IPv6 packet is contained in the payload of the second packet, parsing a length field contained in a header of the first packet that is spaced apart from a payload start point of the second packet by a predetermined offset, and identifying a total length of the second packet by adding a sum of a header length of the first packet and a header length of the second packet to a length of the first packet indicated by the length field.

Preferably, if the C/S field indicates that a plurality of concatenated IPv6 packets are contained in the payload of the second packet, the indicator part element further includes a count field indicating the number of first packets contained in the payload.

Preferably, the parsing of the second packet at the received broadcast signal includes: if the C/S field indicates that a plurality of concatenated IPv6 packets are contained in the payload of the second packet, parsing a length field contained in a header of the first packet that is spaced apart from a payload start point of the second packet by a predetermined offset, and parsing a length field contained in a header of a next first packet that is spaced apart from a payload end point of the first packet identified by the parsed length field by the predetermined offset, repeating the parsing step of the length field until all the length fields contained in the headers of as many first packets as the number of first packets identified by the count field are completely parsed and identifying a total length of the second packet by adding not only a specific value obtained when a header length of the IPv6 packet is multiplied by the number of packets identified by the count field but also a header length of the second packet to the lengths of the IPv6 packets indicated by the parsed length fields.

In accordance with another embodiment of the present invention, an apparatus for receiving a broadcast signal comprises: a receiver configured to receive a broadcast signal, a common protocol stack processor configured to parse a second packet at the received broadcast signal, wherein the second packet includes a fixed header, an extended header having a variable length, and a payload including the first packet, wherein the fixed header includes a packet type element for identifying a category of the first packet and an indicator part element for identifying a construction of the payload, wherein the indicator part element includes a C/S (Concatenation/Segmentation) field for identifying a format of the first packet contained in the payload of the second packet, and configured to parse the first packet using the fixed header and/or the extended header, and an A/V (Audio/Video) processor configured to display broadcast contents by processing the parsed first packet.

Preferably, the packet type element identifies that the first packet is an IPv4 (Internet Protocol version 4) packet.

Preferably, the common protocol stack processor, if the C/S field indicates that a general IPv4 packet is contained in the payload of the second packet, parses a length field contained in a header of the first packet that is spaced apart from a payload start point of the second packet by a predetermined offset; and identifies a total length of the second packet by adding a header length of the second packet to a length of the first packet indicated by the length field.

Preferably, if the C/S field indicates that a plurality of concatenated IPv4 packets are contained in the payload of the second packet, the indicator part element further includes a count field indicating the number of first packets contained in the payload.

Preferably, the common protocol stack processor, if the C/S field indicates that a plurality of concatenated IPv4 packets are contained in the payload of the second packet, parses a length field contained in a header of the first packet that is spaced apart from a payload start point of the second packet by a predetermined offset, and parses a length field contained in a header of a next first packet that is spaced apart from a payload end point of the first packet identified by the parsed length field by the predetermined offset; repeats the parsing of the length field until all the length fields contained in the headers of as many first packets as the number of first packets identified by the count field are completely parsed; and identifies a total length of the second packet by adding a header length of the second packet to the lengths of the IPv4 packets indicated by the parsed length fields.

Preferably, the packet type element identifies that the first packet is an IPv6 (Internet Protocol version 6) packet.

Preferably, the common protocol stack processor, if the C/S field indicates that a general IPv6 packet is contained in the payload of the second packet, parses a length field contained in a header of the first packet that is spaced apart from a payload start point of the second packet by a predetermined offset; and identifies a total length of the second packet by adding a sum of a header length of the first packet and a header length of the second packet to a length of the first packet indicated by the length field.

Preferably, if the C/S field indicates that a plurality of concatenated IPv6 packets are contained in the payload of the second packet, the indicator part element further includes a count field indicating the number of first packets contained in the payload.

Preferably, the common protocol stack processor, if the C/S field indicates that a plurality of concatenated IPv6 packets are contained in the payload of the second packet, parses a length field contained in a header of the first packet that is spaced apart from a payload start point of the second packet by a predetermined offset, and parses a length field contained in a header of a next first packet that is spaced apart from a payload end point of the first packet identified by the parsed length field by the predetermined offset, repeats the parsing of the length field until all the length fields contained in the headers of as many first packets as the number of first packets identified by the count field are completely parsed; and identifies a total length of the second packet by adding not only a specific value obtained when a header length of the IPv6 packet is multiplied by the number of packets identified by the count field but also a header length of the second packet to the lengths of the IPv6 packets indicated by the parsed length fields.

As is apparent from the above description, the broadcast receiver according to the embodiments can process packets of a link layer, irrespective of packet types received from an upper layer.

The broadcast receiver can use information contained in packets of a higher layer of a protocol stack, prior to execution of higher layer processing, i.e., in the processing step of lower layer packets.

In accordance with the embodiments, the broadcast receiver can reduce overhead encountered in a transmission process of higher layer packets.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 22 illustrates a structure of a random generator according to an embodiment of the present invention.

FIG. 23 illustrates a random generator according to an embodiment of the present invention.

FIG. 24 illustrates a random generator according to another embodiment of the present invention.

FIG. 35 shows graphs representing results obtained when the scrambling sequence according to an embodiment of the present invention is used.

FIG. 36 shows graphs representing results obtained when a scrambling sequence according to another embodiment of the present invention is used.

FIG. 68 is a view illustrating signaling information according to an embodiment of the present invention.

FIG. 90 shows a table illustrating information related to a reception mode according to an embodiment of the present invention.

FIG. 92 shows tables including Tx parameters according to the embodiment.

FIG. 93 shows a table including Tx parameters capable of optimizing the effective signal bandwidth (eBW) according to the embodiment.

FIG. 94 shows a table including Tx parameters for optimizing the effective signal bandwidth (eBW) according to another embodiment of the present invention.

FIG. 95 shows a Table including Tx parameters for optimizing the effective signal bandwidth (eBW) according to another embodiment of the present invention.

FIG. 96 shows Tx parameters according to another embodiment of the present invention.

FIG. 98 is a table showing information related to the reception mode according to another embodiment of the present invention.

FIG. 100 shows a Table in which pilot parameters are defined according to an embodiment of the present invention.

FIG. 101 shows a Table in which pilot parameters of another embodiment are defined.

FIG. 119 is a diagram showing an embodiment of NUQ-64 for 11/15 code rate according to the present invention.

FIG. 120 is a diagram showing an embodiment of NUQ-64 for 12/15 code rate according to the present invention.

FIG. 121 is a diagram showing an embodiment of NUQ-64 for 13/15 code rate according to the present invention.

FIG. 122 is a view illustrating a null packet deletion block 16000 according to another embodiment of the present invention.

FIG. 123 is a view illustrating a null packet insertion block 17000 according to another embodiment of the present invention.

FIG. 124 is a view illustrating a null packet spreading method according to an embodiment of the present invention.

FIG. 125 is a view illustrating a null packet offset method according to an embodiment of the present invention.

FIG. 126 is a flowchart illustrating a null packet spreading method according to an embodiment of the present invention.

FIG. 127 is a conceptual diagram illustrating a protocol stack for the next generation broadcast system based on hybrid according to an embodiment of the present invention.

FIG. 128 is a conceptual diagram illustrating an interface of a link layer according to an embodiment of the present invention.

FIG. 129 is a conceptual diagram illustrating a packet structure of a link layer according to an embodiment of the present invention.

FIG. 130 shows packet types dependent upon the packet type element values according to an embodiment of the present invention.

Figure 131:
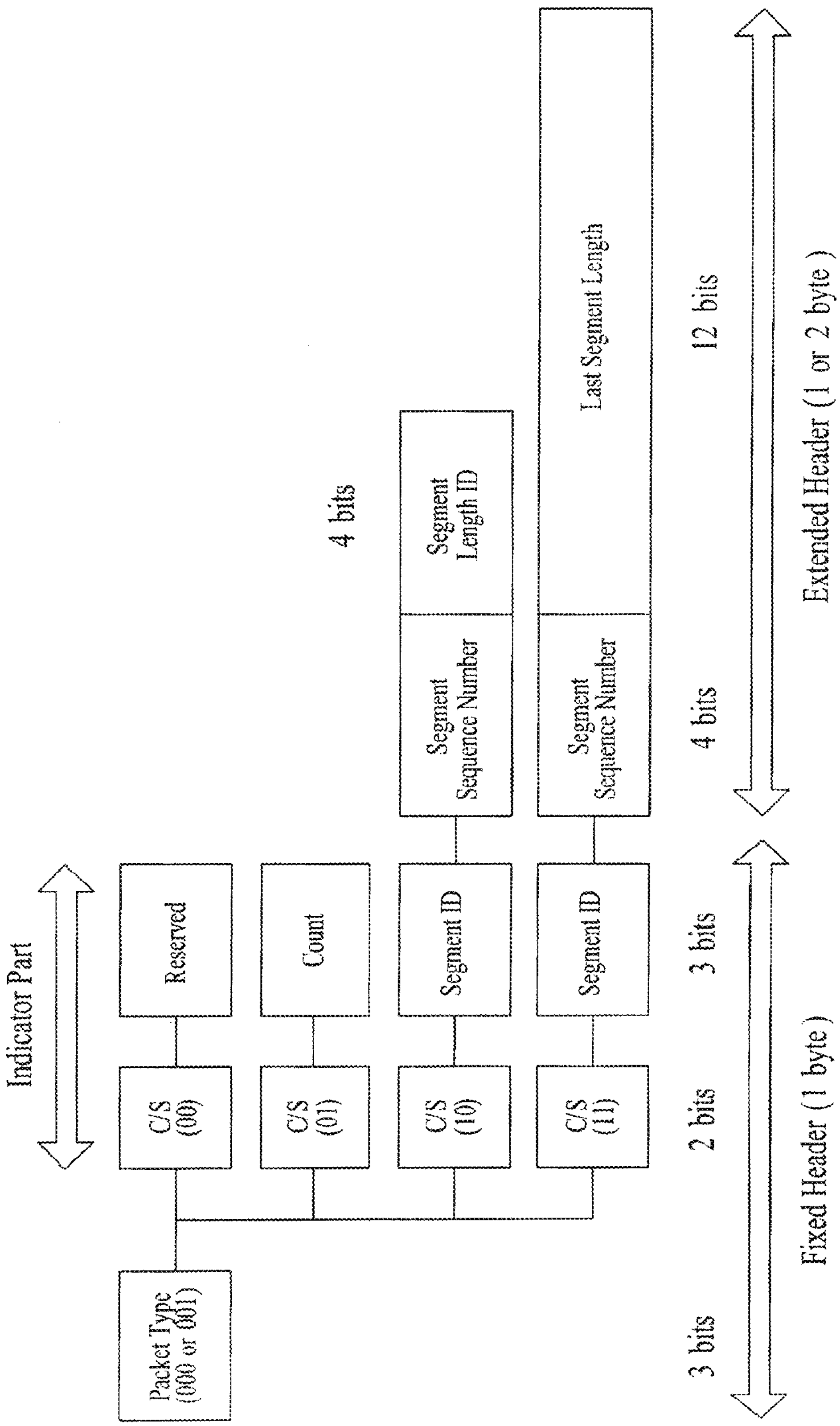

FIG. 131 is a conceptual diagram illustrating a header structure of a link layer packet when an IP packet is transmitted to the link layer according to an embodiment of the present invention.

FIG. 132 is a conceptual diagram illustrating the meaning and header structures according to C/S field values.

FIG. 133 is a conceptual diagram illustrating the meaning according to the count field values.

FIG. 134 is a conceptual diagram illustrating the meaning and segment lengths according to values of Seg_Len_ID field.

Figure 135:
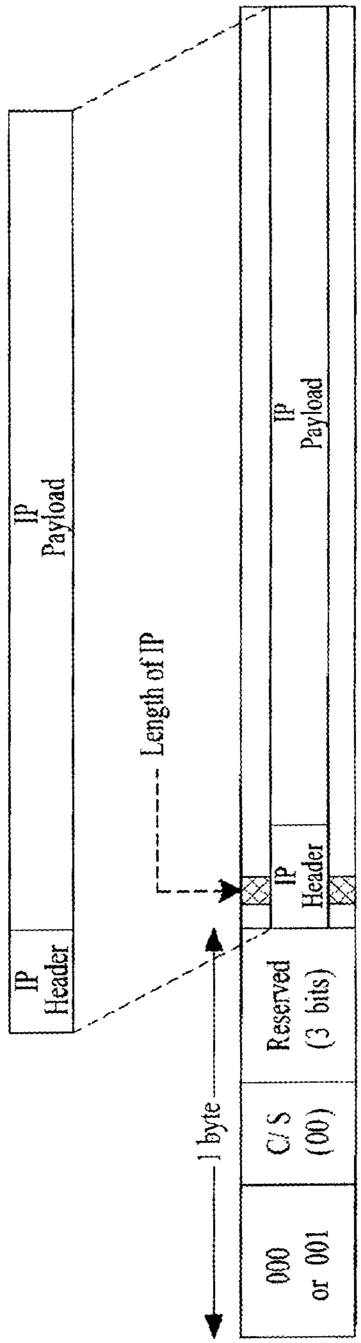

FIG. 135 is a conceptual diagram illustrating an equation for encapsulating a normal packet and an equation for calculating a link layer packet length.

Figure 136:
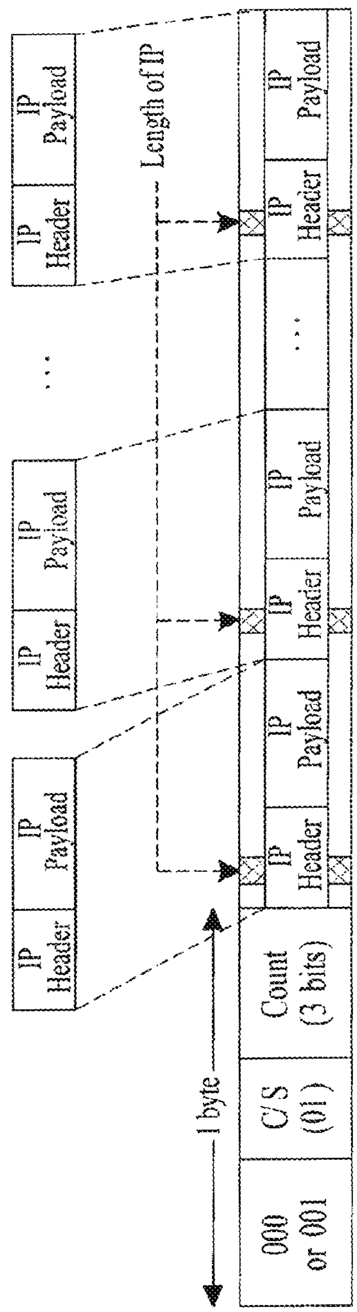

FIG. 136 is a conceptual diagram illustrating a process for encapsulating a concatenated packet and an equation for calculating a link layer packet length.

Figure 137:
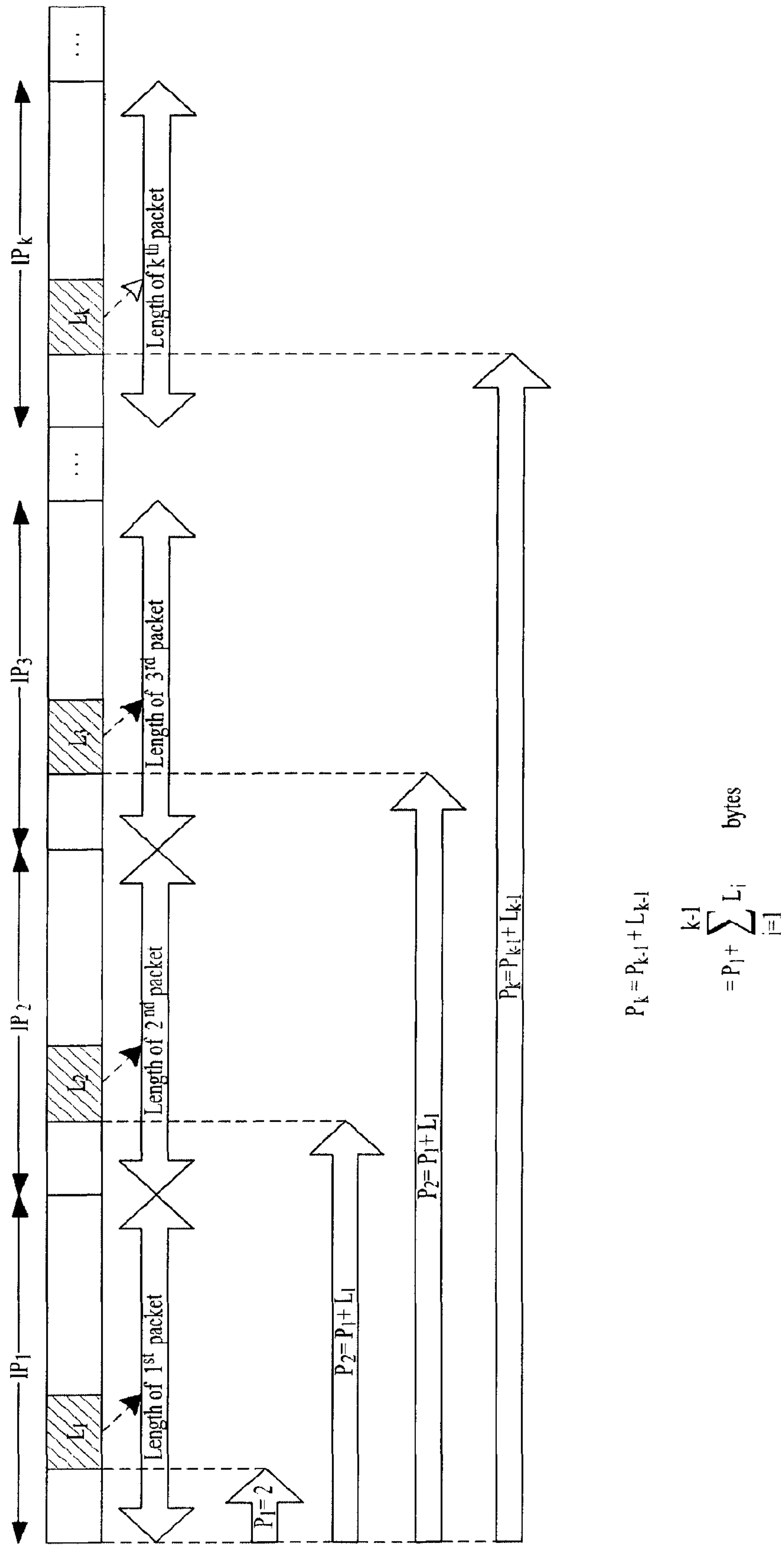

FIG. 137 is a conceptual diagram illustrating a process for calculating the length of a concatenated packet including an IPv4 packet and an equation for calculating an offset value at which a length field of the IP packet is located.

Figure 138:
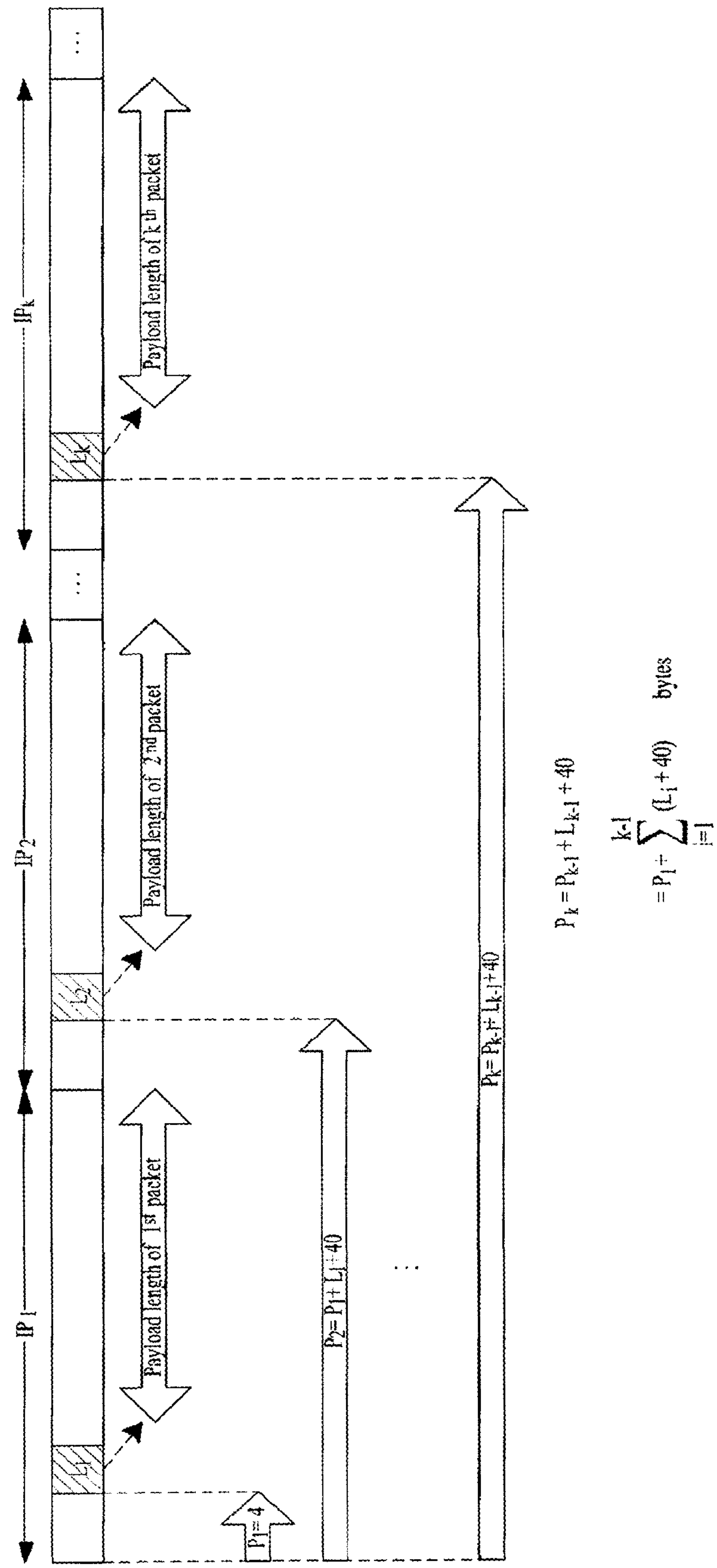

FIG. 138 is a conceptual diagram illustrating a process for calculating the length of a concatenated packet including an IPv6 packet and an equation for calculating an offset value at which a length field of the IP packet is located.

Figure 139:
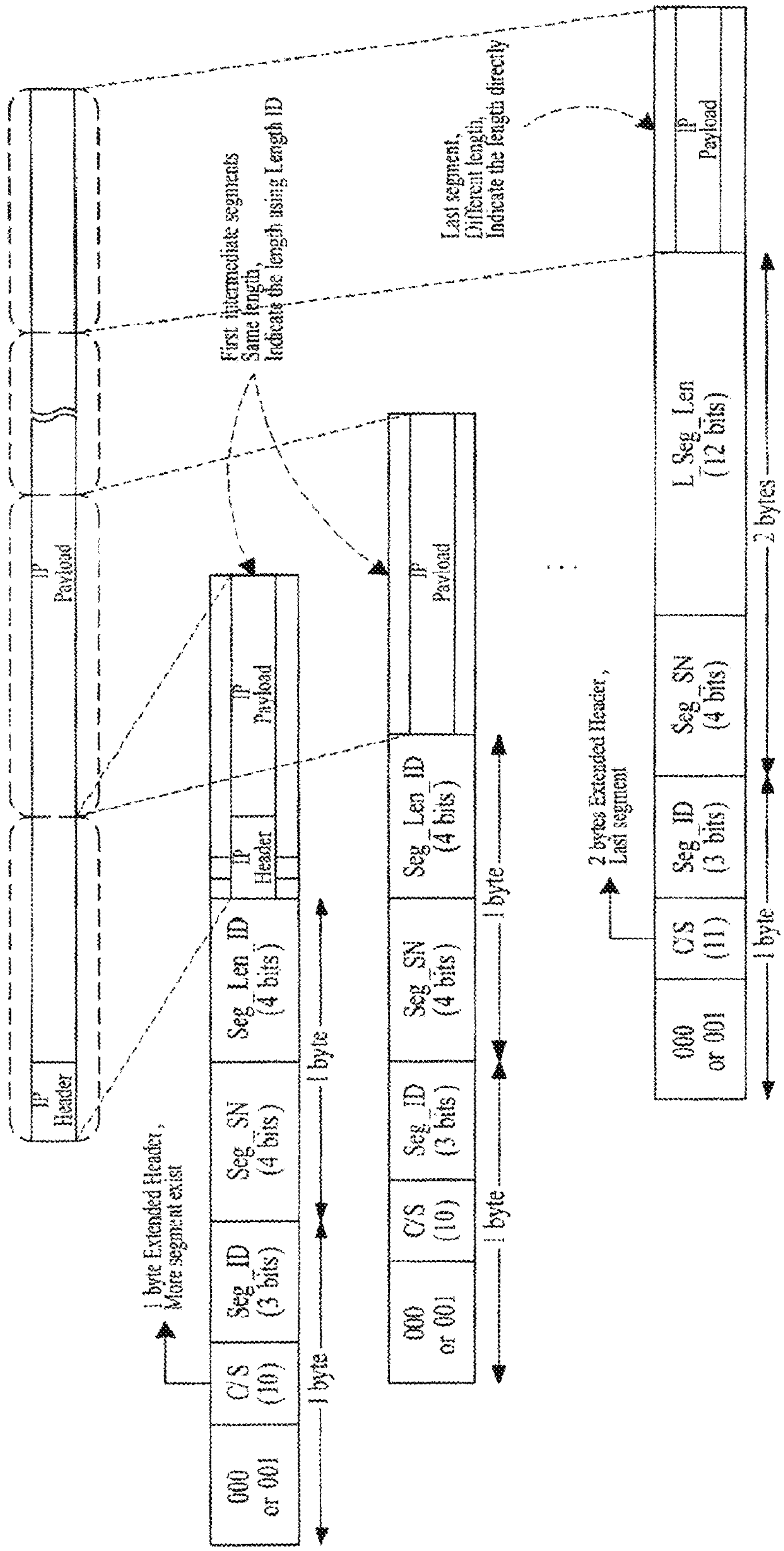

FIG. 139 is a conceptual diagram illustrating an encapsulation process of a segmented packet according to an embodiment of the present invention.

Figure 140:
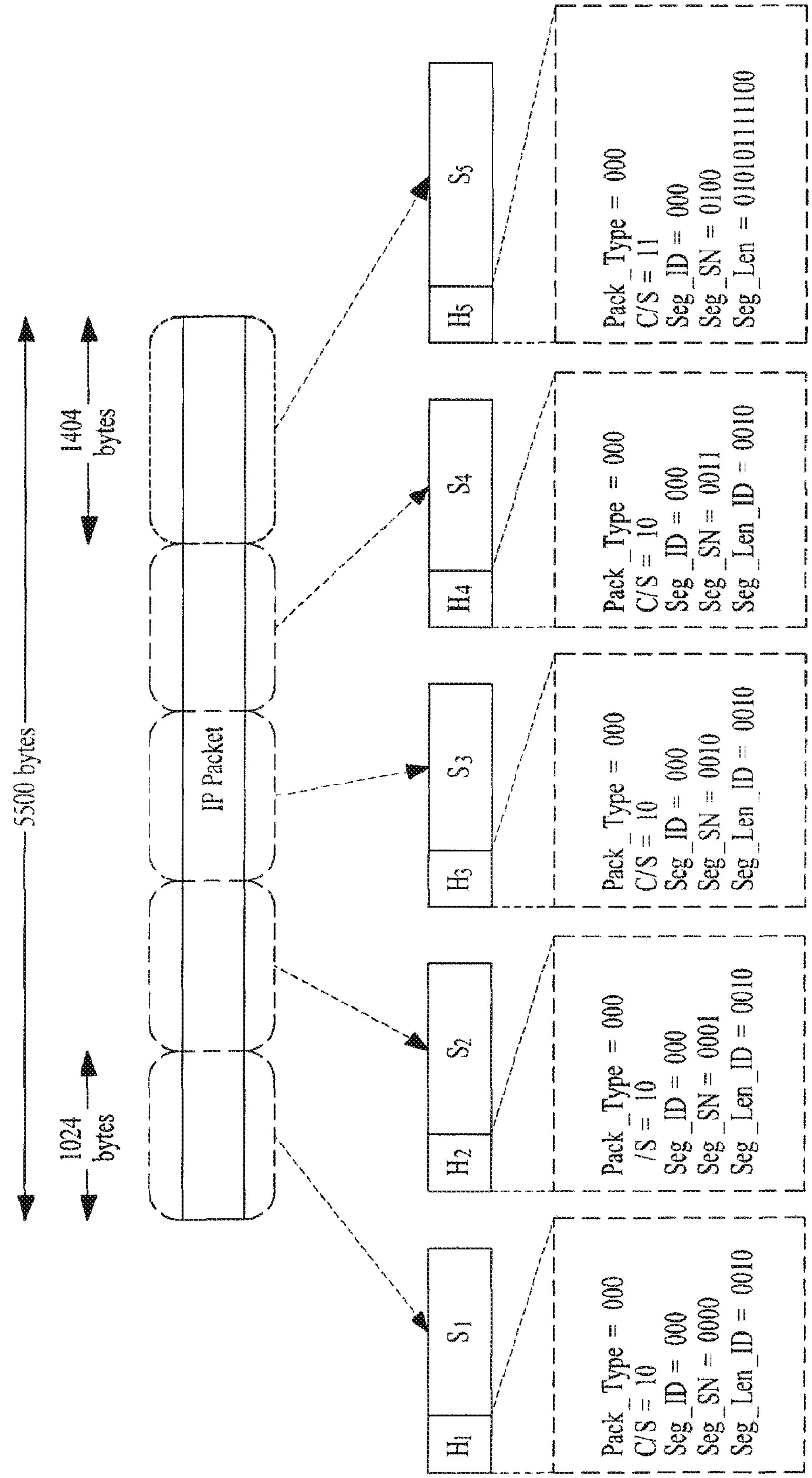

FIG. 140 is a conceptual diagram illustrating a segmentation process of an IP packet and header information of a link layer packet according to an embodiment of the present invention.

Figure 141:
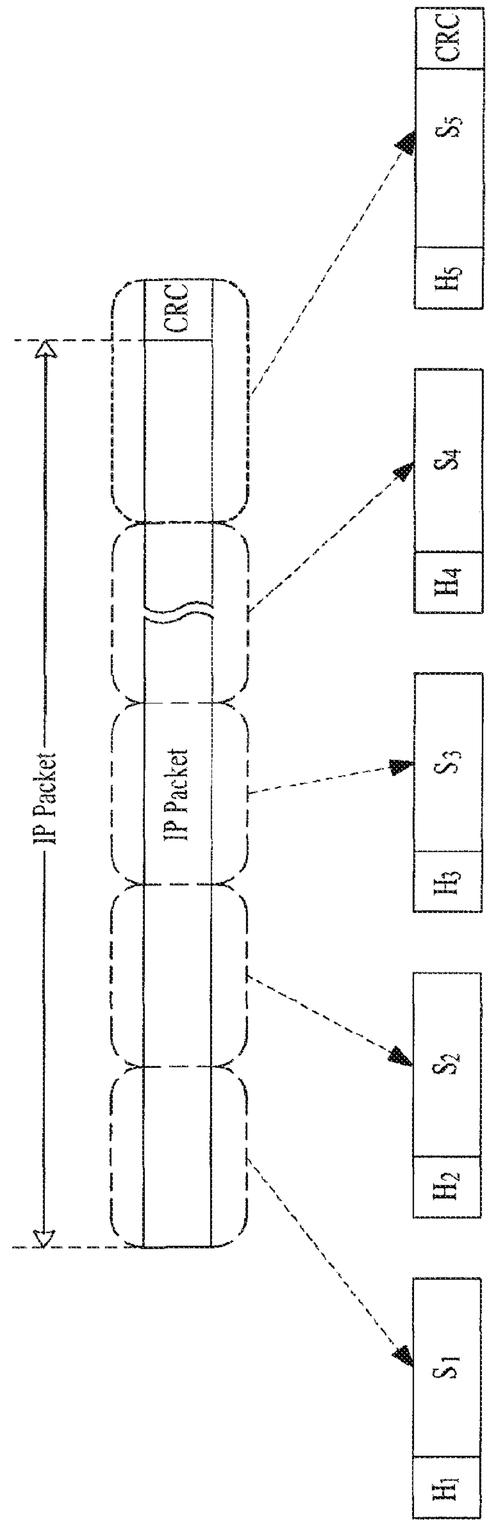

FIG. 141 is a conceptual diagram illustrating a segmentation process of an IP packet including a cyclic redundancy check (CRC) according to an embodiment of the present invention.

Figure 142:
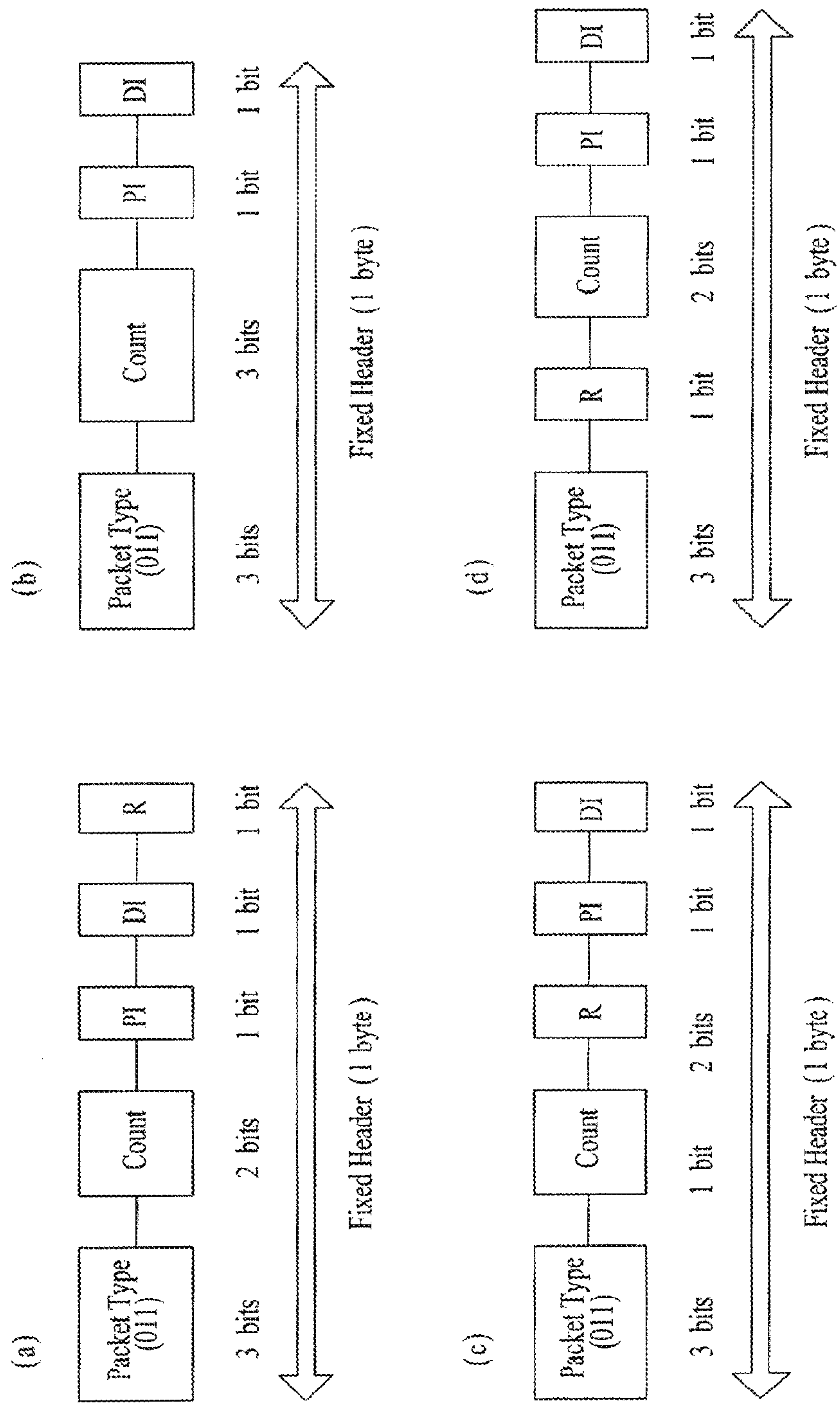

FIG. 142 is a conceptual diagram illustrating a header structure of a link layer packet when MPEG-2 TS (Transport Stream) is input to a link layer according to an embodiment of the present invention.

FIG. 143 shows the number of MPEG-2 TS packets contained in a payload of the link layer packet according to values of a count field.

FIG. 144 is a conceptual diagram illustrating a header of the MPEG-2 TS packet according to an embodiment of the present invention.

Figure 145:
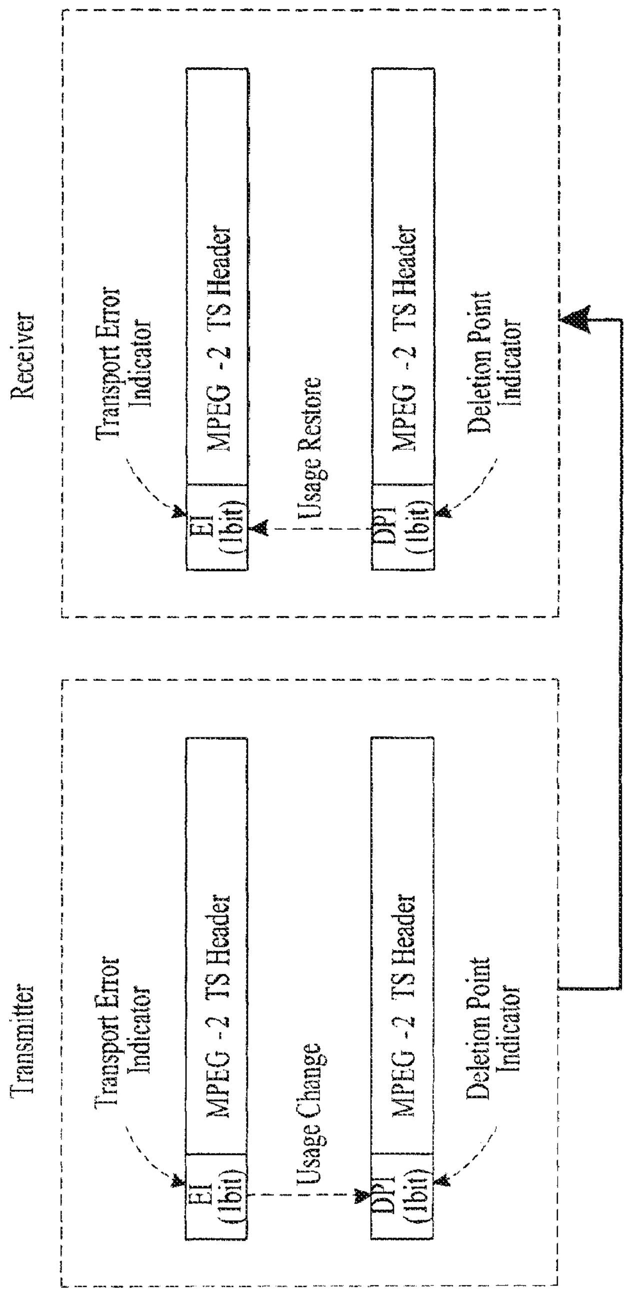

FIG. 145 is a conceptual diagram illustrating a process for allowing a transceiver to change a usage of a transport error indicator field according to an embodiment of the present invention.

Figure 146:
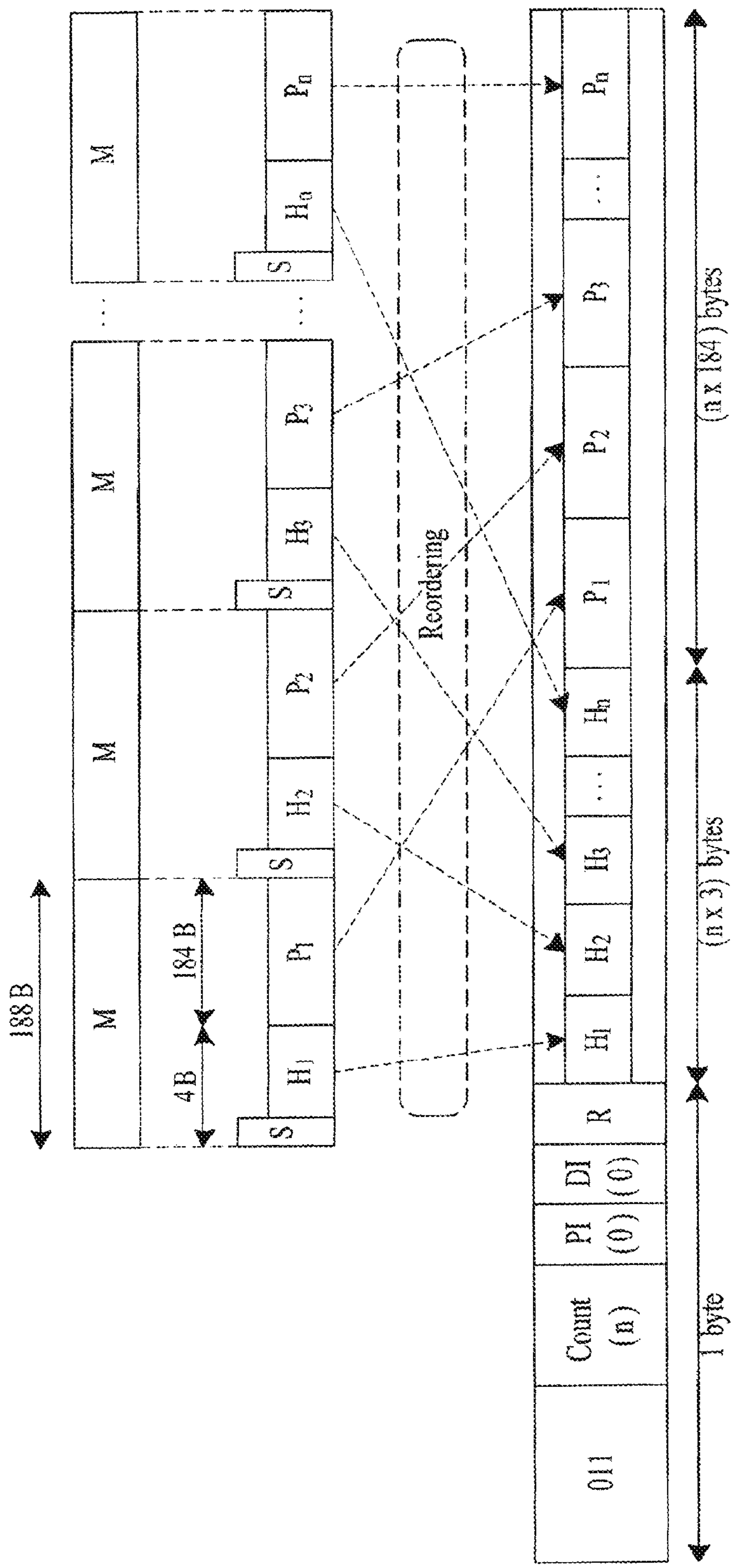

FIG. 146 is a conceptual diagram illustrating an encapsulation process of the MPEG-2 TS packet according to an embodiment of the present invention.

Figure 147:
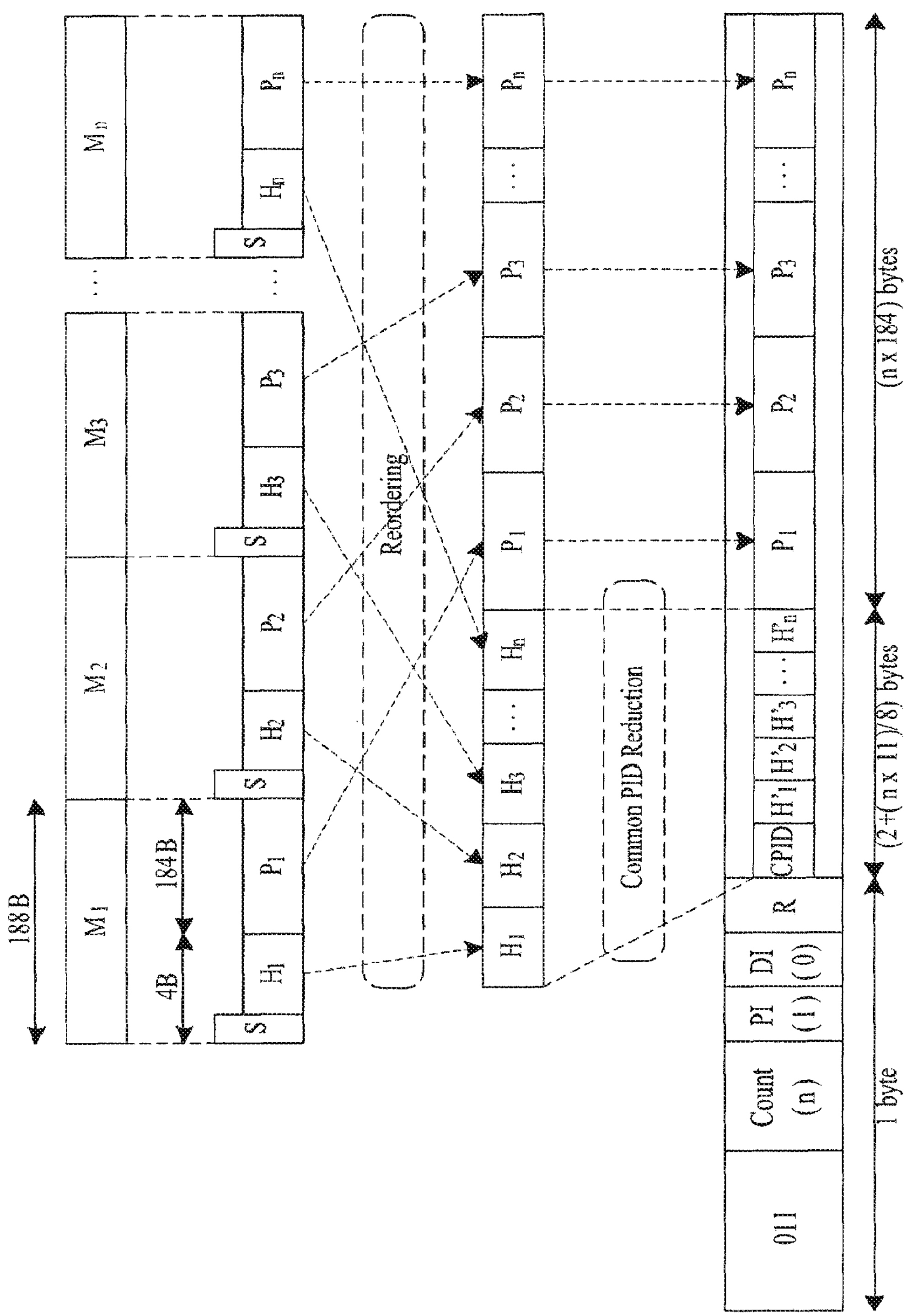

FIG. 147 is a conceptual diagram illustrating an encapsulation process of the MPEG-2 TS packet having the same PID according to an embodiment of the present invention.

Figure 148:
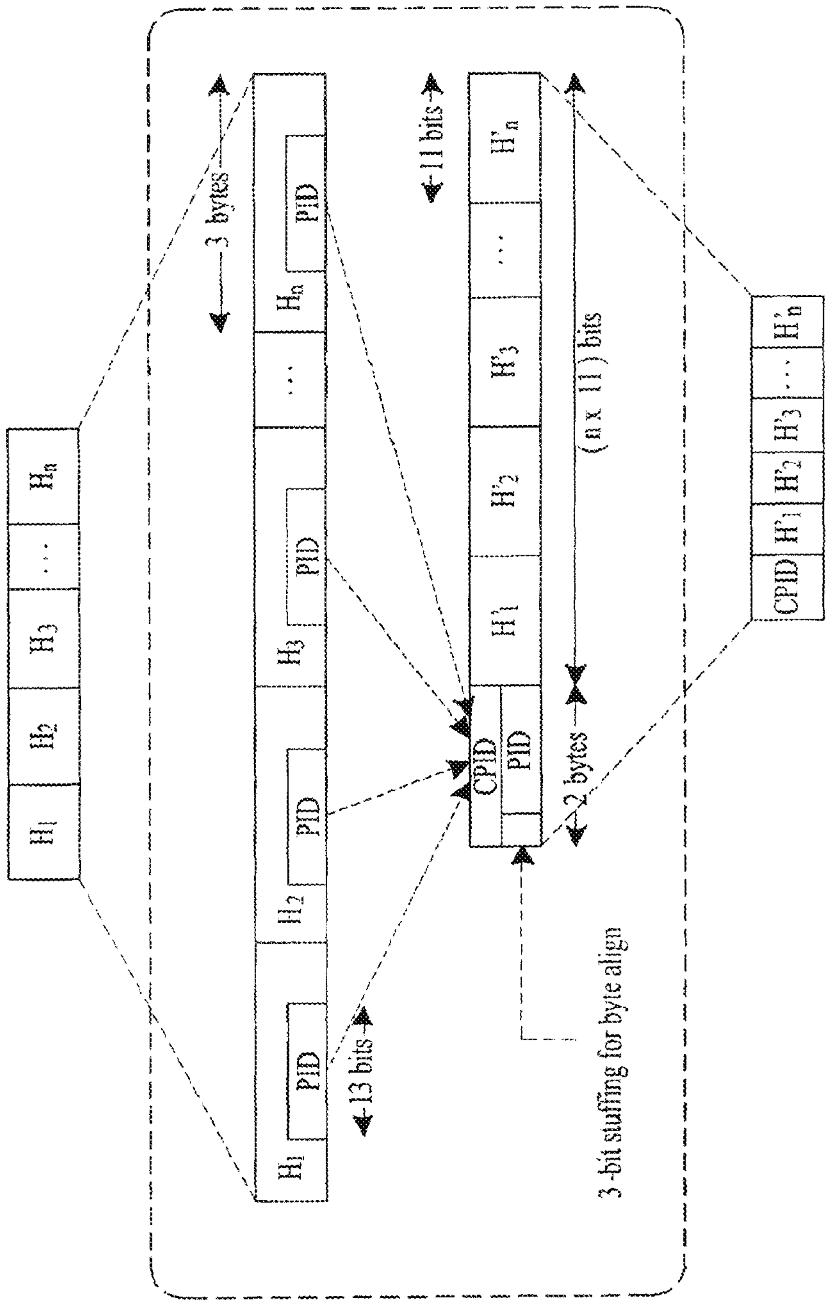

FIG. 148 is a conceptual diagram illustrating an equation for calculating the length of a link layer packet through a Common PID reduction process and a Common PID reduction process.

FIG. 149 is a conceptual diagram illustrating the number of concatenated MPEG-2 TS packets and the length of a link layer packet according to count field values when Common PID reduction is used.

Figure 150:
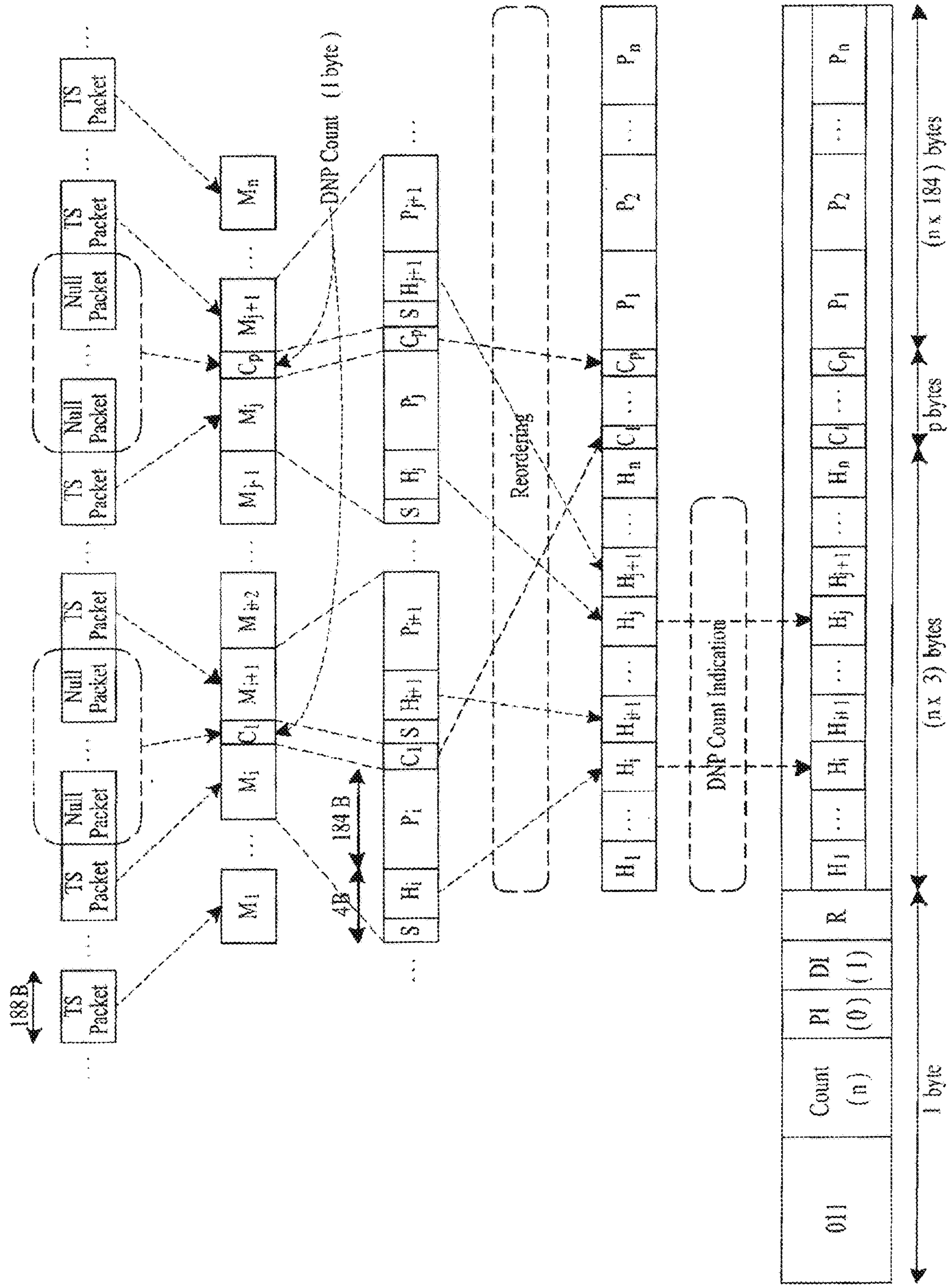

FIG. 150 is a conceptual diagram illustrating a process for encapsulating the MPEG-2 TS packet including a null packet according to an embodiment of the present invention.

Figure 151:
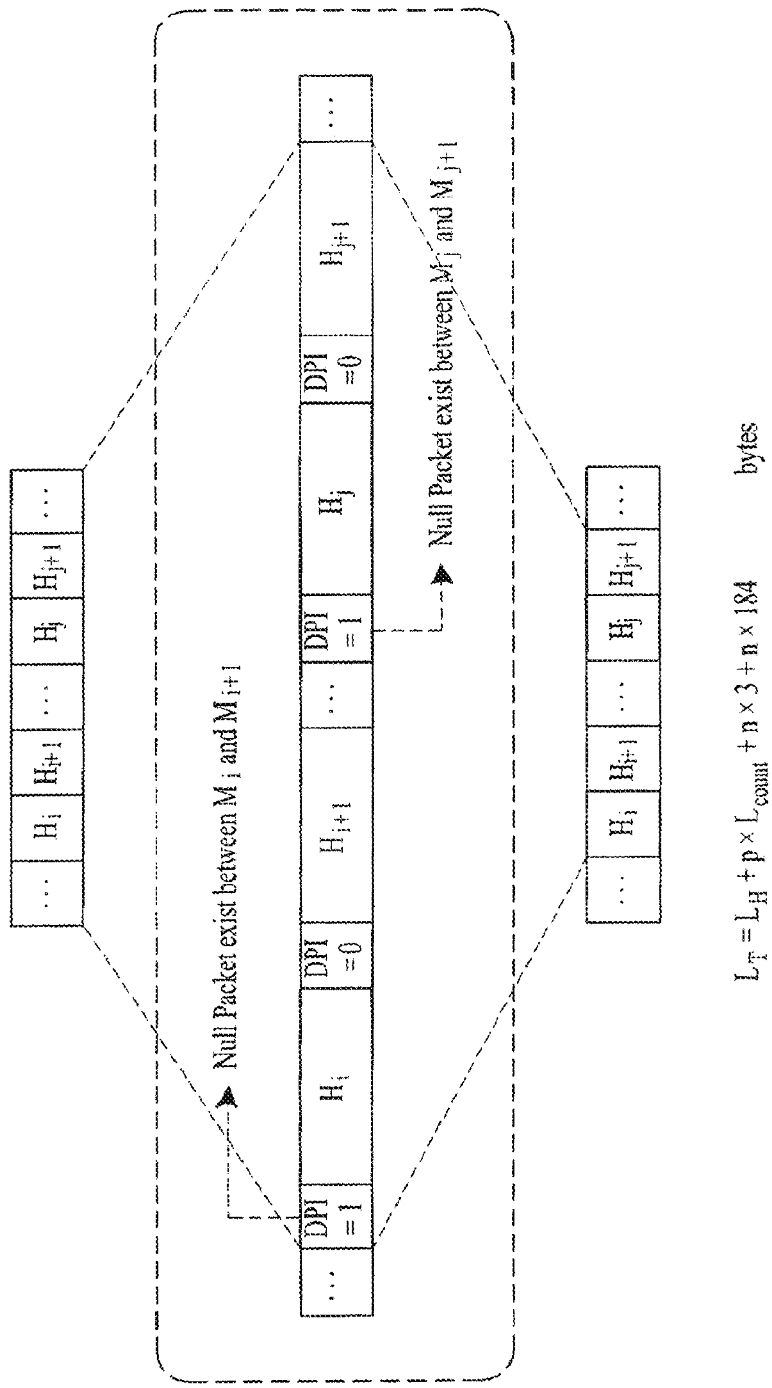

FIG. 151 is a conceptual diagram illustrating a step for processing an indicator configured to count a removed null packet and an equation for calculating the length of a link layer packet in the processing step.

Figure 152:
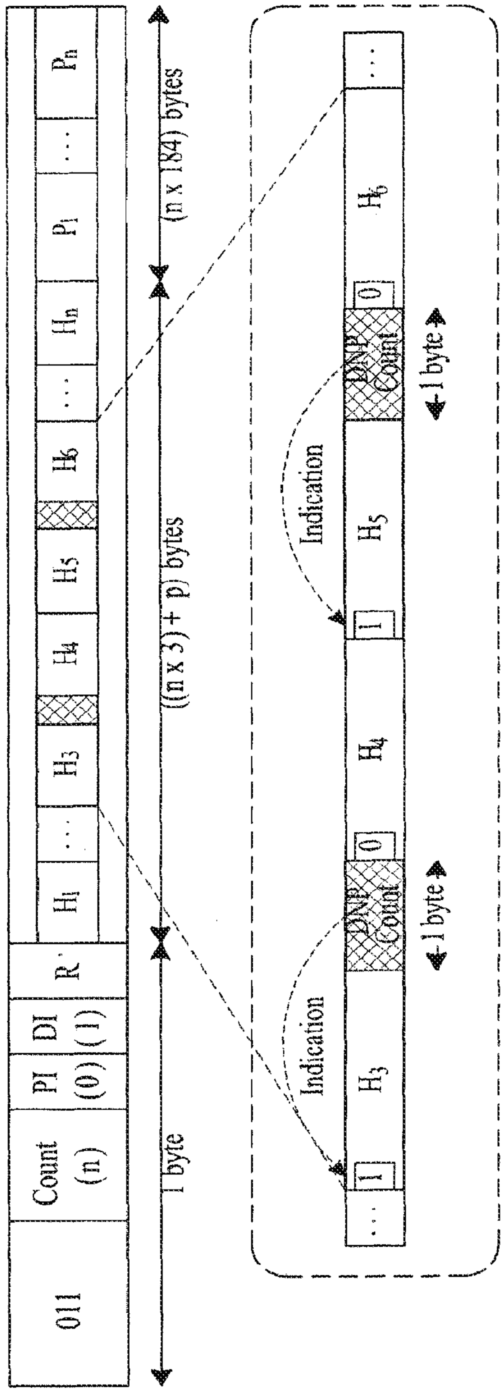

FIG. 152 is a conceptual diagram illustrating a process for encapsulating the MPEG-2 TS packet including a null packet according to another embodiment of the present invention.

Figure 153:
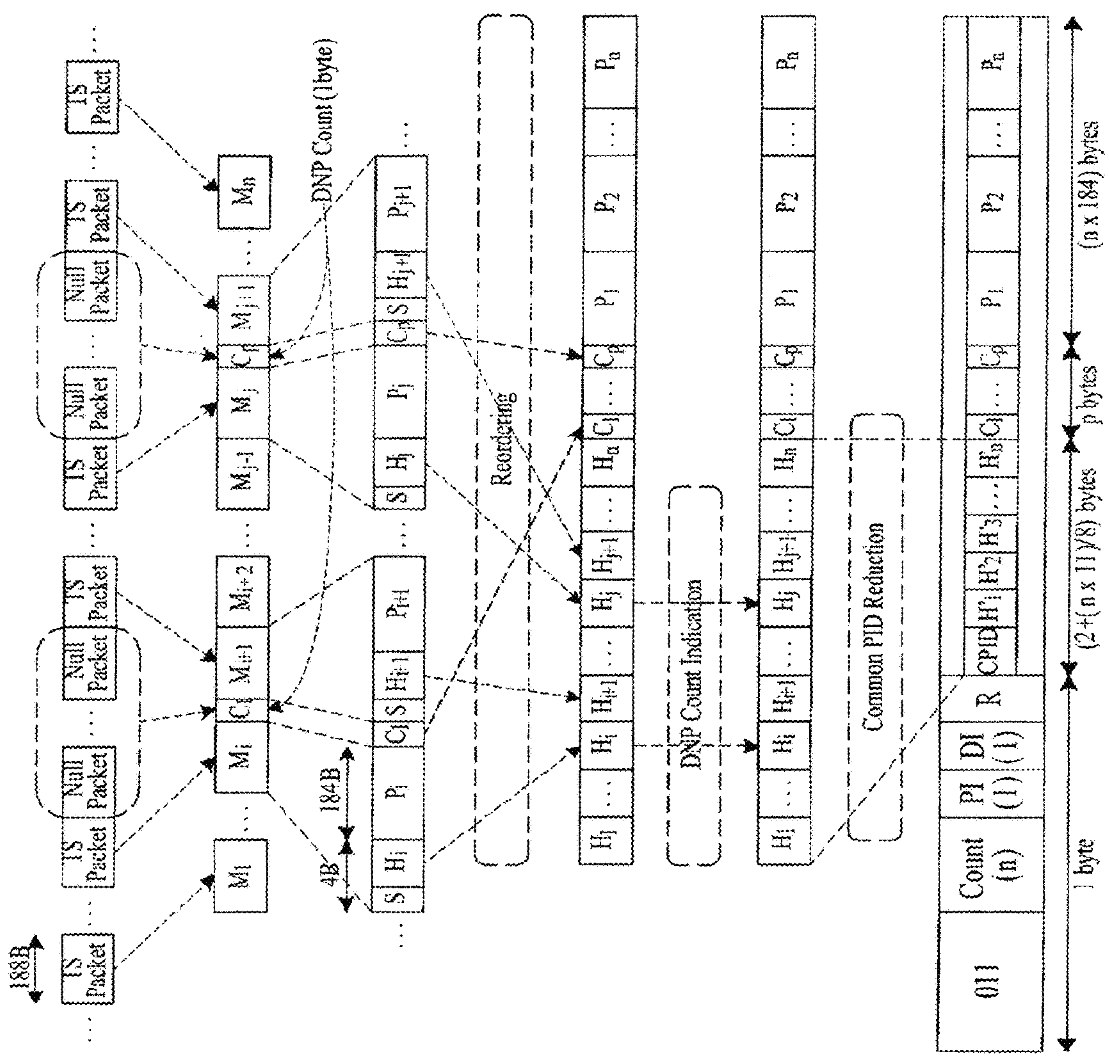

FIG. 153 is a conceptual diagram illustrating a process for encapsulating the MPEG-2 TS packets including the same packet identifiers (PIDs) in a stream including a null packet according to an embodiment of the present invention.

FIG. 154 is a conceptual diagram illustrating an equation for calculating the length of a link layer packet when the MPEG-2 TS packets having the same PIDs are encapsulated in a stream including a null packet according to an embodiment of the present invention.

Figure 155:
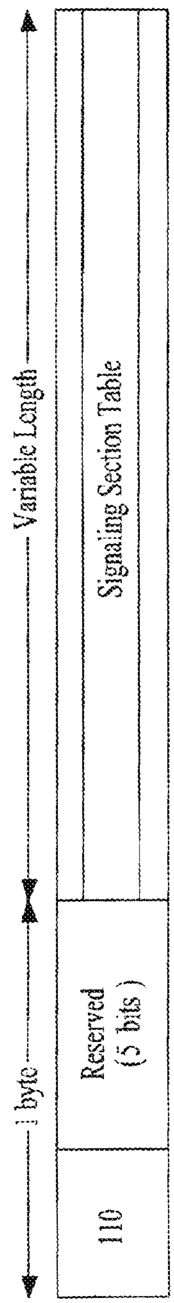

FIG. 155 is a conceptual diagram illustrating a link layer packet structure for transmitting signaling information according to an embodiment of the present invention.

Figure 156:
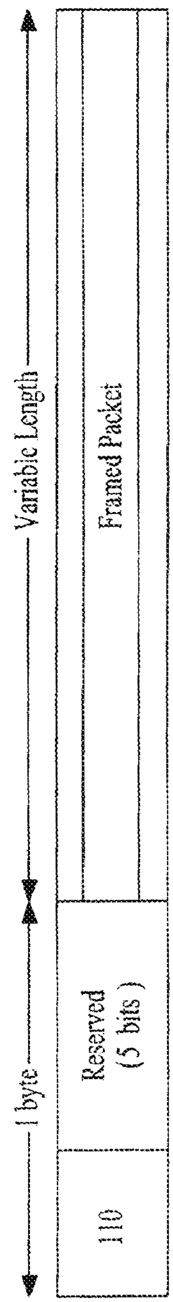

FIG. 156 is a conceptual diagram illustrating a link layer packet structure for transmitting the framed packet according to an embodiment of the present invention.

FIG. 157 shows a syntax of the framed packet according to an embodiment of the present invention.

Figure 158:
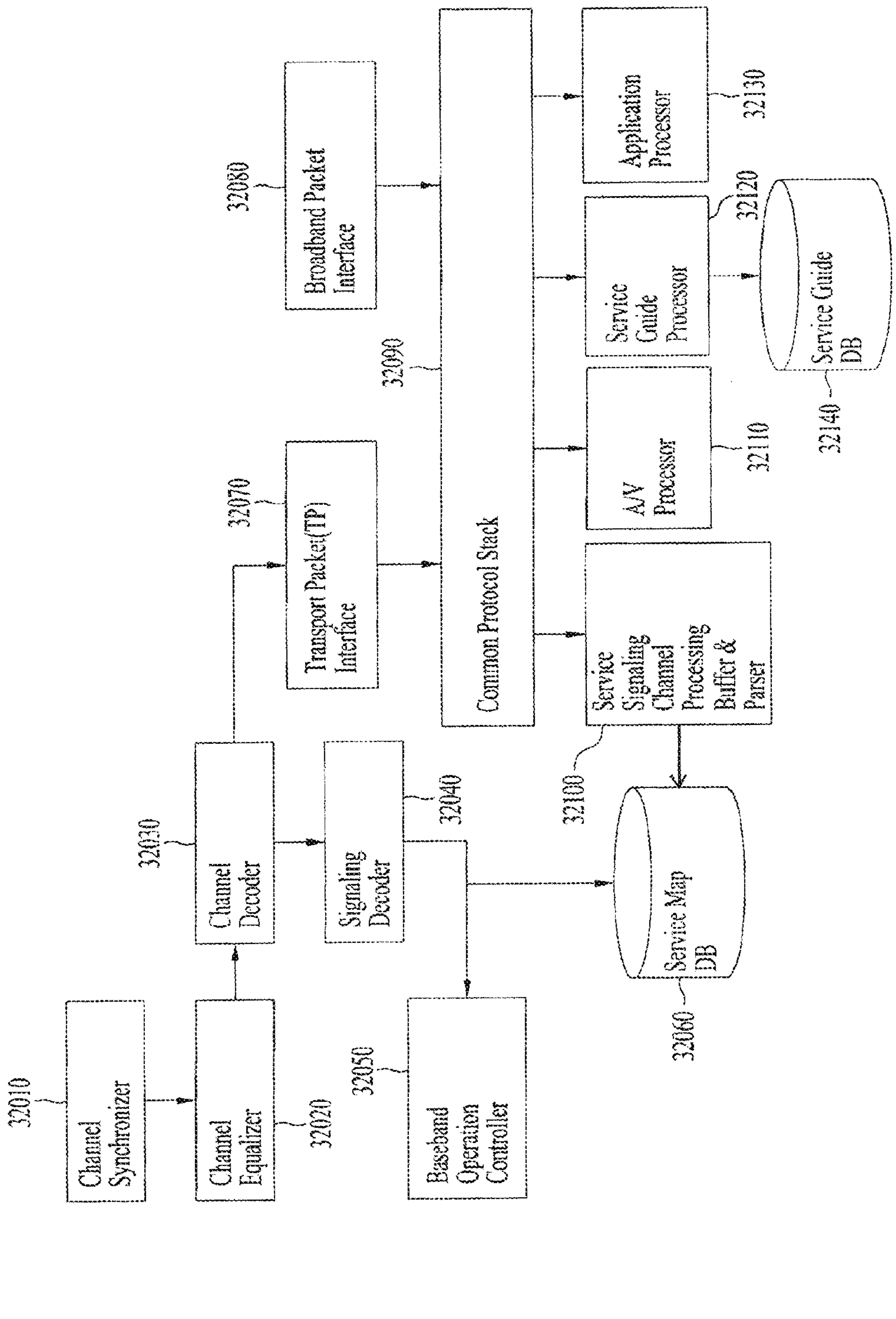

FIG. 158 is a block diagram illustrating a receiver of the next generation broadcast system according to an embodiment of the present invention.

DETAILED DESCRIPTION OF THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

Although most terms of elements in this specification have been selected from general ones widely used in the art taking into consideration functions thereof in this specification, the terms may be changed depending on the intention or convention of those skilled in the art or the introduction of new technology. Some terms have been arbitrarily selected by the applicant and their meanings are explained in the following description as needed. Thus, the terms used in this specification should be construed based on the overall content of this specification together with the actual meanings of the terms rather than their simple names or meanings.

The term "signaling" in the present invention may indicate that service information (SI) that is transmitted and received from a broadcast system, an Internet system, and/or a broadcast/Internet convergence system. The service information (SI) may include broadcast service information (e.g., ATSC-SI and/or DVB-SI) received from the existing broadcast systems.

The term "broadcast signal" may conceptually include not only signals and/or data received from a terrestrial broadcast, a cable broadcast, a satellite broadcast, and/or a mobile broadcast, but also signals and/or data received from bidirectional broadcast systems such as an Internet broadcast, a broadband broadcast, a communication broadcast, a data broadcast, and/or VOD (Video On Demand).

The term "PLP" may indicate a predetermined unit for transmitting data contained in a physical layer. Therefore, the term "PLP" may also be replaced with the terms 'data unit' or 'data pipe' as necessary.

A hybrid broadcast service configured to interwork with the broadcast network and/or the Internet network may be used as a representative application to be used in a digital television (DTV) service. The hybrid broadcast service transmits, in real time, enhancement data related to broadcast A/V (Audio/Video) contents transmitted through the terrestrial broadcast network over the Internet, or transmits, in real time, some parts of the broadcast A/V contents over the Internet, such that users can experience a variety of contents.

The present invention aims to provide a method for encapsulating an IP packet, an MPEG-2 TS packet, and a packet applicable to other broadcast systems in the next generation digital broadcast system in such a manner that the IP packet, the MPEG-2 TS packet, and the packet can be transmitted to a physical layer. In addition, the present invention proposes a method for transmitting layer-2 signaling using the same header format.

The contents to be described hereinafter may be implemented by the device. For example, the following processes can be carried out by a signaling processor, a protocol processor, a processor, and/or a packet generator.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The apparatuses and methods for transmitting according to an embodiment of the present invention may be categorized into a base profile for the terrestrial broadcast service, a handheld profile for the mobile broadcast service and an advanced profile for the UHDTV service. In this case, the base profile can be used as a profile for both the terrestrial broadcast service and the mobile broadcast service. That is, the base profile can be used to define a concept of a profile which includes the mobile profile. This can be changed according to intention of the designer.

The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

Figure 1:
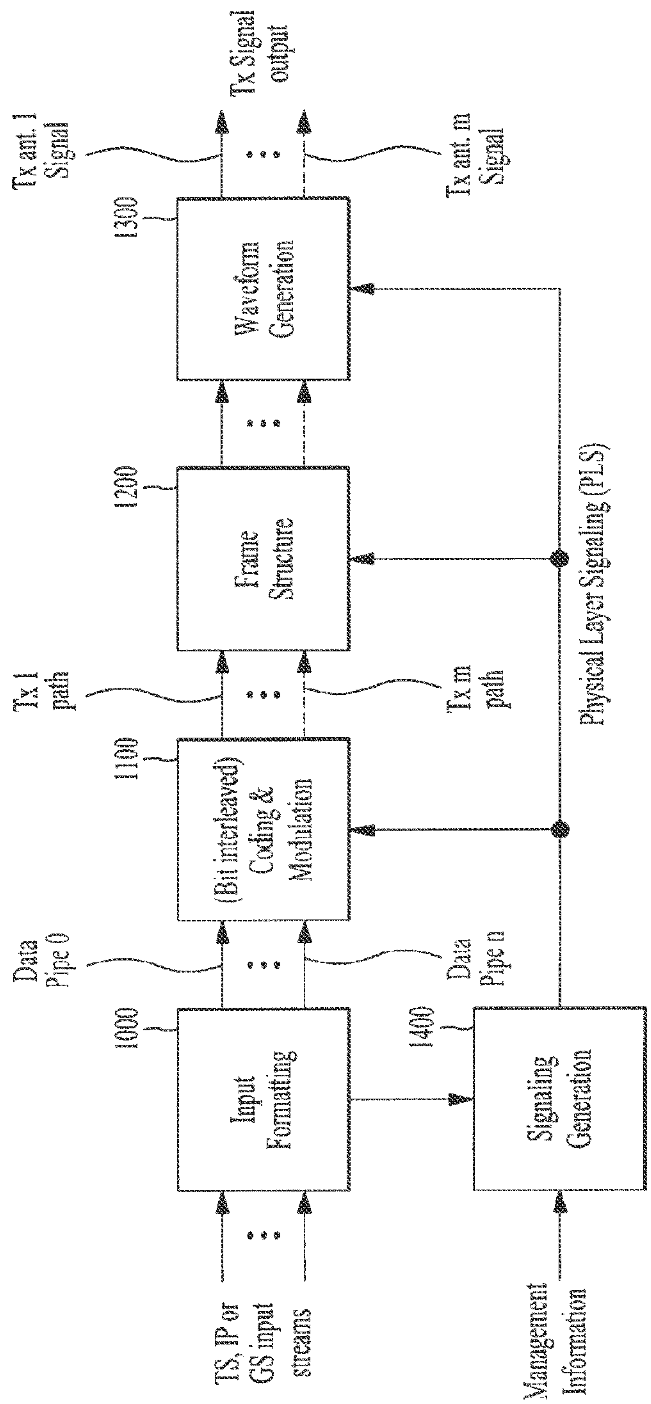
FIG. 1 illustrates a structure of an apparatus for transmitting broadcast signals for future broadcast services according to an embodiment of the present invention.

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting module 1000, a coding & modulation module 1100, a frame structure module 1200, a waveform generation module 1300 and a signaling generation module 1400. A description will be given of the operation of each module of the apparatus for transmitting broadcast signals.

Referring to FIG. 1, the apparatus for transmitting broadcast signals for future broadcast services according to an embodiment of the present invention can receive MPEG-TSs, IP streams (v4/v6) and generic streams (GSs) as an input signal. In addition, the apparatus for transmitting broadcast signals can receive management information about the configuration of each stream constituting the input signal and generate a final physical layer signal with reference to the received management information.

The input formatting module 1000 according to an embodiment of the present invention can classify the input streams on the basis of a standard for coding and modulation or services or service components and output the input streams as a plurality of logical data pipes (or data pipes or DP data). The data pipe is a logical channel in the physical layer that carries service data or related metadata, which may carry one or multiple service(s) or service component(s). In addition, data transmitted through each data pipe may be called DP data.

In addition, the input formatting module 1000 according to an embodiment of the present invention can divide each data pipe into blocks necessary to perform coding and modulation and carry out processes necessary to increase transmission efficiency or to perform scheduling. Details of operations of the input formatting module 1000 will be described later.

The coding & modulation module 1100 according to an embodiment of the present invention can perform forward error correction (FEC) encoding on each data pipe received from the input formatting module 1000 such that an apparatus for receiving broadcast signals can correct an error that may be generated on a transmission channel. In addition, the coding & modulation module 1100 according to an embodiment of the present invention can convert FEC output bit data to symbol data and interleave the symbol data to correct burst error caused by a channel. As shown in FIG. 1, the coding & modulation module 1100 according to an embodiment of the present invention can divide the processed data such that the divided data can be output through data paths for respective antenna outputs in order to transmit the data through two or more Tx antennas.

The frame structure module 1200 according to an embodiment of the present invention can map the data output from the coding & modulation module 1100 to signal frames. The frame structure module 1200 according to an embodiment of the present invention can perform mapping using scheduling information output from the input formatting module 1000 and interleave data in the signal frames in order to obtain additional diversity gain.

The waveform generation module 1300 according to an embodiment of the present invention can convert the signal frames output from the frame structure module 1200 into a signal for transmission. In this case, the waveform generation module 1300 according to an embodiment of the present invention can insert a preamble signal (or preamble) into the signal for detection of the transmission apparatus and insert a reference signal for estimating a transmission channel to compensate for distortion into the signal. In addition, the waveform generation module 1300 according to an embodiment of the present invention can provide a guard interval and insert a specific sequence into the same in order to offset the influence of channel delay spread due to multi-path reception. Additionally, the waveform generation module 1300 according to an embodiment of the present invention can perform a procedure necessary for efficient transmission in consideration of signal characteristics such as a peak-to-average power ratio of the output signal.

The signaling generation module 1400 according to an embodiment of the present invention generates final physical layer signaling information using the input management information and information generated by the input formatting module 1000, coding & modulation module 1100 and frame structure module 1200. Accordingly, a reception apparatus according to an embodiment of the present invention can decode a received signal by decoding the signaling information.

As described above, the apparatus for transmitting broadcast signals for future broadcast services according to one embodiment of the present invention can provide terrestrial broadcast service, mobile broadcast service, UHDTV service, etc. Accordingly, the apparatus for transmitting broadcast signals for future broadcast services according to one embodiment of the present invention can multiplex signals for different services in the time domain and transmit the same.

Figure 2:
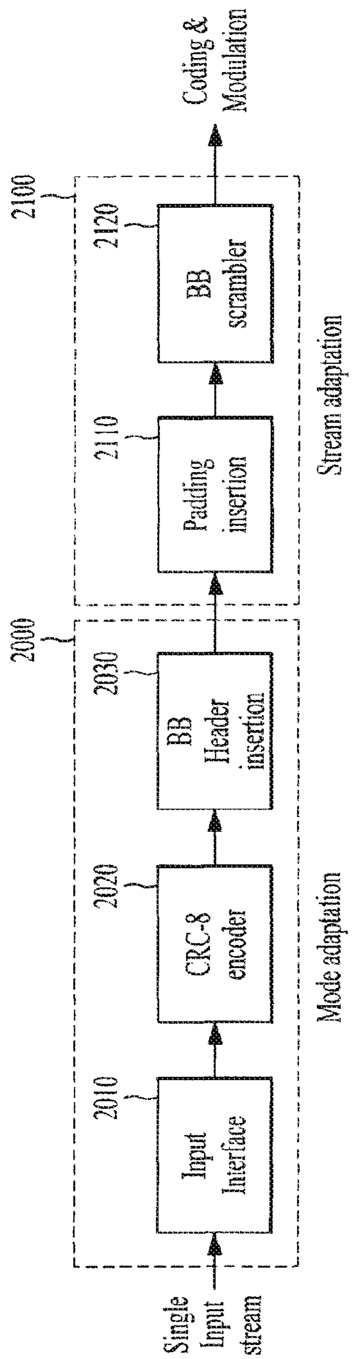
FIG. 2 illustrates an input formatting module according to one embodiment of the present invention.
Figure 3:
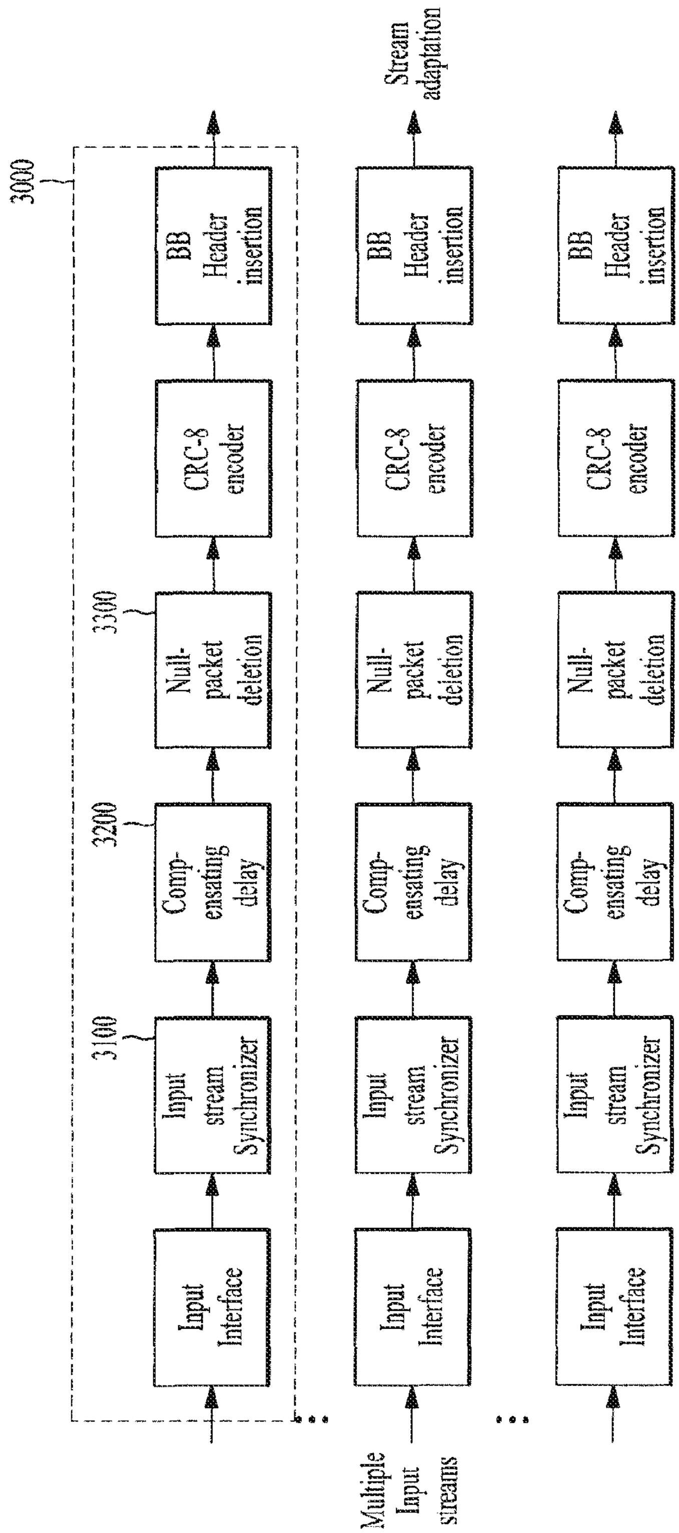
FIG. 3 illustrates an input formatting module according to another embodiment of the present invention.
Figure 4:
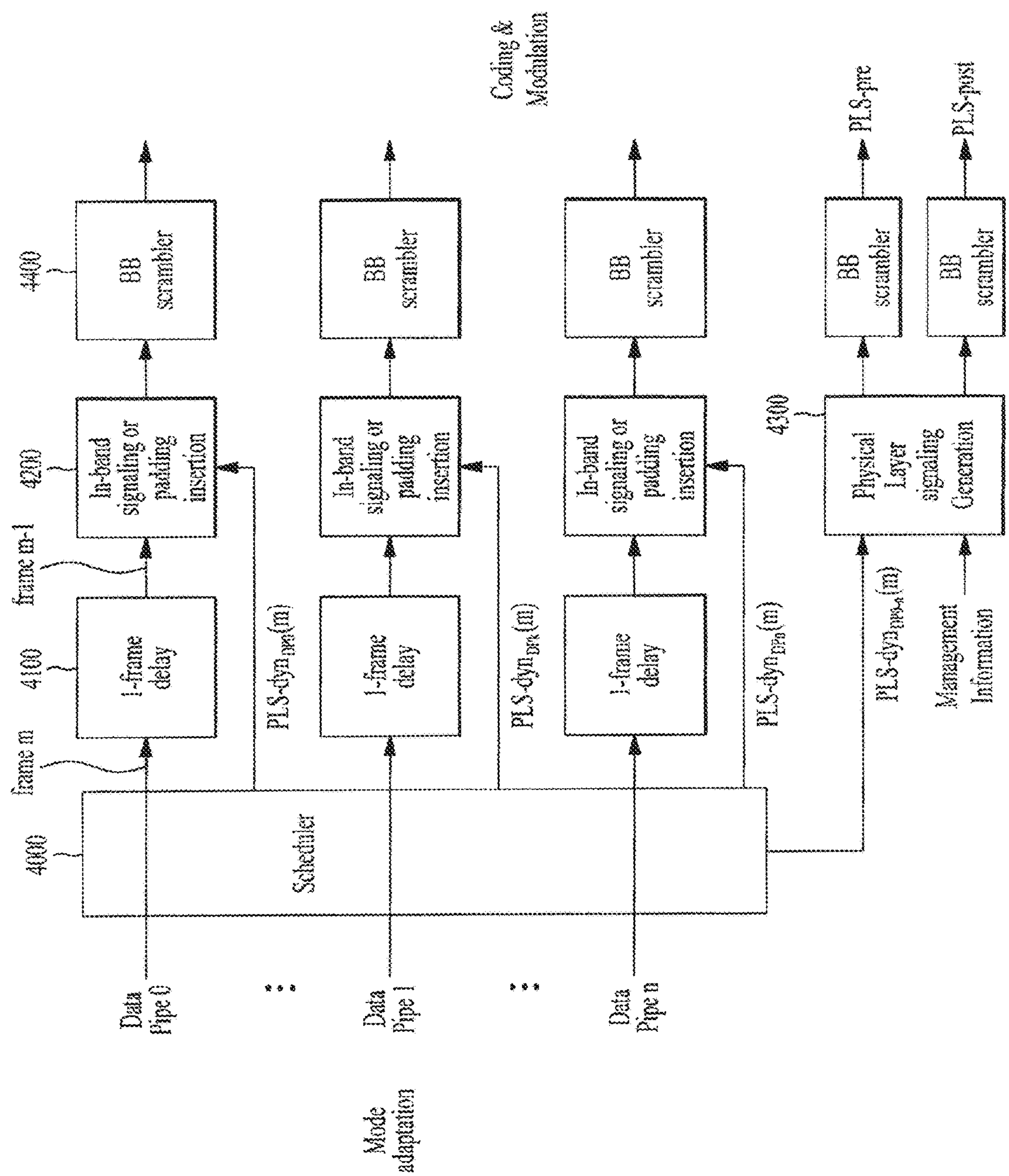
FIG. 4 illustrates an input formatting module according to another embodiment of the present invention.

FIGS. 2, 3 and 4 illustrate the input formatting module 1000 according to embodiments of the present invention. A description will be given of each figure.

FIG. 2 illustrates an input formatting module according to one embodiment of the present invention.

FIG. 2 shows an input formatting module when the input signal is a single input stream.

Referring to FIG. 2, the input formatting module according to one embodiment of the present invention can include a mode adaptation module 2000 and a stream adaptation module 2100.

As shown in FIG. 2, the mode adaptation module 2000 can include an input interface block 2010, a CRC-8 encoder block 2020 and a BB header insertion block 2030. Description will be given of each block of the mode adaptation module 2000.

The input interface block 2010 can divide the single input stream input thereto into data pieces each having the length of a baseband (BB) frame used for FEC (BCH/LDPC) which will be performed later and output the data pieces.

The CRC-8 encoder block 2020 can perform CRC encoding on BB frame data to add redundancy data thereto.

The BB header insertion block 2030 can insert, into the BB frame data, a header including information such as mode adaptation type (TS/GS/IP), a user packet length, a data field length, user packet sync byte, start address of user packet sync byte in data field, a high efficiency mode indicator, an input stream synchronization field, etc.

As shown in FIG. 2, the stream adaptation module 2100 can include a padding insertion block 2110 and a BB scrambler block 2120. Description will be given of each block of the stream adaptation module 2100.

If data received from the mode adaptation module 2000 has a length shorter than an input data length necessary for FEC encoding, the padding insertion block 2110 can insert a padding bit into the data such that the data has the input data length and output the data including the padding bit.

The BB scrambler block 2120 can randomize the input bit stream by performing an XOR operation on the input bit stream and a pseudo random binary sequence (PRBS).

The above-described blocks may be omitted or replaced by blocks having similar or identical functions.

As shown in FIG. 2, the input formatting module can finally output data pipes to the coding & modulation module.

FIG. 3 illustrates an input formatting module according to another embodiment of the present invention.

FIG. 3 shows a mode adaptation module 3000 of the input formatting module when the input signal corresponds to multiple input streams.

The mode adaptation module 3000 of the input formatting module for processing the multiple input streams can independently process the multiple input streams.

Referring to FIG. 3, the mode adaptation module 3000 for respectively processing the multiple input streams can include input interface blocks, input stream synchronizer blocks 3100, compensating delay blocks 3200, null packet deletion blocks 3300, CRC-8 encoder blocks and BB header insertion blocks. Description will be given of each block of the mode adaptation module 3000.

Operations of the input interface block, CRC-8 encoder block and BB header insertion block correspond to those of the input interface block, CRC-8 encoder block and BB header insertion block described with reference to FIG. 2 and thus description thereof is omitted.

The input stream synchronizer block 3100 can transmit input stream clock reference (ISCR) information to generate timing information necessary for the apparatus for receiving broadcast signals to restore the TSs or GSs.

The compensating delay block 3200 can delay input data and output the delayed input data such that the apparatus for receiving broadcast signals can synchronize the input data if a delay is generated between data pipes according to processing of data including the timing information by the transmission apparatus.

The null packet deletion block 3300 can delete unnecessarily transmitted input null packets from the input data, insert the number of deleted null packets into the input data based on positions in which the null packets are deleted and transmit the input data.

The above-described blocks may be omitted or replaced by blocks having similar or identical functions.

FIG. 4 illustrates an input formatting module according to another embodiment of the present invention.

Specifically, FIG. 4 illustrates a stream adaptation module of the input formatting module when the input signal corresponds to multiple input streams.

The stream adaptation module of the input formatting module when the input signal corresponds to multiple input streams can include a scheduler 4000, a 1-frame delay block 4100, an in-band signaling or padding insertion block 4200, a physical layer signaling generation block 4300 and a BB scrambler block 4400. Description will be given of each block of the stream adaptation module.

The scheduler 4000 can perform scheduling for a MIMO system using multiple antennas having dual polarity. In addition, the scheduler 4000 can generate parameters for use in signal processing blocks for antenna paths, such as a bit-to-cell demux block, a cell interleaver block, a time interleaver block, etc. included in the coding & modulation module illustrated in FIG. 1.

The 1-frame delay block 4100 can delay the input data by one transmission frame such that scheduling information about the next frame can be transmitted through the current frame for in-band signaling information to be inserted into the data pipes.

The in-band signaling or padding insertion block 4200 can insert undelayed physical layer signaling (PLS)-dynamic signaling information into the data delayed by one transmission frame. In this case, the in-band signaling or padding insertion block 4200 can insert a padding bit when a space for padding is present or insert in-band signaling information into the padding space. In addition, the scheduler 4000 can output physical layer signaling-dynamic signaling information about the current frame separately from in-band signaling information. Accordingly, a cell mapper, which will be described later, can map input cells according to scheduling information output from the scheduler 4000.

The physical layer signaling generation block 4300 can generate physical layer signaling data which will be transmitted through a preamble symbol of a transmission frame or spread and transmitted through a data symbol other than the in-band signaling information. In this case, the physical layer signaling data according to an embodiment of the present invention can be referred to as signaling information. Furthermore, the physical layer signaling data according to an embodiment of the present invention can be divided into PLS-pre information and PLS-post information. The PLS-pre information can include parameters necessary to encode the PLS-post information and static PLS signaling data and the PLS-post information can include parameters necessary to encode the data pipes. The parameters necessary to encode the data pipes can be classified into static PLS signaling data and dynamic PLS signaling data. The static PLS signaling data is a parameter commonly applicable to all frames included in a super-frame and can be changed on a super-frame basis. The dynamic PLS signaling data is a parameter differently applicable to respective frames included in a super-frame and can be changed on a frame-by-frame basis. Accordingly, the reception apparatus can acquire the PLS-post information by decoding the PLS-pre information and decode desired data pipes by decoding the PLS-post information.

The BB scrambler block 4400 can generate a pseudo-random binary sequence (PRBS) and perform an XOR operation on the PRBS and the input bit streams to decrease the peak-to-average power ratio (PAPR) of the output signal of the waveform generation block. As shown in FIG. 4, scrambling of the BB scrambler block 4400 is applicable to both data pipes and physical layer signaling information.

The above-described blocks may be omitted or replaced by blocks having similar or identical functions according to designer.

As shown in FIG. 4, the stream adaptation module can finally output the data pipes to the coding & modulation module.

Figure 5:
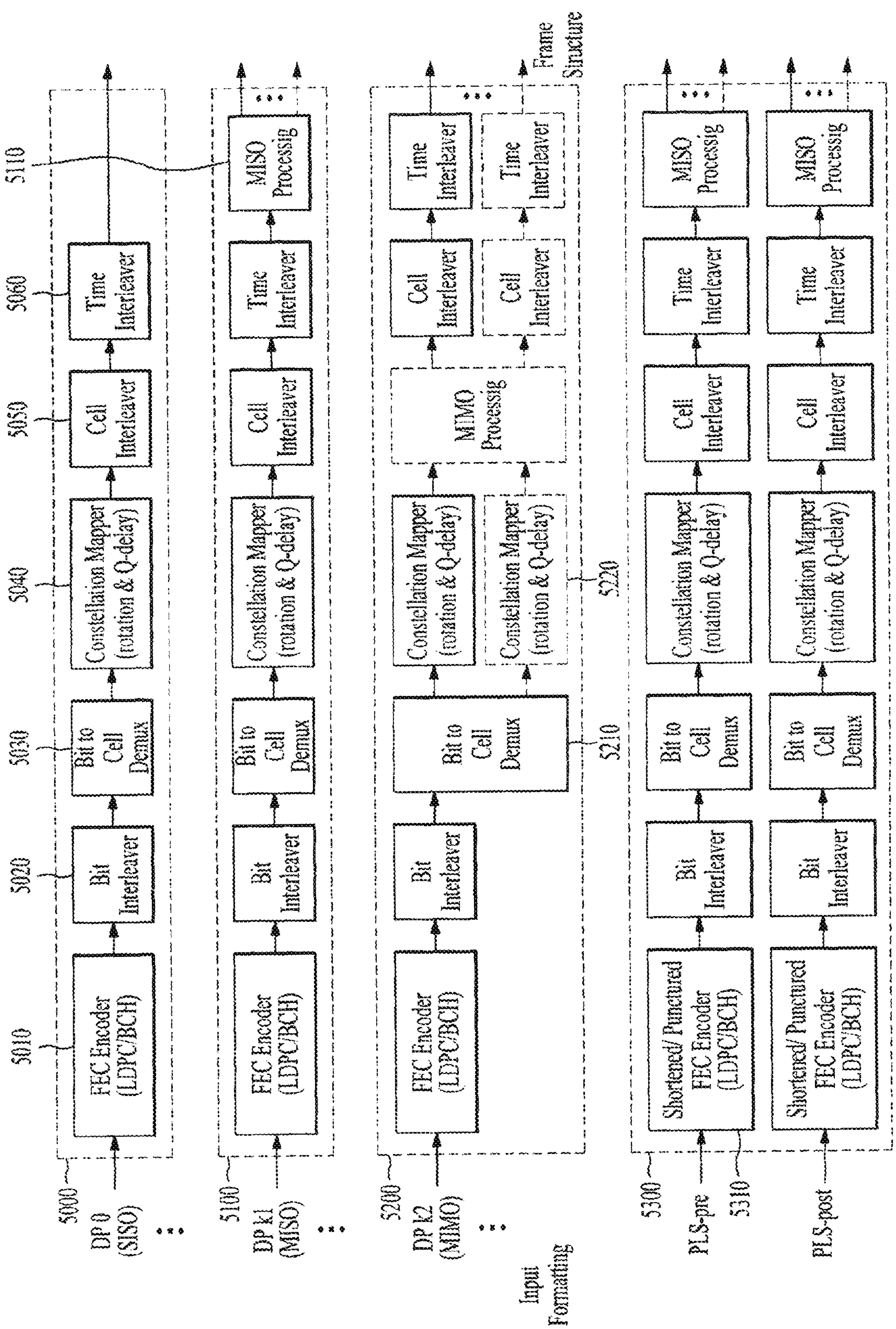
FIG. 5 illustrates a coding & modulation module according to an embodiment of the present invention.

FIG. 5 illustrates a coding & modulation module according to an embodiment of the present invention.

The coding & modulation module shown in FIG. 5 corresponds to an embodiment of the coding & modulation module illustrated in FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the coding & modulation module according to an embodiment of the present invention can independently process data pipes input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each data pipe.

Accordingly, the coding & modulation module according to an embodiment of the present invention can include a first block 5000 for SISO, a second block 5100 for MISO, a third block 5200 for MIMO and a fourth block 5300 for processing the PLS-pre/PLS-post information. The coding & modulation module illustrated in FIG. 5 is an exemplary and may include only the first block 5000 and the fourth block 5300, the second block 5100 and the fourth block 5300 or the third block 5200 and the fourth block 5300 according to design. That is, the coding & modulation module can include blocks for processing data pipes equally or differently according to design.

A description will be given of each block of the coding & modulation module.

The first block 5000 processes an input data pipe according to SISO and can include an FEC encoder block 5010, a bit interleaver block 5020, a bit-to-cell demux block 5030, a constellation mapper block 5040, a cell interleaver block 5050 and a time interleaver block 5060.

The FEC encoder block 5010 can perform BCH encoding and LDPC encoding on the input data pipe to add redundancy thereto such that the reception apparatus can correct an error generated on a transmission channel.

The bit interleaver block 5020 can interleave bit streams of the FEC-encoded data pipe according to an interleaving rule such that the bit streams have robustness against burst error that may be generated on the transmission channel. Accordingly, when deep fading or erasure is applied to QAM symbols, errors can be prevented from being generated in consecutive bits from among all codeword bits since interleaved bits are mapped to the QAM symbols.

The bit-to-cell demux block 5030 can determine the order of input bit streams such that each bit in an FEC block can be transmitted with appropriate robustness in consideration of both the order of input bit streams and a constellation mapping rule.

In addition, the bit interleaver block 5020 is located between the FEC encoder block 5010 and the constellation mapper block 5040 and can connect output bits of LDPC encoding performed by the FEC encoder block 5010 to bit positions having different reliability values and optimal values of the constellation mapper in consideration of LDPC decoding of the apparatus for receiving broadcast signals. Accordingly, the bit-to-cell demux block 5030 can be replaced by a block having a similar or equal function.

The constellation mapper block 5040 can map a bit word input thereto to one constellation. In this case, the constellation mapper block 5040 can additionally perform rotation & Q-delay. That is, the constellation mapper block 5040 can rotate input constellations according to a rotation angle, divide the constellations into an in-phase component and a quadrature-phase component and delay only the quadrature-phase component by an arbitrary value. Then, the constellation mapper block 5040 can remap the constellations to new constellations using a paired in-phase component and quadrature-phase component.

In addition, the constellation mapper block 5040 can move constellation points on a two-dimensional plane in order to find optimal constellation points. Through this process, capacity of the coding & modulation module 1100 can be optimized. Furthermore, the constellation mapper block 5040 can perform the above-described operation using IQ-balanced constellation points and rotation. The constellation mapper block 5040 can be replaced by a block having a similar or equal function.

The cell interleaver block 5050 can randomly interleave cells corresponding to one FEC block and output the interleaved cells such that cells corresponding to respective FEC blocks can be output in different orders.

The time interleaver block 5060 can interleave cells belonging to a plurality of FEC blocks and output the interleaved cells. Accordingly, the cells corresponding to the FEC blocks are dispersed and transmitted in a period corresponding to a time interleaving depth and thus diversity gain can be obtained.

The second block 5100 processes an input data pipe according to MISO and can include the FEC encoder block, bit interleaver block, bit-to-cell demux block, constellation mapper block, cell interleaver block and time interleaver block in the same manner as the first block 5000. However, the second block 5100 is distinguished from the first block 5000 in that the second block 5100 further includes a MISO processing block 5110. The second block 5100 performs the same procedure including the input operation to the time interleaver operation as those of the first block 5000 and thus description of the corresponding blocks is omitted.

The MISO processing block 5110 can encode input cells according to a MISO encoding matrix providing transmit diversity and output MISO-processed data through two paths. MISO processing according to one embodiment of the present invention can include OSTBC (orthogonal space time block coding)/OSFBC (orthogonal space frequency block coding, Alamouti coding).

The third block 5200 processes an input data pipe according to MIMO and can include the FEC encoder block, bit interleaver block, bit-to-cell demux block, constellation mapper block, cell interleaver block and time interleaver block in the same manner as the second block 5100, as shown in FIG. 5. However, the data processing procedure of the third block 5200 is different from that of the second block 5100 since the third block 5200 includes a MIMO processing block 5220.

That is, in the third block 5200, basic roles of the FEC encoder block and the bit interleaver block are identical to those of the first and second blocks 5000 and 5100 although functions thereof may be different from those of the first and second blocks 5000 and 5100.

The bit-to-cell demux block 5210 can generate as many output bit streams as input bit streams of MIMO processing and output the output bit streams through MIMO paths for MIMO processing. In this case, the bit-to-cell demux block 5210 can be designed to optimize the decoding performance of the reception apparatus in consideration of characteristics of LDPC and MIMO processing.

Basic roles of the constellation mapper block, cell interleaver block and time interleaver block are identical to those of the first and second blocks 5000 and 5100 although functions thereof may be different from those of the first and second blocks 5000 and 5100. As shown in FIG. 5, as many constellation mapper blocks, cell interleaver blocks and time interleaver blocks as the number of MIMO paths for MIMO processing can be present. In this case, the constellation mapper blocks, cell interleaver blocks and time interleaver blocks can operate equally or independently for data input through the respective paths.

The MIMO processing block 5220 can perform MIMO processing on two input cells using a MIMO encoding matrix and output the MIMO-processed data through two paths. The MIMO encoding matrix according to an embodiment of the present invention can include spatial multiplexing, Golden code, full-rate full diversity code, linear dispersion code, etc.

The fourth block 5300 processes the PLS-pre/PLS-post information and can perform SISO or MISO processing.

The basic roles of the bit interleaver block, bit-to-cell demux block, constellation mapper block, cell interleaver block, time interleaver block and MISO processing block included in the fourth block 5300 correspond to those of the second block 5100 although functions thereof may be different from those of the second block 5100.

A shortened/punctured FEC encoder block 5310 included in the fourth block 5300 can process PLS data using an FEC encoding scheme for a PLS path provided for a case in which the length of input data is shorter than a length necessary to perform FEC encoding. Specifically, the shortened/punctured FEC encoder block 5310 can perform BCH encoding on input bit streams, pad Os corresponding to a desired input bit stream length necessary for normal LDPC encoding, carry out LDPC encoding and then remove the padded Os to puncture parity bits such that an effective code rate becomes equal to or lower than the data pipe rate.

The blocks included in the first block 5000 to fourth block 5300 may be omitted or replaced by blocks having similar or identical functions according to design.

As illustrated in FIG. 5, the coding & modulation module can output the data pipes (or DP data), PLS-pre information and PLS-post information processed for the respective paths to the frame structure module.

Figure 6:
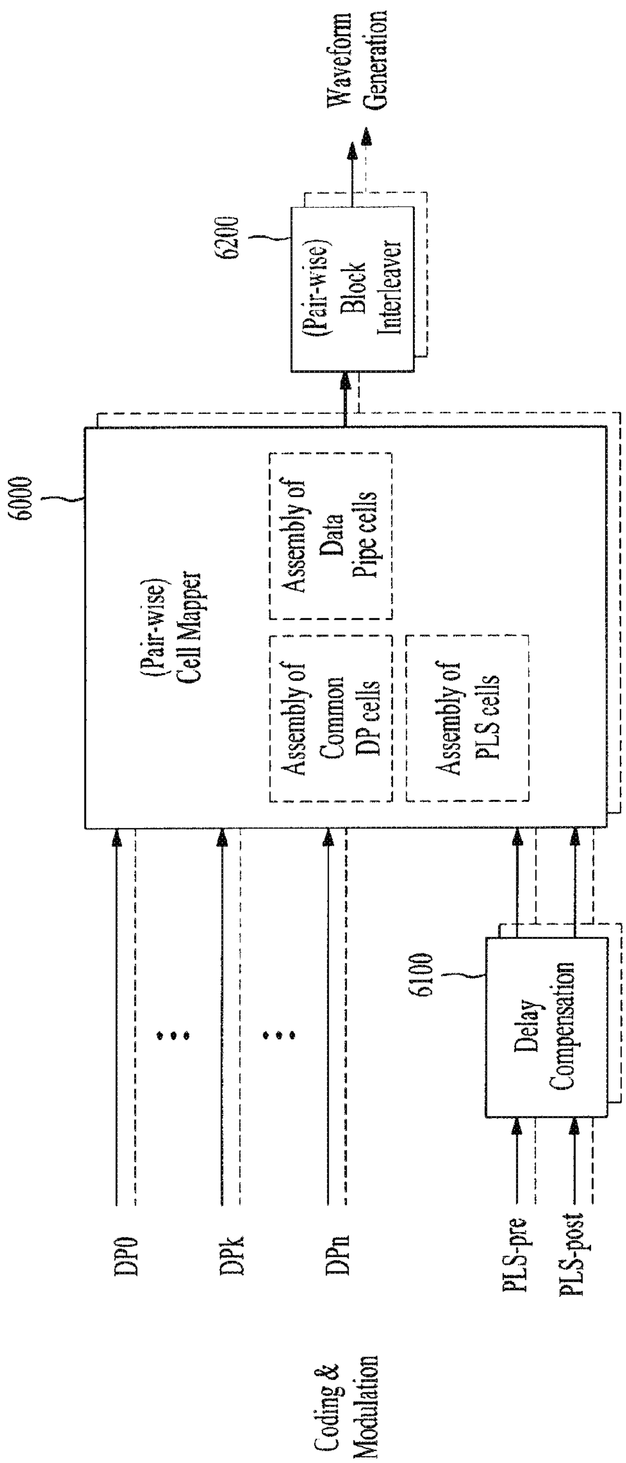
FIG. 6 illustrates a frame structure module according to one embodiment of the present invention.

FIG. 6 illustrates a frame structure module according to one embodiment of the present invention.

The frame structure module shown in FIG. 6 corresponds to an embodiment of the frame structure module 1200 illustrated in FIG. 1.

The frame structure module according to one embodiment of the present invention can include at least one cell-mapper 6000, at least one delay compensation module 6100 and at least one block interleaver 6200. The number of cell mappers 6000, delay compensation modules 6100 and block interleavers 6200 can be changed. A description will be given of each module of the frame structure block.

The cell-mapper 6000 can allocate cells corresponding to SISO-, MISO- or MIMO-processed data pipes output from the coding & modulation module, cells corresponding to common data commonly applicable to the data pipes and cells corresponding to the PLS-pre/PLS-post information to signal frames according to scheduling information. The common data refers to signaling information commonly applied to all or some data pipes and can be transmitted through a specific data pipe. The data pipe through which the common data is transmitted can be referred to as a common data pipe and can be changed according to design.

When the apparatus for transmitting broadcast signals according to an embodiment of the present invention uses two output antennas and Alamouti coding is used for MISO processing, the cell-mapper 6000 can perform pair-wise cell mapping in order to maintain orthogonality according to Alamouti encoding. That is, the cell-mapper 6000 can process two consecutive cells of the input cells as one unit and map the unit to a frame. Accordingly, paired cells in an input path corresponding to an output path of each antenna can be allocated to neighboring positions in a transmission frame.

The delay compensation block 6100 can obtain PLS data corresponding to the current transmission frame by delaying input PLS data cells for the next transmission frame by one frame. In this case, the PLS data corresponding to the current frame can be transmitted through a preamble part in the current signal frame and PLS data corresponding to the next signal frame can be transmitted through a preamble part in the current signal frame or in-band signaling in each data pipe of the current signal frame. This can be changed by the designer.

The block interleaver 6200 can obtain additional diversity gain by interleaving cells in a transport block corresponding to the unit of a signal frame. In addition, the block interleaver 6200 can perform interleaving by processing two consecutive cells of the input cells as one unit when the above-described pair-wise cell mapping is performed. Accordingly, cells output from the block interleaver 6200 can be two consecutive identical cells.

When pair-wise mapping and pair-wise interleaving are performed, at least one cell mapper and at least one block interleaver can operate equally or independently for data input through the paths.

The above-described blocks may be omitted or replaced by blocks having similar or identical functions according to design.

As illustrated in FIG. 6, the frame structure module can output at least one signal frame to the waveform generation module.

Figure 7:
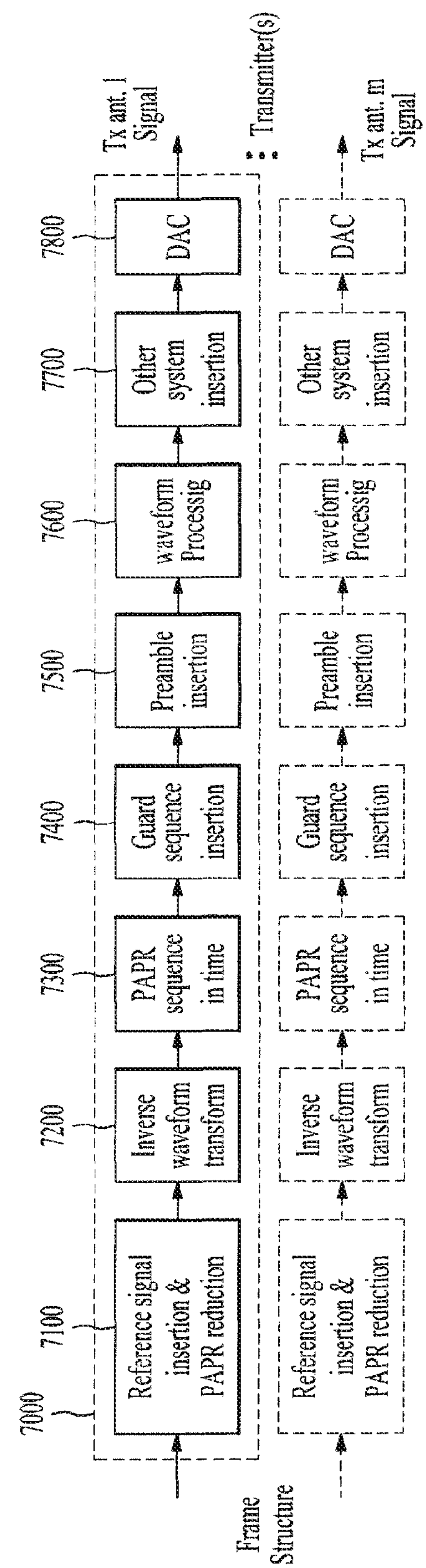
FIG. 7 illustrates a waveform generation module according to an embodiment of the present invention.

FIG. 7 illustrates a waveform generation module according to an embodiment of the present invention.

The waveform generation module illustrated in FIG. 7 corresponds to an embodiment of the waveform generation module 1300 described with reference to FIG. 1.

The waveform generation module according to an embodiment of the present invention can modulate and transmit as many signal frames as the number of antennas for receiving and outputting signal frames output from the frame structure module illustrated in FIG. 6.

Specifically, the waveform generation module illustrated in FIG. 7 is an embodiment of a waveform generation module of an apparatus for transmitting broadcast signals using m Tx antennas and can include m processing blocks for modulating and outputting frames corresponding to m paths. The m processing blocks can perform the same processing procedure. A description will be given of operation of the first processing block 7000 from among the m processing blocks.

The first processing block 7000 can include a reference signal & PAPR reduction block 7100, an inverse waveform transform block 7200, a PAPR reduction in time block 7300, a guard sequence insertion block 7400, a preamble insertion block 7500, a waveform processing block 7600, other system insertion block 7700 and a DAC (digital analog converter) block 7800.

The reference signal insertion & PAPR reduction block 7100 can insert a reference signal into a predetermined position of each signal block and apply a PAPR reduction scheme to reduce a PAPR in the time domain. If a broadcast transmission/reception system according to an embodiment of the present invention corresponds to an OFDM system, the reference signal insertion & PAPR reduction block 7100 can use a method of reserving some active subcarriers rather than using the same. In addition, the reference signal insertion & PAPR reduction block 7100 may not use the PAPR reduction scheme as an optional feature according to broadcast transmission/reception system.

The inverse waveform transform block 7200 can transform an input signal in a manner of improving transmission efficiency and flexibility in consideration of transmission channel characteristics and system architecture. If the broadcast transmission/reception system according to an embodiment of the present invention corresponds to an OFDM system, the inverse waveform transform block 7200 can employ a method of transforming a frequency domain signal into a time domain signal through inverse FFT operation. If the broadcast transmission/reception system according to an embodiment of the present invention corresponds to a single carrier system, the inverse waveform transform block 7200 may not be used in the waveform generation module.

The PAPR reduction in time block 7300 can use a method for reducing PAPR of an input signal in the time domain. If the broadcast transmission/reception system according to an embodiment of the present invention corresponds to an OFDM system, the PAPR reduction in time block 7300 may use a method of simply clipping peak amplitude. Furthermore, the PAPR reduction in time block 7300 may not be used in the broadcast transmission/reception system according to an embodiment of the present invention since it is an optional feature.

The guard sequence insertion block 7400 can provide a guard interval between neighboring signal blocks and insert a specific sequence into the guard interval as necessary in order to minimize the influence of delay spread of a transmission channel. Accordingly, the reception apparatus can easily perform synchronization or channel estimation. If the broadcast transmission/reception system according to an embodiment of the present invention corresponds to an OFDM system, the guard sequence insertion block 7400 may insert a cyclic prefix into a guard interval of an OFDM symbol.

The preamble insertion block 7500 can insert a signal of a known type (e.g. the preamble or preamble symbol) agreed upon between the transmission apparatus and the reception apparatus into a transmission signal such that the reception apparatus can rapidly and efficiently detect a target system signal. If the broadcast transmission/reception system according to an embodiment of the present invention corresponds to an OFDM system, the preamble insertion block 7500 can define a signal frame composed of a plurality of OFDM symbols and insert a preamble symbol into the beginning of each signal frame. That is, the preamble carries basic PLS data and is located in the beginning of a signal frame.

The waveform processing block 7600 can perform waveform processing on an input baseband signal such that the input baseband signal meets channel transmission characteristics. The waveform processing block 7600 may use a method of performing square-root-raised cosine (SRRC) filtering to obtain a standard for out-of-band emission of a transmission signal. If the broadcast transmission/reception system according to an embodiment of the present invention corresponds to a multi-carrier system, the waveform processing block 7600 may not be used.

The other system insertion block 7700 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 7800 can convert an input digital signal into an analog signal and output the analog signal. The signal output from the DAC block 7800 can be transmitted through m output antennas. A Tx antenna according to an embodiment of the present invention can have vertical or horizontal polarity.

The above-described blocks may be omitted or replaced by blocks having similar or identical functions according to design.

Figure 8:
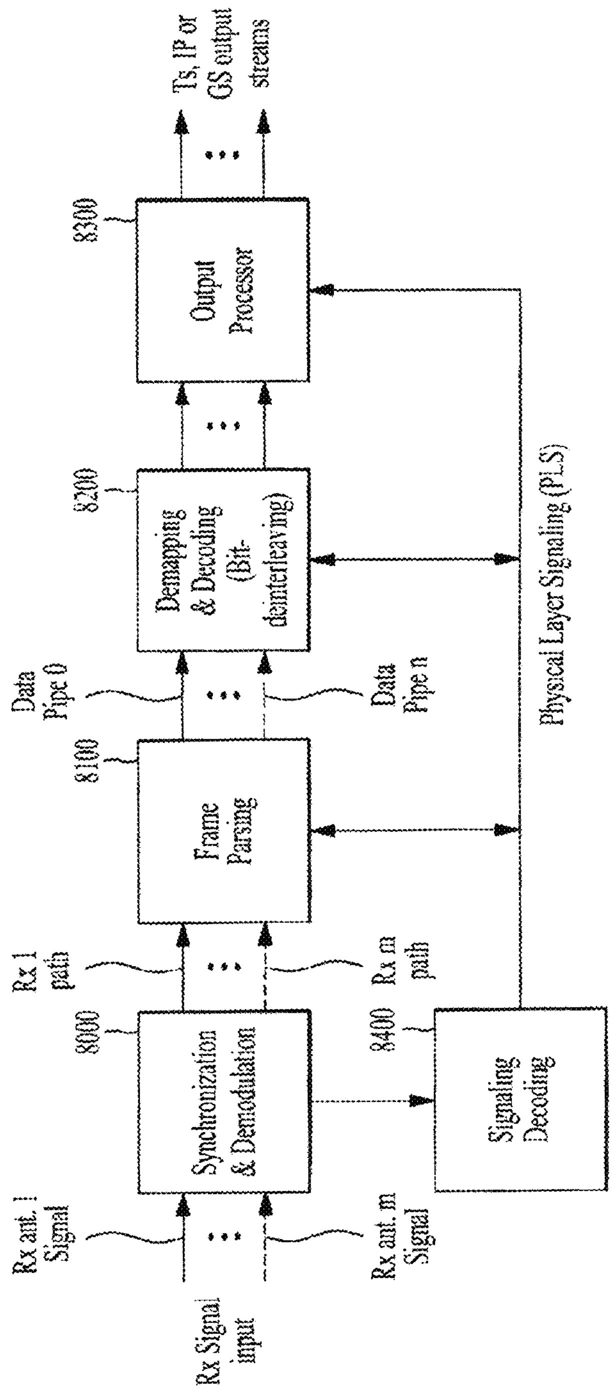
FIG. 8 illustrates a structure of an apparatus for receiving broadcast signals for future broadcast services according to an embodiment of the present invention.

FIG. 8 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1. The apparatus for receiving broadcast signals for future broadcast services according to an embodiment of the present invention can include a synchronization & demodulation module 8000, a frame parsing module 8100, a demapping & decoding module 8200, an output processor 8300 and a signaling decoding module 8400. A description will be given of operation of each module of the apparatus for receiving broadcast signals.

The synchronization & demodulation module 8000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 8100 can parse input signal frames and extract data through which a service selected by a user is transmitted. If the apparatus for transmitting broadcast signals performs interleaving, the frame parsing module 8100 can carry out deinterleaving corresponding to a reverse procedure of interleaving. In this case, the positions of a signal and data that need to be extracted can be obtained by decoding data output from the signaling decoding module 8400 to restore scheduling information generated by the apparatus for transmitting broadcast signals.

The demapping & decoding module 8200 can convert the input signals into bit domain data and then deinterleave the same as necessary. The demapping & decoding module 8200 can perform demapping for mapping applied for transmission efficiency and correct an error generated on a transmission channel through decoding. In this case, the demapping & decoding module 8200 can obtain transmission parameters necessary for demapping and decoding by decoding the data output from the signaling decoding module 8400.

The output processor 8300 can perform reverse procedures of various compression/signal processing procedures which are applied by the apparatus for transmitting broadcast signals to improve transmission efficiency. In this case, the output processor 8300 can acquire necessary control information from data output from the signaling decoding module 8400. The output of the output processor 8300 corresponds to a signal input to the apparatus for transmitting broadcast signals and may be MPEG-TSs, IP streams (v4 or v6) and generic streams.

The signaling decoding module 8400 can obtain PLS information from the signal demodulated by the synchronization & demodulation module 8000. As described above, the frame parsing module 8100, demapping & decoding module 8200 and output processor 8300 can execute functions thereof using the data output from the signaling decoding module 8400.

Figure 9:
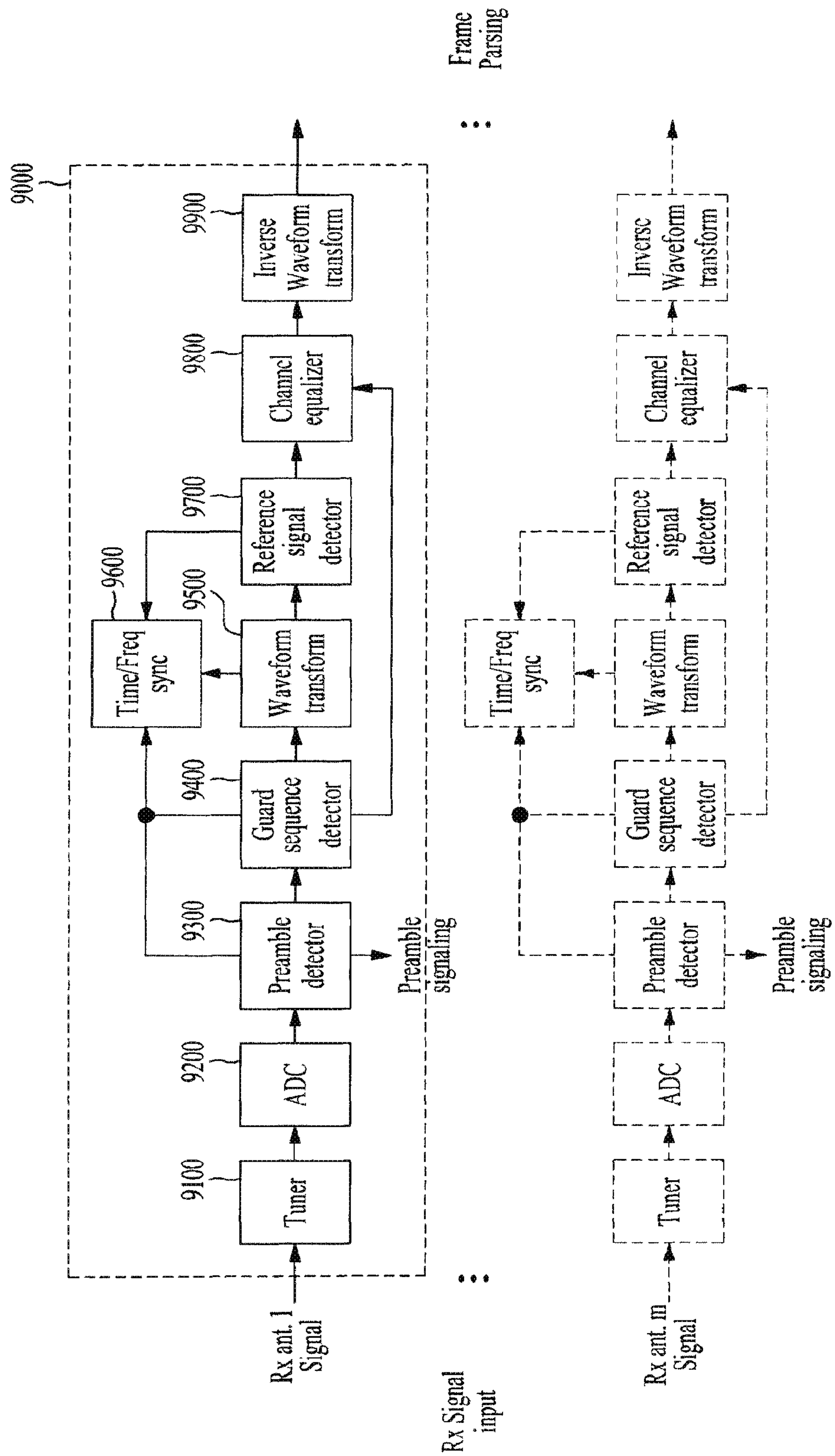
FIG. 9 illustrates a synchronization & demodulation module according to an embodiment of the present invention.

FIG. 9 illustrates a synchronization & demodulation module according to an embodiment of the present invention.

The synchronization & demodulation module shown in FIG. 9 corresponds to an embodiment of the synchronization & demodulation module described with reference to FIG. 8. The synchronization & demodulation module shown in FIG. 9 can perform a reverse operation of the operation of the waveform generation module illustrated in FIG. 7.

As shown in FIG. 9, the synchronization & demodulation module according to an embodiment of the present invention corresponds to a synchronization & demodulation module of an apparatus for receiving broadcast signals using m Rx antennas and can include m processing blocks for demodulating signals respectively input through m paths. The m processing blocks can perform the same processing procedure. A description will be given of operation of the first processing block 9000 from among the m processing blocks.

The first processing block 9000 can include a tuner 9100, an ADC block 9200, a preamble detector 9300, a guard sequence detector 9400, a waveform transform block 9500, a time/frequency synchronization block 9600, a reference signal detector 9700, a channel equalizer 9800 and an inverse waveform transform block 9900.

The tuner 9100 can select a desired frequency band, compensate for the magnitude of a received signal and output the compensated signal to the ADC block 9200.

The ADC block 9200 can convert the signal output from the tuner 9100 into a digital signal.

The preamble detector 9300 can detect a preamble (or preamble signal or preamble symbol) in order to check whether or not the digital signal is a signal of the system corresponding to the apparatus for receiving broadcast signals. In this case, the preamble detector 9300 can decode basic transmission parameters received through the preamble.

The guard sequence detector 9400 can detect a guard sequence in the digital signal. The time/frequency synchronization block 9600 can perform time/frequency synchronization using the detected guard sequence and the channel equalizer 9800 can estimate a channel through a received/restored sequence using the detected guard sequence.

The waveform transform block 9500 can perform a reverse operation of inverse waveform transform when the apparatus for transmitting broadcast signals has performed inverse waveform transform. When the broadcast transmission/reception system according to one embodiment of the present invention is a multi-carrier system, the waveform transform block 9500 can perform FFT. Furthermore, when the broadcast transmission/reception system according to an embodiment of the present invention is a single carrier system, the waveform transform block 9500 may not be used if a received time domain signal is processed in the frequency domain or processed in the time domain.

The time/frequency synchronization block 9600 can receive output data of the preamble detector 9300, guard sequence detector 9400 and reference signal detector 9700 and perform time synchronization and carrier frequency synchronization including guard sequence detection and block window positioning on a detected signal. Here, the time/frequency synchronization block 9600 can feed back the output signal of the waveform transform block 9500 for frequency synchronization.

The reference signal detector 9700 can detect a received reference signal. Accordingly, the apparatus for receiving broadcast signals according to an embodiment of the present invention can perform synchronization or channel estimation.

The channel equalizer 9800 can estimate a transmission channel from each Tx antenna to each Rx antenna from the guard sequence or reference signal and perform channel equalization for received data using the estimated channel.

The inverse waveform transform block 9900 may restore the original received data domain when the waveform transform block 9500 performs waveform transform for efficient synchronization and channel estimation/equalization. If the broadcast transmission/reception system according to an embodiment of the present invention is a single carrier system, the waveform transform block 9500 can perform FFT in order to carry out synchronization/channel estimation/equalization in the frequency domain and the inverse waveform transform block 9900 can perform IFFT on the channel-equalized signal to restore transmitted data symbols. If the broadcast transmission/reception system according to an embodiment of the present invention is a multi-carrier system, the inverse waveform transform block 9900 may not be used.

The above-described blocks may be omitted or replaced by blocks having similar or identical functions according to design.

Figure 10:
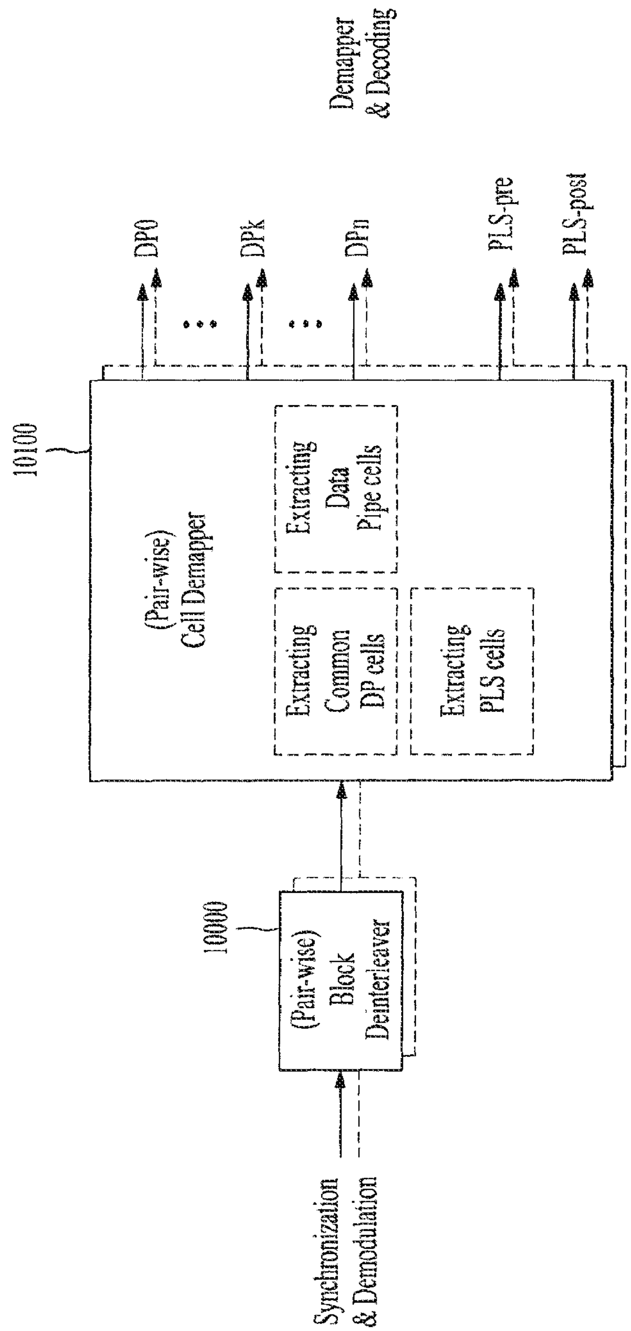
FIG. 10 illustrates a frame parsing module according to an embodiment of the present invention.

FIG. 10 illustrates a frame parsing module according to an embodiment of the present invention.

The frame parsing module illustrated in FIG. 10 corresponds to an embodiment of the frame parsing module described with reference to FIG. 8. The frame parsing module shown in FIG. 10 can perform a reverse operation of the operation of the frame structure module illustrated in FIG. 6.

As shown in FIG. 10, the frame parsing module according to an embodiment of the present invention can include at least one block deinterleaver 10000 and at least one cell demapper 10100.

The block deinterleaver 10000 can deinterleave data input through data paths of the m Rx antennas and processed by the synchronization & demodulation module on a signal block basis. In this case, if the apparatus for transmitting broadcast signals performs pair-wise interleaving as illustrated in FIG. 8, the block deinterleaver 10000 can process two consecutive pieces of data as a pair for each input path. Accordingly, the block interleaver 10000 can output two consecutive pieces of data even when deinterleaving has been performed. Furthermore, the block deinterleaver 10000 can perform a reverse operation of the interleaving operation performed by the apparatus for transmitting broadcast signals to output data in the original order.

The cell demapper 10100 can extract cells corresponding to common data, cells corresponding to data pipes and cells corresponding to PLS data from received signal frames. The cell demapper 10100 can merge data distributed and transmitted and output the same as a stream as necessary. When two consecutive pieces of cell input data are processed as a pair and mapped in the apparatus for transmitting broadcast signals, as shown in FIG. 6, the cell demapper 10100 can perform pair-wise cell demapping for processing two consecutive input cells as one unit as a reverse procedure of the mapping operation of the apparatus for transmitting broadcast signals.

In addition, the cell demapper 10100 can extract PLS signaling data received through the current frame as PLS-pre & PLS-post data and output the PLS-pre & PLS-post data.

The above-described blocks may be omitted or replaced by blocks having similar or identical functions according to design.

Figure 11:
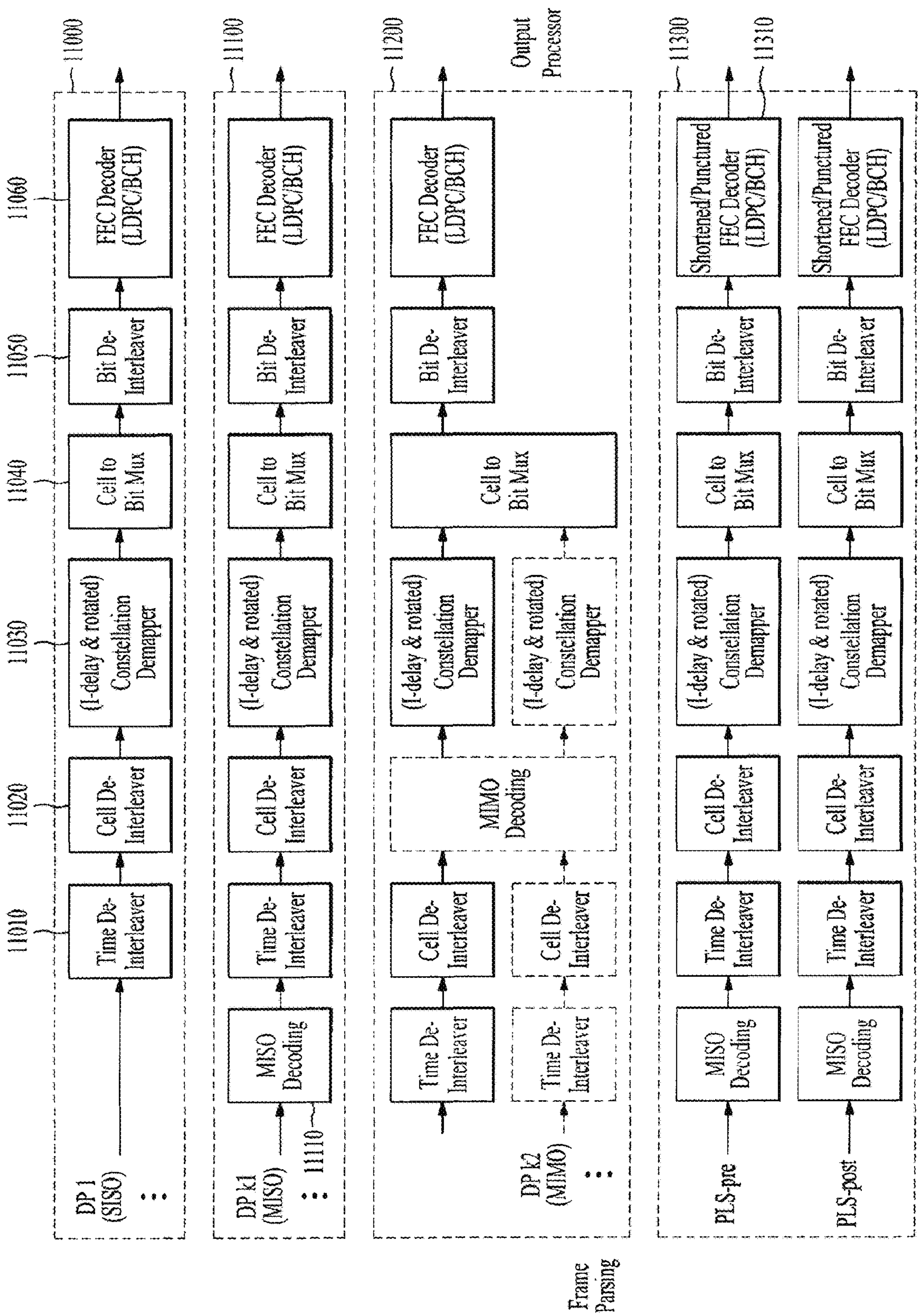
FIG. 11 illustrates a demapping & decoding module according to an embodiment of the present invention.

FIG. 11 illustrates a demapping & decoding module according to an embodiment of the present invention.

The demapping & decoding module shown in FIG. 11 corresponds to an embodiment of the demapping & decoding module illustrated in FIG. 8. The demapping & decoding module shown in FIG. 11 can perform a reverse operation of the operation of the coding & modulation module illustrated in FIG. 5.

The coding & modulation module of the apparatus for transmitting broadcast signals according to an embodiment of the present invention can process input data pipes by independently applying SISO, MISO and MIMO thereto for respective paths, as described above. Accordingly, the demapping & decoding module illustrated in FIG. 11 can include blocks for processing data output from the frame parsing module according to SISO, MISO and MIMO in response to the apparatus for transmitting broadcast signals.

As shown in FIG. 11, the demapping & decoding module according to an embodiment of the present invention can include a first block 11000 for SISO, a second block 11100 for MISO, a third block 11200 for MIMO and a fourth block 11300 for processing the PLS-pre/PLS-post information. The demapping & decoding module shown in FIG. 11 is exemplary and may include only the first block 11000 and the fourth block 11300, only the second block 11100 and the fourth block 11300 or only the third block 11200 and the fourth block 11300 according to design. That is, the demapping & decoding module can include blocks for processing data pipes equally or differently according to design.

A description will be given of each block of the demapping & decoding module.

The first block 11000 processes an input data pipe according to SISO and can include a time deinterleaver block 11010, a cell deinterleaver block 11020, a constellation demapper block 11030, a cell-to-bit mux block 11040, a bit deinterleaver block 11050 and an FEC decoder block 11060.

The time deinterleaver block 11010 can perform a reverse process of the process performed by the time interleaver block 5060 illustrated in FIG. 5. That is, the time deinterleaver block 11010 can deinterleave input symbols interleaved in the time domain into original positions thereof.

The cell deinterleaver block 11020 can perform a reverse process of the process performed by the cell interleaver block 5050 illustrated in FIG. 5. That is, the cell deinterleaver block 11020 can deinterleave positions of cells spread in one FEC block into original positions thereof.

The constellation demapper block 11030 can perform a reverse process of the process performed by the constellation mapper block 5040 illustrated in FIG. 5. That is, the constellation demapper block 11030 can demap a symbol domain input signal to bit domain data. In addition, the constellation demapper block 11030 may perform hard decision and output decided bit data. Furthermore, the constellation demapper block 11030 may output a log-likelihood ratio (LLR) of each bit, which corresponds to a soft decision value or probability value. If the apparatus for transmitting broadcast signals applies a rotated constellation in order to obtain additional diversity gain, the constellation demapper block 11030 can perform 2-dimensional LLR demapping corresponding to the rotated constellation. Here, the constellation demapper block 11030 can calculate the LLR such that a delay applied by the apparatus for transmitting broadcast signals to the I or Q component can be compensated.

The cell-to-bit mux block 11040 can perform a reverse process of the process performed by the bit-to-cell demux block 5030 illustrated in FIG. 5. That is, the cell-to-bit mux block 11040 can restore bit data mapped by the bit-to-cell demux block 5030 to the original bit streams.

The bit deinterleaver block 11050 can perform a reverse process of the process performed by the bit interleaver 5020 illustrated in FIG. 5. That is, the bit deinterleaver block 11050 can deinterleave the bit streams output from the cell-to-bit mux block 11040 in the original order.

The FEC decoder block 11060 can perform a reverse process of the process performed by the FEC encoder block 5010 illustrated in FIG. 5. That is, the FEC decoder block 11060 can correct an error generated on a transmission channel by performing LDPC decoding and BCH decoding.

The second block 11100 processes an input data pipe according to MISO and can include the time deinterleaver block, cell deinterleaver block, constellation demapper block, cell-to-bit mux block, bit deinterleaver block and FEC decoder block in the same manner as the first block 11000, as shown in FIG. 11. However, the second block 11100 is distinguished from the first block 11000 in that the second block 11100 further includes a MISO decoding block 11110. The second block 11100 performs the same procedure including time deinterleaving operation to outputting operation as the first block 11000 and thus description of the corresponding blocks is omitted.

The MISO decoding block 11110 can perform a reverse operation of the operation of the MISO processing block 5110 illustrated in FIG. 5. If the broadcast transmission/reception system according to an embodiment of the present invention uses STBC, the MISO decoding block 11110 can perform Alamouti decoding.

The third block 11200 processes an input data pipe according to MIMO and can include the time deinterleaver block, cell deinterleaver block, constellation demapper block, cell-to-bit mux block, bit deinterleaver block and FEC decoder block in the same manner as the second block 11100, as shown in FIG. 11. However, the third block 11200 is distinguished from the second block 11100 in that the third block 11200 further includes a MIMO decoding block 11210. The basic roles of the time deinterleaver block, cell deinterleaver block, constellation demapper block, cell-to-bit mux block and bit deinterleaver block included in the third block 11200 are identical to those of the corresponding blocks included in the first and second blocks 11000 and 11100 although functions thereof may be different from the first and second blocks 11000 and 11100.

The MIMO decoding block 11210 can receive output data of the cell deinterleaver for input signals of the m Rx antennas and perform MIMO decoding as a reverse operation of the operation of the MIMO processing block 5220 illustrated in FIG. 5. The MIMO decoding block 11210 can perform maximum likelihood decoding to obtain optimal decoding performance or carry out sphere decoding with reduced complexity. Otherwise, the MIMO decoding block 11210 can achieve improved decoding performance by performing MMSE detection or carrying out iterative decoding with MMSE detection.

The fourth block 11300 processes the PLS-pre/PLS-post information and can perform SISO or MISO decoding. The fourth block 11300 can carry out a reverse process of the process performed by the fourth block 5300 described with reference to FIG. 5.

The basic roles of the time deinterleaver block, cell deinterleaver block, constellation demapper block, cell-to-bit mux block and bit deinterleaver block included in the fourth block 11300 are identical to those of the corresponding blocks of the first, second and third blocks 11000, 11100 and 11200 although functions thereof may be different from the first, second and third blocks 11000, 11100 and 11200.

The shortened/punctured FEC decoder 11310 included in the fourth block 11300 can perform a reverse process of the process performed by the shortened/punctured FEC encoder block 5310 described with reference to FIG. 5. That is, the shortened/punctured FEC decoder 11310 can perform de-shortening and de-puncturing on data shortened/punctured according to PLS data length and then carry out FEC decoding thereon. In this case, the FEC decoder used for data pipes can also be used for PLS. Accordingly, additional FEC decoder hardware for the PLS only is not needed and thus system design is simplified and efficient coding is achieved.

The above-described blocks may be omitted or replaced by blocks having similar or identical functions according to design.

The demapping & decoding module according to an embodiment of the present invention can output data pipes and PLS information processed for the respective paths to the output processor, as illustrated in FIG. 11.

Figure 12:
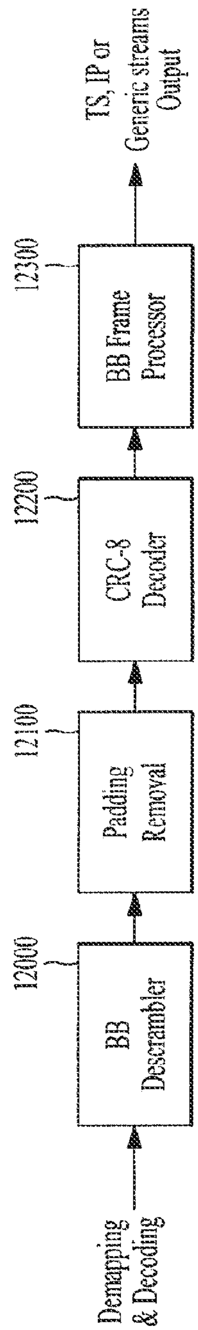
FIG. 12 illustrates an output processor according to an embodiment of the present invention.
Figure 13:
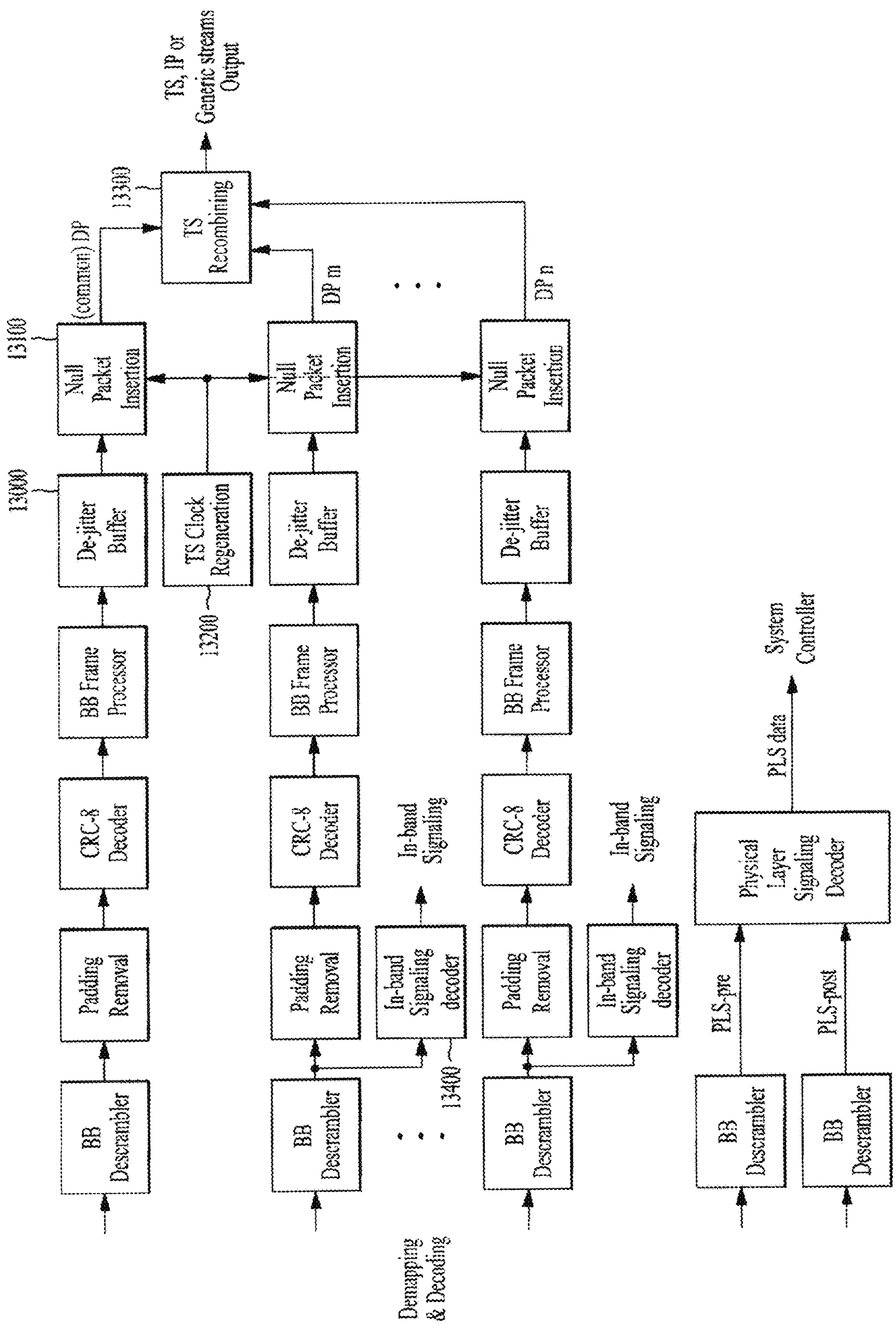
FIG. 13 illustrates an output processor according to another embodiment of the present invention.

FIGS. 12 and 13 illustrate output processors according to embodiments of the present invention.

FIG. 12 illustrates an output processor according to an embodiment of the present invention.

The output processor illustrated in FIG. 12 corresponds to an embodiment of the output processor illustrated in FIG. 8. The output processor illustrated in FIG. 12 receives a single data pipe output from the demapping & decoding module and outputs a single output stream. The output processor can perform a reverse operation of the operation of the input formatting module illustrated in FIG. 2.

The output processor shown in FIG. 12 can include a BB scrambler block 12000, a padding removal block 12100, a CRC-8 decoder block 12200 and a BB frame processor block 12300.

The BB scrambler block 12000 can descramble an input bit stream by generating the same PRBS as that used in the apparatus for transmitting broadcast signals for the input bit stream and carrying out an XOR operation on the PRBS and the bit stream.

The padding removal block 12100 can remove padding bits inserted by the apparatus for transmitting broadcast signals as necessary.

The CRC-8 decoder block 12200 can check a block error by performing CRC decoding on the bit stream received from the padding removal block 12100.

The BB frame processor block 12300 can decode information transmitted through a BB frame header and restore MPEG-TSs, IP streams (v4 or v6) or generic streams using the decoded information.

The above-described blocks may be omitted or replaced by blocks having similar or identical functions according to design.

FIG. 13 illustrates an output processor according to another embodiment of the present invention.

The output processor shown in FIG. 13 corresponds to an embodiment of the output processor illustrated in FIG. 8. The output processor shown in FIG. 13 receives multiple data pipes output from the demapping & decoding module. Decoding multiple data pipes can include a process of merging common data commonly applicable to a plurality of data pipes and data pipes related thereto and decoding the same or a process of simultaneously decoding a plurality of services or service components (including a scalable video service) by the apparatus for receiving broadcast signals.

The output processor shown in FIG. 13 can include a BB descrambler block, a padding removal block, a CRC-8 decoder block and a BB frame processor block as the output processor illustrated in FIG. 12. The basic roles of these blocks correspond to those of the blocks described with reference to FIG. 12 although operations thereof may differ from those of the blocks illustrated in FIG. 12.

A de-jitter buffer block 13000 included in the output processor shown in FIG. 13 can compensate for a delay, inserted by the apparatus for transmitting broadcast signals for synchronization of multiple data pipes, according to a restored TTO (time to output) parameter.

A null packet insertion block 13100 can restore a null packet removed from a stream with reference to a restored DNP (deleted null packet) and output common data.

A TS clock regeneration block 13200 can restore time synchronization of output packets based on ISCR (input stream time reference) information.

A TS recombining block 13300 can recombine the common data and data pipes related thereto, output from the null packet insertion block 13100, to restore the original MPEG-TSs, IP streams (v4 or v6) or generic streams. The TTO, DNT and ISCR information can be obtained through the BB frame header.

An in-band signaling decoding block 13400 can decode and output in-band physical layer signaling information transmitted through a padding bit field in each FEC frame of a data pipe.

The output processor shown in FIG. 13 can BB-descramble the PLS-pre information and PLS-post information respectively input through a PLS-pre path and a PLS-post path and decode the descrambled data to restore the original PLS data. The restored PLS data is delivered to a system controller included in the apparatus for receiving broadcast signals. The system controller can provide parameters necessary for the synchronization & demodulation module, frame parsing module, demapping & decoding module and output processor module of the apparatus for receiving broadcast signals.

The above-described blocks may be omitted or replaced by blocks having similar r identical functions according to design.

Figure 14:
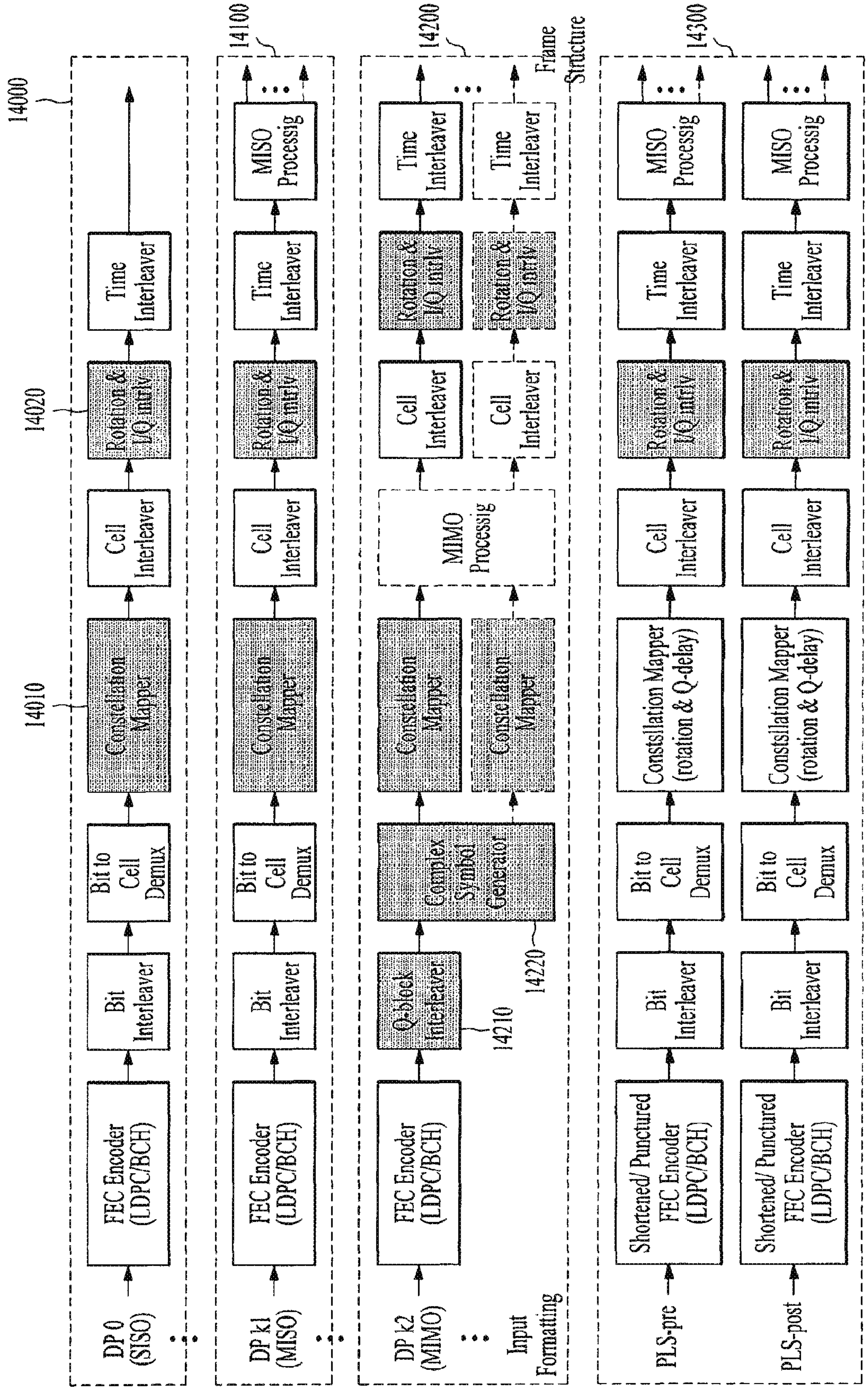
FIG. 14 illustrates a coding & modulation module according to another embodiment of the present invention.

FIG. 14 illustrates a coding & modulation module according to another embodiment of the present invention.

The coding & modulation module shown in FIG. 14 corresponds to another embodiment of the coding & modulation module illustrated in FIGS. 1 to 5.

To control QoS for each service or service component transmitted through each data pipe, as described above with reference to FIG. 5, the coding & modulation module shown in FIG. 14 can include a first block 14000 for SISO, a second block 14100 for MISO, a third block 14200 for MIMO and a fourth block 14300 for processing the PLS-pre/PLS-post information. In addition, the coding & modulation module can include blocks for processing data pipes equally or differently according to the design. The first to fourth blocks 14000 to 14300 shown in FIG. 14 are similar to the first to fourth blocks 5000 to 5300 illustrated in FIG. 5.

However, the first to fourth blocks 14000 to 14300 shown in FIG. 14 are distinguished from the first to fourth blocks 5000 to 5300 illustrated in FIG. 5 in that a constellation mapper 14010 included in the first to fourth blocks 14000 to 14300 has a function different from the first to fourth blocks 5000 to 5300 illustrated in FIG. 5, a rotation & I/Q interleaver block 14020 is present between the cell interleaver and the time interleaver of the first to fourth blocks 14000 to 14300 illustrated in FIG. 14 and the third block 14200 for MIMO has a configuration different from the third block 5200 for MIMO illustrated in FIG. 5. The following description focuses on these differences between the first to fourth blocks 14000 to 14300 shown in FIG. 14 and the first to fourth blocks 5000 to 5300 illustrated in FIG. 5.

The constellation mapper block 14010 shown in FIG. 14 can map an input bit word to a complex symbol. However, the constellation mapper block 14010 may not perform constellation rotation, differently from the constellation mapper block shown in FIG. 5. The constellation mapper block 14010 shown in FIG. 14 is commonly applicable to the first, second and third blocks 14000, 14100 and 14200, as described above.

The rotation & I/Q interleaver block 14020 can independently interleave in-phase and quadrature-phase components of each complex symbol of cell-interleaved data output from the cell interleaver and output the in-phase and quadrature-phase components on a symbol-by-symbol basis. The number of number of input data pieces and output data pieces of the rotation & I/Q interleaver block 14020 is two or more which can be changed by the designer. In addition, the rotation & I/Q interleaver block 14020 may not interleave the in-phase component.

The rotation & I/Q interleaver block 14020 is commonly applicable to the first to fourth blocks 14000 to 14300, as described above. In this case, whether or not the rotation & I/Q interleaver block 14020 is applied to the fourth block 14300 for processing the PLS-pre/post information can be signaled through the above-described preamble.

The third block 14200 for MIMO can include a Q-block interleaver block 14210 and a complex symbol generator block 14220, as illustrated in FIG. 14.

The Q-block interleaver block 14210 can permute a parity part of an FEC-encoded FEC block received from the FEC encoder. Accordingly, a parity part of an LDPC H matrix can be made into a cyclic structure like an information part. The Q-block interleaver block 14210 can permute the order of output bit blocks having Q size of the LDPC H matrix and then perform row-column block interleaving to generate final bit streams.

The complex symbol generator block 14220 receives the bit streams output from the Q-block interleaver block 14210, maps the bit streams to complex symbols and outputs the complex symbols. In this case, the complex symbol generator block 14220 can output the complex symbols through at least two paths. This can be modified by the designer.

The above-described blocks may be omitted or replaced by blocks having similar or identical functions according to design.

The coding & modulation module according to another embodiment of the present invention, illustrated in FIG. 14, can output data pipes, PLS-pre information and PLS-post information processed for respective paths to the frame structure module.

Figure 15:
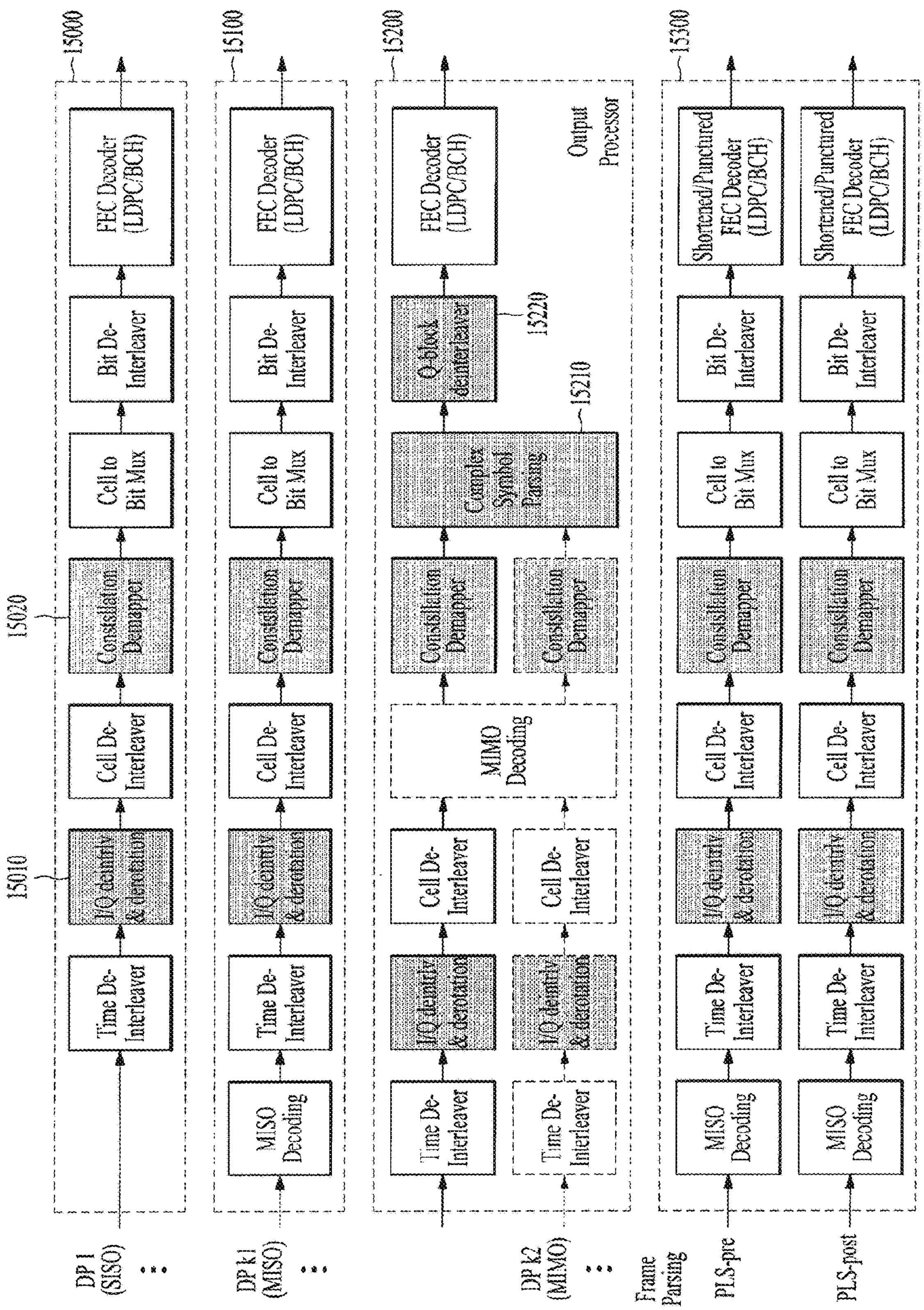
FIG. 15 illustrates a demapping & decoding module according to another embodiment of the present invention.

FIG. 15 illustrates a demapping & decoding module according to another embodiment of the present invention.

The demapping & decoding module shown in FIG. 15 corresponds to another embodiment of the demapping & decoding module illustrated in FIG. 11. The demapping & decoding module shown in FIG. 15 can perform a reverse operation of the operation of the coding & modulation module illustrated in FIG. 14.

As shown in FIG. 15, the demapping & decoding module according to another embodiment of the present invention can include a first block 15000 for SISO, a second block 11100 for MISO, a third block 15200 for MIMO and a fourth block 14300 for processing the PLS-pre/PLS-post information. In addition, the demapping & decoding module can include blocks for processing data pipes equally or differently according to design. The first to fourth blocks 15000 to 15300 shown in FIG. 15 are similar to the first to fourth blocks 11000 to 11300 illustrated in FIG. 11.

However, the first to fourth blocks 15000 to 15300 shown in FIG. 15 are distinguished from the first to fourth blocks 11000 to 11300 illustrated in FIG. 11 in that an I/Q deinterleaver and derotation block 15010 is present between the time interleaver and the cell deinterleaver of the first to fourth blocks 15000 to 15300, a constellation mapper 15010 included in the first to fourth blocks 15000 to 15300 has a function different from the first to fourth blocks 11000 to 11300 illustrated in FIG. 11 and the third block 15200 for MIMO has a configuration different from the third block 11200 for MIMO illustrated in FIG. 11. The following description focuses on these differences between the first to fourth blocks 15000 to 15300 shown in FIG. 15 and the first to fourth blocks 11000 to 11300 illustrated in FIG. 11.

The I/Q deinterleaver & derotation block 15010 can perform a reverse process of the process performed by the rotation & I/Q interleaver block 14020 illustrated in FIG. 14. That is, the I/Q deinterleaver & derotation block 15010 can deinterleave I and Q components I/Q-interleaved and transmitted by the apparatus for transmitting broadcast signals and derotate complex symbols having the restored I and Q components.

The I/Q deinterleaver & derotation block 15010 is commonly applicable to the first to fourth blocks 15000 to 15300, as described above. In this case, whether or not the I/Q deinterleaver & derotation block 15010 is applied to the fourth block 15300 for processing the PLS-pre/post information can be signaled through the above-described preamble.

The constellation demapper block 15020 can perform a reverse process of the process performed by the constellation mapper block 14010 illustrated in FIG. 14. That is, the constellation demapper block 15020 can demap cell-deinterleaved data without performing derotation.

The third block 15200 for MIMO can include a complex symbol parsing block 15210 and a Q-block deinterleaver block 15220, as shown in FIG. 15.

The complex symbol parsing block 15210 can perform a reverse process of the process performed by the complex symbol generator block 14220 illustrated in FIG. 14. That is, the complex symbol parsing block 15210 can parse complex data symbols and demap the same to bit data. In this case, the complex symbol parsing block 15210 can receive complex data symbols through at least two paths.

The Q-block deinterleaver block 15220 can perform a reverse process of the process carried out by the Q-block interleaver block 14210 illustrated in FIG. 14. That is, the Q-block deinterleaver block 15220 can restore Q size blocks according to row-column deinterleaving, restore the order of permuted blocks to the original order and then restore positions of parity bits to original positions according to parity deinterleaving.

The above-described blocks may be omitted or replaced by blocks having similar or identical functions according to design.

As illustrated in FIG. 15, the demapping & decoding module according to another embodiment of the present invention can output data pipes and PLS information processed for respective paths to the output processor.

As described above, the apparatus and method for transmitting broadcast signals according to an embodiment of the present invention can multiplex signals of different broadcast transmission/reception systems within the same RF channel and transmit the multiplexed signals and the apparatus and method for receiving broadcast signals according to an embodiment of the present invention can process the signals in response to the broadcast signal transmission operation. Accordingly, it is possible to provide a flexible broadcast transmission and reception system.

Figure 16:
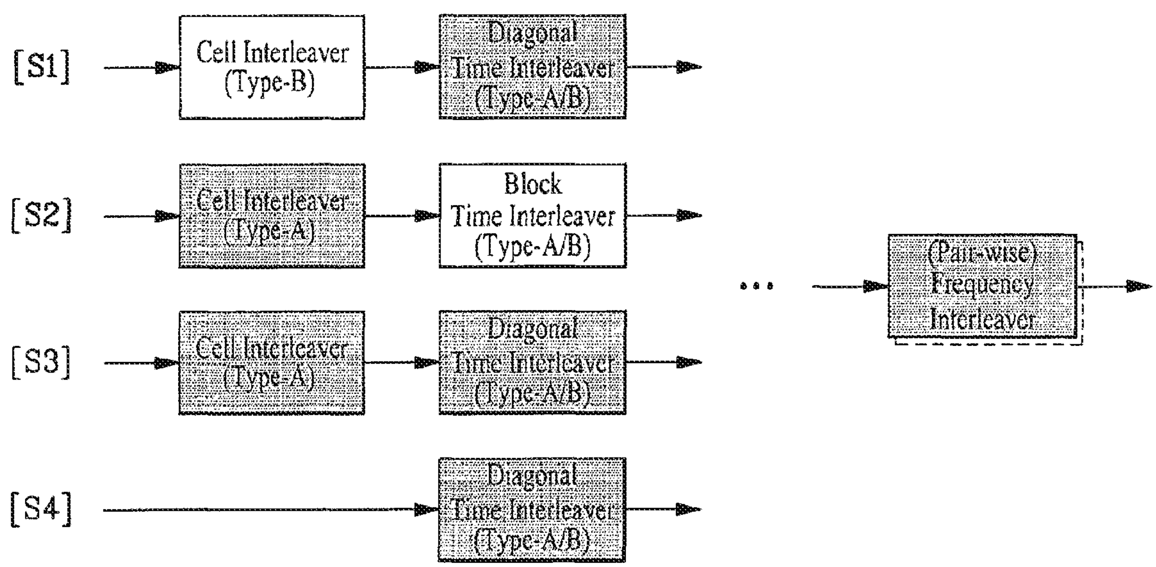
FIG. 16 is a conceptual diagram illustrating combinations of interleavers on the condition that Signal Space Diversity (SSD) is not considered.

FIG. 16 is a conceptual diagram illustrating combinations of interleavers on the condition that Signal Space Diversity (SSD) is not considered.

When SSD is not considered, combinations of the interleavers may be denoted by four scenarios S1 to S4. Each scenario may include a cell interleaver, a time interleaver, and/or a block interleaver.

The scope or spirit of the present invention is not limited to combinations of the above interleavers, and the present invention can provide a variety of additional combinations achieved by substitution, deletion, and/or addition of the interleavers. Combinations of the additional interleavers may be determined in consideration of system throughput, receiver operation, memory complexity, robustness, etc. For example, a new scenario achieved by omitting the cell interleaver from each of four scenarios may be additionally proposed. Although the additional scenario is not shown in the drawing, the additional scenario is within the scope or spirit of the present invention, and the operations of this additional scenario may be identical to the sum of operation of the individual constituent interleavers.

In FIG. 16, a diagonal time interleaver and a block time interleaver may correspond to the above-mentioned time interleavers. In addition, a pair-wise frequency interleaver may correspond to an interleaver corresponding to the above-mentioned block interleaver. The individual interleavers may be a legacy cell interleaver, a legacy time interleaver and/or a legacy block interleaver for use in the conventional art, or may be a new cell interleaver, a new time interleaver and/or a new block interleaver for use in the present invention. The four scenarios mentioned above may include a combination of the legacy interleavers and the new interleavers. The shaded interleavers shown in FIG. 16 may denote the new interleavers or may denote the legacy interleavers having other roles or functions.

TABLE 1

| Blocks | Types | Development Status | Interleaving Seed Variation | Single-memory Deinterleaving |
|---|---|---|---|---|
| Cell Interleaver | Type-A | New | Yes | Yes |
| | Type-B | Conventional | No (2-period) | Yes |
| Block Time Interleaver | Type-A | Conventional | — | Yes |
| | Type-B | Conventional | — | Yes |
| Diagonal Time Interleaver | Type-A | New | — | Yes |
| | Type-B | New | — | Yes |
| (pair-wise) Frequency Interleaver | — | New | Yes | Yes |

Table 1 shows various interleavers for use in the four scenarios. "Types" item define various types of the respective interleavers. For example, the cell interleavers may include a Type-A interleaver and/or a Type-B interleaver. The block time interleavers may include a Type-A interleaver and/or a Type-B interleaver. "Development Status" item may denote development states of types of the respective interleavers. For example, the Type-A cell interleaver may be a new cell interleaver, and the Type-B cell interleaver may be a conventional cell interleaver. "Interleaving Seed Variation" item may indicate whether the interleaving seed of each interleaver is changeable. "YES" item may indicate that the interleaving seed of each interleaver is changeable (i.e., YES). "Single Memory Deinterleaving" item may indicate whether a deinterleaver corresponding to each interleaver provides single memory deinterleaving. "YES" item may indicate single memory deinterleaving.

A Type-B cell interleaver may correspond to a frequency interleaver for use in the conventional art (T2, NGH). A Type-A block time interleaver may correspond to DVB-T2. A Type-B block time interleaver may correspond to an interleaver for use in DVB-NGH.

TABLE 2

| Blocks | Types | Key Properties |
|---|---|---|
| Cell Interleaver | Type-A | Different interleaving seed is applied for every FEC block<br>Possible to use a single-memory at receiver |
| | Type-B | even & odd interleaving seeds are applied to FEC blocks, in turn<br>Possible to use a single-memory at receiver |
| (pair-wise) Frequency Interleaver | — | Different interleaving seed is applied for every OFDM symbol<br>Possible to use a single-memory at receiver |

Table 2 shows a Type-A cell interleaver, a Type-B cell interleaver, and a frequency interleaver. As described above, the frequency interleaver may correspond to the above-mentioned block interleaver.

The basic operation of the cell interleaver shown in Table 1 is identical to those of Table 2. The cell interleaver may perform interleaving of a plurality of cells corresponding to one FEC block, and output the interleaving result. In this case, cells corresponding to individual FEC blocks may be output in different orders of the individual FEC blocks. The cell deinterleaver may perform deinterleaving from the locations of cells interleaved in one FEC block to the original locations of the cells. The cell interleaver and the cell deinterleaver may be omitted as described above, or may be replaced with other blocks/modules having the same or similar functions.

The Type-A cell interleaver is newly proposed by the present invention, and may perform interleaving by applying different interleaving seeds to individual FEC blocks. Specifically, cells corresponding to one FEC block may be interleaved at intervals of a predetermined time, and the interleaved resultant cells can be generated. The Type-A cell deinterleaver may perform deinterleaving using a single memory.

The Type-B cell interleaver may be implemented when the interleaver used as a frequency interleaver for use in the conventional art (T2, NGH) is used as the cell interleaver. The Type-B cell interleaver may perform interleaving of cells corresponding to one FEC block, and may output the interleaved cells. The Type-B cell interleaver may apply different interleaving seeds to an even FEC block and an odd FEC block, and then perform interleaving. Accordingly, the Type-B cell interleaver has a disadvantage in that different interleaving seeds are applied to individual FEC blocks as compared to the Type-A cell interleaver. The Type-B cell deinterleaver may perform deinterleaving using a single memory.

A general frequency interleaver may correspond to the above-mentioned block interleaver. The basic operation of the block interleaver (i.e., frequency interleaver) is identical to the above-described operations. The block interleaver may perform interleaving of cells contained in a transmission (Tx) block used as a unit of a transmission (Tx) frame so as to obtain an additional diversity gain. The pair-wise block interleaver may process two contiguous cells into one unit, and perform interleaving of the processed result. Accordingly, output cells of the pair-wise block interleaver may be two contiguous cells to be arranged contiguous to each other. The output cells may operate in the same manner as in two antenna paths, or may operate independently of each other.

The operations of a general block deinterleaver (frequency deinterleaver) may be identical to the basic operations of the above-mentioned block deinterleaver. The block deinterleaver may perform a reverse process of the block interleaver operation so as to recover the original data order. The block deinterleaver may perform deinterleaving of data in units of a transmission block (TB). If the pair-wise block interleaver is used by a transmitter, the block deinterleaver can perform deinterleaving by pairing two contiguous data pieces of each input path. If deinterleaving is performed by pairing the two contiguous data pieces, output data may be two contiguous data pieces. The block interleaver and the block deinterleaver may be omitted as described above, or may be replaced with other blocks/modules having the same or similar functions.

The pair-wise frequency interleaver may be a new frequency interleaver proposed by the present invention. The new frequency interleaver may perform modified operations of the basic operations of the above-mentioned block interleaver. The new frequency interleaver may operate by applying different interleaving seeds to respective OFDM symbols according to an embodiment. In accordance with another embodiment, OFDM symbols are paired so that interleaving may be performed on the paired OFDM symbols. In this case, different interleaving seeds may be applied to one OFDM symbol pair. That is, the same interleaving seeds may be assigned to the paired OFDM symbols. The OFDM symbol pair may be implemented by combining two contiguous OFDM symbols. Two data carriers of the OFDM symbol may be paired and interleaving may be performed on the paired data carriers.

A new frequency interleaver may perform interleaving using two memories. In this case, the even pair may be interleaved using a first memory, and the odd pair may be interleaved using a second memory. The pair-wise frequency deinterleaver may perform deinterleaving using a single memory. In this case, the pair-wise frequency deinterleaver may indicate a new frequency deinterleaver corresponding to a new frequency interleaver.

TABLE 3

| Blocks | Types | Key Properties |
|---|---|---|
| Block Time Interleaver | Type-A | Column-wise writing and row-wise reading operations<br>Actual interleaving depth of a single FEC block is more than 2<br>Possible to use a single-memory at receiver |
| | Type-B | Column-wise writing and row-wise reading operations<br>Actual interleaving depth of a single FEC block is 1<br>Possible to use a single-memory at receiver |
| Diagonal Time Interleaver | Type-A | Column-wise writing and diagonal-wise reading operations<br>Actual interleaving depth of a single FEC block is more than 2<br>Possible to use a single-memory at receiver |
| | Type-B | Column-wise writing and diagonal-wise reading operations<br>Actual interleaving depth of a single FEC block is 1<br>Possible to use a single-memory at receiver |

Table 3 shows a Type-A block time interleaver, a Type-B block time interleaver, a Type-A diagonal time interleaver, and a Type-B diagonal time interleaver. The diagonal time interleaver and the block time interleaver may correspond to the above-mentioned time interleavers.

A general time interleaver may mix the cells corresponding to a plurality of FEC blocks, and output the mixed cells. Cells contained in each FEC block are scattered by a time interleaving depth through time interleaving, and the scattered cells can be transmitted. A diversity gain can be obtained through time interleaving. A general time deinterleaver may perform a reverse process of the time interleaver operation. The time deinterleaver may perform deinterleaving of cells interleaved in the time domain into the original locations of the cells. The time interleaver and the time deinterleaver may be omitted as described above, or may be replaced with other blocks/modules having the same or similar functions.

The block time interleaver shown in Table 3 may perform the operations similar to those of the time interleaver used in the conventional art (T2, NGH). The Type-A block time interleaver may indicate two or more interleavers, each of which has an interleaving depth with respect to one input FEC block. In addition, the type-B block time interleaver may indicate a specific interleaver which has an interleaving depth of 1 with respect to one input FEC block. In this case, the interleaving depth may indicate a column-wise writing period.

The diagonal time interleaver shown in Table 3 may be a new time interleaver proposed by the present invention. The diagonal time interleaver may perform the reading operation in a diagonal direction in a different way from the above-mentioned block time interleaver. That is, the diagonal time interleaver may store the FEC block in a memory by performing the column-wise writing operation, and may read the cells stored in the memory by performing the diagonal-wise reading operation. The number of memories used in the above-mentioned case may be set to 2 according to the present invention. The diagonal-wise reading operation may indicate the operation for reading the cells diagonally spaced apart from each other by a predetermined distance in the interleaving array stored in the memory. Interleaving may be achieved through the diagonal-wise reading operation. The diagonal time interleaver may be called a twisted row-column block interleaver.

The Type-A diagonal time interleaver may indicate an interleaver having an interleaving depth of 2 or higher with respect to one input FEC block. In addition, the Type-B diagonal time interleaver may indicate an interleaver having an interleaving depth of 1 with respect to one input FEC block. In this case, the interleaving depth may indicate the column-wise writing period.

Figure 17:
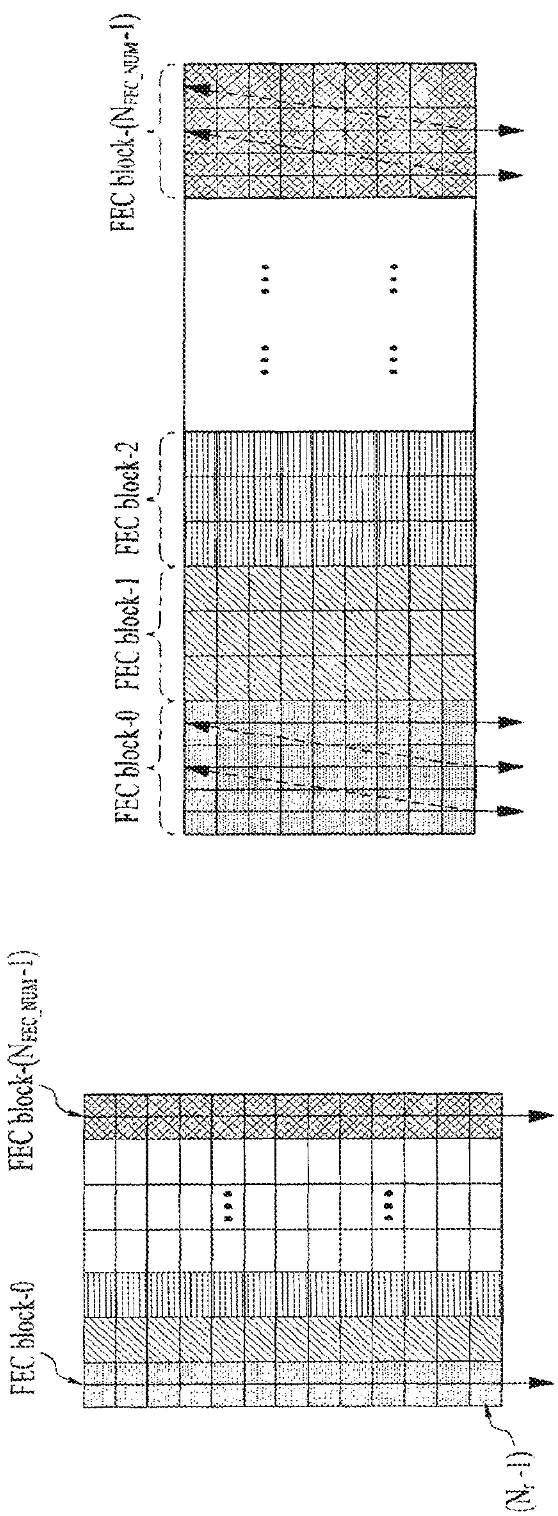
FIG. 17 shows the column-wise writing operations of the block time interleaver and the diagonal time interleaver according to the present invention.

FIG. 17 shows the column-wise writing operations of the block time interleaver and the diagonal time interleaver according to the present invention.

The column-wise writing operation of the Type-A block time interleaver and the Type-A diagonal time interleaver may have the interleaving depth of 2 or higher as shown in FIG. 17.

The column-wise writing operation of the Type-B block time interleaver and the Type-B diagonal time interleaver may have the interleaving depth of 1 as shown in FIG. 17. In this case, the interleaving depth may indicate the column-wise writing period.

Figure 18:
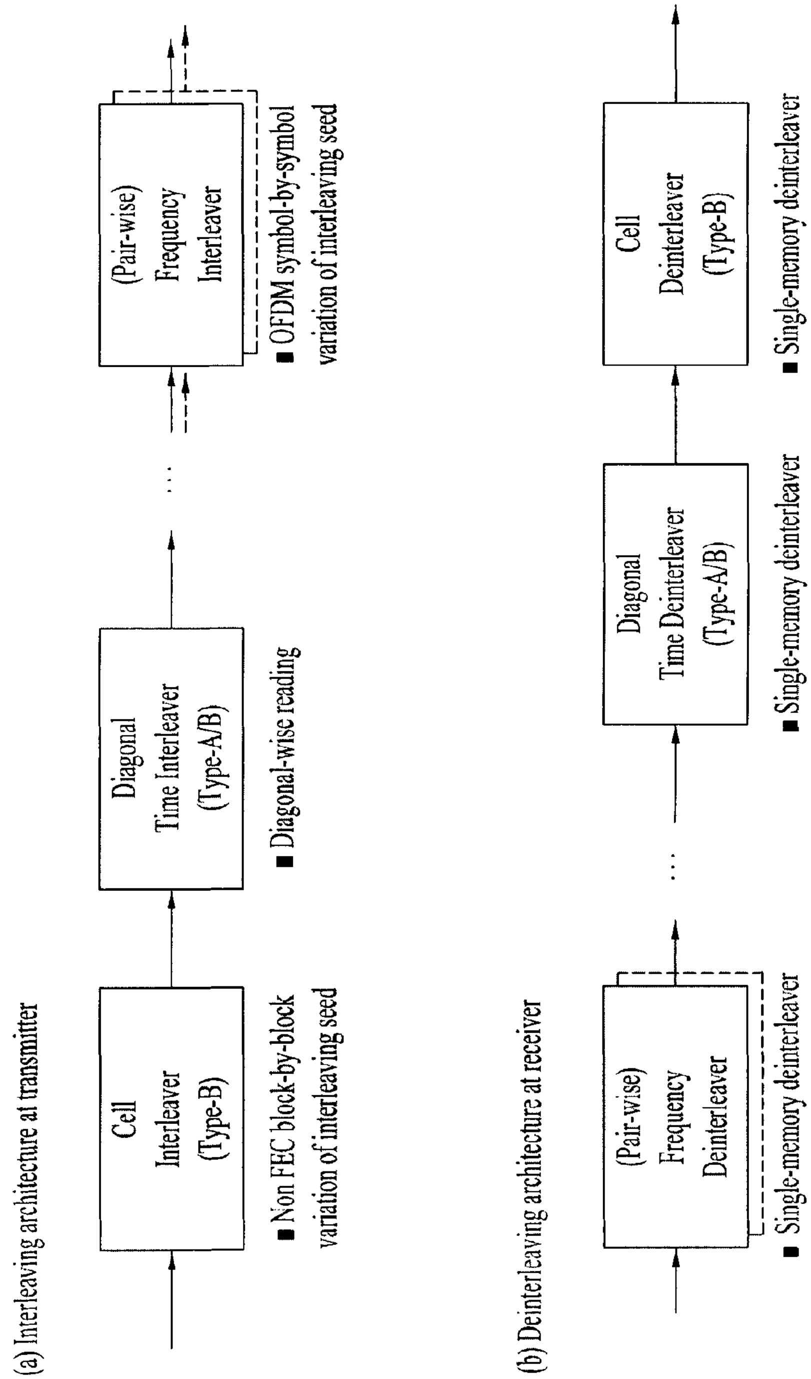
FIG. 18 is a conceptual diagram illustrating a first scenario S2 from among combinations of the interleavers without consideration of a signal space diversity (SSD).

FIG. 18 is a conceptual diagram illustrating a first scenario S2 from among combinations of the interleavers without consideration of a signal space diversity (SSD).

FIG. 18(*a*) shows the interleaving structure according to the first scenario. The interleaving structure of the first scenario may include a Type-B cell interleaver, a Type-A or Type-B diagonal time interleaver, and/or a pair-wise frequency interleaver. In this case, the pair-wise frequency interleaver may be the above-mentioned new frequency interleaver.

The Type-B cell interleaver may mix the cells corresponding to one FEC block at random, and output the mixed cells. In this case, the cells corresponding to each FEC block may be output in different orders of individual FEC blocks. The Type-B cell interleaver may perform interleaving by applying different interleaving seeds to odd input FEC blocks and even input FEC blocks as described above. The cell interleaving can be implemented by performing not only the writing operation for writing data in the memory, but also the reading operation for reading data from the memory.

The Type-A and Type-B diagonal time interleavers may perform the column-wise writing operation and the diagonal-wise reading operation for the cells belonging to a plurality of FEC blocks. Cells located at other locations within each FEC block through the diagonal time interleaving are scattered and transmitted within an interval as long as a diagonal interleaving depth, such that a diversity gain can be obtained.

Thereafter, the output of the diagonal time interleaver may be input to the pair-wise frequency interleaver after passing through other blocks/modules such as the above-mentioned cell mapper or the like. In this case, the pair-wise frequency interleaver may be a new frequency interleaver. Accordingly, the pair-wise frequency interleaver (new frequency interleaver) may provide an additional diversity gain by interleaving the cells contained in the OFDM symbol.

FIG. 18(*b*) shows the deinterleaving structure according to the first scenario. The deinterleaving structure of the first scenario may include a (pair-wise) frequency deinterleaver, a Type-A or Type-B diagonal time deinterleaver, and/or a Type-B cell deinterleaver. In this case, the pair-wise frequency deinterleaver may correspond to the above-mentioned new frequency deinterleaver. The pair-wise frequency deinterleaver may perform deinterleaving of data through a reverse process of the new frequency interleaver operation.

Thereafter, the output of the pair-wise frequency deinterleaver may be input to the Type-A and Type-B diagonal time deinterleavers after passing through other blocks/modules such as the above-mentioned cell demapper. The Type-A diagonal time deinterleaver may perform a reverse process of the Type-A diagonal time interleaver. The Type-B diagonal time deinterleaver may perform a reverse process of the Type-B diagonal time interleaver. In this case, the Type-A and Type-B diagonal time deinterleaver may perform time deinterleaving using a single memory.

The Type-B cell deinterleaver may perform deinterleaving from the locations of the cells interleaved in one FEC block to the original locations of the cells.

Figure 19:
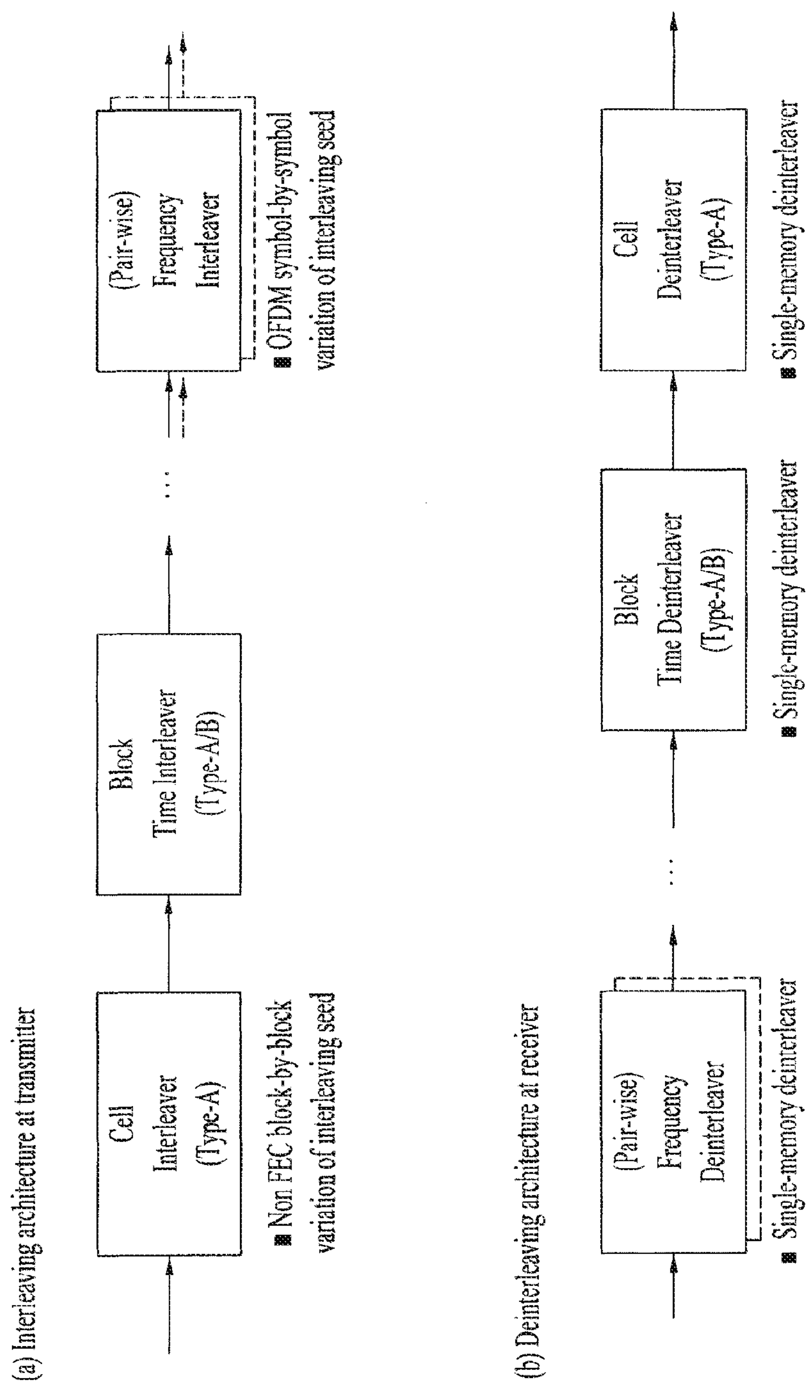
FIG. 19 is a conceptual diagram of a second scenario S2 from among combinations of the interleavers without consideration of a signal space diversity (SSD).

FIG. 19 is a conceptual diagram of a second scenario S2 from among combinations of the interleavers without consideration of a signal space diversity (SSD).

FIG. 19(*a*) shows the interleaving structure according to the second scenario. The interleaving structure of the second scenario may include a Type-A cell interleaver, a Type-A or Type-B block time interleaver, and/or a pair-wise frequency interleaver. In this case, the pair-wise frequency interleaver may be the above-mentioned new frequency interleaver.

The Type-A cell interleaver may perform interleaving by applying different interleaving seeds to respective input FEC blocks as described above.

The Type-A and Type-B block timer interleavers may perform interleaving of the cells belonging to a plurality of FEC blocks through the column-wise writing operation and the row-wise reading operation, as described above. Cells located at other locations within are scattered and transmitted within an interval as long as an interleaving depth, such that a diversity gain can be obtained.

Thereafter, the output of the block time interleaver may be input to the pair-wise frequency interleaver after passing through other blocks/modules such as the above-mentioned cell mapper or the like. In this case, the pair-wise frequency interleaver may be the above-mentioned new frequency interleaver. Accordingly, the pair-wise frequency interleaver (new frequency interleaver) may provide an additional diversity gain by interleaving the cells contained in the OFDM symbol.

FIG. 19(*b*) shows the deinterleaving structure according to the second scenario. The deinterleaving structure of the second scenario may include a (pair-wise) frequency deinterleaver, a Type-A or Type-B diagonal time deinterleaver, and/or a Type-A cell deinterleaver. In this case, the pair-wise frequency deinterleaver may correspond to the above-mentioned new frequency deinterleaver.

The pair-wise frequency deinterleaver may perform deinterleaving of data through a reverse process of the new frequency interleaver operation.

Thereafter, the output of the pair-wise frequency deinterleaver may be input to the Type-A and Type-B diagonal time deinterleavers after passing through other blocks/modules such as the above-mentioned cell demapper. The Type-A block time deinterleaver may perform a reverse process of the Type-A block time interleaver. The Type-B block time deinterleaver may perform a reverse process of the Type-B block time interleaver. In this case, the Type-A or Type-B block time deinterleaver may perform time deinterleaving using a single memory.

The Type-A cell deinterleaver may perform deinterleaving from the locations of the cells interleaved in one FEC block to the original locations of the cells.

Figure 20:
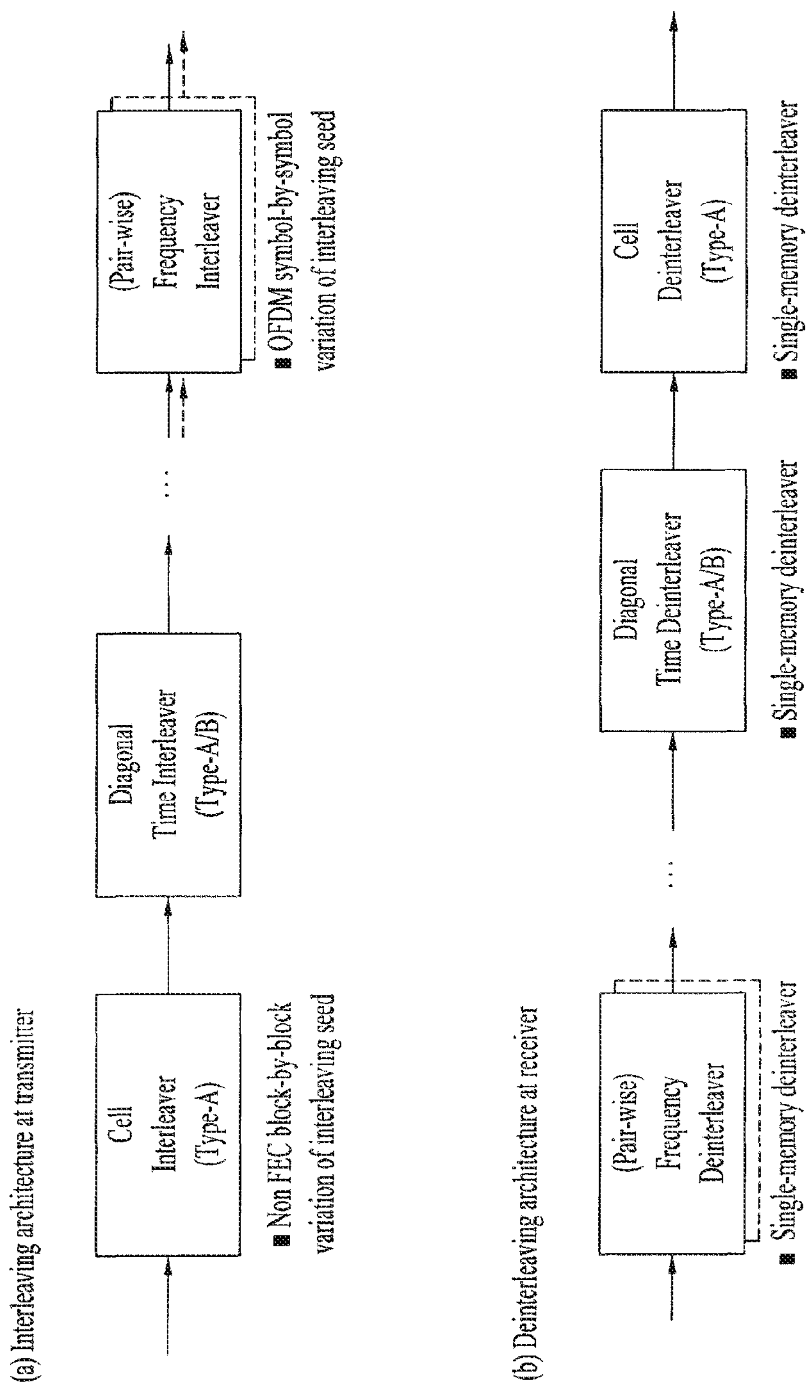
FIG. 20 is a conceptual diagram of a third scenario S3 from among combinations of the interleavers without consideration of signal space diversity (SSD).

FIG. 20 is a conceptual diagram of a third scenario S3 from among combinations of the interleavers without consideration of signal space diversity (SSD).

FIG. 20(*a*) shows the interleaving structure according to the third scenario. The interleaving structure of the third scenario may include a Type-A cell interleaver, a Type-A or Type-B diagonal time interleaver, and/or a pair-wise frequency interleaver. In this case, the pair-wise frequency interleaver may be the above-mentioned new frequency interleaver.

The operations of the Type-A cell interleaver, the Type-A and Type-B diagonal time interleaver, and the pair-wise frequency interleaver may be identical to those of the above-mentioned figures.

FIG. 19(*b*) shows the deinterleaving structure according to the third scenario. The deinterleaving structure of the third scenario may include a (pair-wise) frequency deinterleaver, a Type-A or Type-B diagonal time deinterleaver, and/or a Type-A cell deinterleaver. In this case, the pair-wise frequency deinterleaver may correspond to the above-mentioned new frequency deinterleaver.

The operations of the pair-wise frequency deinterleaver, the Type-A and Type-B diagonal time interleavers, and the Type-A cell deinterleaver may be identical to those of the above-mentioned figures.

Figure 21:
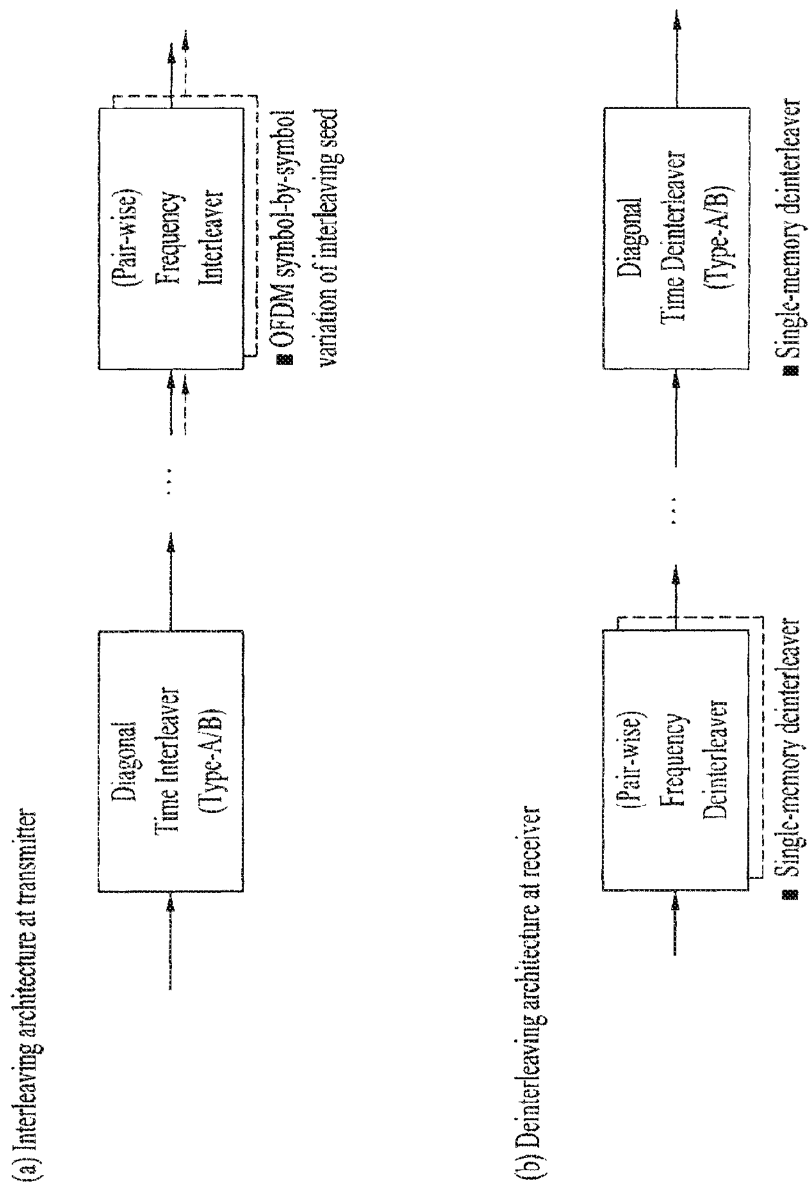
FIG. 21 is a conceptual diagram of a fourth scenario S4 from among combinations of the interleavers without consideration of a signal space diversity (SSD).

FIG. 21 is a conceptual diagram of a fourth scenario S4 from among combinations of the interleavers without consideration of a signal space diversity (SSD).

FIG. 21(*a*) shows the interleaving structure according to the fourth scenario. The interleaving structure of the fourth scenario may include a Type-A or Type-B diagonal time interleaver and/or a pair-wise frequency interleaver. In this case, the pair-wise frequency interleaver may be the above-mentioned new frequency interleaver.

The operations of the Type-A and Type-B diagonal time interleavers and the pair-wise frequency deinterleaver may be identical to those of the above-mentioned figures.

FIG. 21(*b*) shows the deinterleaving structure according to the fourth scenario. The deinterleaving structure of the fourth scenario may include a (pair-wise) frequency deinterleaver and/or a Type-A or Type-B diagonal time deinterleaver. In this case, the pair-wise frequency deinterleaver may correspond to the above-mentioned new frequency deinterleaver.

The operations of the pair-wise frequency deinterleaver and the Type-A or Type-B diagonal time interleaver may be identical to those of the above-mentioned figures.

FIG. 22 illustrates a structure of a random generator according to an embodiment of the present invention.

FIG. 22 illustrates the case in which the random generator generates an initial-offset value using a PP method.

The random generator according to an embodiment of the present invention may include a register 32000 and an XOR operator 32100. In general, the PP method may randomly output values 1, . . . , 2n−1. Accordingly, the random generator according to an embodiment of the present invention may perform a register reset process in order to output $2^n$ symbol indexes including 0 and set a register initial value for a register shifting process.

The random generator according to an embodiment of the present invention may include different registers and XOR operators for respective primitive polynomials for the PP method.

Table 4 below shows primitive polynomials for the aforementioned PP method and a reset value and an initial value for the register reset process and the register shifting

TABLE 4

| Order (n) | Primitive polynomial | k = 0 (reset value) | k = 1 (initial value) |
|---|---|---|---|
| 9 | $f(x) = 1 + x^5 + x^9$ | [000000000] | [000010001] |
| 10 | $f(x) = 1 + x^7 + x^{10}$ | [0000000000] | [0000001001] |
| 11 | $f(x) = 1 + x^9 + x^{11}$ | [00000000000] | [00000000101] |
| 12 | $f(x) = 1 + x^6 + x^8 + x^{11} + x^{12}$ | [000000000000] | [000001010011] |
| 13 | $f(x) = 1 + x^2 + x^4 + x^8 + x^9 + x^{12} + x^{13}$ | [0000000000000] | [0101000110011] |
| 14 | $f(x) = 1 + x^2 + x^{12} + x^{13} + x^{14}$ | [00000000000000] | [00100000000111] |
| 15 | $f(x) = 1 + x^{14} + x^{15}$ | [000000000000000] | [000000000000011] |

Table 4 above shows a register reset value and register initial value corresponding to an $n^{th}$ primitive polynomial (n=9, . . . , 15). As shown in Table 4 above, k=0 refers to a register reset value and k=1 refers to a register initial value. In addition, $2 \le k \le 2^n - 1$ refers to shifted register values.

FIG. 23 illustrates a random generator according to an embodiment of the present invention.

FIG. 23 illustrates a structure of the random generator when n of the $n^{th}$ primitive polynomial of Table 4 above is 9 to 12.

FIG. 24 illustrates a random generator according to another embodiment of the present invention.

FIG. 24 illustrates a structure of the random generator when n of the $n^{th}$ primitive polynomial of Table 4 above is 13 to 15.

Figure 25:
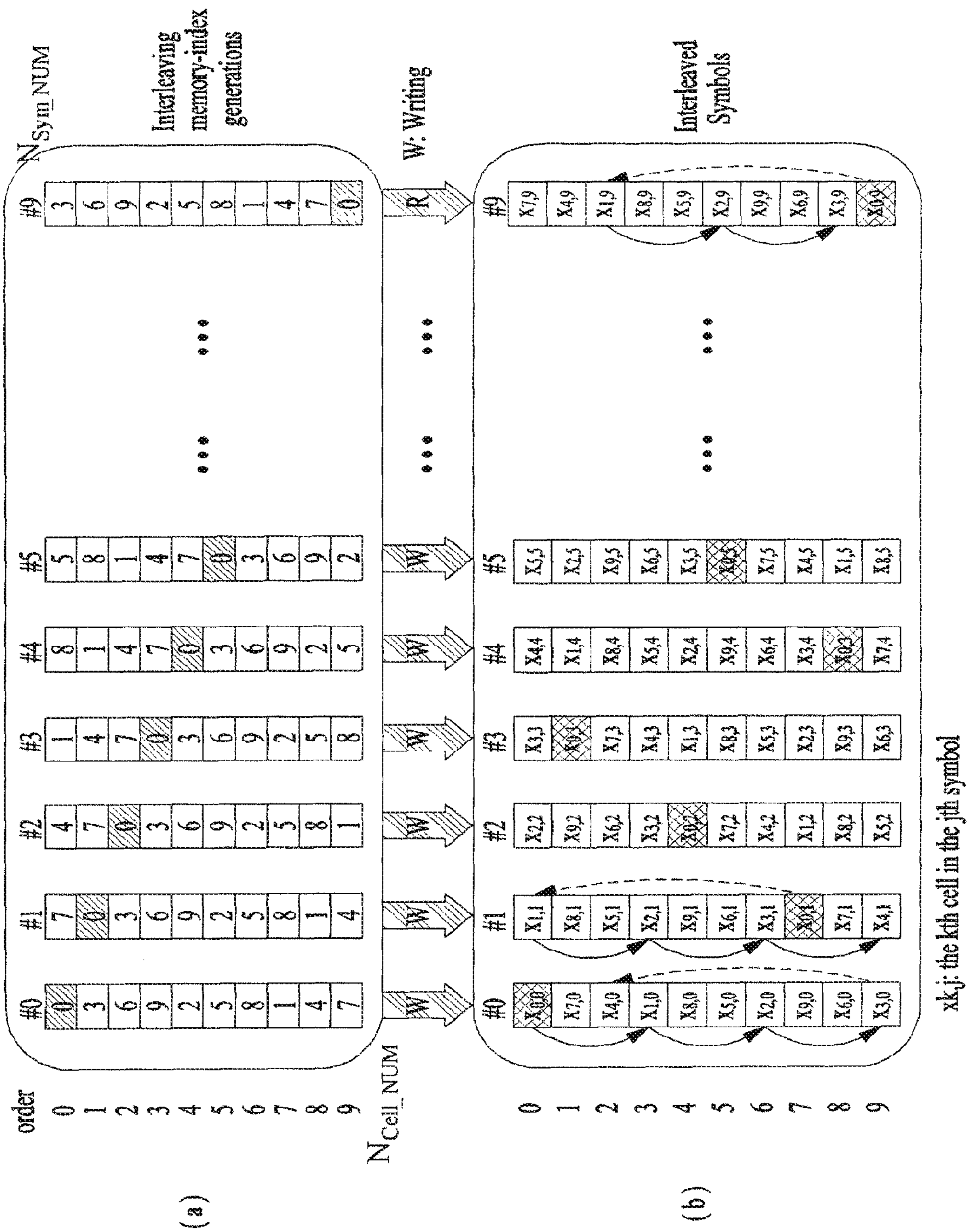
FIG. 25 illustrates a frequency interleaving process according to an embodiment of the present invention.

FIG. 25 illustrates a frequency interleaving process according to an embodiment of the present invention.

FIG. 25 illustrates a frequency interleaving process when a single memory is applied to a broadcast signal receiver, if the number of all symbols is 10, the number of cells included in one symbol is 10, and p is 3, according to an embodiment of the present invention.

FIG. 25(*a*) illustrates output values of respective symbols, which is output using an RPI method. In particular, a first memory index value of each OFDM symbol, that is, 0, 7, 4, 1, 8 . . . may be set as an initial-offset value generated by the random generator of the aforementioned RPI. A number indicated in the interleaving memory index represents an order in which cells included in each symbol are interleaved and output.

FIG. 25(*b*) illustrates results obtained by interleaving cells of an input OFDM symbol in a symbol unit using the generated interleaving memory index.

Figure 26:
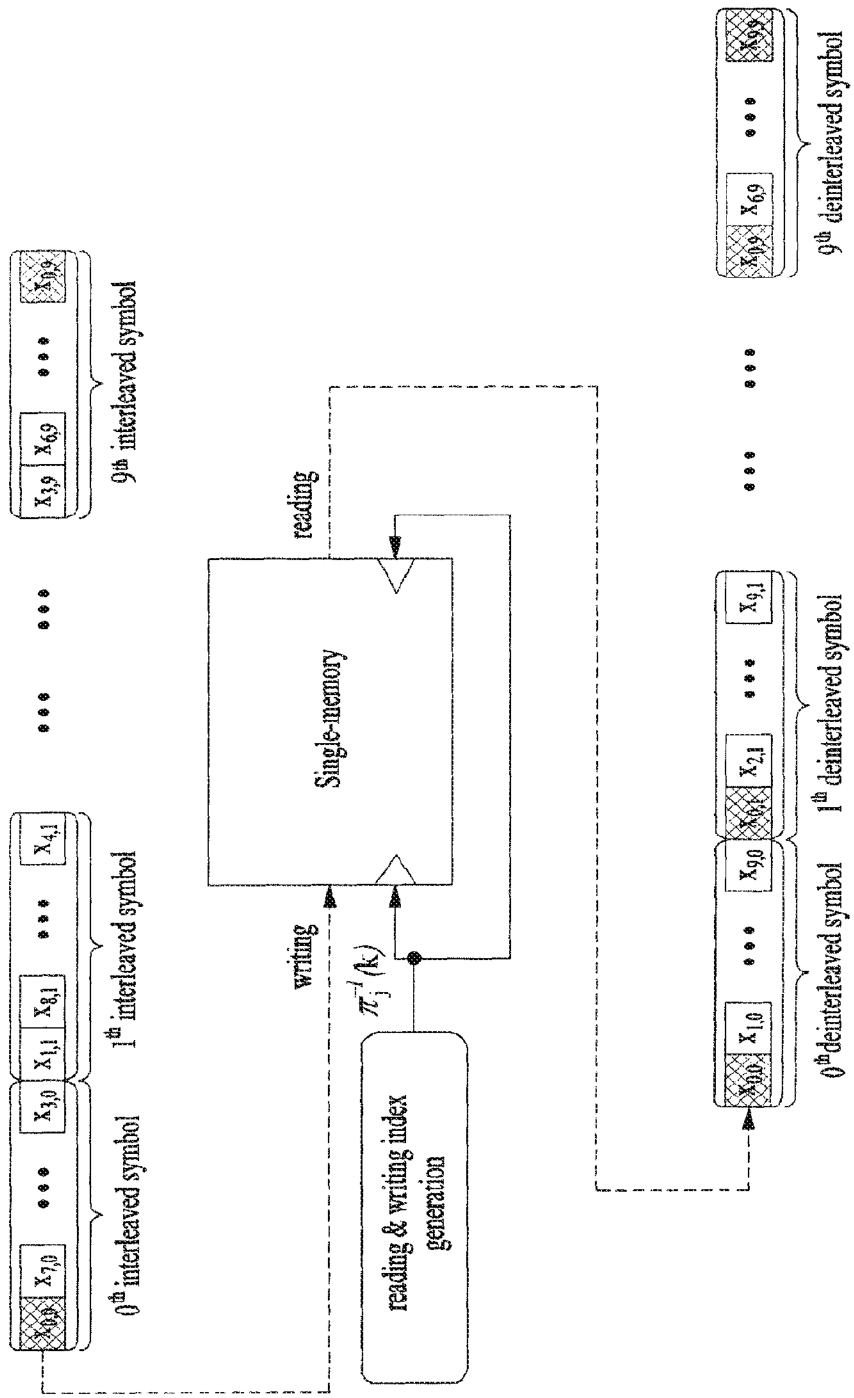
FIG. 26 is a conceptual diagram illustrating a frequency deinterleaving process according to an embodiment of the present invention.

FIG. 26 is a conceptual diagram illustrating a frequency deinterleaving process according to an embodiment of the present invention.

FIG. 26 illustrates a frequency deinterleaving process when a single memory is applied to a broadcast signal receiver and, that is, an embodiment in which the number of cells included in one symbol is 10.

The broadcast signal receiver (or a frame parsing module or a block interleaver) according to an embodiment of the present invention may generate a deinterleaving memory index via a process of sequentially writing symbols interleaved via the aforementioned frequency interleaving in an input order and output deinterleaved symbols via a reading process. In this case, the broadcast signal receiver according to an embodiment of the present invention may perform a process of performing writing on a deinterleaving memory index on which the reading is performed.

Figure 27:
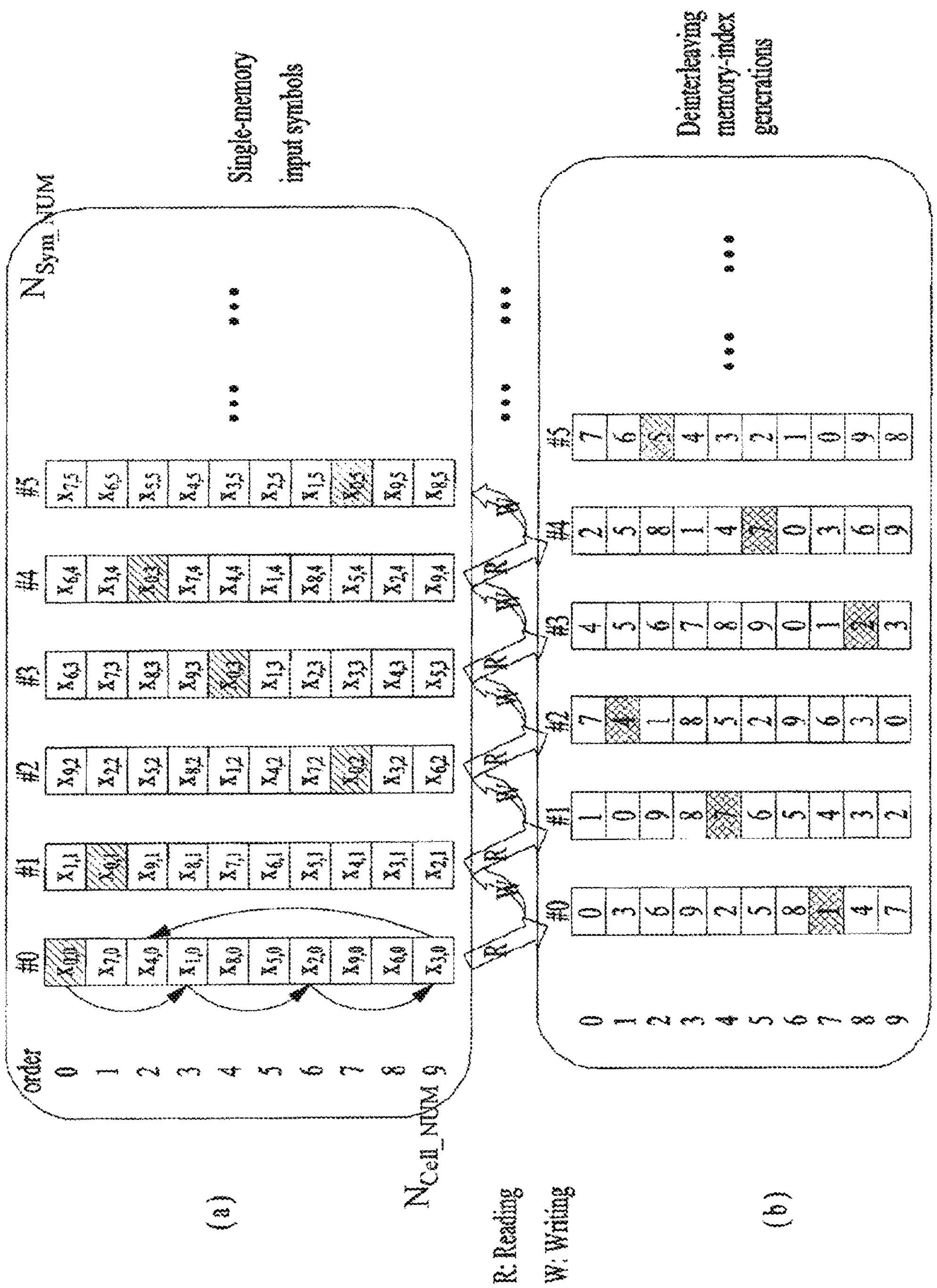
FIG. 27 illustrates a frequency deinterleaving process according to an embodiment of the present invention.

FIG. 27 illustrates a frequency deinterleaving process according to an embodiment of the present invention.

FIG. 27 illustrates a deinterleaving process when the number of all symbols is 10, the number of cells included in one symbol is 10, and p is 3.

FIG. 27(*a*) illustrates symbols input to a single memory according to an embodiment of the present invention. That is, the single-memory input symbols shown in FIG. 27(*a*) refer to values stored in the single-memory according to each input symbol. In this case, the values stored in the single-memory according to each input symbol refer to a result obtained by sequentially writing currently input symbol cells while reading a previous symbol.

FIG. 27(*b*) illustrates a process of generation a deinterleaving memory index.

The deinterleaving memory index is an index used to deinterleave values stored in a single memory, and a number indicated in the deinterleaving memory index refers to an order in which cells included in each symbol are deinterleaved and output.

Hereinafter, the aforementioned frequency deinterleaving process will be described in terms of input symbols #0 and #1 among illustrated symbols.

The broadcast signal receiver according to an embodiment of the present invention sequentially writes input symbol #0 in a single memory. Then the broadcast signal receiver according to an embodiment of the present invention may sequentially generate the aforementioned deinterleaving memory index in an order of 0, 3, 6, 9 . . . in order to deinterleave input symbol #0.

Then the broadcast signal receiver according to an embodiment of the present invention reads input symbol #0 written (or stored) in the single memory according to the generated deinterleaving memory index. The already written values do not have to be stored and thus a newly input symbol #1 may be sequentially re-written.

Then the process of reading input symbol #1 and the process of writing input symbol #1 are completed, the deinterleaving memory index may be generated in order to deinterleave the written input symbol #1. In this case, since the broadcast signal receiver according to an embodiment of the present invention uses a single memory, interleaving cannot be performed using an interleaving pattern applied to each symbol applied in the broadcast signal transmitter. Then deinterleaving processing can be performed on input symbols in the same way.

Figure 28:
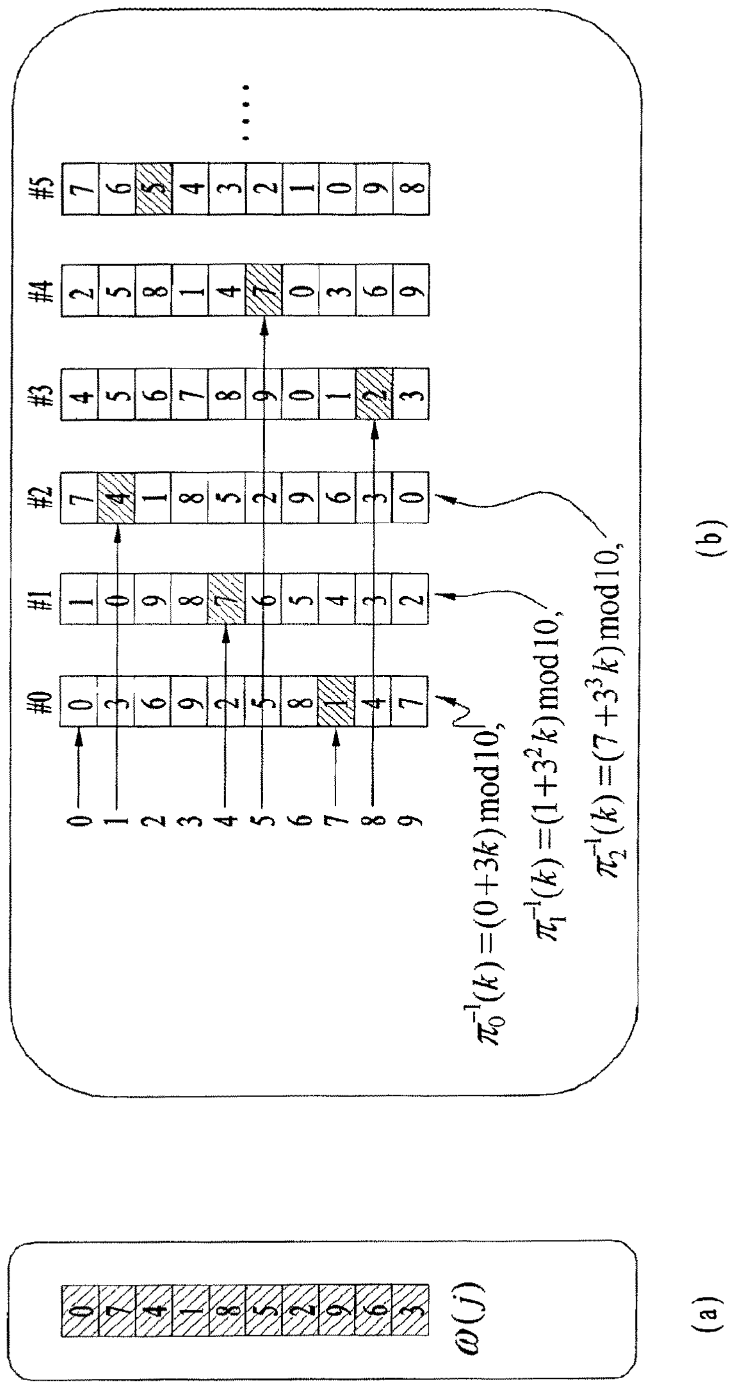
FIG. 28 illustrates a process of generating a deinterleaved memory index according to an embodiment of the present invention.

FIG. 28 illustrates a process of generating a deinterleaved memory index according to an embodiment of the present invention.

In particular, FIG. 28 illustrates a method of generating a new interleaving pattern when interleaving cannot be performed using an interleaving pattern applied to each symbol applied in the broadcast signal transmitter since the broadcast signal receiver according to an embodiment of the present invention users a single memory.

FIG. 28(*a*) illustrates a deinterleaving memory index of a $j^{th}$ input symbol and FIG. 28(*b*) illustrates the aforementioned process of generating a deinterleaving memory index together with Math Figures.

As shown in FIG. 28(*b*), according to an embodiment of the present invention, a variable of RPI of each input symbol is used.

According to an embodiment of the present invention, a process of generating a deinterleaving memory index of input symbol #0 uses p=3 and $I_0=0$ as a variable of RPI like in the broadcast signal transmitter. According to an embodiment of the present invention, in the case of input symbol #1, $p^2=3\times3$ and $I_0=1$ may be used as a variable of RPI, and in the case of input symbol #2, $p^3=3\times3\times3$ and $I_0=7$ may be used as a variable of RPI. In addition, according to an embodiment of the present invention, in the case of input symbol #3, $p^4=3\times3\times3\times3$ and $I_0=4$ may be used as a variable of RPI.

That is, the broadcast signal receiver according to an embodiment of the present invention may change a value p of RPI and an initial offset value for each symbol and may effectively perform deinterleaving in order to deinterleave symbols stored in each single memory. In addition, a value p used in each symbol may be easily induced using exponentiation of p and initial offset values may be sequentially acquired using a mother interleaving seed. Hereinafter, a method of calculating an initial offset value will be described.

According to an embodiment of the present invention, an initial offset value used in input symbol #0 is defined as $I_0=0$. An initial offset value used in input symbol #1 is $I_0=1$ that is the same as a seventh value generated in the deinterleaving memory index generation process of input symbol #0. That is, the broadcast signal receiver according to an embodiment of the present invention may store and use the value in the deinterleaving memory index generation process of input symbol #0.

An initial offset value used in input symbol #2 is $I_0=7$ that is the same as a fourth value generated in the deinterleaving memory index generation process of input symbol #1, and an initial offset value used in input symbol #3 is $I_0=4$ that is the same as a first value generated in the deinterleaving memory index generation process of input symbol #2.

Accordingly, the broadcast signal receiver according to an embodiment of the present invention may store and use a value corresponding to an initial offset value to be used in each symbol in a process of generating a deinterleaving memory index of a previous symbol.

As a result, the aforementioned method may be represented according to Math FIG. 1 below.

$$\pi_j^{-1}(k)=(I_j^{-1}+p^{j+1}K)\bmod N_{Cell\_NUM},\ \text{for } k=0,\ \ldots,\ N_{Cell\_NUM}-1,\ j=0,\ \ldots,\ N_{Sym\_NUM}-1$$

$$\text{where } I_j^{-1}=\pi_{j-1}^{-1}(\omega(j)) \text{ with } I_0^{-1}=0 \quad \text{[Math Figure 1]}$$

$I_j^{-1}$: the initial-offset value at the $j^{th}$ RPI for deinterleaving $\pi_j^{-1}(k)$: deinterleaving output memory-index for the $k^{th}$ input cell-index in the $j^{th}$ OFDM symbol $\pi_j^{-1}(\omega(j))$: the ω(j)th deinterleaving output memory-index in the $j^{th}$ OFDM symbol In this case, a position of a value corresponding to each initial offset value may be easily induced according to Math Figure 1 above.

According to an embodiment of the present invention, the broadcast signal transmitter according to an embodiment of the present invention may recognize two adjacent cells as one cell and perform frequency interleaving. This may be referred to as pair-wise interleaving. In this case, since two adjacent cells are considered as one cell and interleaving is performed, it is advantageous that a number of times of generating a memory index may be reduced in half.

Math Figure 2 below represents the pair-wise RPI.

$$\pi_j(k)=(\omega(j)+pk)\bmod(N_{Cell\_NUM}/2),\ \text{for } k=0,\ \ldots,\ N_{Cell\_NUM}/2-1,\ j=0,\ \ldots,\ N_{Sym\_NUM}-1 \quad \text{[Math Figure 2]}$$

Math Figure 3 below represents a pair-wise deinterleaving method.

$$\pi_j^{-1}(k)=(I_j^{-1}+p^{j+1}K)\bmod(N_{Cell\_NUM}/2),\ \text{for } k=0,\ \ldots,\ N_{Cell\_NUM}/2-1,\ j=0,\ \ldots,\ N_{Sym\_NUM}-1$$

$$\text{where } I_j^{-1}=\pi_{j-1}^{-1}(\omega(j)) \text{ with } I_0^{-1}=0 \quad \text{[Math Figure 3]}$$

Figure 29:
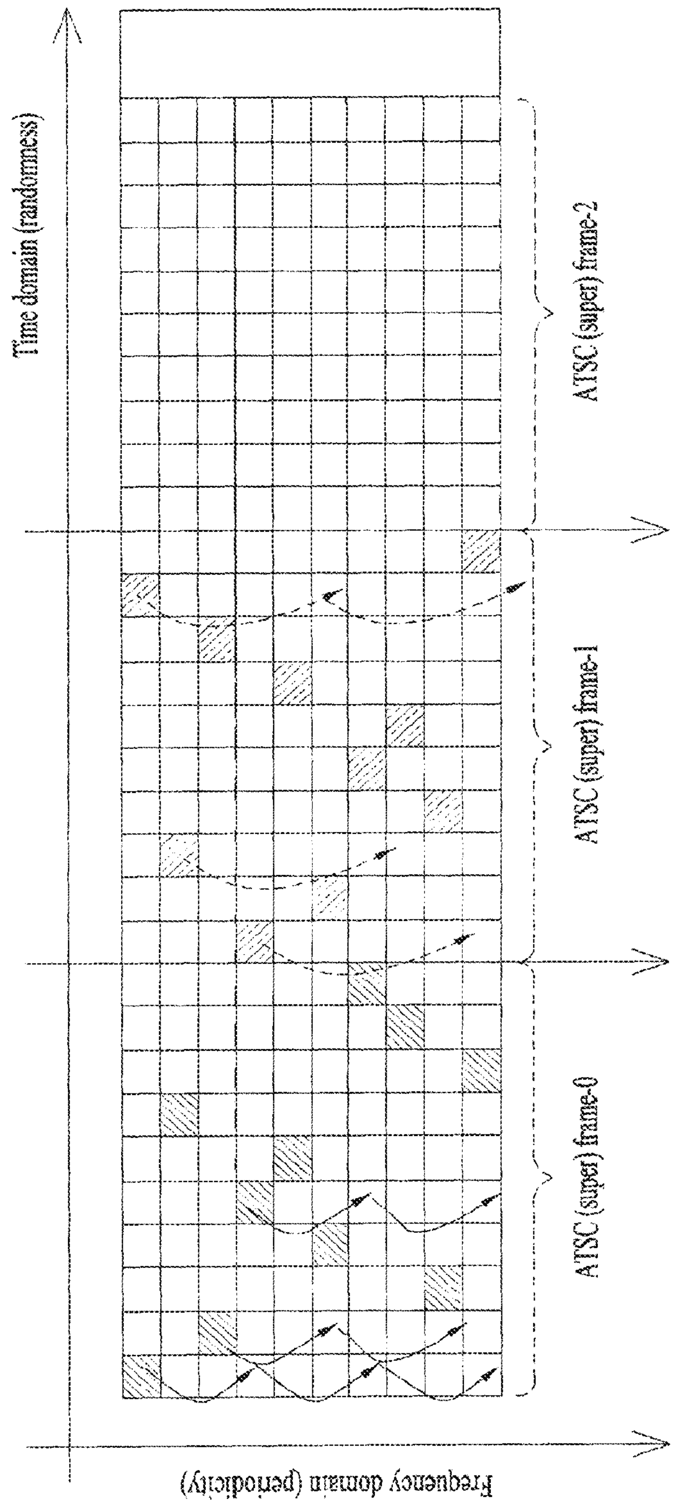
FIG. 29 illustrates a frequency interleaving process according to an embodiment of the present invention.

FIG. 29 illustrates a frequency interleaving process according to an embodiment of the present invention.

FIG. 29 illustrates an interleaving method for improving frequency diversity performance using different relative primes including a plurality of OFDM symbols by the aforementioned frequency interleaver.

That is, as shown in FIG. 29, a relative prime value is changed every frame/super frame so as to further improve a frequency diversity performance, especially avoiding a repeated interleaving pattern.

The apparatus for receiving broadcast signals according to an embodiment of the present invention can output process the decoded DP data. More specifically, the apparatus for receiving broadcast signals according to an embodiment of the present invention can decompress a header in the each of the data packets in the decoded DP data according to a header compression mode and recombine the data packets. Details are as described in FIG. 16 to 32.

Figure 30:
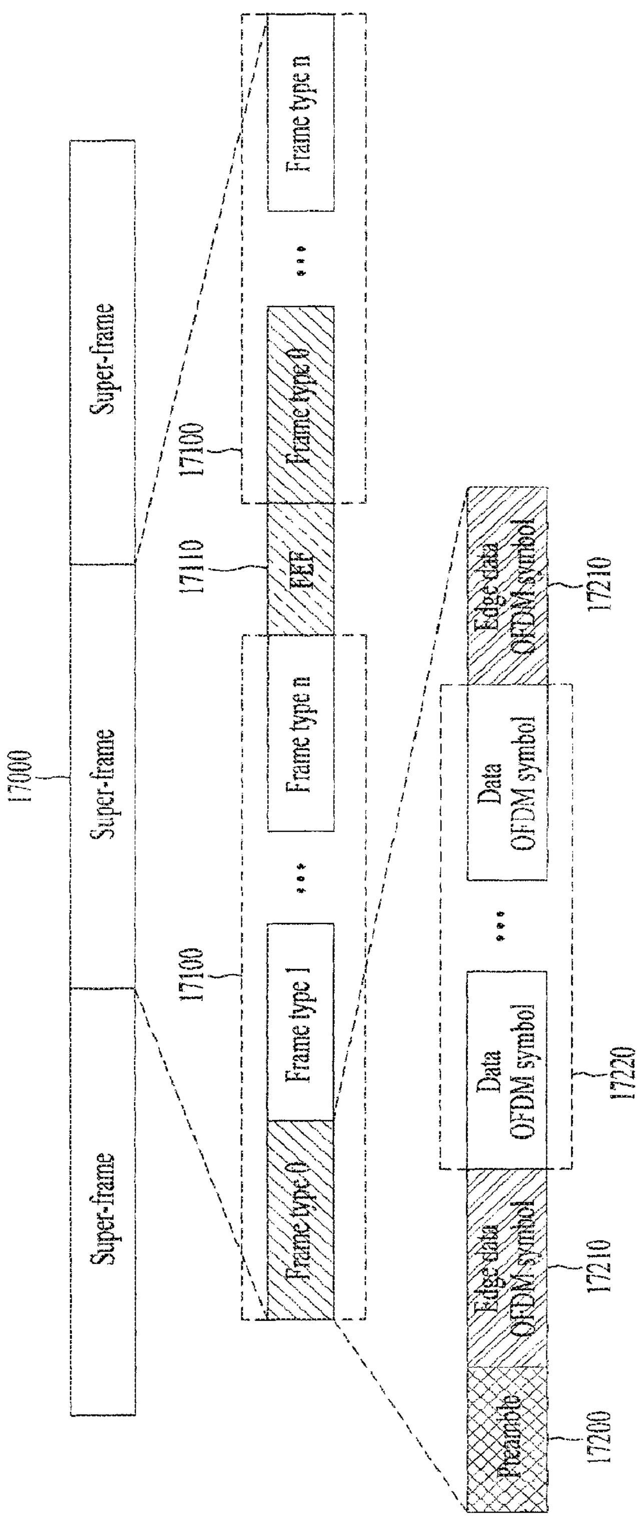
FIG. 30 illustrates a super-frame structure according to an embodiment of the present invention.

FIG. 30 illustrates a super-frame structure according to an embodiment of the present invention.

The apparatus for transmitting broadcast signals according to an embodiment of the present invention can sequentially transmit a plurality of super-frames carrying data corresponding to a plurality of broadcast services.

As shown in FIG. 30, frames 17100 of different types and a future extension frame (FEF) 17110 can be multiplexed in the time domain and transmitted in a super-frame 17000. The apparatus for transmitting broadcast signals according to an embodiment of the present invention can multiplex signals of different broadcast services on a frame-by-frame basis and transmit the multiplexed signals in the same RF channel, as described above. The different broadcast services may require different reception conditions or different coverages according to characteristics and purposes thereof. Accordingly, signal frames can be classified into types for transmitting data of different broadcast services and data included in the signal frames can be processed by different transmission parameters. In addition, the signal frames can have different FFT sizes and guard intervals according to broadcast services transmitted through the signal frames. The FEF 17110 shown in FIG. 30 is a frame available for future new broadcast service systems.

The signal frames 17100 of different types according to an embodiment of the present invention can be allocated to a super-frame according to design. Specifically, the signal frames 17100 of different types can be repeatedly allocated to the super-frame in a multiplexed pattern. Otherwise, a plurality of signal frames of the same type can be sequentially allocated to a super-frame and then signal frames of a different type can be sequentially allocated to the super-frame. The signal frame allocation scheme can be changed by the designer.

Each signal frame can include a preamble 17200, an edge data OFDM symbol 17210 and a plurality of data OFDM symbols 17220, as shown in FIG. 30.

The preamble 17200 can carry signaling information related to the corresponding signal frame, for example, a transmission parameter. That is, the preamble carries basic PLS data and is located in the beginning of a signal frame. In addition, the preamble 17200 can carry the PLS data described with reference to FIG. 1. That is, the preamble can carry only basic PLS data or both basic PLS data and the PLS data described with reference to FIG. 1. The information carried through the preamble can be changed by the designer. The signaling information carried through the preamble can be referred to as preamble signaling information.

The edge data OFDM symbol 17210 is an OFDM symbol located at the beginning or end of the corresponding frame and can be used to transmit pilots in all pilot carriers of data symbols. The edge data OFDM symbol may be in the form of a known data sequence or a pilot. The position of the edge data OFDM symbol 17210 can be changed by the designer.

The plurality of data OFDM symbols 17220 can carry data of broadcast services.

Since the preamble 17200 illustrated in FIG. 30 includes information indicating the start of each signal frame, the apparatus for receiving broadcast signals according to an embodiment of the present invention can detect the preamble 17200 to perform synchronization of the corresponding signal frame. Furthermore, the preamble 17200 can include information for frequency synchronization and basic transmission parameters for decoding the corresponding signal frame.

Accordingly, even if the apparatus for receiving broadcast signals according to an embodiment of the present invention receives signal frames of different types multiplexed in a super-frame, the apparatus for receiving broadcast signals can discriminate signal frames by decoding preambles of the signal frames and acquire a desired broadcast service.

That is, the apparatus for receiving broadcast signals according to an embodiment of the present invention can detect the preamble 17200 in the time domain to check whether or not the corresponding signal is present in the broadcast signal transmission and reception system according to an embodiment of the present invention. Then, the apparatus for receiving broadcast signals according to an embodiment of the present invention can acquire information for signal frame synchronization from the preamble 17200 and compensate for a frequency offset. Furthermore, the apparatus for receiving broadcast signals according to an embodiment of the present invention can decode signaling information carried by the preamble 17200 to acquire basic transmission parameters for decoding the corresponding signal frame. Then, the apparatus for receiving broadcast signals according to an embodiment of the present invention can obtain desired broadcast service data by decoding signaling information for acquiring broadcast service data transmitted through the corresponding signal frame.

Figure 31:
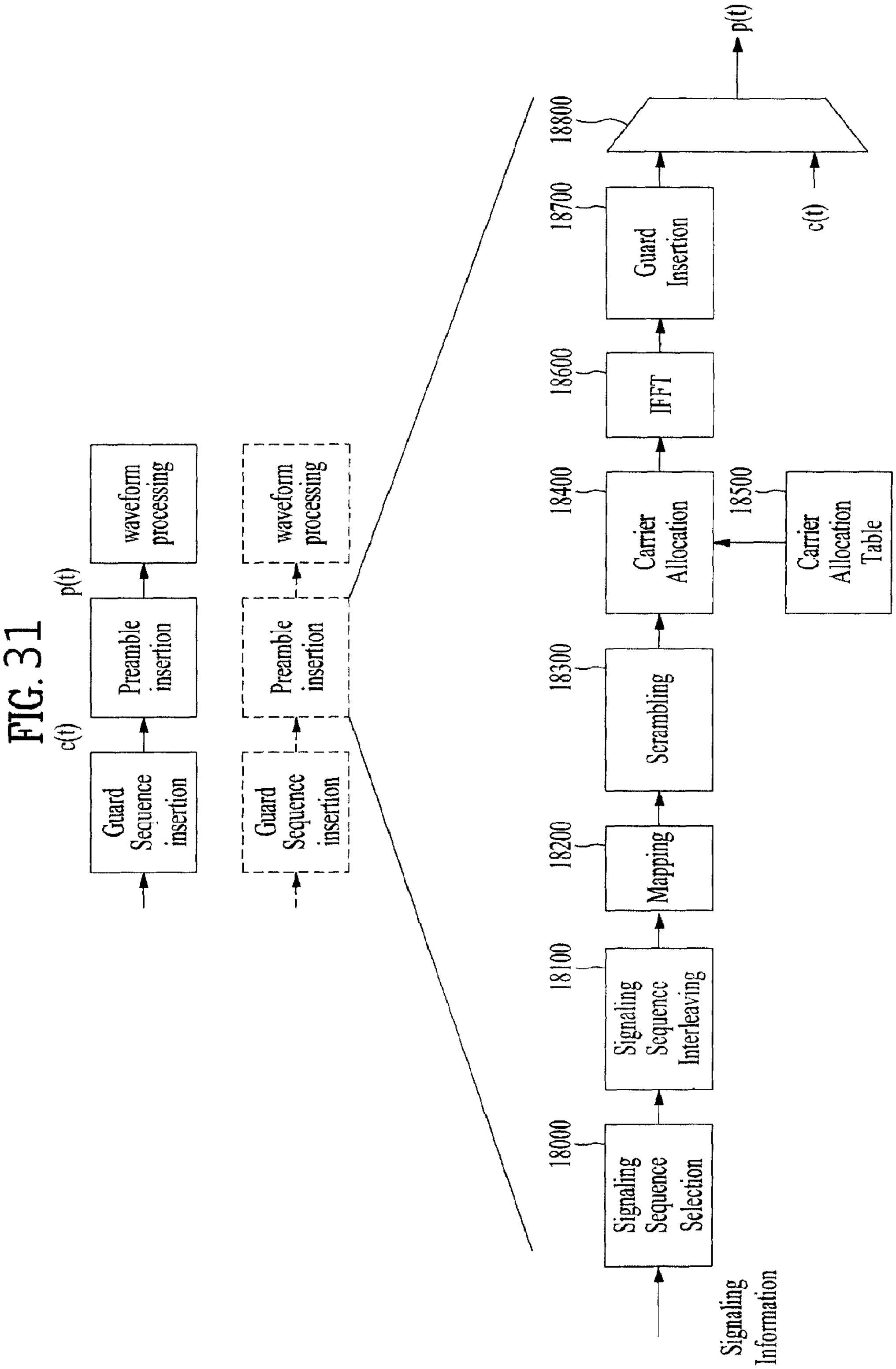
FIG. 31 illustrates a preamble insertion block according to an embodiment of the present invention.

FIG. 31 illustrates a preamble insertion block according to an embodiment of the present invention.

The preamble insertion block illustrated in FIG. 31 corresponds to an embodiment of the preamble insertion block 7500 described with reference to FIG. 7 and can generate the preamble described in FIG. 30.

As shown in FIG. 31, the preamble insertion block according to an embodiment of the present invention can include a signaling sequence selection block 18000, a signaling sequence interleaving block 18100, a mapping block 18200, a scrambling block 18300, a carrier allocation block 18400, a carrier allocation table block 18500, an IFFT block 18600, a guard insertion block 18700 and a multiplexing block 18800. Each block may be modified or may not be included in the preamble insertion block by the designer. A description will be given of each block of the preamble insertion block.

The signaling sequence selection block 18000 can receive the signaling information to be transmitted through the preamble and select a signaling sequence suitable for the signaling information.

The signaling sequence interleaving block 18100 can interleave signaling sequences for transmitting the input signaling information according to the signaling sequence selected by the signaling sequence selection block 18000. Details will be described later.

The mapping block 18200 can map the interleaved signaling information using a modulation scheme.

The scrambling block 18300 can multiply mapped data by a scrambling sequence.

The carrier allocation block 18400 can allocate the data output from the scrambling block 18300 to predetermined carrier positions using active carrier position information output from the carrier allocation table block 18500.

The IFFT block 18600 can transform the data allocated to carriers, output from the carrier allocation block 18400, into an OFDM signal in the time domain.

The guard insertion block 18700 can insert a guard interval into the OFDM signal.

The multiplexing block 18800 can multiplex the signal output from the guard insertion block 18700 and a signal c(t) output from the guard sequence insertion block 7400 illustrated in FIG. 7 and output an output signal p(t). The output signal p(t) can be input to the waveform processing block 7600 illustrated in FIG. 7.

Figure 32:
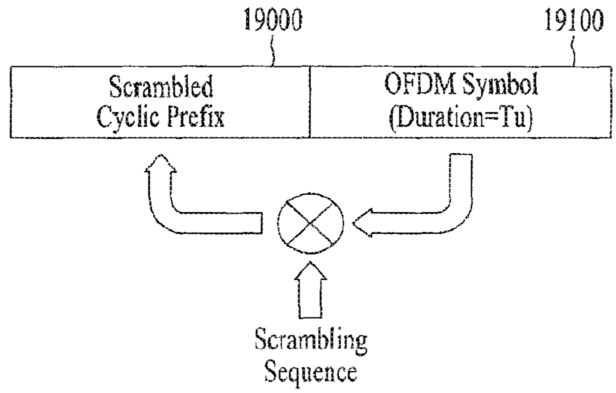
FIG. 32 illustrates a preamble structure according to an embodiment of the present invention.

FIG. 32 illustrates a preamble structure according to an embodiment of the present invention.

The preamble shown in FIG. 32 can be generated by the preamble insertion block illustrated in FIG. 31.

The preamble according to an embodiment of the present invention has a structure of a preamble signal in the time domain and can include a scrambled cyclic prefix part 19000 and an OFDM symbol 19100. In addition, the preamble according to an embodiment of the present invention may include an OFDM symbol and a scrambled cyclic postfix part. In this case, the scrambled cyclic postfix part may follow the OFDM symbol, differently from the scrambled prefix, and may be generated through the same process as the process for generating the scrambled cyclic prefix, which will be described later. The position and generation process of the scrambled cyclic postfix part may be changed according to design.

The scrambled cyclic prefix part 19000 shown in FIG. 32 can be generated by scrambling part of the OFDM symbol or the whole OFDM symbol and can be used as a guard interval.

Accordingly, the apparatus for receiving broadcast signals according to an embodiment of the present invention can detect a preamble through guard interval correlation using a guard interval in the form of a cyclic prefix even when a frequency offset is present in a received broadcast signal since frequency synchronization cannot be performed.

In addition, the guard interval in the scrambled cyclic prefix form according to an embodiment of the present invention can be generated by multiplying (or combining) the OFDM symbol by a scrambling sequence (or sequence). Or the guard interval in the scrambled cyclic prefix form according to an embodiment of the present invention can be generated by scrambling the OFDM symbol with a scrambling sequence (or sequence), The scrambling sequence according to an embodiment of the present invention can be a signal of any type which can be changed by the designer.

The method of generating the guard interval in the scrambled cyclic prefix form according to an embodiment of the present invention has the following advantages.

Firstly, a preamble can be easily detected by discriminating the guard interval from a normal OFDM symbol. As described above, the guard interval in the scrambled cyclic prefix form is generated by being scrambled by the scrambling sequence, distinguished from the normal OFDM symbol. In this case, if the apparatus for receiving broadcast signals according to an embodiment of the present invention performs guard interval correlation, the preamble can be easily detected since only a correlation peak according to the preamble is generated without a correlation peak according to the normal OFDM symbol.

Secondly, when the guard interval in the scrambled cyclic prefix form according to an embodiment of the present invention is used, a dangerous delay problem can be solved. For example, if the apparatus for receiving broadcast signals performs guard interval correlation when multi-path interference delayed by the duration Tu of the OFDM symbol is present, preamble detection performance may be deteriorated since a correlation value according to multiple paths is present at all times. However, when the apparatus for receiving broadcast signals according to an embodiment of the present invention performs guard interval correlation, the apparatus for receiving broadcast signals can detect the preamble without being affected by the correlation value according to multiple paths since only a peak according to the scrambled cyclic prefix is generated, as described above.

Finally, the influence of continuous wave (CW) interference can be prevented. If a received signal includes CW interference, the signal detection performance and synchronization performance of the apparatus for receiving broadcast signals can be deteriorated since a DC component caused by CW is present at all times when the apparatus for receiving broadcast signals performs guard interval correlation. However, when the guard interval in the scrambled cyclic prefix form according to an embodiment of the present invention is used, the influence of CW can be prevented since the DC component caused by CW is averaged out by the scrambling sequence.

Figure 33:
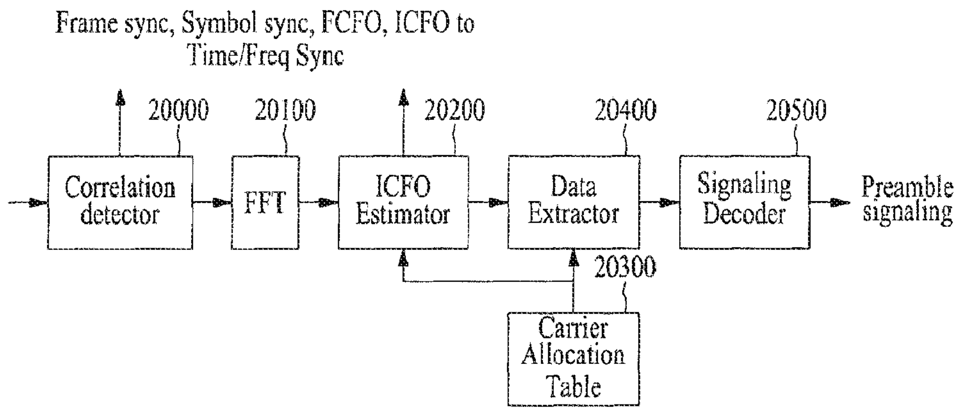
FIG. 33 illustrates a preamble detector according to an embodiment of the present invention.

FIG. 33 illustrates a preamble detector according to an embodiment of the present invention.

The preamble detector shown in FIG. 33 corresponds to an embodiment of the preamble detector 9300 included in the synchronization & demodulation module illustrated in FIG. 9 and can detect the preamble illustrated in FIG. 30.

As shown in FIG. 33, the preamble detector according to an embodiment of the present invention can include a correlation detector 20000, an FFT block 20100, an ICFO (integer carrier frequency offset) estimator 20200, a carrier allocation table block 20300, a data extractor 20300 and a signaling decoder 20500. Each block may be modified or may not be included in the preamble detector according to design. A description will be given of operation of each block of the preamble detector.

The correlation detector 20000 can detect the above-described preamble and estimate frame synchronization, OFDM symbol synchronization, timing information and FCFO (fractional frequency offset). Details will be described later.

The FFT block 20100 can transform the OFDM symbol part included in the preamble into a frequency domain signal using the timing information output from the correlation detector 20000.

The ICFO estimator 20200 can receive position information on active carriers, output from the carrier allocation table block 20300, and estimate ICFO information.

The data extractor 20300 can receive the ICFO information output from the ICFO estimator 20200 to extract signaling information allocated to the active carriers and the signaling decoder 20500 can decode the extracted signaling information.

Accordingly, the apparatus for receiving broadcast signals according to an embodiment of the present invention can obtain the signaling information carried by the preamble through the above-described procedure.

Figure 34:
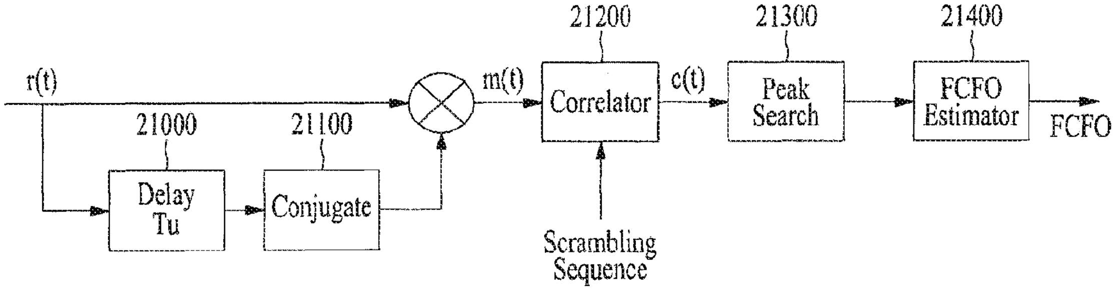
FIG. 34 illustrates a correlation detector according to an embodiment of the present invention.

FIG. 34 illustrates a correlation detector according to an embodiment of the present invention.

The correlation detector shown in FIG. 34 corresponds to an embodiment of the correlation detector illustrated in FIG. 33.

The correlation detector according to an embodiment of the present invention can include a delay block 21000, a conjugate block 21100, a multiplier, a correlator block 21200, a peak search block 21300 and an FCFO estimator block 21400. A description will be given of operation of each block of the correlation detector.

The delay block 21000 of the correlation detector can delay an input signal r(t) by the duration Tu of the OFDM symbol in the preamble.

The conjugate block 21100 can perform conjugation on the delayed signal r(t).

The multiplier can multiply the signal r(t) by the conjugated signal r(t) to generate a signal m(t).

The correlator block 21200 can correlate the signal m(t) input thereto and the scrambling sequence to generate a descrambled signal c(t).

The peak search block 21300 can detect a peak of the signal c(t) output from the correlator block 21200. In this case, since the scrambled cyclic prefix included in the preamble is descrambled by the scrambling sequence, a peak of the scrambled cyclic prefix can be generated. However, OFDM symbols or components caused by multiple paths other than the scrambled cyclic prefix are scrambled by the scrambling sequence, and thus a peak of the OFDM symbols or components caused by multiple paths is not generated. Accordingly, the peak search block 21300 can easily detect the peak of the signal c(t).

The FCFO estimator block 21400 can acquire frame synchronization and OFDM symbol synchronization of the signal input thereto and estimate FCFO information from a correlation value corresponding to the peak.

As described above, the scrambling sequence according to an embodiment of the present invention can be a signal of any type and can be changed by the designer.

FIGS. 21 to 25 illustrate results obtained when a chirp-like sequence, a balanced m-sequence, a Zadoff-Chu sequence and a binary chirp-like sequence are used as the scrambling sequence according to an embodiment of the present invention.

Each figure will now be described.

FIG. 35 shows graphs representing results obtained when the scrambling sequence according to an embodiment of the present invention is used.

The graph of FIG. 35 shows results obtained when the scrambling sequence according to an embodiment of the present invention is a chirp-like sequence. The chirp-like sequence can be calculated according to Math Figure 4.

$$e^{j2\pi k/80} \text{ for } k=0\sim79,$$

$$e^{j2\pi k/144} \text{ for } k=80\sim223,$$

$$e^{j2\pi k/272} \text{ for } k=224\sim495,$$

$$e^{j2\pi k/528} \text{ for } k=496\sim1023$$ [Math Figure 4]

As represented by Math Figure 4, the chirp-like sequence can be generated by connecting sinusoids of 4 different frequencies corresponding to one period.

As shown in FIG. 35, (*a*) is a graph showing waveforms of the chirp-like sequence according to an embodiment of the present invention.

The first waveform 22000 shown in (*a*) represents a real number part of the chirp-like sequence and the second waveform 22100 represents an imaginary number part of the chirp-like sequence. The duration of the chirp-like sequence corresponds to 1024 samples and the averages of a real number part sequence and an imaginary number part sequence are 0.

As shown in FIG. 35, (*b*) is a graph showing the waveform of the signal c(t) output from the correlator block illustrated in FIGS. 20 and 21 when the chirp-like sequence is used.

Since the chirp-like sequence is composed of signals having different periods, dangerous delay is not generated. Furthermore, the correlation property of the chirp-like sequence is similar to guard interval correlation and thus distinctly discriminated from the preamble of conventional broadcast signal transmission/reception systems. Accordingly, the apparatus for receiving broadcast signals according to an embodiment of the present invention can easily detect the preamble. In addition, the chirp-like sequence can provide correct symbol timing information and is robust to noise on a multi-path channel, compared to a sequence having a delta-like correlation property, such as an m-sequence. Furthermore, when scrambling is performed using the chirp-like sequence, it is possible to generate a signal having a bandwidth slightly increased compared to the original signal.

FIG. 36 shows graphs representing results obtained when a scrambling sequence according to another embodiment of the present invention is used.

The graphs of FIG. 36 are obtained when the balanced m-sequence is used as a scrambling sequence. The balanced m-sequence according to an embodiment of the present invention can be calculated by Math Figure 5.

$$g(x)=x^{10}+x^{8}+x^{4}+x^{3}+1$$ [Math Figure 5]

The balanced m-sequence can be generated by adding a sample having a value of '+1' to an m-sequence having a length corresponding to 1023 samples according to an embodiment of the present invention. The length of balanced m-sequence is 1024 samples and the average thereof is '0' according to one embodiment. The length and average of the balanced m-sequence can be changed by the designer.

As shown in FIG. 36, (*a*) is a graph showing the waveform of the balanced m-sequence according to an embodiment of the present invention and (*b*) is a graph showing the waveform of the signal c(t) output from the correlator block illustrated in FIGS. 20 and 21 when the balanced m-sequence is used.

When the balanced m-sequence according to an embodiment of the present invention is used, the apparatus for receiving broadcast signals according to an embodiment of the present invention can easily perform symbol synchronization on a received signal since preamble correlation property corresponds to a delta function.

Figure 37:
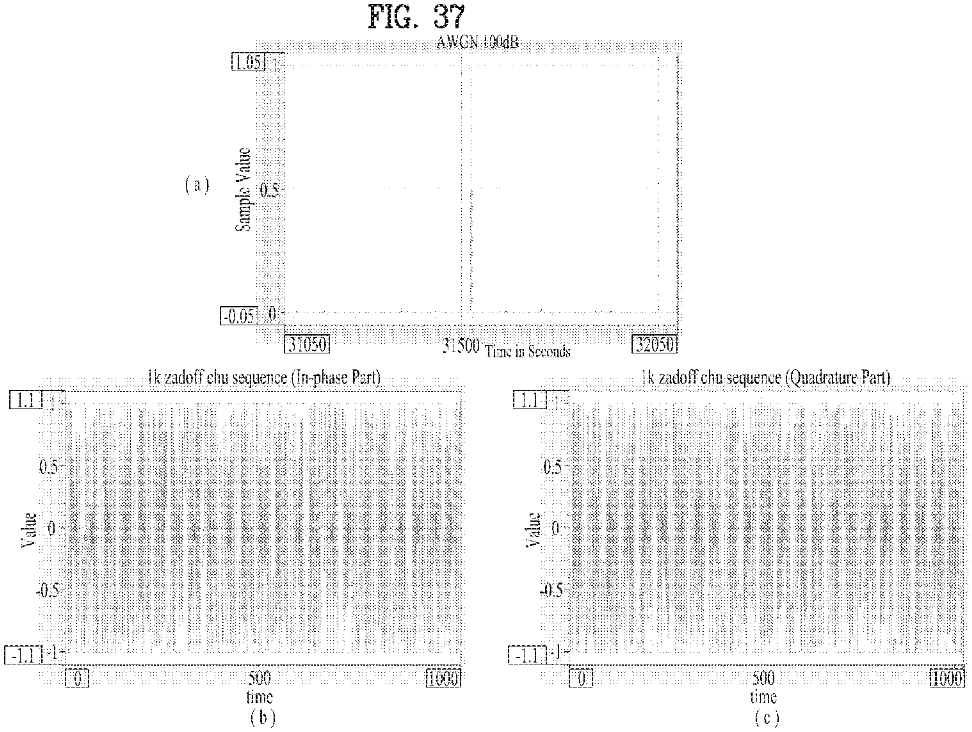
FIG. 37 shows graphs representing results obtained when a scrambling sequence according to another embodiment of the present invention is used.

FIG. 37 shows graphs representing results obtained when a scrambling sequence according to another embodiment of the present invention is used.

The graphs of FIG. 37 show results obtained when the Zadoff-Chu sequence is used as a scrambling sequence. The Zadoff-Chu sequence according to an embodiment of the present invention can be calculated by Math Figure 6.

$$e^{-j\pi uk(k+1)/1023} \text{ for } k=0\sim1022,\ u=23$$ [Math Figure 6]

The Zadoff-Chu sequence may have a length corresponding to 1023 samples and u value of 23 according to one embodiment. The length and u value of the Zadoff-Chu sequence can be changed by the designer.

As shown in FIG. 37, (*a*) is a graph showing the waveform of the signal c(t) output from the correlator block illustrated in FIGS. 20 and 21 when the Zadoff-Chu sequence according to an embodiment of the present invention is used.

As shown in FIG. 37, (*b*) is a graph showing the in-phase waveform of the Zadoff-Chu sequence according to an embodiment of the present invention and (*c*) is a graph showing the quadrature phase waveform of the Zadoff-Chu sequence according to an embodiment of the present invention.

When the Zadoff-Chu sequence according to an embodiment of the present invention is used, the apparatus for receiving broadcast signals according to an embodiment of the present invention can easily perform symbol synchronization on a received signal since preamble correlation property corresponds to a delta function. In addition, the envelope of the received signal is uniform in both the frequency domain and time domain.

Figure 38:
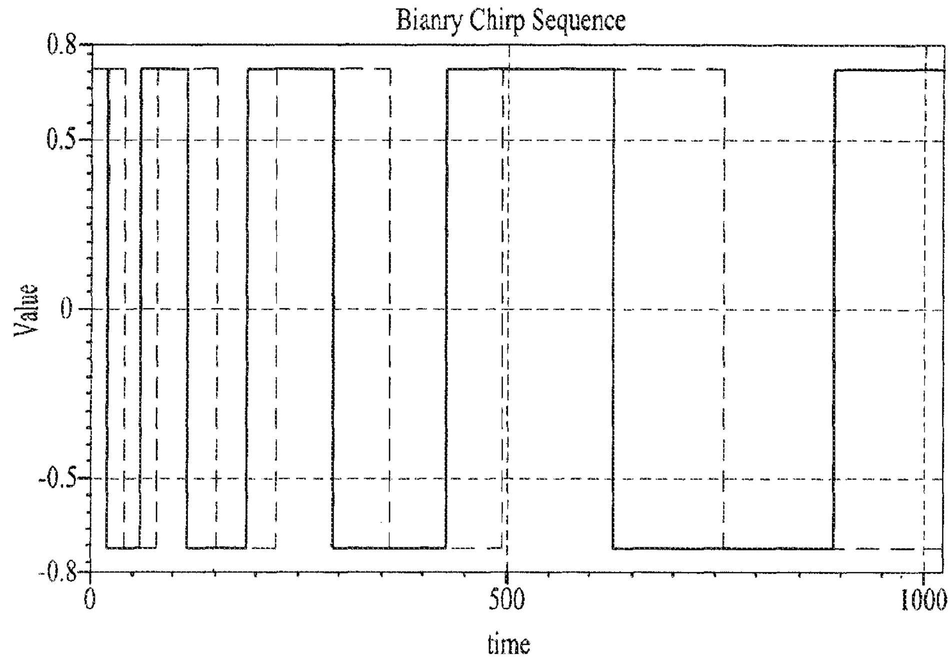
FIG. 38 is a graph showing a result obtained when a scrambling sequence according to another embodiment of the present invention is used.

FIG. 38 is a graph showing a result obtained when a scrambling sequence according to another embodiment of the present invention is used. The graph of FIG. 38 shows waveforms of a binary chirp-like sequence. The binary chirp-like sequence is an embodiment of the signal that can be used as the scrambling sequence according to the present invention.

$$x[k]=\{i[k],q[k]\}$$ [Math Figure7]

$$\begin{aligned} i[k] &= 1 \text{ for } k=0\sim19 \\ &= -1 \text{ for } k=20\sim59 \\ &= 1 \text{ for } k=60\sim115 \\ &= -1 \text{ for } k=116\sim187 \\ &= 1 \text{ for } k=188\sim291 \\ &= -1 \text{ for } k=292\sim427 \\ &= 1 \text{ for } k=428\sim627 \\ &= -1 \text{ for } k=628\sim891 \\ &= 1 \text{ for } k=892\sim1023 \end{aligned}$$

-continued $$
\begin{aligned}
q[k] &= 1 \text{ for } k = 0\sim39 \\
&= -1 \text{ for } k = 40\sim79 \\
&= 1 \text{ for } k = 80\sim151 \\
&= -1 \text{ for } k = 152\sim223 \\
&= 1 \text{ for } k = 224\sim359 \\
&= -1 \text{ for } k = 360\sim495 \\
&= 1 \text{ for } k = 496\sim759 \\
&= -1 \text{ for } k = 760\sim1023
\end{aligned}
$$

The binary chirp-like sequence can be represented by Math Figure 7. The signal represented by Math Figure 7 is an embodiment of the binary chirp-like sequence.

The binary chirp-like sequence is a sequence that is quantized such that the real-number part and imaginary part of each signal value constituting the above-described chirp-like sequence have only two values of '1' and '−1'. The binary chirp-like sequence according to another embodiment of the present invention can have the real-number part and imaginary part having only two signal values of '−0.707 (−1 divided by square root of 2)' and '0.707' (1 divided by square root of 2). The quantized value of the real-number part and imaginary part of the binary chirp-like sequence can be changed by the designer. In Math Figure 7, i[k] represents the real-number part of each signal constituting the sequence and q[k] represents the imaginary part of each signal constituting the sequence.

The binary chirp-like sequence has the following advantages. Firstly, the binary chirp-like sequence does not generate dangerous delay since it is composed of signals having different periods. Secondly, the binary chirp-like sequence has correlation characteristic similar to guard interval correlation and thus provides correct symbol timing information compared to conventional broadcast systems and has higher noise resistance on a multi-path channel than a sequence having delta-like correlation characteristic such as m-sequence. Thirdly, when scrambling is performed using the binary chirp-like sequence, bandwidth is less increased compared to the original signal. Fourthly, since the binary chirp-like sequence is a binary level sequence, a receiver with reduced complexity can be designed when the binary chirp-like sequence is used.

In the graph showing the waveforms of the binary chirp-like sequence, a solid line represents a waveform corresponding to real-number parts and a dotted line represents a waveform corresponding to imaginary parts. Both the waveforms of the real-number parts and imaginary parts of the binary chirp-like sequence correspond to a square wave, differently from the chirp-like sequence.

Figure 39:
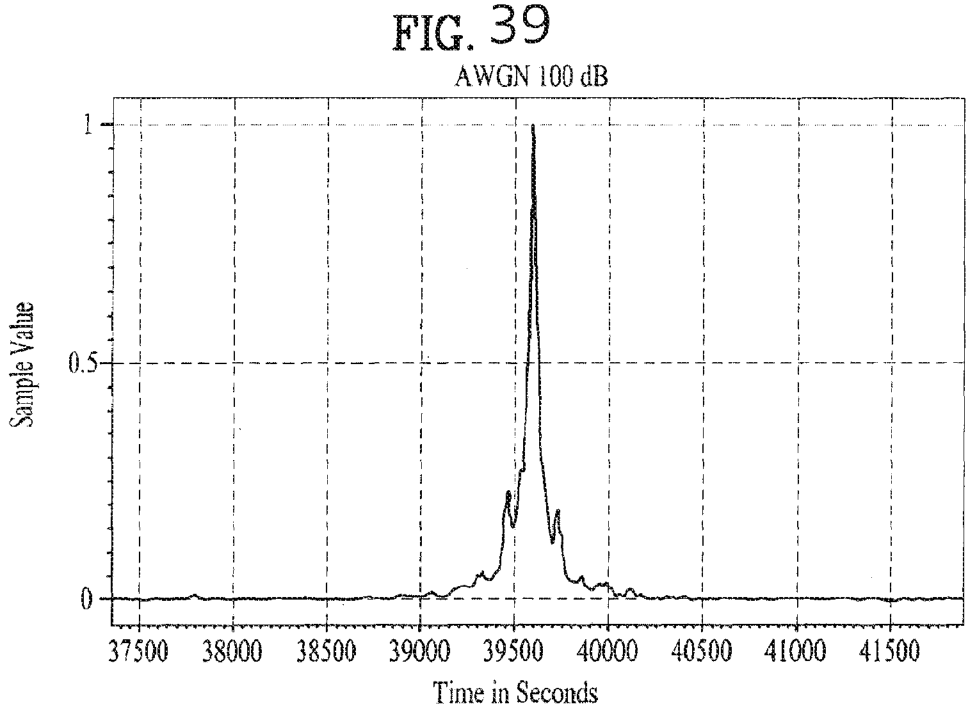
FIG. 39 is a graph showing a result obtained when a scrambling sequence according to another embodiment of the present invention is used.

FIG. 39 is a graph showing a result obtained when a scrambling sequence according to another embodiment of the present invention is used. The graph shows the waveform of signal c(t) output from the above-described correlator block when the binary chirp-like sequence is used. In the graph, the peak may be a correlation peak according to cyclic prefix.

As described above with reference to FIG. 31, the signaling sequence interleaving block 18100 included in the preamble insertion block according to an embodiment of the present invention can interleave the signaling sequences for transmitting the input signaling information according to the signaling sequence selected by the signaling sequence selection block 18000.

A description will be given of a method through which the signaling sequence interleaving block 18100 according to an embodiment of the present invention interleaves the signaling information in the frequency domain of the preamble.

Figure 40:
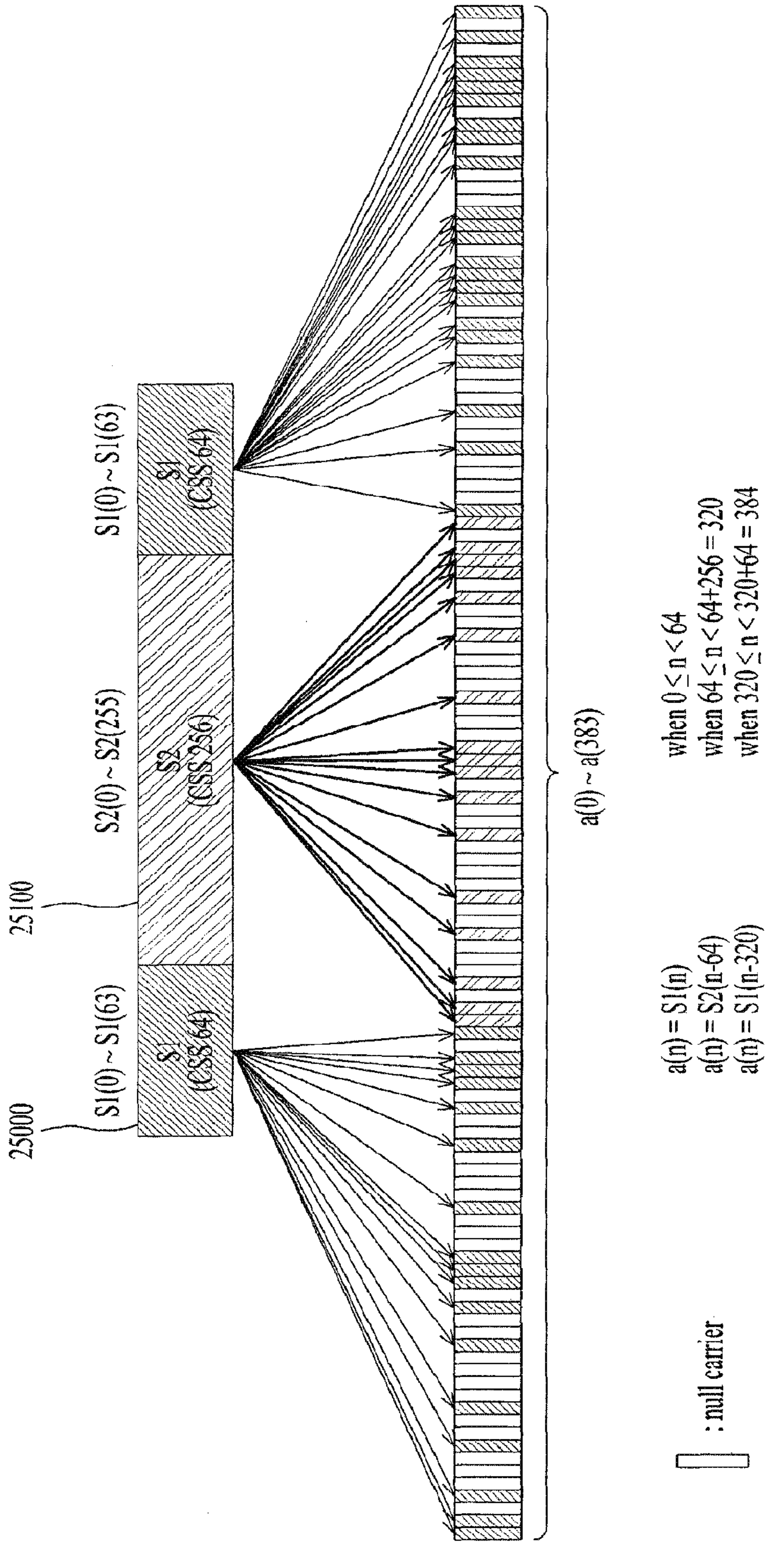
FIG. 40 illustrates a signaling information interleaving procedure according to an embodiment of the present invention.

FIG. 40 illustrates a signaling information interleaving procedure according to an embodiment of the present invention.

The preamble according to an embodiment of the present invention, described above with reference to FIG. 17, can have a size of 1K symbol and only 384 active carriers from among carriers constituting the 1K symbol can be used. The size of the preamble or the number of active carriers used can be changed by the designer. The signalling data carried in the preamble is composed of 2 signalling fields, namely S1 and S2.

As shown in FIG. 40, the signaling information carried by the preamble according to an embodiment of the present invention can be transmitted through bit sequences of S1 and bit sequences of S2.

The bit sequences of S1 and the bit sequences of S2 according to an embodiment of the present invention represent signaling sequences that can be allocated to active carriers to respectively carry signaling information (or signaling fields) included in the preamble.

Specifically, S1 can carry 3-bit signaling information and can be configured in a structure in which a 64-bit sequence is repeated twice. In addition, S1 can be located before and after S2. S2 is a single 256-bit sequence and can carry 4-bit signaling information. The bit sequences of S1 and S2 are represented as sequential numbers starting from 0 according to an embodiment of the present invention. Accordingly, the first bit sequence of S1 can be represented as S1(0) and the first bit sequence of S2 can be represented as S2(0), as shown in FIG. 40. This can be changed by the designer.

S1 can carry information for identifying the signal frames included in the super-frame described in FIG. 30, for example, a signal frame processed according to SISO, a signal frame processed according to MISO or information indicating FE. S2 can carry information about the FFT size of the current signal frame, information indicating whether or not frames multiplexed in a super-frame are of the same type or the like. Information that can be carried by S1 and S2 can be changed according to design.

As shown in FIG. 40, the signaling sequence interleaving block 18100 according to an embodiment of the present invention can sequentially allocate S1 and S2 to active carriers corresponding to predetermined positions in the frequency domain.

In one embodiment of the present invention, 384 carriers are present and are represented as sequential numbers starting from 0. Accordingly, the first carrier according to an embodiment of the present invention can be represented as a(0), as shown in FIG. 40. In FIG. 40, uncolored active carriers are null carriers to which S1 or S2 is not allocated from among the 384 carriers.

As illustrated in FIG. 40, bit sequences of S1 can be allocated to active carriers other than null carriers from among active carriers a(0) to a(63), bit sequences of S2 can be allocated to active carriers other than null carriers from among active carriers a(64) to a(319) and bit sequences of S1 can be allocated to active carriers other than null carriers from among active carriers a(320) to a(383).

According to the interleaving method illustrated in FIG. 40, the apparatus for receiving broadcast signals may not decode specific signaling information affected by fading when frequency selective fading occurs due to multi-path interference and a fading period is concentrated on a region to which the specific signaling information is allocated.

Figure 41:
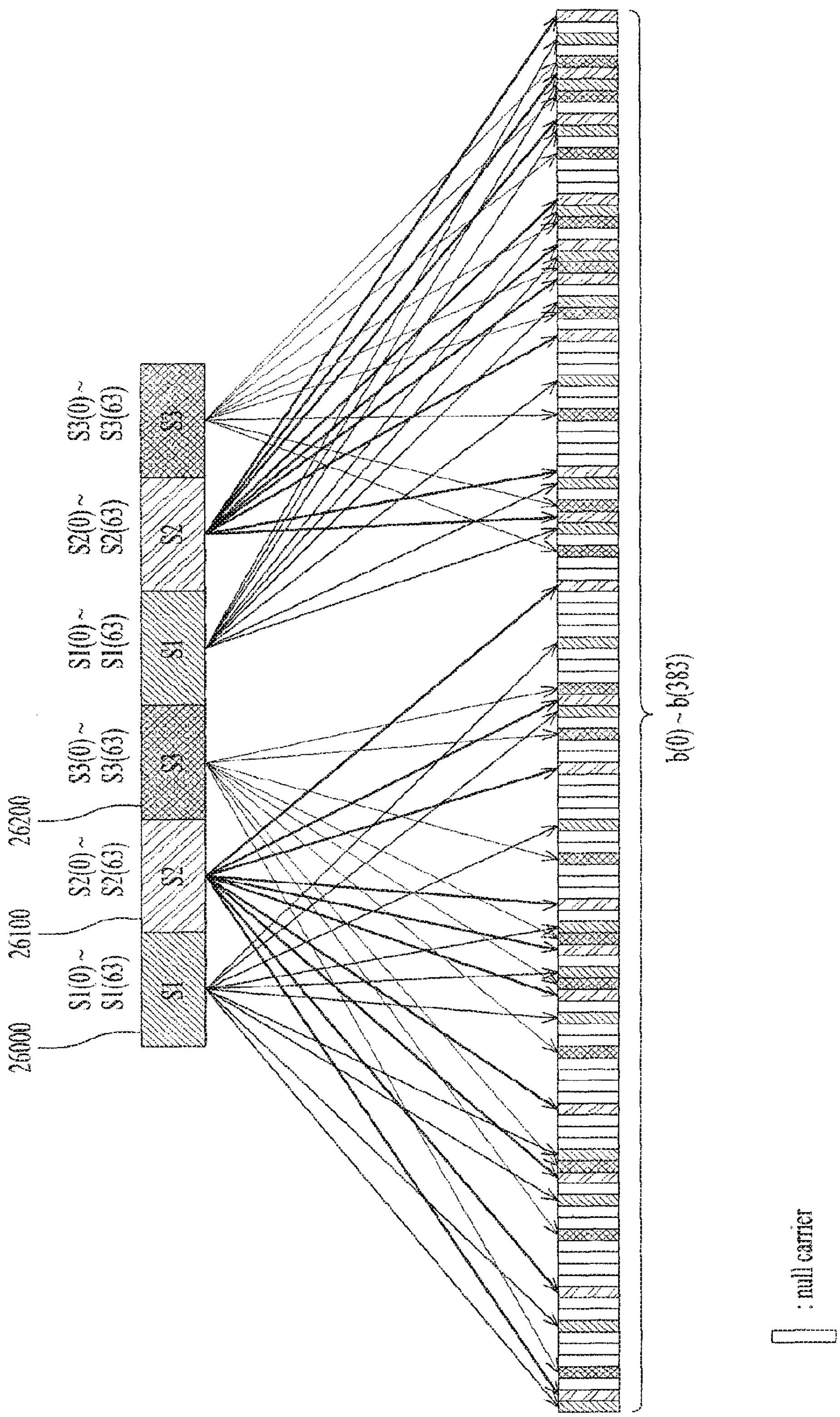
FIG. 41 illustrates a signaling information interleaving procedure according to another embodiment of the present invention.

FIG. 41 illustrates a signaling information interleaving procedure according to another embodiment of the present invention.

According to the signaling information interleaving procedure illustrated in FIG. 41, the signaling information carried by the preamble according to an embodiment of the present invention can be transmitted through bit sequences of S1, bit sequences of S2 and bit sequences of S3. The signalling data carried in the preamble is composed of 3 signalling fields, namely S1, S2 and S3.

As illustrated in FIG. 41, the bit sequences of S1, the bit sequences of S2 and the bit sequences of S3 according to an embodiment of the present invention are signaling sequences that can be allocated to active carriers to respectively carry signaling information (or signaling fields) included in the preamble.

Specifically, each of S1, S2 and S3 can carry 3-bit signaling information and can be configured in a structure in which a 64-bit sequence is repeated twice. Accordingly, 2-bit signaling information can be further transmitted compared to the embodiment illustrated in FIG. 40.

In addition, S1 and S2 can respectively carry the signaling information described in FIG. 40 and S3 can carry signaling information about a guard length (or guard interval length). Signaling information carried by S1, S2 and S3 can be changed according to design.

As illustrated in FIG. 41, bit sequences of S1, S2 and S3 can be represented as sequential numbers starting from 0, that is, S1(0), . . . . In the present embodiment of the invention, 384 carriers are present and are represented as sequential numbers starting from 0, that is, b(0), . . . . This can be modified by the designer.

As illustrated in FIG. 41, S1, S2 and S3 can be sequentially and repeatedly allocated to active carriers corresponding to predetermined positions in the frequency domain.

Specifically, bit sequences of S1, S2 and S3 can be sequentially allocated to active carriers other than null packets from among active carriers b(0) to b(383) according to Math FIG. 8.

$$b(n)=S1(n/3) \text{ when } n \bmod 3=0 \text{ and } 0\le n<192$$

$$b(n)=S2((n-1)/3) \text{ when } n \bmod 3=1 \text{ and } 0\le n<192$$

$$b(n)=S3((n-2)/3) \text{ when } n \bmod 3=2 \text{ and } 0\le n<192$$

$$b(n)=S1((n-192)/3) \text{ when } n \bmod 3=0 \text{ and } 192\le n<384$$

$$b(n)=S2((n-192-1)/3) \text{ when } n \bmod 3=1 \text{ and } 192\le n<384$$

$$b(n)=S2((n-192-2)/3) \text{ when } n \bmod 3=2 \text{ and } 192\le n<384 \quad \text{[Math Figure 8]}$$

According to the interleaving method illustrated in FIG. 41, it is possible to transmit a larger amount of signaling information than the interleaving method illustrated in FIG. 40. Furthermore, even if frequency selective fading occurs due to multi-path interference, the apparatus for receiving broadcast signals can uniformly decode signaling information since a fading period can be uniformly distributed in a region to which signaling information is allocated.

Figure 42:
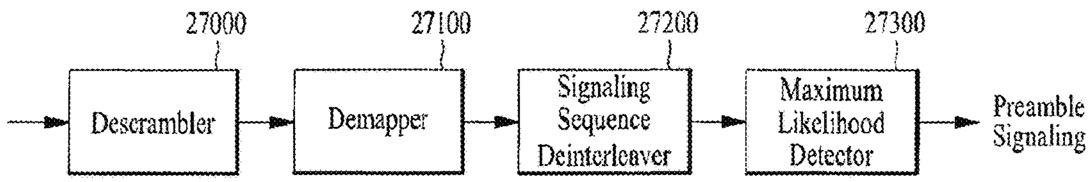
FIG. 42 illustrates a signaling decoder according to an embodiment of the present invention.

FIG. 42 illustrates a signaling decoder according to an embodiment of the present invention.

The signaling decoder illustrated in FIG. 42 corresponds to an embodiment of the signaling decoder illustrated in FIG. 33 and can include a descrambler 27000, a demapper 27100, a signaling sequence deinterleaver 27200 and a maximum likelihood detector 27300. A description will be given of operation of each block of the signaling decoder.

The descrambler 27000 can descramble a signal output from the data extractor. In this case, the descrambler 27000 can perform descrambling by multiplying the signal output from the data extractor by the scrambling sequence. The scrambling sequence according to an embodiment of the present invention can correspond to one of the sequences described with reference to FIGS. 21, 22, 23, 24 and 25.

The demapper 27100 can demap the signal output from the descrambler 27000 to output sequences having a soft value.

The signaling sequence deinterleaver 27200 can rearrange uniformly interleaved sequences as consecutive sequences in the original order by performing deinterleaving corresponding to a reverse process of the interleaving process described in FIGS. 25 and 26.

The maximum likelihood detector 27300 can decode preamble signaling information using the sequences output from the signaling sequence deinterleaver 27200.

Figure 43:
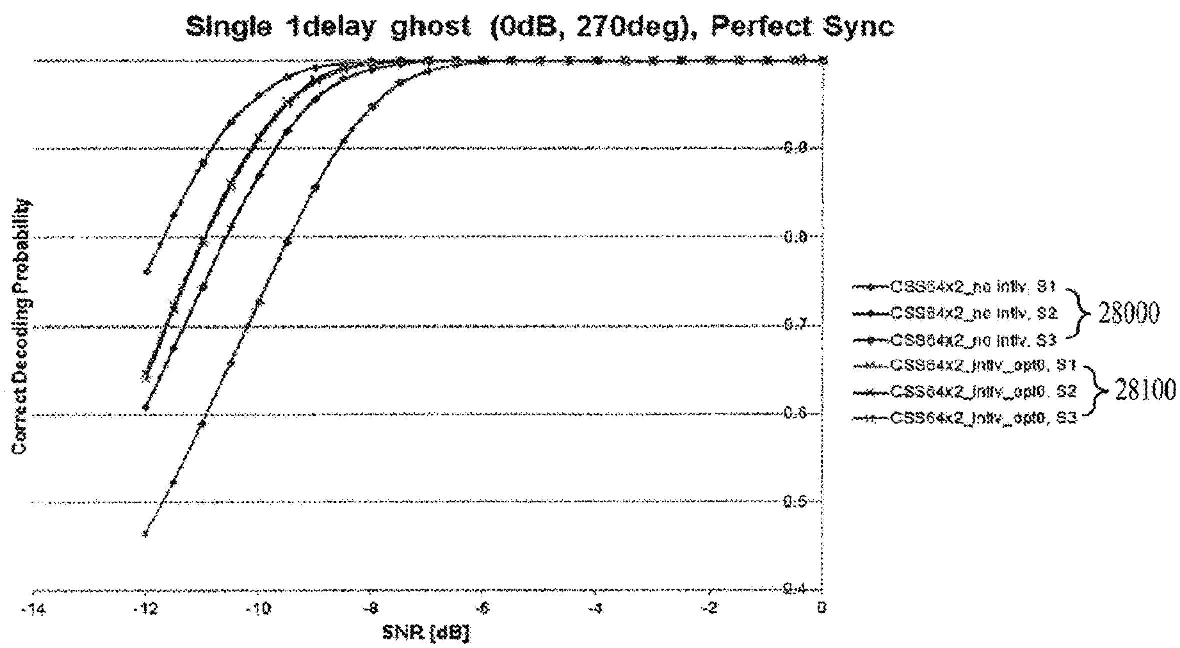
FIG. 43 is a graph showing the performance of the signaling decoder according to an embodiment of the present invention.

FIG. 43 is a graph showing the performance of the signaling decoder according to an embodiment of the present invention.

The graph of FIG. 43 shows the performance of the signaling decoder as the relationship between correct decoding probability and SNR in the case of perfect synchronization, 1 sample delay, 0 dB and 270 degree single ghost.

Specifically, first, second and third curves 28000 respectively show the decoding performance of the signaling decoder for S1, S2 and S3 when the interleaving method illustrated in FIG. 40 is employed, that is, S1, S2 and S3 are sequentially allocated to active carriers and transmitted. Fourth, fifth and sixth curves 28100 respectively show the decoding performance of the signaling decoder for S1, S2 and S3 when the interleaving method illustrated in FIG. 41 is employed, that is, S1, S2 and S3 are sequentially allocated to active carriers corresponding to predetermined positions in the frequency domain in a repeated manner and transmitted. Referring to FIG. 43, it can be known that there is a large difference between signaling decoding performance for a region considerably affected by fading and signaling decoding performance for a region that is not affected by fading when a signal processed according to the interleaving method illustrated in FIG. 40 is decoded. When a signal processed according to the interleaving method illustrated in FIG. 41 is decoded, however, uniform signaling decoding performance is achieved for S1, S2 and S3.

Figure 44:
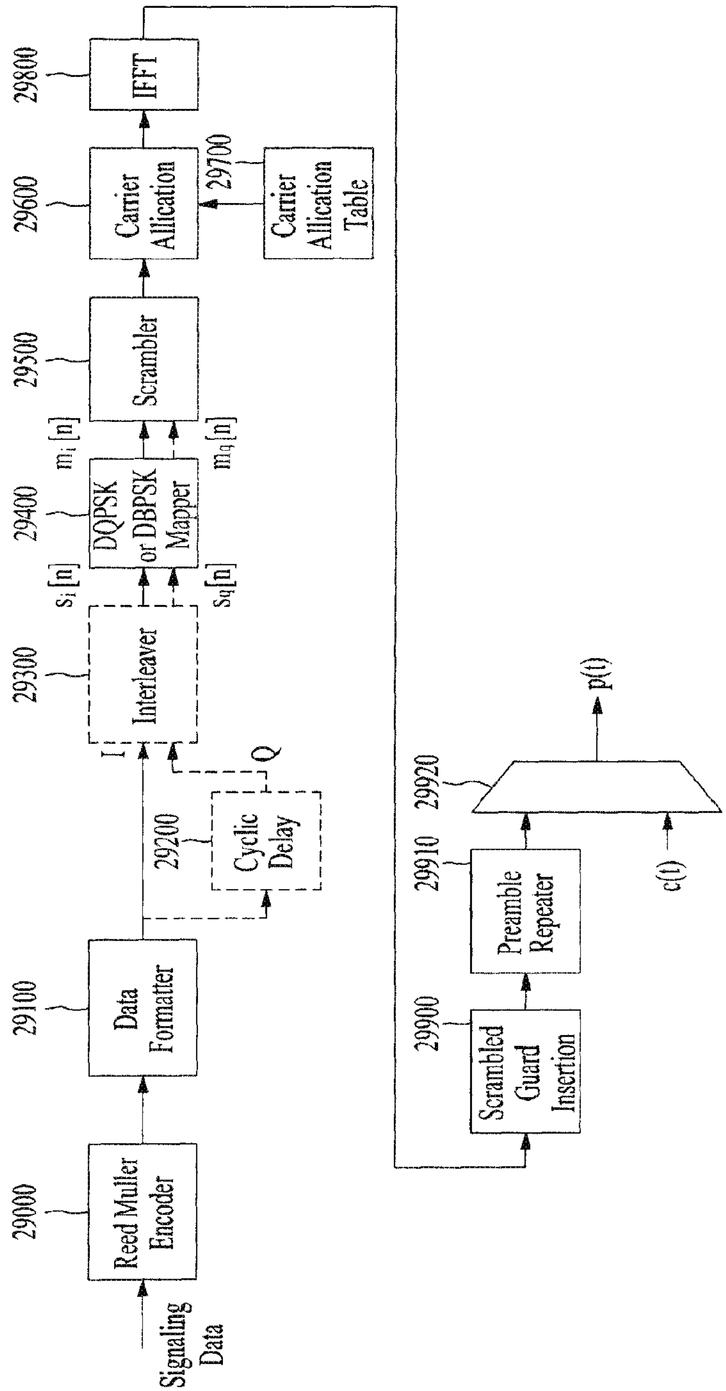
FIG. 44 illustrates a preamble insertion block according to another embodiment of the present invention.

FIG. 44 illustrates a preamble insertion block according to another embodiment of the present invention.

The preamble insertion block shown in FIG. 44 corresponds to another embodiment of the preamble insertion block 7500 illustrated in FIG. 11.

As shown in FIG. 44, the preamble insertion block can include a Reed Muller encoder 29000, a data formatter 29100, a cyclic delay block 29200, an interleaver 29300, a DQPSK (differential quadrature phase shift keying)/DBPSK (differential binary phase shift keying) mapper 29400, a scrambler 29500, a carrier allocation block 29600, a carrier allocation table block 29700, an IFFT block 29800, a scrambled guard insertion block 29900, a preamble repeater 29910 and a multiplexing block 29920. Each block may be modified or may not be included in the preamble insertion block according to design. A description will be given of operation of each block of the preamble insertion block.

The Reed Muller encoder 29000 can receive signaling information to be carried by the preamble and perform Reed Muller encoding on the signaling information. When Reed Muller encoding is performed, performance can be improved compared to signaling using an orthogonal sequence or signaling using the sequence described in FIG. 31.

The data formatter 29100 can receive bits of the signaling information on which Reed Muller encoding has been performed and format the bits to repeat and arrange the bits.

The DQPSK/DBPSK mapper 29400 can map the formatted bits of the signaling information according to DQPSK or DBPSK and output the mapped signaling information.

When the DQPSK/DBPSK mapper 29400 maps the formatted bits of the signaling information according to DBPSK, the operation of the cyclic delay block 29200 can be omitted. The interleaver 29300 can receive the formatted bits of the signaling information and perform frequency interleaving on the formatted bits of the signaling information to output interleaved data. In this case, the operation of the interleaver can be omitted according to design.

When the DQPSK/DBPSK mapper 29400 maps the formatted bits of the signaling information according to DQPSK, the data formatter 29100 can output the formatted bits of the signaling information to the interleaver 29300 through path I shown in FIG. 44.

The cyclic delay block 29200 can perform cyclic delay on the formatted bits of the signaling information output from the data formatter 29100 and then output the cyclic-delayed bits to the interleaver 29300 through path Q shown in FIG. 44. When cyclic Q-delay is performed, performance on a frequency selective fading channel is improved.

The interleaver 29300 can perform frequency interleaving on the signaling information received through paths I and Q and the cyclic Q-delayed signaling information to output interleaved information. In this case, the operation of the interleaver 29300 can be omitted according to design.

Math FIGS. 6 and 7 represent the relationship between input information and output information or a mapping rule when the DQPSK/DBPSK mapper 29400 maps the signaling information input thereto according to DQPSK and DBPSK.

As shown in FIG. 44, the input information of the DQPSK/DBPSK mapper 29400 can be represented as si[in] and sq[n] and the output information of the DQPSK/DBPSK mapper 29400 can be represented as mi[in] and mq[n].

$$m_i[-1]=1$$

$$m_i[n]=m_i[n-1] \text{ if } s_i[n]=0$$

$$m_i[n]=m_i[n-1] \text{ if } s_i[n]=1$$

$$m_q[n]=0,\ n=0\sim I,\ I\text{: \# of Reed Muller encoded signaling bits} \quad \text{[Math Figure 9]}$$

$$y[-1]=0$$

$$y[n]=y[n-1] \text{ if } s_i[n]=0 \text{ and } s_q[n]=0$$

$$y[n]=(y[n-1]+3)\bmod 4 \text{ if } s_i[n]=0 \text{ and } s_q[n]=1$$

$$y[n]=(y[n-1]+1)\bmod 4 \text{ if } s_i[n]=1 \text{ and } s_q[n]=0$$

$$y[n]=(y[n-1]+2)\bmod 4 \text{ if } s_i[n]=1 \text{ and } s_q[n]=1,\ n=0\sim I,$$

$$I\text{: \# of Reed Muller encoded signaling bits}$$

$$m_i[n]=m_q[n]=\text{if } y[n]=0$$

$$m_i[n]=m_q[n]=\text{if } y[n]=1$$

$$m_i[n]=m_q[n]=\text{if } y[n]=2$$

$$m_i[n]=m_q[n]=\text{if } y[n]=3,\ n=0\sim I$$

$$I\text{:\# of Reed Muller encoded signaling bits} \quad \text{[Math Figure 10]}$$

The scrambler 29500 can receive the mapped signaling information output from the DQPSK/DBPSK mapper 29400 and multiply the signaling information by the scrambling sequence.

The carrier allocation block 29600 can allocate the signaling information processed by the scrambler 29500 to predetermined carriers using position information output from the carrier allocation table block 29700.

The IFFT block 29800 can transform the carriers output from the carrier allocation block 29600 into an OFDM signal in the time domain.

The scrambled guard insertion block 29900 can insert a guard interval into the OFDM signal to generate a preamble. The guard interval according to one embodiment of the present invention can correspond to the guard interval in the scrambled cyclic prefix form described in FIG. 32 and can be generated according to the method described in FIG. 32.

The preamble repeater 29910 can repeatedly arrange the preamble in a signal frame. The preamble according to one embodiment of the present invention can have the preamble structure described in FIG. 32 and can be transmitted through one signal frame only once.

When the preamble repeater 29910 repeatedly allocate the preamble within one signal frame, the OFDM symbol region and scrambled cyclic prefix region of the preamble can be separated from each other. The preamble can include the scrambled cyclic prefix region and the OFDM symbol region, as described above. In the specification, the preamble repeatedly allocated by the preamble repeater 29910 can also be referred to as a preamble. The repeated preamble structure may be a structure in which the OFDM symbol region and the scrambled cyclic prefix region are alternately repeated. Otherwise, the repeated preamble structure may be a structure in which the OFDM symbol region is allocated, the scrambled prefix region is consecutively allocated twice or more and then the OFDM symbol region is allocated. Furthermore, the repeated preamble structure may be a structure in which the scrambled cyclic prefix region is allocated, the OFDM symbol region is consecutively allocated twice or more and then the scrambled cyclic prefix region is allocated. A preamble detection performance level can be controlled by adjusting the number of repetitions of the OFDM symbol region or scrambled cyclic prefix region and positions in which the OFDM symbol region and scrambled cyclic prefix region are allocated.

When the same preamble is repeated in one frame, the apparatus for receiving broadcast signals can stably detect the preamble even in the case of low SNR and decode the signaling information.

The multiplexing block 29920 can multiplex the signal output from the preamble repeater 29910 and the signal c(t) output from the guard sequence insertion block 7400 illustrated in FIG. 7 to output an output signal p(t). The output signal p(t) can be input to the waveform processing block 7600 described in FIG. 7.

Figure 45:
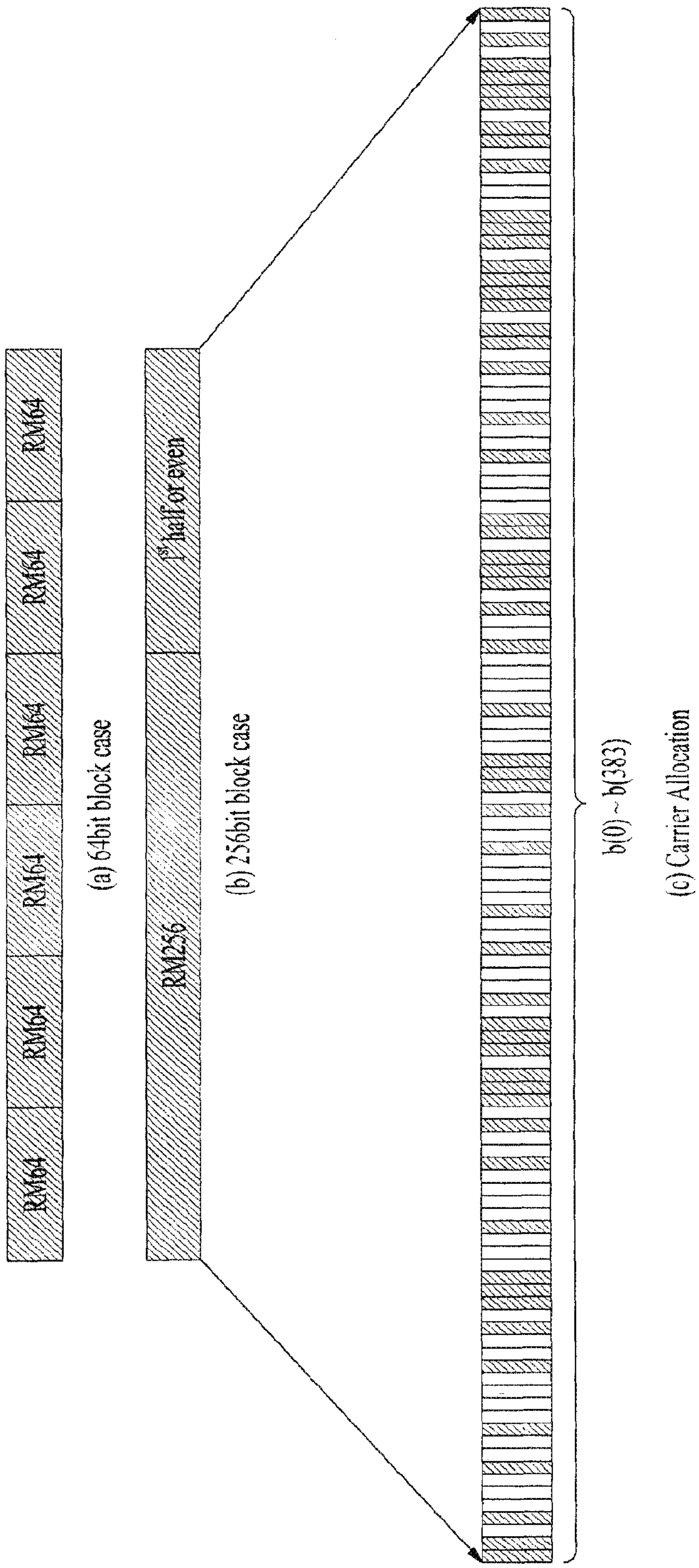
FIG. 45 illustrates a structure of signaling data in a preamble according to an embodiment of the present invention.

FIG. 45 illustrates a structure of signaling data in a preamble according to an embodiment of the present invention.

Specifically, FIG. 45 shows the structure of the signaling data carried on the preamble according to an embodiment of the present invention in the frequency domain.

As shown in FIG. 45, (*a*) and (*b*) illustrate an embodiment in which the data formatter 29100 described in FIG. 44 repeats or allocates data according to code block length of Reed Muller encoding performed by the Reed Muller encoder 29000.

The data formatter 29100 can repeat the signaling information output from the Reed Muller encoder 29000 such that the signaling information corresponds to the number of active carriers based on code block length or arrange the signaling information without repeating the same. (*a*) and (*b*) correspond to a case in which the number of active carriers is 384.

Accordingly, when the Reed Muller encoder 29000 performs Reed Muller encoding of a 64-bit block, as shown in (*a*), the data formatter 29100 can repeat the same data six times. In this case, if the first order Reed Muller code is used in Reed Muller encoding, the signaling data may be 7 bits.

When the Reed Muller encoder 29000 performs Reed Muller encoding of a 256-bit block, as shown in (*b*), the data formatter 29100 can repeat former 128 bits or later 124 bits of the 256-bit code block or repeat 128 even-numbered bits or 124 odd-numbered bits. In this case, if the first order Reed Muller code is used in Reed Muller encoding, the signaling data may be 8 bits.

As described above with reference to FIG. 44, the signaling information formatted by the data formatter 29100 can be processed by the cyclic delay block 29200 and the interleaver 29300 or mapped by the DQPSK/DBPSK mapper 29400 without being processed by the cyclic delay block 29200 and the interleaver 29300, scrambled by the scrambler 29500 and input to the carrier allocation block 29600.

As shown in FIG. 45, (*c*) illustrates a method of allocating the signaling information to active carriers in the carrier allocation block 29600 according to one embodiment. As shown in (*c*), b(n) represents carriers to which data is allocated and the number of carriers can be 384 in one embodiment of the present invention. Colored carriers from among the carriers shown in (*c*) refer to active carriers and uncolored carriers refer to null carriers. The positions of the active carriers illustrated in FIG. 45-(*c*) can be changed according to design.

Figure 46:
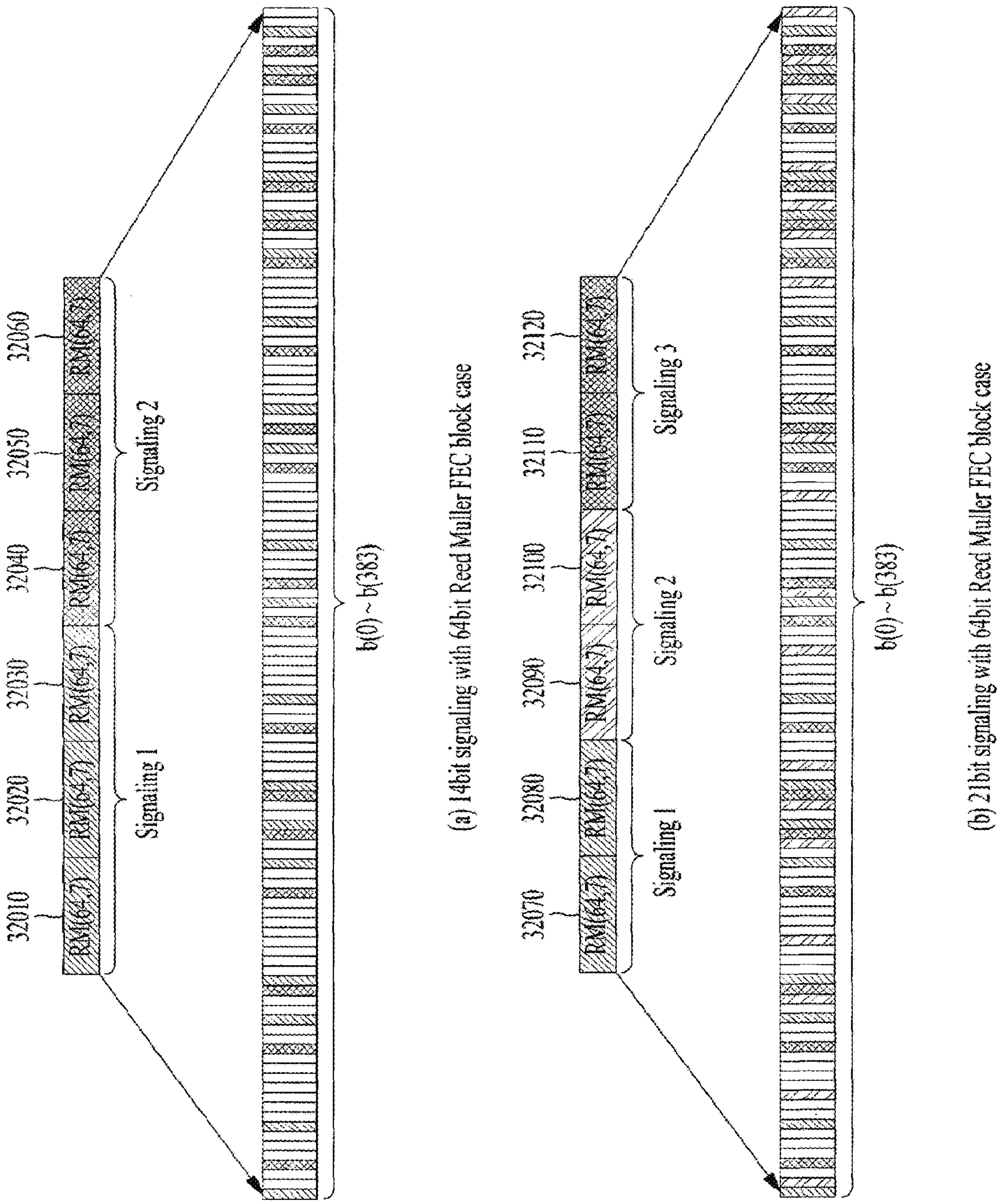
FIG. 46 illustrates a procedure of processing signaling data carried on a preamble according to one embodiment.

FIG. 46 illustrates a procedure of processing signaling data carried on a preamble according to one embodiment.

The signaling data carried on a preamble may include a plurality of signaling sequences. Each signaling sequence may be 7 bits. The number and size of signaling sequences can be changed by the designer.

In the figure, (*a*) illustrates a signaling data processing procedure according to an embodiment when the signaling data carried on the preamble is 14 bits. In this case, the signaling data carried on the preamble can include two signaling sequences which are respectively referred to as signaling 1 and signaling 2. Signaling 1 and signaling 2 may correspond to the above-described signaling sequences S1 and S2.

Each of signaling 1 and signaling 2 can be encoded into a 64-bit Reed Muller code by the above-described Reed Muller encoder. In the figure, (*a*) illustrates Reed Muller encoded signaling sequence blocks 32010 and 32040.

The signaling sequence blocks 32010 and 32040 of the encoded signaling 1 and signaling 2 can be repeated three times by the above-described data formatter. In the figure, (*a*) illustrates repeated signaling sequence blocks 32010, 32020 and 32030 of signaling 1 and repeated signaling sequence blocks 32040, 32050 and 32060 of repeated signaling 2. Since a Reed-Muller encoded signaling sequence block is 64 bits, each of the signaling sequence blocks of signaling 1 and signaling 2, which are repeated three times, is 192 bits.

Signaling 1 and signaling 2 composed of 6 blocks 32010, 32020, 32030, 32040, 32050 and 32060 can be allocated to 384 carriers by the above-described carrier allocation block. In the figure (*a*), b(0) is the first carrier and b(1) and b(2) are carriers. 384 carriers b(0) to b(383) are present in one embodiment of the present invention. Colored carriers from among the carriers shown in the figure refer to active carriers and uncolored carriers refer to null carriers. The active carrier represents a carrier to which signaling data is allocated and the null carrier represents a carrier to which signaling data is not allocated. In this specification, active carrier can also be referred to as a carrier. Data of signaling 1 and data of signaling 2 can be alternately allocated to carriers. For example, the data of signaling 1 can be allocated to b(0), the data of signaling 2 can be allocated to b(7) and the data of signaling 1 can be allocated to b(24). The positions of the active carriers and null carriers can be changed by the designer.

In the figure, (*b*) illustrates a signaling data processing procedure when the signaling data transmitted through the preamble is 21 bits. In this case, the signaling data transmitted through the preamble can include three signaling sequences which are respectively referred to as signaling 1, signaling 2 and signaling 3. Signaling 1, signaling 2 and signaling 3 may correspond to the above-described signaling sequences S1, S2 and S3.

Each of signaling 1, signaling 2 and signaling 3 can be encoded into a 64-bit Reed-Muller code by the above-described Reed-Muller encoder. In the figure, (*b*) illustrates Reed-Muller encoded signaling sequence blocks 32070, 32090 and 32110.

The signaling sequence blocks 32070, 32090 and 32110 of the encoded signaling 1, signaling 2 and signaling 3 can be repeated twice by the above-described data formatter. In the figure, (*b*) illustrates the repeated signaling sequence blocks 32070 and 32080 of signaling 1, repeated signaling sequence blocks 32090 and 32100 of signaling 2 and repeated signaling sequence blocks 32110 and 32120 of signaling 3. Since a Reed-Muller encoded signaling sequence block is 64 bits, each of the signaling sequence blocks of signaling 1, signaling 2 and signaling 3, which are repeated twice, is 128 bits.

Signaling 1, signaling 2 and signaling 3 composed of 6 blocks 32070, 32080, 32090, 32100, 32110 and 32120 can be allocated to 384 carriers by the above-described carrier allocation block. In the figure (*b*), b(0) is the first carrier and b(1) and b(2) are carriers. 384 carriers b(0) to b(383) are present in one embodiment of the present invention. Colored carriers from among the carriers shown in the figure refer to active carriers and uncolored carriers refer to null carriers. The active carrier represents a carrier to which signaling data is allocated and the null carrier represents a carrier to which signaling data is not allocated. Data of signaling 1, signaling 2 and data of signaling 3 can be alternately allocated to carriers. For example, the data of signaling 1 can be allocated to b(0), the data of signaling 2 can be allocated to b(7), the data of signaling 3 can be allocated to b(24) and the data of signaling 1 can be allocated to b(31). The positions of the active carriers and null carriers can be changed by the designer.

As illustrated in (*a*) and (*b*) of the figure, trade off between signaling data capacity and signaling data protection level can be achieved by controlling the length of an FEC encoded signaling data block. That is, when the signaling data block length increases, signaling data capacity increases whereas the number of repetitions by the data formatter and the signaling data protection level decrease. Accordingly, various signaling capacities can be selected.

Figure 47:
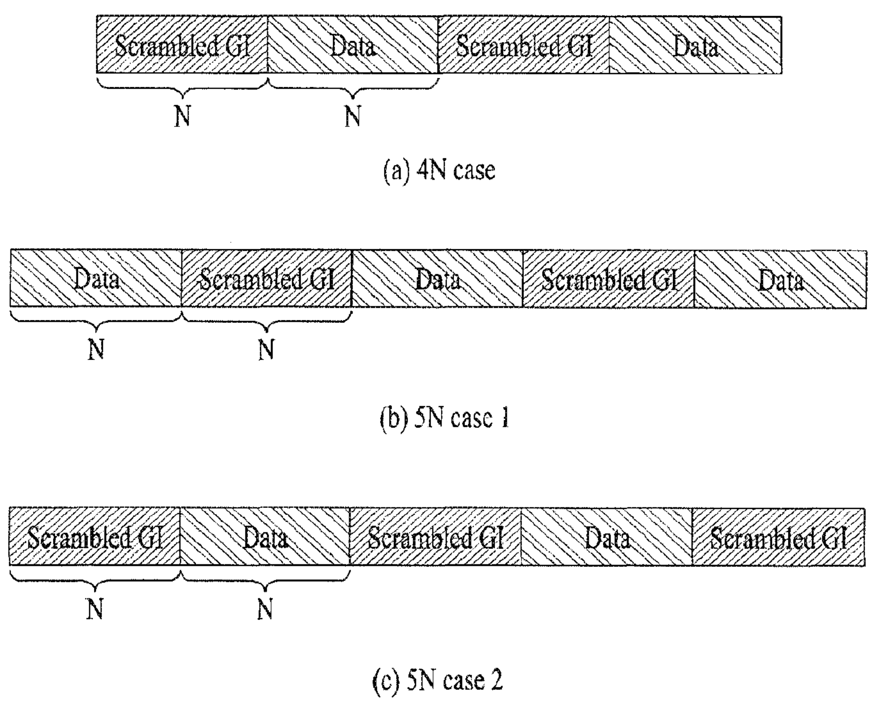
FIG. 47 illustrates a preamble structure repeated in the time domain according to one embodiment.

FIG. 47 illustrates a preamble structure repeated in the time domain according to one embodiment.

As described above, the preamble repeater can alternately repeat data and a scrambled guard interval. In the following description, a basic preamble refers to a structure in which a data region follows a scrambled guard interval.

In the figure, (*a*) illustrates a structure in which the basic preamble is repeated twice in a case in which the preamble length is 4N. Since a preamble having the structure of (*a*) includes the basic preamble, the preamble can be detected even by a normal receiver in an environment having a high signal-to-noise ratio (SNR) and detected using the repeated structure in an environment having a low SNR. The structure of (*a*) can improve decoding performance of the receiver since signaling data is repeated in the structure.

In the figure, (*b*) illustrates a preamble structure when the preamble length is 5N. The structure of (*b*) is started with data and then a guard interval and data are alternately allocated. This structure can improve preamble detection performance and decoding performance of the receiver since the data is repeated a larger number of times (3N) than the structure of (*a*).

In the figure, (*c*) illustrates a preamble structure when the preamble length is 5N. Distinguished from the structure of (*b*), the structure of (*c*) is started with the guard interval and then the data and the guard interval are alternately allocated. The structure of (*c*) has a smaller number (2N) of repetitions of data than the structure of (*b*) although the preamble length is identical to that of the structure of (*b*), and thus the structure of (*c*) may deteriorate decoding performance of the receiver. However, the preamble structure of (*c*) has an advantage that a frame is started in the same manner as a normal frame since the data region follows the scrambled guard interval.

Figure 48:
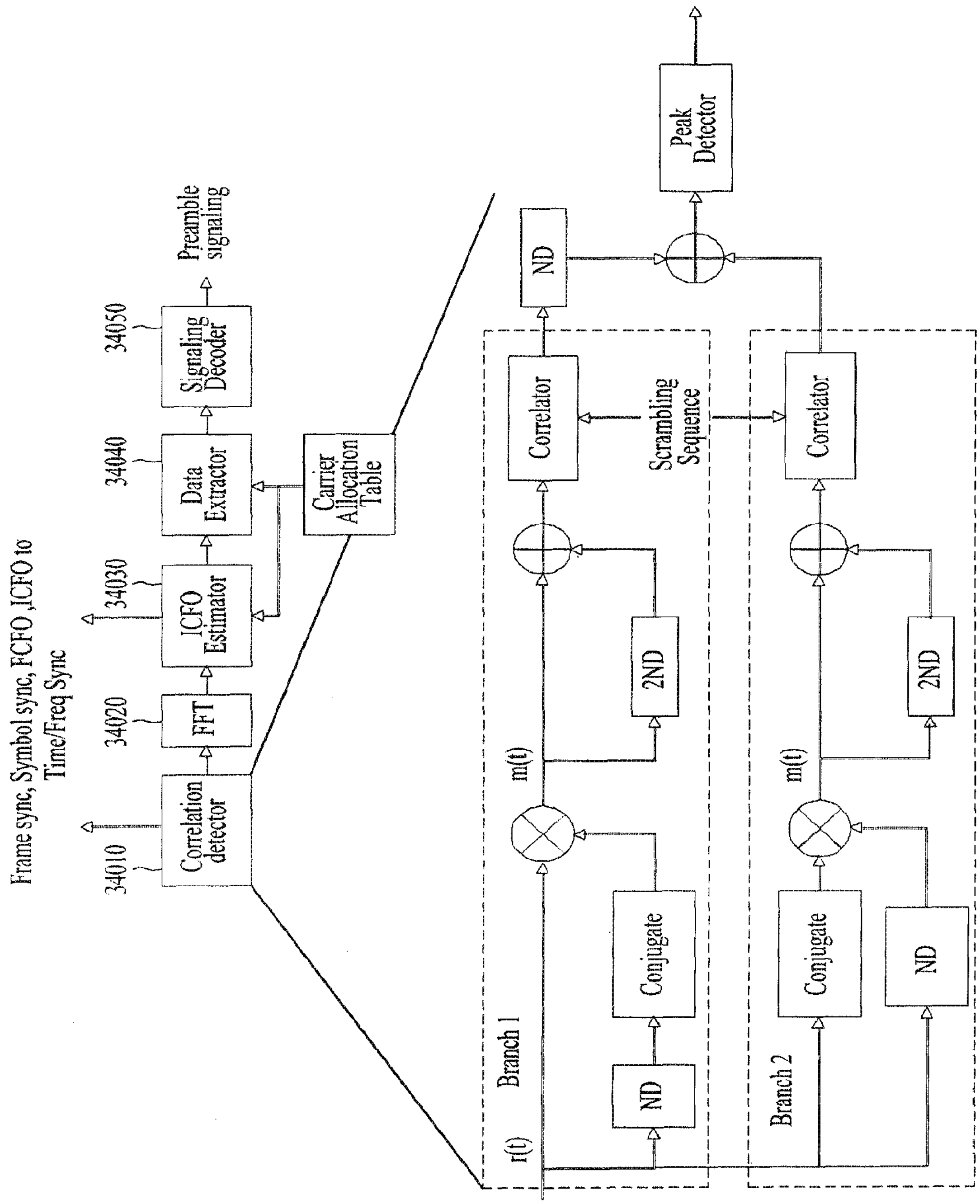
FIG. 48 illustrates a preamble detector and a correlation detector included in the preamble detector according to an embodiment of the present invention.

FIG. 48 illustrates a preamble detector and a correlation detector included in the preamble detector according to an embodiment of the present invention.

FIG. 48 illustrates an embodiment of the above-described preamble detector for the preamble structure of (*b*) in the above-described figure showing the preamble structure repeated in the time domain.

The preamble detector according to the present embodiment can include a correlation detector 34010, an FFT block 34020, an ICFO estimator 34030, a data extractor 34040 and/or a signaling decoder 34050.

The correlation detector 34010 can detect a preamble. The correlation detector 34010 can include two branches. The above-described repeated preamble structure can be a structure in which the scrambled guard interval and data region are alternatively assigned. Branch 1 can be used to obtain correlation of a period in which the scrambled guard interval is located prior to the data region in the preamble. Branch 2 can be used to obtain correlation of a period in which the data region is located prior to the scrambled guard interval in the preamble.

In the preamble structure of (*b*) in the above figure showing the preamble structure repeated in the time domain, in which the data region and scrambled guard interval are repeated, the period in which the scrambled guard interval is located prior to the data region appears twice and the period in which the data region is located prior to the scrambled guard interval appears twice. Accordingly, 2 correlation peaks can be generated in each of branch 1 and branch 2. The 2 correlation branches generated in each branch can be summed. A correlator included in each branch can correlate the summed correlation peak with a scrambling sequence. The correlated peaks of branch 1 and branch 2 can be summed and a peak detector can detect the preamble position from the summed peak of branch 1 and branch 2 and perform OFDM symbol timing synchronization and fractional frequency offset synchronization.

The FFT block 34020, ICFO estimator 34030, data extractor 34040 and signaling decoder 34050 can operate in the same manner as the above-described corresponding blocks.

Figure 49:
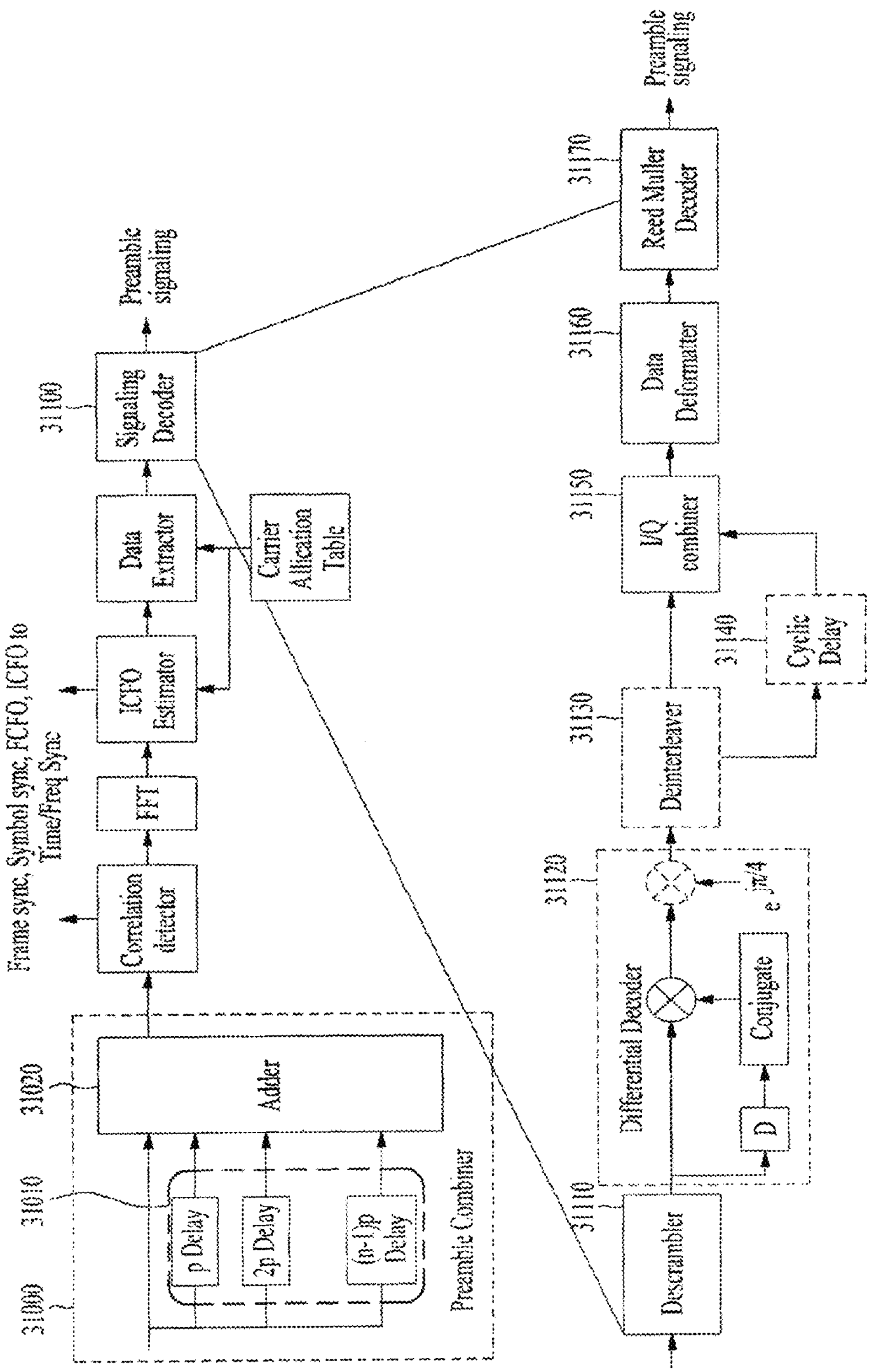
FIG. 49 illustrates a preamble detector according to another embodiment of the present invention.

FIG. 49 illustrates a preamble detector according to another embodiment of the present invention.

The preamble detector shown in FIG. 49 corresponds to another embodiment of the preamble detector 9300 described in FIGS. 9 and 20 and can perform operation corresponding to the preamble insertion block illustrated in FIG. 44.

As shown in FIG. 49, the preamble detector according to another embodiment of the present invention can include a correlation detector, an FFT block, an ICFO estimator, a carrier allocation table block, a data extractor and a signaling decoder 31100 in the same manner as the preamble detector described in FIG. 33. However, the preamble detector shown in FIG. 49 is distinguished from the preamble detector shown in FIG. 33 in that the preamble detector shown in FIG. 49 includes a preamble combiner 31000. Each block may be modified or omitted from the preamble detector according to design.

Description of the same blocks as those of the preamble detector illustrated in FIG. 33 is omitted and operations of the preamble combiner 31000 and signaling decoder 31100 are described.

The preamble combiner 31000 can include n delay blocks 31010 and an adder 31020. The preamble combiner 31000 can combine received signals to improve signal characteristics when the preamble repeater 29910 described in FIG. 44 repeatedly allocate the same preamble to one signal frame.

As shown in FIG. 49, the n delay blocks 31010 can delay each preamble by p*n−1 in order to combine repeated preambles. In this case, p represents a preamble length and n represents the number of repetitions.

The adder 31020 can combine the delayed preambles.

The signaling decoder 31100 corresponds to another embodiment of the signaling decoder illustrated in FIG. 42 and can perform reverse operations of the operations of the Reed Muller encoder 29000, data formatter 29100, cyclic delay block 29200, interleaver 29300, DQPSK/DBPSK mapper 29400 and scrambler 29500 included in the preamble insertion block illustrated in FIG. 44.

As shown in FIG. 49, the signaling decoder 31100 can include a descrambler 31110, a differential decoder 31120, a deinterleaver 31130, a cyclic delay block 31140, an I/Q combiner 31150, a data deformatter 31160 and a Reed Muller decoder 31170.

The descrambler 31110 can descramble a signal output from the data extractor.

The differential decoder 31120 can receive the descrambled signal and perform DBPSK or DQPSK demapping on the descrambled signal.

Specifically, when a signal on which DQPSK mapping has been performed in the apparatus for transmitting broadcast signals is received, the differential decoder 31120 can phase-rotate a differential-decoded signal by $\pi/4$. Accordingly, the differential decoded signal can be divided into in-phase and quadrature components.

If the apparatus for transmitting broadcast signals has performed interleaving, the deinterleaver 31130 can deinterleave the signal output from the differential decoder 31120.

If the apparatus for transmitting broadcast signals has performed cyclic delay, the cyclic delay block 31140 can perform a reverse process of cyclic delay.

The I/Q combiner 31150 can combine I and Q components of the deinterleaved or delayed signal.

If a signal on which DBPSK mapping has been performed in the apparatus for transmitting broadcast signals is received, the I/Q combiner 31150 can output only the I component of the deinterleaved signal.

The data deformatter 31160 can combine bits of signals output from the I/Q combiner 31150 to output signaling information. The Reed Muller decoder 31170 can decode the signaling information output from the data deformatter 31160.

Accordingly, the apparatus for receiving broadcast signals according to an embodiment of the present invention can acquire the signaling information carried by the preamble through the above-described procedure.

Figure 50:
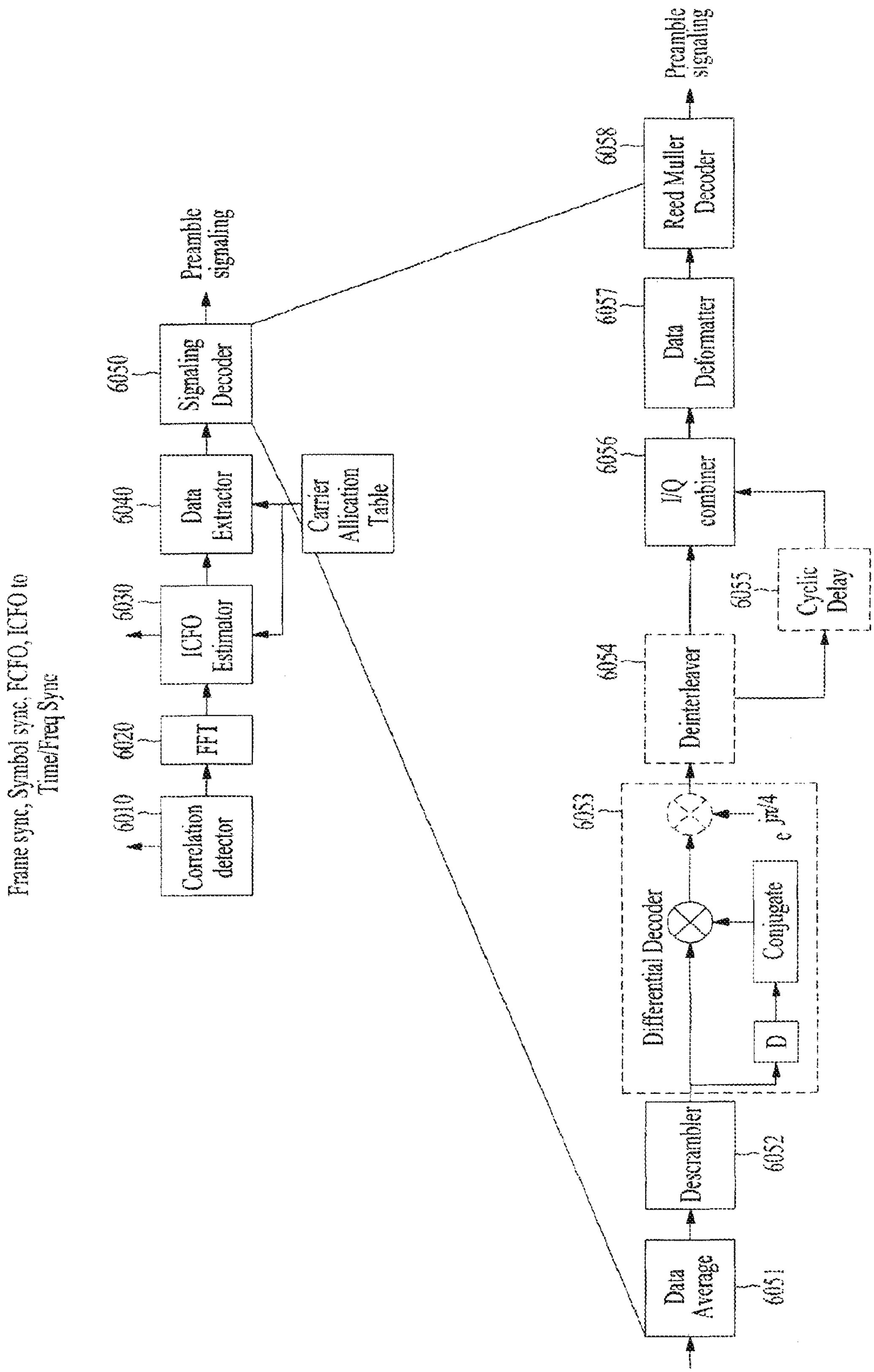
FIG. 50 illustrates a preamble detector and a signaling decoder included in the preamble detector according to an embodiment of the present invention.

FIG. 50 illustrates a preamble detector and a signaling decoder included in the preamble detector according to an embodiment of the present invention.

FIG. 50 shows an embodiment of the above-described preamble detector.

The preamble detector according to the present embodiment can include a correlation detector 36010, an FFT block 36020, an ICFO estimator 36030, a data extractor 36040 and/or a signaling decoder 36050.

The correlation detector 36010, FFT block 36020, ICFO estimator 36030 and data extractor 36040 can perform the same operations as those of the above-described corresponding blocks.

The signaling decoder 36050 can decode the preamble. The signaling decoder 36050 according to the present embodiment can include a data average module 36051, a descrambler 36052, a differential decoder 36053, a deinterleaver 36054, a cyclic delay 36055, an I/Q combiner 36056, a data deformatter 36057 and/or a Reed-Muller decoder 36058.

The data average module 36051 can calculate the average of repeated data blocks to improve signal characteristics when the preamble has repeated data blocks. For example, if a data block is repeated three times, as illustrated in (*b*) of the above figure showing the preamble structure repeated in the time domain, the data average module 36051 can calculate the average of the 3 data blocks to improve signal characteristics. The data average module 36051 can output the averaged data to the next module.

The descrambler 36052, differential decoder 36053, deinterleaver 36054, cyclic delay 36055, I/Q combiner 36056, data deformatter 36057 and Reed Muller decoder 36058 can perform the same operations as those of the above-described corresponding blocks.

Figure 51:
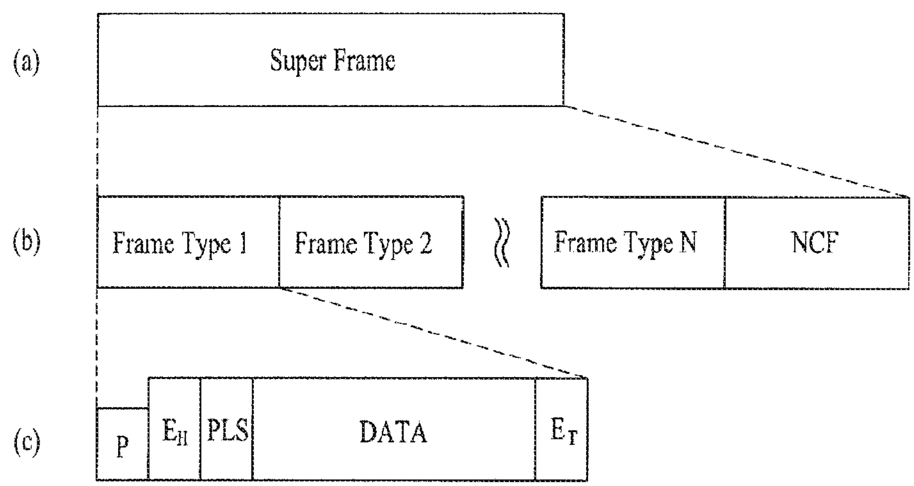
FIG. 51 is a view illustrating a frame structure of a broadcast system according to an embodiment of the present invention.

FIG. 51 is a view illustrating a frame structure of a broadcast system according to an embodiment of the present invention.

The above-described cell mapper included in the frame structure module may locate cells for transmitting input SISO, MISO or MIMO processed DP data, cells for transmitting common DP data, and cells for transmitting PLS data in a signal frame according to scheduling information. Then, the generated signal frames may be sequentially transmitted.

A broadcast signal transmission apparatus and transmission method according to an embodiment of the present invention may multiplex and transmit signals of different broadcast transception systems within the same RF channel, and a broadcast signal reception apparatus and reception method according to an embodiment of the present invention may correspondingly process the signals. Thus, a broadcast signal transception system according to an embodiment of the present invention may provide a flexible broadcast transception system.

Therefore, the broadcast signal transmission apparatus according to an embodiment of the present invention may sequentially transmit a plurality of superframes delivering data related to broadcast service.

FIG. 51(*a*) illustrates a superframe according to an embodiment of the present invention, and FIG. 51(*b*) illustrates the configuration of the superframe according to an embodiment of the present invention. As illustrated in FIG. 51(*b*), the superframe may include a plurality of signal frames and a non-compatible frame (NCF). According to an embodiment of the present invention, the signal frames are time division multiplexing (TDM) signal frames of a physical layer end, which are generated by the above-described frame structure module, and the NCF is a frame which is usable for a new broadcast service system in the future.

The broadcast signal transmission apparatus according to an embodiment of the present invention may multiplex and transmit various services, e.g., UHD, Mobile and MISO/MIMO, on a frame basis to simultaneously provide the services in an RF. Different broadcast services may require different reception environments, transmission processes, etc. according to characteristics and purposes of the broadcast services.

Accordingly, different services may be transmitted on a signal frame basis, and the signal frames can be defined as different frame types according to services transmitted therein. Further, data included in the signal frames can be processed using different transmission parameters, and the signal frames can have different FFT sizes and guard intervals according to broadcast services transmitted therein.

Accordingly, as illustrated in FIG. 51(*b*), the different-type signal frames for transmitting different services may be multiplexed using TDM and transmitted within a superframe.

According to an embodiment of the present invention, a frame type may be defined as a combination of an FFT mode, a guard interval mode and a pilot pattern, and information about the frame type may be transmitted using a preamble portion within a signal frame. A detailed description thereof will be given below.

Further, configuration information of the signal frames included in the superframe may be signaled through the above-described PLS, and may vary on a superframe basis.

FIG. 51(*c*) is a view illustrating the configuration of each signal frame. The signal frame may include a preamble, head/tail edge symbols $E_H/E_T$, one or more PLS symbols and a plurality of data symbols. This configuration is variable according to the intention of a designer.

The preamble is located at the very front of the signal frame and may transmit a basic transmission parameter for identifying a broadcast system and the type of signal frame, information for synchronization, etc. Thus, the broadcast signal reception apparatus according to an embodiment of the present invention may initially detect the preamble of the signal frame, identify the broadcast system and the frame type, and selectively receive and decode a broadcast signal corresponding to a receiver type.

The head/tail edge symbols may be located after the preamble of the signal frame or at the end of the signal frame. In the present invention, an edge symbol located after the preamble may be called a head edge symbol and an edge symbol located at the end of the signal frame may be called a tail edge symbol. The names, locations or numbers of the edge symbols are variable according to the intention of a designer. The head/tail edge symbols may be inserted into the signal frame to support the degree of freedom in design of the preamble and multiplexing of signal frames having different frame types. The edge symbols may include a larger number of pilots compared to the data symbols to enable frequency-only interpolation and time interpolation between the data symbols. Accordingly, a pilot pattern of the edge symbols has a higher density than that of the pilot pattern of the data symbols.

The PLS symbols are used to transmit the above-described PLS data and may include additional system information (e.g., network topology/configuration, PAPR use, etc.), frame type ID/configuration information, and information necessary to extract and decode DPs.

The data symbols are used to transmit DP data, and the above-described cell mapper may locate a plurality of DPs in the data symbols.

A description is now given of DPs according to an embodiment of the present invention.

Figure 52:
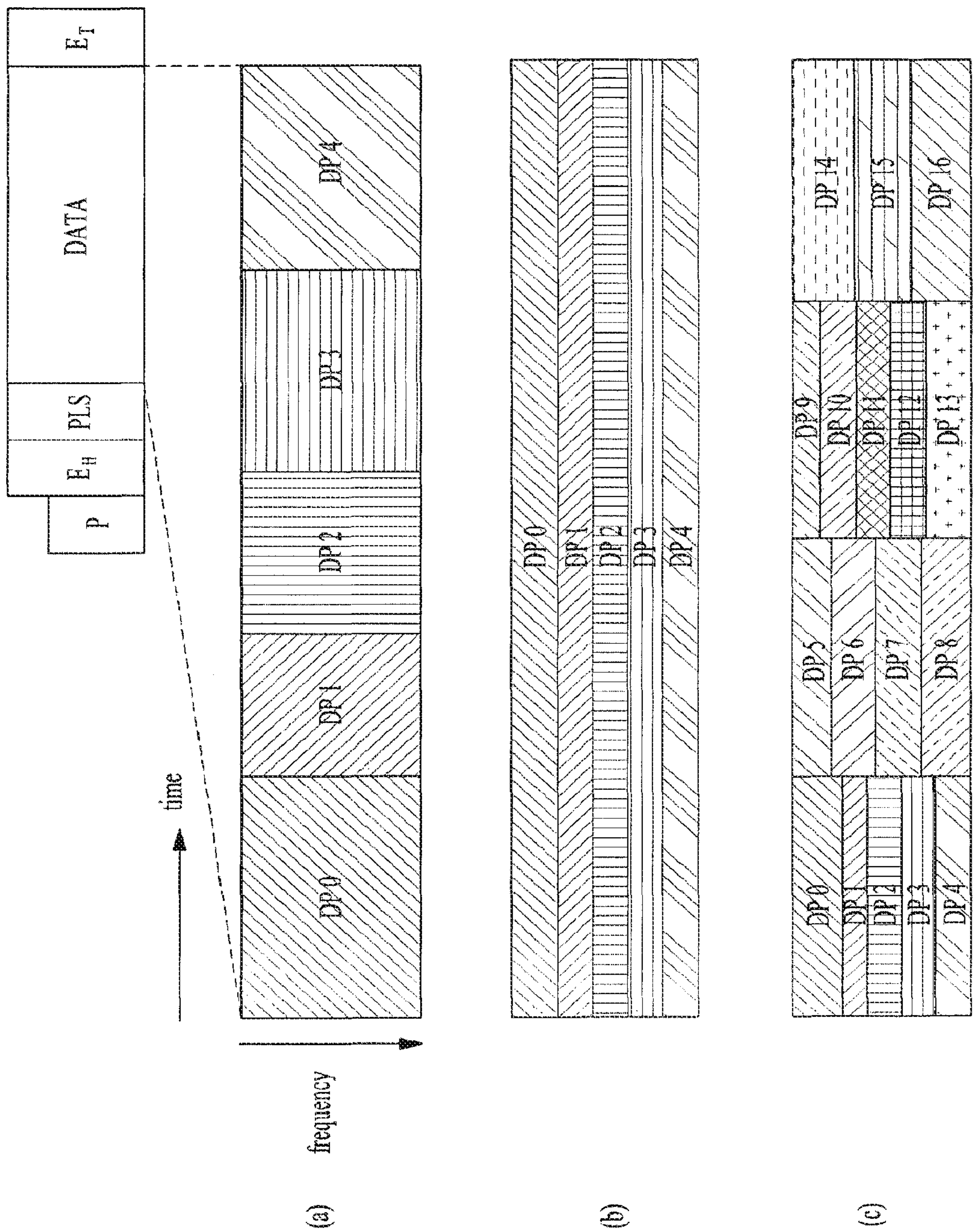
FIG. 52 is a view illustrating DPs according to an embodiment of the present invention.

FIG. 52 is a view illustrating DPs according to an embodiment of the present invention.

As described above, data symbols of a signal frame may include a plurality of DPs. According to an embodiment of the present invention, the DPs may be divided into type 1 to type 3 according to mapping modes (or locating modes) in the signal frame.

FIG. 52(*a*) illustrates type1 DPs mapped to the data symbols of the signal frame, FIG. 52(*b*) illustrates type2 DPs mapped to the data symbols of the signal frame, and FIG. 52(*c*) illustrates type3 DPs mapped to the data symbols of the signal frame. FIGS. 52(*a*) to 52(*c*) illustrate only a data symbol portion of the signal frame, and a horizontal axis refers to a time axis while a vertical axis refers to a frequency axis. A description is now given of the type1 to type3 DPs.

As illustrated in FIG. 52(*a*), the type1 DPs refer to DPs mapped using TDM in the signal frame.

That is, when the type1 DPs are mapped to the signal frame, a frame structure module (or cell mapper) according to an embodiment of the present invention may map corresponding DP cells in a frequency axis direction. Specifically, the frame structure module (or cell mapper) according to an embodiment of the present invention may map cells of DP0 in a frequency axis direction and, if an OFDM symbol is completely filled, move to a next OFDM symbol to continuously map the cells of DP0 in a frequency axis direction. After the cells of DP0 are completely mapped, cells of DP1 and DP2 may also be mapped to the signal frame in the same manner. In this case, the frame structure module (or cell mapper) according to an embodiment of the present invention may map the cells with an arbitrary interval between DPs.

Since the cells of the type1 DPs are mapped with the highest density on the time axis, compared to other-type DPs, the type1 DPs may minimize an operation time of a receiver. Accordingly, the type1 DPs are appropriate to provide a corresponding service to a broadcast signal reception apparatus which should preferentially consider power saving, e.g., a handheld or portable device which operates using a battery.

As illustrated in FIG. 52(*b*), the type2 DPs refer to DPs mapped using frequency division multiplexing (FDM) in the signal frame.

That is, when the type2 DPs are mapped to the signal frame, the frame structure module (or cell mapper) according to an embodiment of the present invention may map corresponding DP cells in a time axis direction. Specifically, the frame structure module (or cell mapper) according to an embodiment of the present invention may preferentially map cells of DP0 on the time axis at a first frequency of an OFDM symbol. Then, if the cells of DP0 are mapped to the last OFDM symbol of the signal frame on the time axis, the frame structure module (or cell mapper) according to an embodiment of the present invention may continuously map the cells of DP0 in the same manner from a second frequency of a first OFDM symbol.

Since the cells of the type2 DPs are transmitted with the widest distribution in time, compared to other-type DPs, the type2 DPs are appropriate to achieve time diversity. However, since an operation time of a receiver to extract the type2 DPs is longer than that to extract the type1 DPs, the type2 DPs may not easily achieve power saving. Accordingly, the type2 DPs are appropriate to provide a corresponding service to a fixed broadcast signal reception apparatus which stably receives power supply.

Since cells of each type2 DP are concentrated on a specific frequency, a receiver in a frequency selective channel environment may have problem to receive a specific DP. Accordingly, after cell mapping, if frequency interleaving is applied on a symbol basis, frequency diversity may be additionally achieved and thus the above-described problem may be solved.

As illustrated in FIG. 52(*c*), the type3 DPs correspond to an intermediate form between the type1 DPs and the type2 DPs and refer to DPs mapped using time & frequency division multiplexing (TFDM) in the signal frame.

When the type3 DPs are mapped to the signal frame, the frame structure module (or cell mapper) according to an embodiment of the present invention may equally partition the signal frame, define each partition as a slot, and map cells of corresponding DPs in a time axis direction along the time axis only within the slot.

Specifically, the frame structure module (or cell mapper) according to an embodiment of the present invention may preferentially map cells of DP0 on the time axis at a first frequency of a first OFDM symbol. Then, if the cells of DP0 are mapped to the last OFDM symbol of the slot on the time axis, the frame structure module (or cell mapper) according to an embodiment of the present invention may continuously map the cells of DP0 in the same manner from a second frequency of the first OFDM symbol.

In this case, a trade-off between time diversity and power saving is possible according to the number and length of slots partitioned from the signal frame. For example, if the signal frame is partitioned into a small number of slots, the slots have a large length and thus time diversity may be achieved as in the type2 DPs. If the signal frame is partitioned into a large number of slots, the slots have a small length and thus power saving may be achieved as in the type1 DPs.

Figure 53:
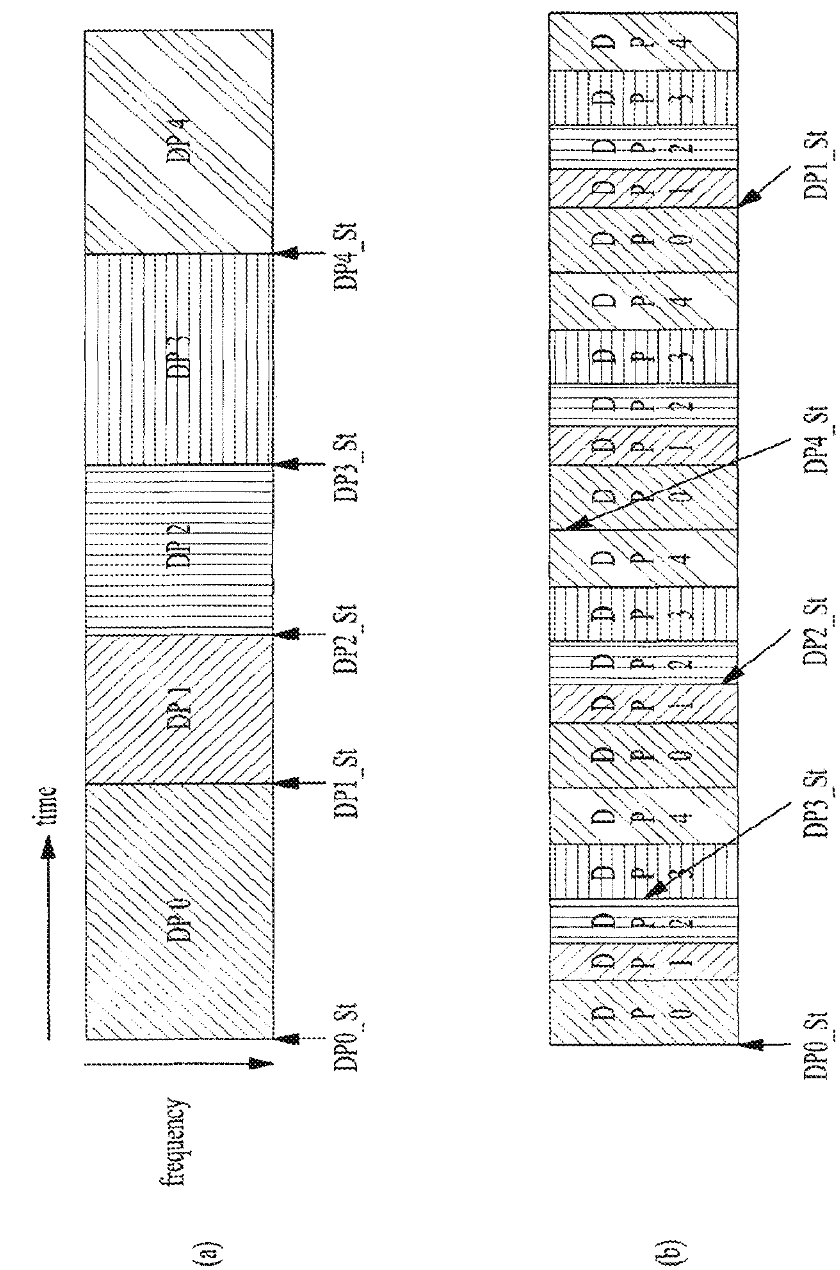
FIG. 53 is a view illustrating type1 DPs according to an embodiment of the present invention.

FIG. 53 is a view illustrating type1 DPs according to an embodiment of the present invention.

FIG. 53 illustrates an embodiment in which the type1 DPs are mapped to a signal frame according to the number of slots. Specifically, FIG. 53(*a*) shows a result of mapping the type1 DPs when the number of slots is 1, and FIG. 53(*b*) shows a result of mapping the type1 DPs when the number of slots is 4.

To extract cells of each DP mapped in the signal frame, the broadcast signal reception apparatus according to an embodiment of the present invention needs type information of each DP and signaling information, e.g., DP start address information indicating an address to which a first cell of each DP is mapped, and FEC block number information of each DP allocated to a signal frame.

Accordingly, as illustrated in FIG. 53(*a*), the broadcast signal transmission apparatus according to an embodiment of the present invention may transmit signaling information including DP start address information indicating an address to which a first cell of each DP is mapped (e.g., DP0_St, DP1_St, DP2_St, DP3_St, DP4_St), etc.

FIG. 53(*b*) shows a result of mapping the type1 DPs when the signal frame is partitioned into 4 slots. Cells of DPs mapped to each slot may be mapped in a frequency direction. As described above, if the number of slots is large, since cells corresponding to a DP are mapped and distributed with a certain interval, time diversity may be achieved. However, since the number of cells of a DP mapped to a single signal frame is not always divided by the number of slots, the number of cells of a DP mapped to each slot may vary. Accordingly, if a mapping rule is established in consideration of this, an address to which a first cell of each DP is mapped may be an arbitrary location in the signal frame. A detailed description of the mapping method will be given below. Further, when the signal frame is partitioned into a plurality of slots, the broadcast signal reception apparatus needs information indicating the number of slots to obtain cells of a corresponding DP. In the present invention, the information indicating the number of slots may be expressed as N_Slot. Accordingly, the number of slots of the signal frame of FIG. 53(*a*) may be expressed as N_Slot=1 and the number of slots of the signal frame of FIG. 53(*b*) may be expressed as N_Slot=4.

Figure 54:
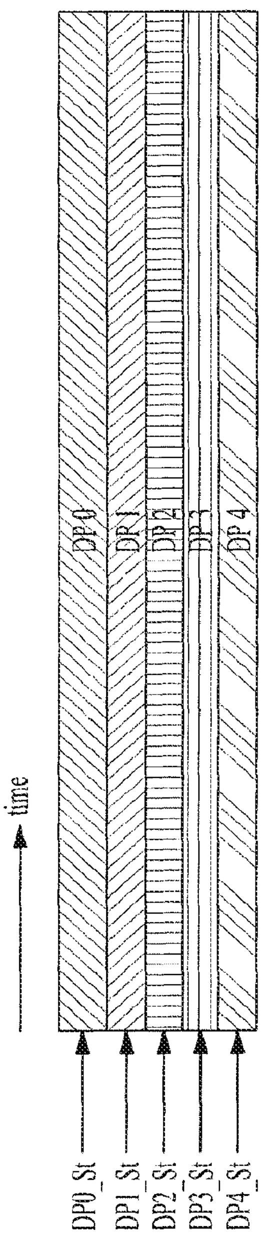
FIG. 54 is a view illustrating type2 DPs according to an embodiment of the present invention.

FIG. 54 is a view illustrating type2 DPs according to an embodiment of the present invention.

As described above, cells of a type2 DP are mapped in a time axis direction and, if the cells of the DP are mapped to the last OFDM symbol of a signal frame on a time axis, the cells of the DP may be continuously mapped in the same manner from a second frequency of a first OFDM symbol.

As described above in relation to FIG. 53, even in the case of the type2 DPs, to extract cells of each DP mapped in the signal frame, the broadcast signal reception apparatus according to an embodiment of the present invention needs type information of each DP and signaling information, e.g., DP start address information indicating an address to which a first cell of each DP is mapped, and FEC block number information of each DP allocated to a signal frame.

Accordingly, as illustrated in FIG. 54, the broadcast signal transmission apparatus according to an embodiment of the present invention may transmit DP start address information indicating an address to which a first cell of each DP is mapped (e.g., DP0_St, DP1_St, DP2_St, DP3_St, DP4_St). Further, FIG. 54 illustrates a case in which the number of slots is 1, and the number of slots of the signal frame of FIG. 54 may be expressed as N_Slot=1.

Figure 55:
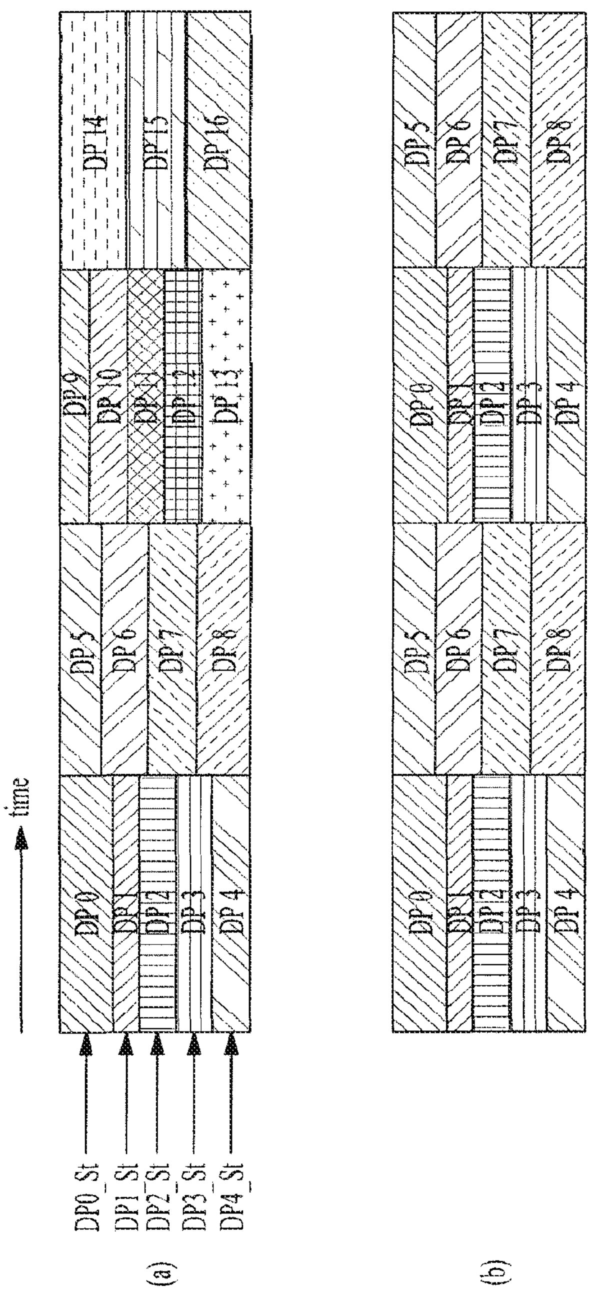
FIG. 55 is a view illustrating type3 DPs according to an embodiment of the present invention.

FIG. 55 is a view illustrating type3 DPs according to an embodiment of the present invention.

The type3 DPs refer to DPs mapped using TFDM in a signal frame as described above, and may be used when power saving is required while restricting or providing time diversity to a desired level. Like the type2 DPs, the type3 DPs may achieve frequency diversity by applying frequency interleaving on an OFDM symbol basis.

FIG. 55(*a*) illustrates a signal frame in a case when a DP is mapped to a slot, and FIG. 55(*b*) illustrates a signal frame in a case when a DP is mapped to two or more slots. Both FIGS. 55(*a*) and 55(*b*) illustrate a case in which the number of slots is 4, and the number of slots of the signal frame may be expressed as N_Slot=4.

Further, as illustrated in FIGS. 18 and 19, the broadcast signal transmission apparatus according to an embodiment of the present invention may transmit DP start address information indicating an address to which a first cell of each DP is mapped (e.g., DP0_St, DP1_St, DP2_St, DP3_St, DP4_St).

In FIG. 55(*b*), time diversity different from that achieved in FIG. 55(*a*) may be achieved. In this case, additional signaling information may be needed.

As described above in relation to FIGS. 18 to 20, the broadcast signal transmission apparatus according to an embodiment of the present invention may transmit signaling information including DP start address information indicating an address to which a first cell of each DP is mapped (e.g., DP0_St, DP1_St, DP2_St, DP3_St, DP4_St), etc. In this case, the broadcast signal transmission apparatus according to an embodiment of the present invention may transmit only the start address information of DP0 which is initially mapped, and transmit an offset value based on the start address information of DP0 for the other DPs. If the DPs are equally mapped, since mapping intervals of the DPs are the same, a receiver may achieve start locations of the DPs using information about a start location of an initial DP, and an offset value. Specifically, when the broadcast signal transmission apparatus according to an embodiment of the present invention transmits offset information having a certain size based on the start address information of DP0, the broadcast signal reception apparatus according to an embodiment of the present invention may calculate a start location of DP1 by adding the above-described offset information to the start address information of DP0. In the same manner, the broadcast signal reception apparatus according to an embodiment of the present invention may calculate a start location of DP2 by adding the above-described offset information twice to the start address information of DP0. If the DPs are not equally mapped, the broadcast signal transmission apparatus according to an embodiment of the present invention may transmit the start address information of DP0 and offset values (OFFSET 1, OFFSET 2, . . . ) indicating intervals of the other DPs based on the start location of DP0. In this case, the offset values may be the same or different. Further, the offset value(s) may be included and transmitted in PLS signaling information or in-band signaling information to be described below with reference to FIG. 68. This is variable according to the intention of a designer.

A description is now given of a method for mapping a DP using resource blocks (RBs) according to an embodiment of the present invention.

An RB is a certain unit block for mapping a DP and may be called a data mapping unit in the present invention. RB based resource allocation is advantageous in intuitively and easily processing DP scheduling and power saving control. According to an embodiment of the present invention, the name of the RB is variable according to the intention of a designer and the size of RB may be freely set within a range which does not cause a problem in bit-rate granularity.

The present invention may exemplarily describe a case in which the size of RB is a value obtained by multiplying or dividing the number of active carriers (NoA) capable of transmitting actual data in an OFDM symbol, by an integer. This is variable according to the intention of a designer. If the RB has a large size, resource allocation may be simplified. However, the size of RB indicates a minimum unit of an actually supportable bit rate and thus should be determined with appropriate consideration.

Figure 56:
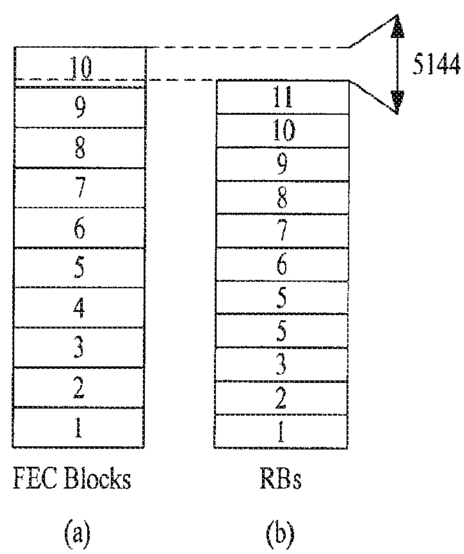
FIG. 56 is a view illustrating RBs according to an embodiment of the present invention.

FIG. 56 is a view illustrating RBs according to an embodiment of the present invention.

FIG. 56 illustrates an embodiment in which DP0 is mapped to a signal frame using RBs when the number of FEC blocks of DP0 is 10. A case in which the length of LDPC blocks is 64K and a QAM modulation value is 256QAM as transmission parameters of DP0, a FFT mode of the signal frame is 32K, and a scattered pilot pattern is PP32-2 (i.e., the interval of pilots delivering carriers is Dx=32, and the number of symbols included in a scattered pilot sequence is Dy=2) is described as an example. In this case, the size of FEC block corresponds to 8100 cells, and NoA can be assumed as 27584. Assuming that the size of RB is a value obtained by dividing NoA by 4, the size of RB corresponds to 6896 cells and may be expressed as L_RB=NoA/4.

In this case, when the size of FEC blocks and the size of RBs are compared on a cell basis, a relationship of the size of 10×FEC blocks=the size of 11×RBs+5144 cells is established. Accordingly, to map the 10 FEC blocks to a single signal frame on an RB basis, the frame structure module (or cell mapper) according to an embodiment of the present invention may map data of the 10 FEC blocks sequentially to the 11 RBs to map the 11 RBs to a current signal frame, and map the remaining data corresponding to the 5144 cells to a next signal frame together with next FEC blocks.

Figure 57:
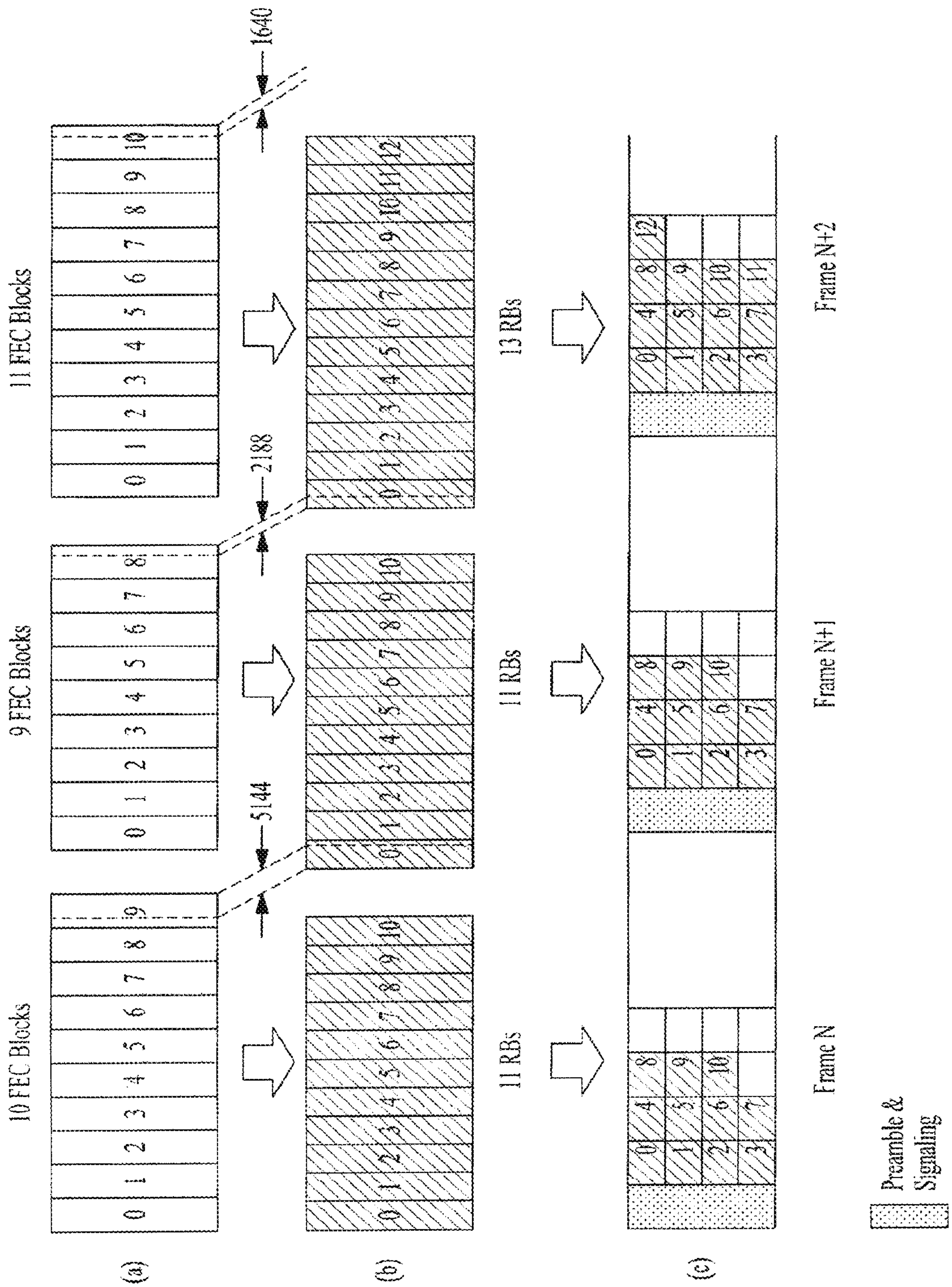
FIG. 57 is a view illustrating a procedure for mapping RBs to frames according to an embodiment of the present invention.

FIG. 57 is a view illustrating a procedure for mapping RBs to frames according to an embodiment of the present invention.

Specifically, FIG. 57 illustrates a case in which contiguous signal frames are transmitted.

When a variable bit rate is supported, each signal frame may have a different number of FEC blocks transmittable therein.

FIG. 57(*a*) illustrates a case in which the number of FEC blocks to be transmitted in signal frame N is 10, a case in which the number of FEC blocks to be transmitted in signal frame N+1 is 9, and a case in which the number of FEC blocks to be transmitted in signal frame N+2 is 11.

FIG. 57(*b*) illustrates a case in which the number of RB to be mapped to signal frame N is 11, a case in which the number of RB to be mapped to signal frame N+1 is 11, and a case in which the number of RB to be mapped to signal frame N+2 is 13.

FIG. 57(*c*) shows a result of mapping the RBs to signal frame N, signal frame N+1 and signal frame N+2.

As illustrated in FIGS. 22(*a*) and 22(*b*), when the number of FEC blocks to be transmitted in signal frame N is 10, since the size of 10 FEC blocks equals to a value obtained by adding 5144 cells to the size of 11 RBs, the 11 RBs may be mapped to and transmitted in signal frame N as illustrated in FIG. 57(*c*).

In addition, as illustrated in the center of FIG. 57(*b*), the remaining 5144 cells form an initial part of a first RB among 11 RBs to be mapped to signal frame N+1. Accordingly, since a relationship of 5144 cells+the size of 9 FEC blocks=the size of 11 RBs+2188 cells is established, 11 RBs are mapped to and transmitted in signal frame N+1 and the remaining 2188 cells form an initial part of a first RB among 13 RBs to be mapped to signal frame N+2. In the same manner, since a relationship of 2188 cells+the size of 11 FEC blocks=the size of 13 RBs+1640 cells is established, 13 RBs are mapped to and transmitted in signal frame N+2 and the remaining 1640 cells are mapped to and transmitted in a next signal frame. The size of FEC blocks is not the same as the size of NoA and thus dummy cells can be inserted. However, according to the method illustrated in FIG. 57, there is no need to insert dummy cells and thus actual data may be more efficiently transmitted. Further, time interleaving or processing similar thereto may be performed on RBs to be mapped to a signal frame before the RBs are mapped to the signal frame and This is variable according to the intention of a designer.

A description is now given of a method of mapping DPs to a signal frame on an RB basis according to the above-described types of the DPs.

Specifically, in the present invention, the RB mapping method is described by separating a case in which a plurality of DPs are allocated to all available RBs in a signal frame from a case in which the DPs are allocated to only some RBs. The present invention may exemplarily describe a case in which the number of DPs is 3, the number of RBs in a signal frame is 80, and the size of RB is a value obtained by dividing NoA by 4. This case may be expressed as follows.

Number of DPs, N_DP=3

Number of RBs in a signal frame, N_RB=80

Size of RB, L_RB=NoA/4

Further, the present invention may exemplarily describe a case in which DP0 fills 31 RBs, DP1 fills 15 RBs, and DP2 fills 34 RBs, as the case in which a plurality of DPs (DP0, DP1, DP2) are allocated to available RBs in a signal frame. This case may be expressed as follows.

{DP0, DP1, DP2}={31,15,34}

In addition, the present invention may exemplarily describe a case in which DP0 fills 7 RBs, DP1 fills 5 RBs, and DP2 fills 6 RBs, as the case in which a plurality of DPs (DP0, DP1, DP2) are allocated to only some RBs in a signal frame. This case may be expressed as follows.

{DP0, DP1, DP2}={7,5,6}

FIGS. 23 to 25 illustrate RB mapping according to the types of DPs.

The present invention may exemplarily define the following values to describe an RB mapping rule according to the type of each DP.

L_Frame: Number of OFDM symbols in a signal frame

N_Slot: Number of slots in a signal frame

L_Slot: Number of OFDM symbols in a slot

N_RB_Sym: Number of RBs in an OFDM symbol

N_RB: Number of RBs in a signal frame

Figure 58:
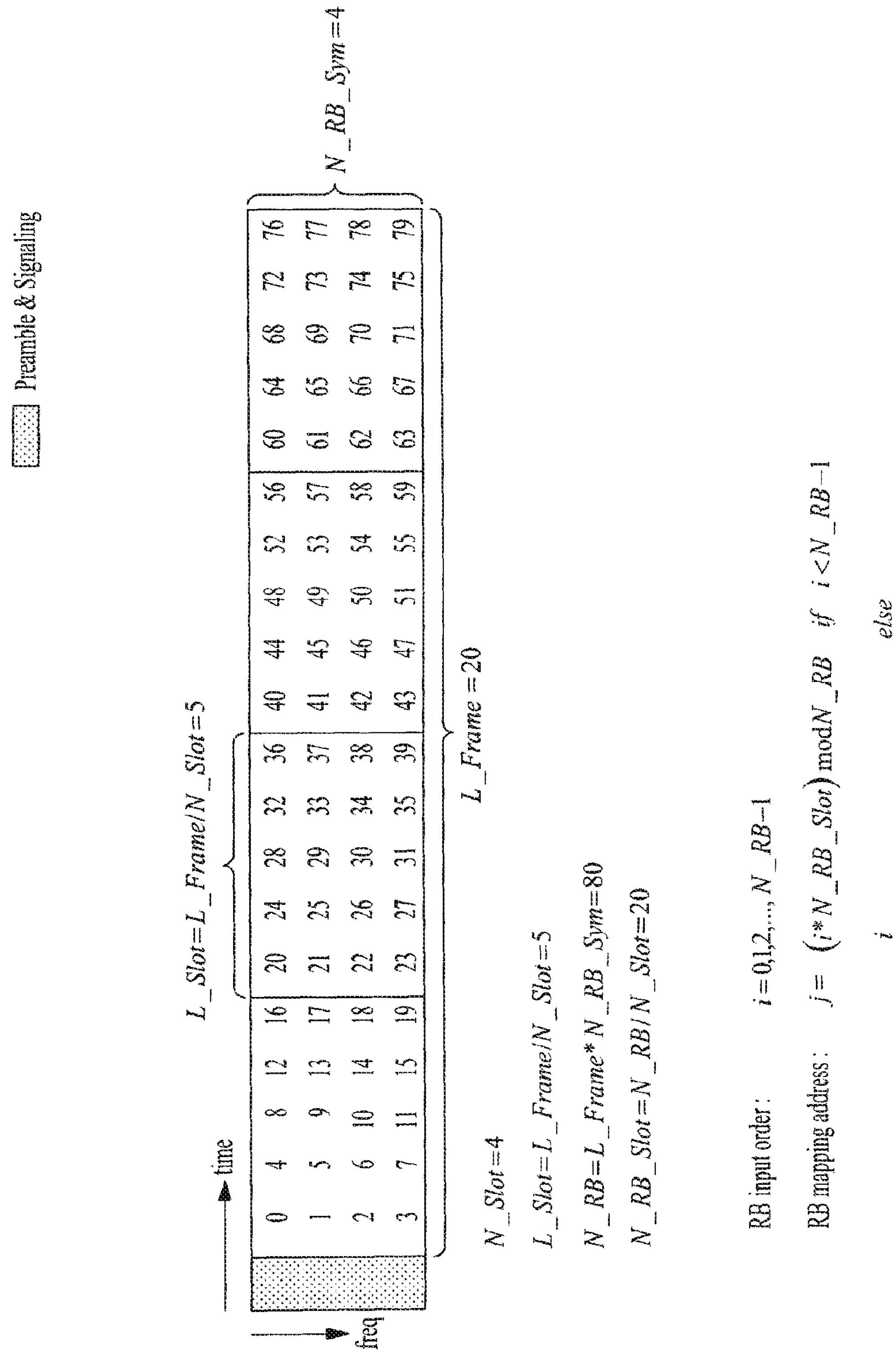
FIG. 58 is a view illustrating RB mapping of type1 DPs according to an embodiment of the present invention.

FIG. 58 is a view illustrating RB mapping of type1 DPs according to an embodiment of the present invention.

FIG. 58 illustrates a single signal frame, and a horizontal axis refers to a time axis while a vertical axis refers to a frequency axis. A colored block located at the very front of the signal frame on the time axis corresponds to a preamble and signaling portion. As described above, according to an embodiment of the present invention, a plurality of DPs may be mapped to a data symbol portion of the signal frame on a RB basis.

The signal frame illustrated in FIG. 58 consists of 20 OFMD symbols (L_Frame=20) and includes 4 slots (N_Slot=4). Further, each slot includes 5 OFDM symbols (L_Slot=5) and each OFDM symbol is equally partitioned into 4 RBs (N_RB_Sym=4). Accordingly, a total number of RBs in the signal frame is L_Frame*N_RB_Sym which corresponds to 80.

Numerals indicated in the signal frame of FIG. 58 refer to the order of allocating RBs in the signal frame. Since the type1 DPs are sequentially mapped in a frequency axis direction, it can be noted that the order of allocating RBs is sequentially increased on the frequency axis. If the order of allocating RBs is determined, corresponding DPs may be mapped to ultimately allocated RBs in the order of time. Assuming that an address to which each RB is actually mapped in the signal frame (i.e., RB mapping address) is j, j may have a value from 0 to N_RB−1. In this case, if an RB input order is defined as i, i may have a value of 0, 1, 2, . . . , N_RB−1 as illustrated in FIG. 58. If N_Slot=1, since the RB mapping address and the RB input order are the same (j=i), input RBs may be sequentially mapped in ascending order of j. If N_Slot>1, RBs to be mapped to the signal frame may be partitioned and mapped according to the number of slots, N_Slot. In this case, the RBs may be mapped according to a mapping rule expressed as an equation illustrated at the bottom of FIG. 58.

Figure 59:
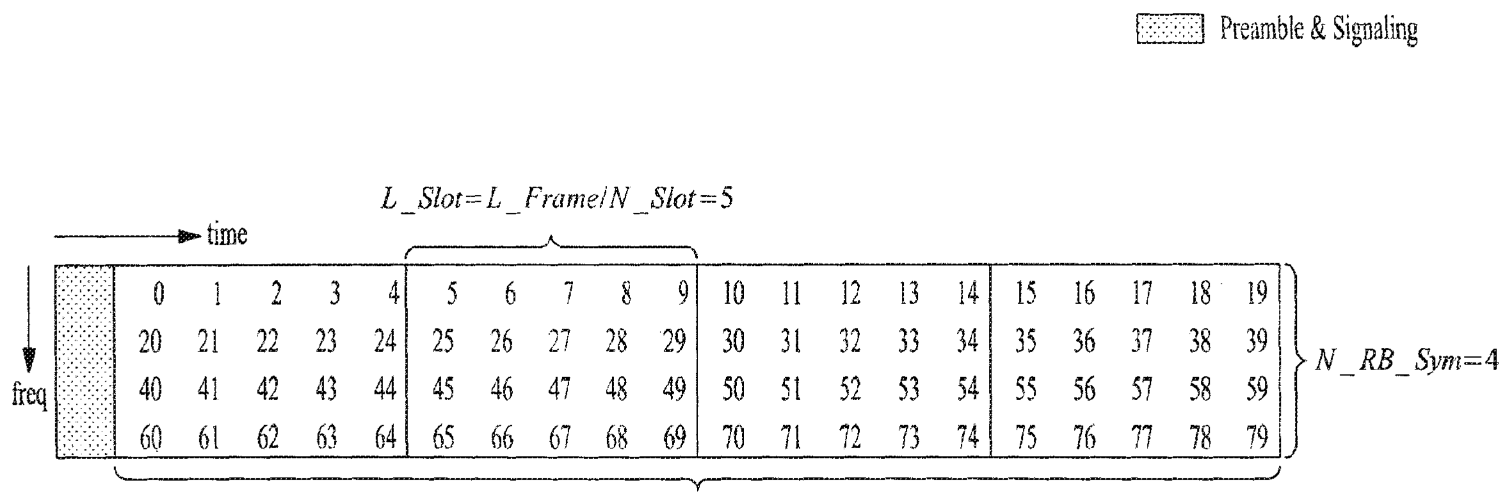
FIG. 59 is a view illustrating RB mapping of type2 DPs according to an embodiment of the present invention.

FIG. 59 is a view illustrating RB mapping of type2 DPs according to an embodiment of the present invention.

Like the signal frame illustrated in FIG. 58, a signal frame illustrated in FIG. 59 consists of 20 OFMD symbols (L_Frame=20) and includes 4 slots (N_Slot=4). Further, each slot includes 5 OFDM symbols (L_Slot=5) and each OFDM symbol is equally partitioned into 4 RBs (N_RB_Sym=4). Accordingly, a total number of RBs in the signal frame is L_Frame*N_RB_Sym which corresponds to 80.

As described above in relation to FIG. 58, assuming that an address to which each RB is actually mapped in the signal frame (i.e., RB mapping address) is j, j may have a value from 0 to N_RB−1. Since the type2 DPs are sequentially mapped in a time axis direction, it can be noted that the order of allocating RBs is sequentially increased in a time axis direction. If the order of allocating RBs is determined, corresponding DPs may be mapped to ultimately allocated RBs in the order of time.

As described above in relation to FIG. 58, when an RB input order is defined as i, if N_Slot=1, since j=i, input RBs may be sequentially mapped in ascending order of j. If N_Slot>1, RBs to be mapped to the signal frame may be partitioned and mapped according to the number of slots, N_Slot. In this case, the RBs may be mapped according to a mapping rule expressed as an equation illustrated at the bottom of FIG. 59.

The equations illustrated in FIGS. 58 and 59 to express the mapping rules have no difference according to the types of DPs. However, since the type1 DPs are mapped in a frequency axis direction while the type2 DPs are mapped in a time axis direction, different RB mapping results are achieved due to the difference in mapping direction.

Figure 60:
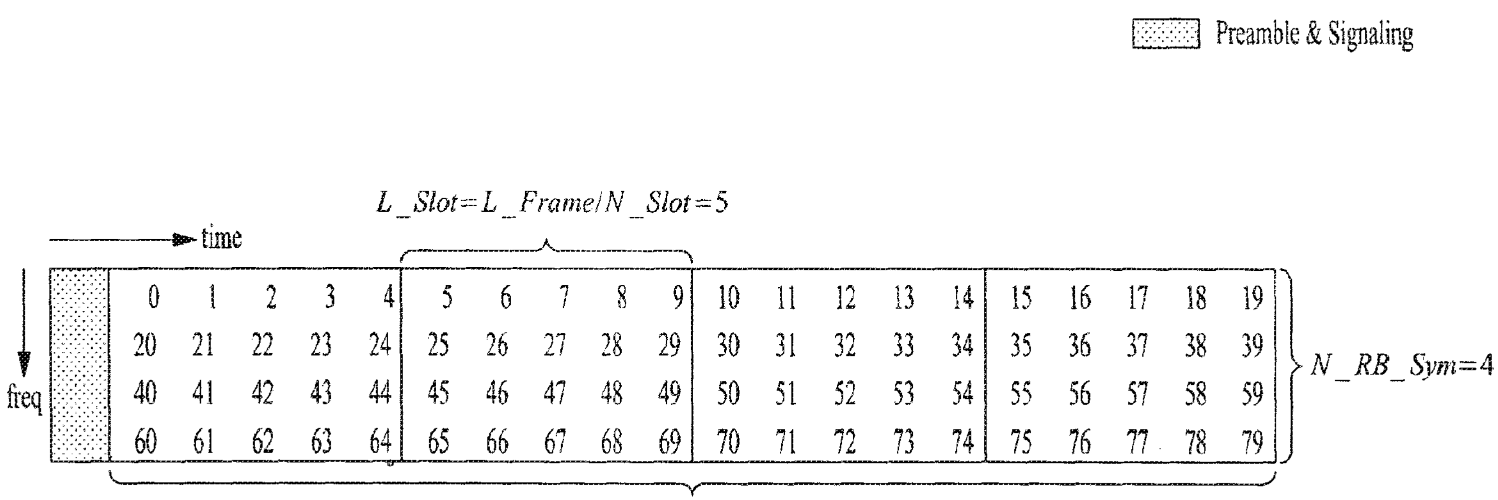
FIG. 60 is a view illustrating RB mapping of type3 DPs according to an embodiment of the present invention.

FIG. 60 is a view illustrating RB mapping of type3 DPs according to an embodiment of the present invention.

Like the signal frames illustrated in FIGS. 23 and 24, a signal frame illustrated in FIG. 60 consists of 20 OFMD symbols (L_Frame=20) and includes 4 slots (N_Slot=4). Further, each slot includes 5 OFDM symbols (L_Slot=5) and each OFDM symbol is equally partitioned into 4 RBs (N_RB_Sym=4). Accordingly, a total number of RBs in the signal frame is L_Frame*N_RB_Sym which corresponds to 80.

An RB mapping address of the type3 DPs may be calculated according to an equation illustrated at the bottom of FIG. 60. That is, if N_Slot=1, the RB mapping address of the type3 DPs is the same as the RB mapping address of the type2 DPs. The type2 and type3 DPs are the same in that they are sequentially mapped in a time axis direction but are different in that the type2 DPs are mapped to the end of a first frequency of the signal frame and then continuously mapped from a second frequency of a first OFDM symbol while the type3 DPs are mapped to the end of a first frequency of a slot and then continuously mapped from a second frequency of a first OFDM symbol of the slot in a time axis direction. Due to this difference, when the type3 DPs are used, time diversity may be restricted by L_Slot and power saving may be achieved on L_Slot basis.

Figure 61:
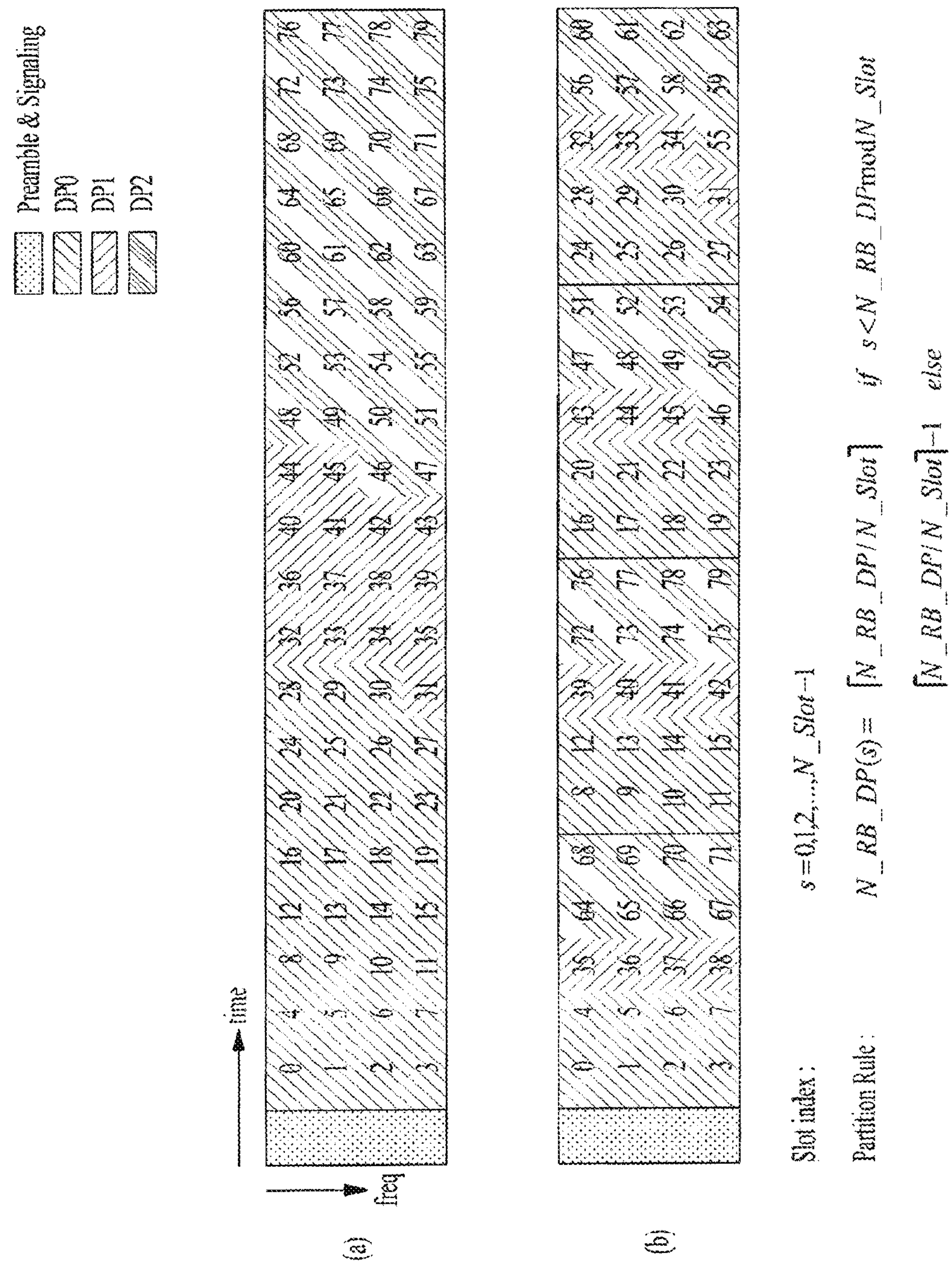
FIG. 61 is a view illustrating RB mapping of type1 DPs according to another embodiment of the present invention.

FIG. 61 is a view illustrating RB mapping of type1 DPs according to another embodiment of the present invention.

FIG. 61(*a*) illustrates an RB mapping order in a case when type1 DP0, DP1 and DP2 are allocated to available RBs in a signal frame, and FIG. 61(*b*) illustrates an RB mapping order in a case when each of type1 DP0, DP1 and DP2 is partitioned and allocated to RBs included in different slots in a signal frame. Numerals indicated in the signal frame refer to the order of allocating RBs. If the order of allocating RBs is determined, corresponding DPs may be mapped to ultimately allocated RBs in the order of time.

FIG. 61(*a*) illustrates an RB mapping order in a case when N_Slot=1 and {DP0, DP1, DP2}={31,15,34}.

Specifically, DP0 may be mapped to RBs in a frequency axis direction according to the order of the RBs and, if an OFDM symbol is completely filled, move to a next OFDM symbol on the time axis to be continuously mapped in a frequency axis direction. Accordingly, if DP0 is mapped to RB0 to RB30, DP1 may be continuously mapped to RB31 to RB45 and DP2 may be mapped to RB46 to RB79.

To extract RBs to which a corresponding DP is mapped, the broadcast signal reception apparatus according to an embodiment of the present invention needs type information of each DP (DP_Type) and the number of equally partitioned slots (N_Slot), and needs signaling information including DP start address information of each DP (DP_RB_St), FEC block number information of each DP to be mapped to a signal frame (DP_N_Block), start address information of an FEC block mapped in a first RB (DP_FEC_St), etc.

Accordingly, the broadcast signal transmission apparatus according to an embodiment of the present invention may also transmit the above-described signaling information.

FIG. 61(*b*) illustrates an RB mapping order in a case when N_Slot=4 and {DP0, DP1, DP2}={31,15,34}.

Specifically, FIG. 61(*b*) shows a result of partitioning DP0, DP1 and DP2 and then sequentially mapping the partitions of each DP to slots on an RB basis in the same manner as the case in which N_Slot=1. An equation expressing a rule for partitioning RBs of each DP is illustrated at the bottom of FIG. 61. In the equation illustrated in FIG. 61, parameters s, N_RB_DP and N_RB_DP(s) may be defined as follows.

s: Slot index, s=0, 1, 2, . . . , N_Slot−1

N_RB_DP: Number of RBs of a DP to be mapped to a signal frame

N_RB_DP(s): Number of RBs of a DP to be mapped to a slot of slot index s

According to an embodiment of the present invention, since N_RB_DP=31 for DP0, according to the equation illustrated in FIG. 61, the number of RBs of DP0 to be mapped to a first slot may be N_RB_DP(0)=8, the number of RBs of DP0 to be mapped to a second slot may be N_RB_DP(1)=8, the number of RBs of DP0 to be mapped to a third slot may be N_RB_DP(2)=8, and the number of RBs of DP0 to be mapped to a fourth slot may be N_RB_DP(3)=7. In the present invention, the numbers of RBs of DP0 partitioned to be mapped to the slots may be expressed as {8,8,8,7}.

In the same manner, DP1 may be partitioned into {4,4,4,3} and DP2 may be partitioned into {9,9,8,8}.

The RBs of each partition of a DP may be sequentially mapped in each slot using the method of the above-described case in which N_Slot=1. In this case, to equally fill all slots, the partitions of each DP may be sequentially mapped from a slot having a smaller slot index s among slots to which a smaller number of RBs of other DPs are allocated.

In the case of DP1, since RBs of DP0 are partitioned into {8,8,8,7} and mapped to the slots in the order of s=0, 1, 2, 3, it can be noted that the smallest number of RBs of DP0 are mapped to the slot having a slot index s=3. Accordingly, RBs of DP1 may be partitioned into {4,4,4,3} and mapped to the slots in the order of s=3, 0, 1, 2. In the same manner, since the smallest number of RBs of DP0 and DP1 are allocated to slots having slot index s=2 and 3 but s=2 is smaller, RBs of DP2 may be partitioned into {9,9,8,8} and mapped to the slots in the order of s=2, 3, 0, 1.

Figure 62:
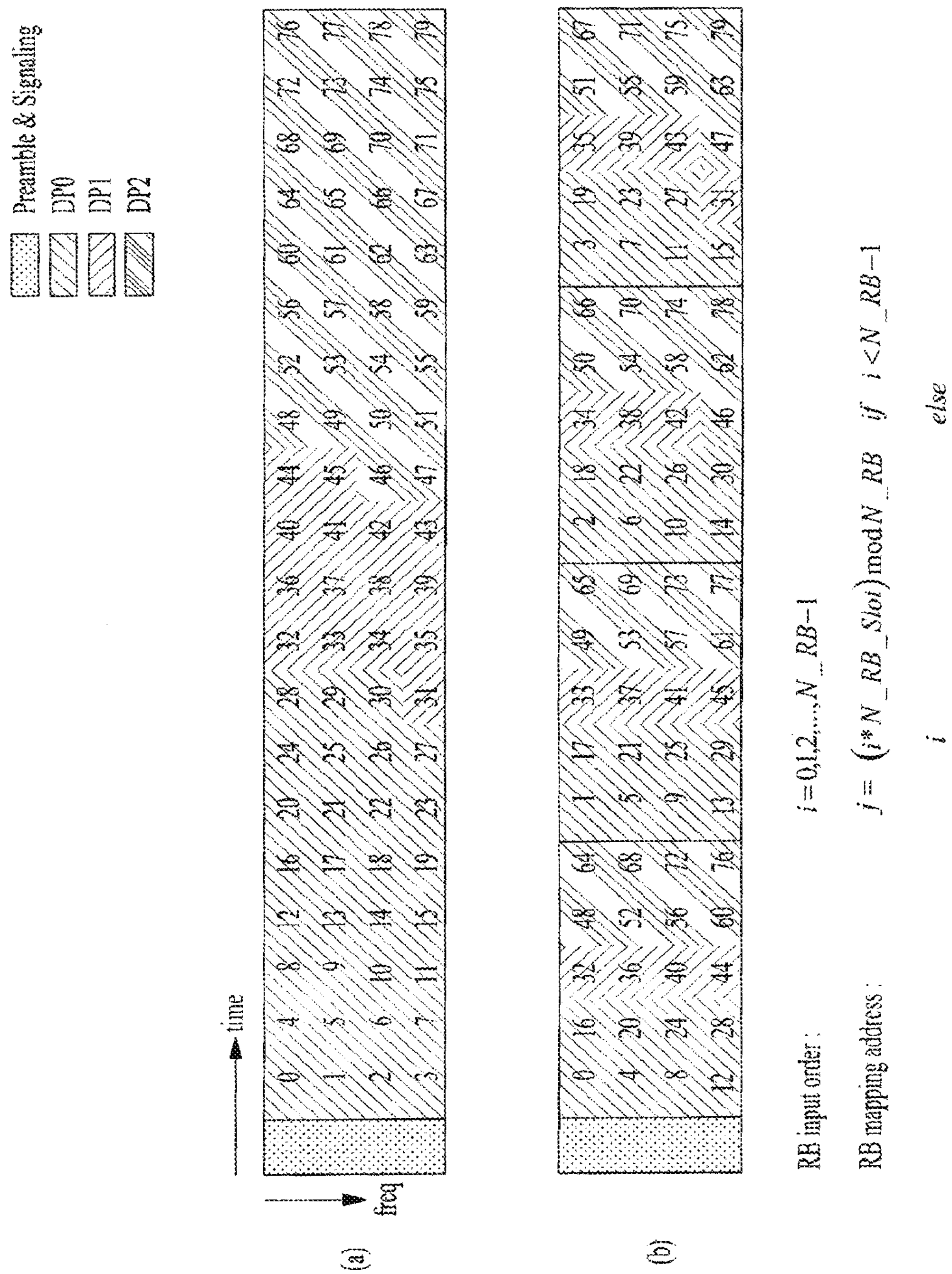
FIG. 62 is a view illustrating RB mapping of type1 DPs according to another embodiment of the present invention.

FIG. 62 is a view illustrating RB mapping of type1 DPs according to another embodiment of the present invention.

FIG. 62 illustrates an embodiment in which the above-described RB mapping address of the type1 DPs is equally applied. An equation expressing the above-described RB mapping address is illustrated at the bottom of FIG. 62. Although a mapping method and procedure in FIG. 62 are different from those described above in relation to FIG. 61, since mapping results thereof are the same, the same mapping characteristics may be achieved. According to the mapping method of FIG. 62, RB mapping may be performed using a single equation irrespective of the value of N_Slot.

Figure 63:
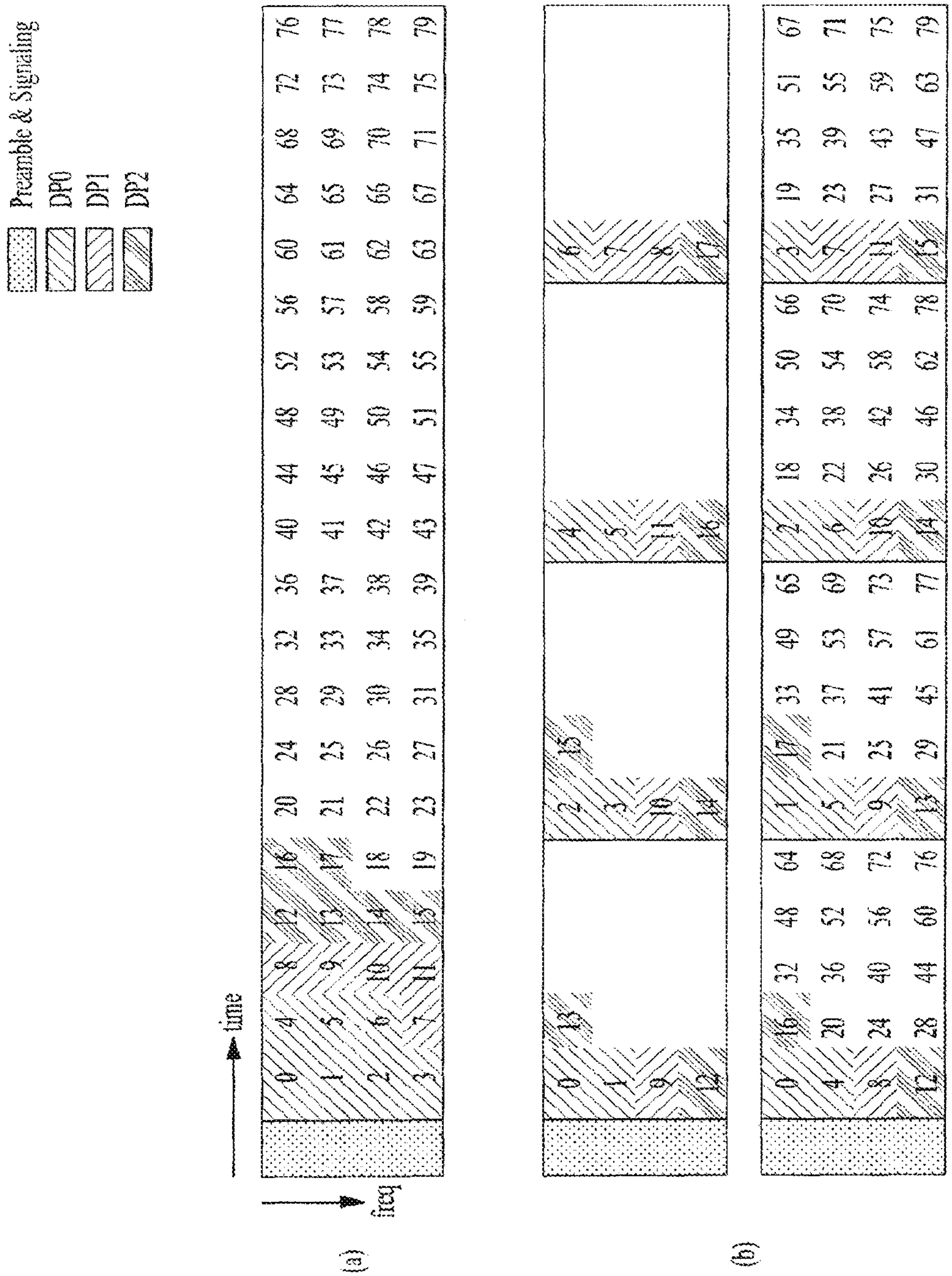
FIG. 63 is a view illustrating RB mapping of type1 DPs according to another embodiment of the present invention.

FIG. 63 is a view illustrating RB mapping of type1 DPs according to another embodiment of the present invention.

FIG. 63(*a*) illustrates an RB mapping order in a case when type1 DP0, DP1 and DP2 are allocated to only some RBs in a signal frame, and FIG. 63(*b*) illustrates an RB mapping order in a case when each of type1 DP0, DP1 and DP2 is partitioned and allocated to only some RBs included in different slots in a signal frame. Numerals indicated in the signal frame refer to the order of allocating RBs. If the order of allocating RBs is determined, corresponding DPs may be mapped to ultimately allocated RBs in the order of time.

FIG. 63(*a*) illustrates an RB mapping order in a case when N_Slot=1 and {DP0, DP1, DP2}={7,5,6}.

Specifically, DP0 may be mapped to RBs in a frequency axis direction according to the order of the RBs and, if an OFDM symbol is completely filled, move to a next OFDM symbol on the time axis to be continuously mapped in a frequency axis direction. Accordingly, if DP0 is mapped to RB0 to RB6, DP1 may be continuously mapped to RB7 to RB11 and DP2 may be mapped to RB12 to RB17.

FIG. 63(*b*) illustrates an RB mapping order in a case when N_Slot=4 and {DP0, DP1, DP2}={7,5,6}.

FIG. 63(*b*) illustrates embodiments in which RBs of each DP are partitioned according to the RB partitioning rule described above in relation to FIG. 61 and are mapped to a signal frame. Detailed procedures thereof have been described above and thus are not described here.

Figure 64:
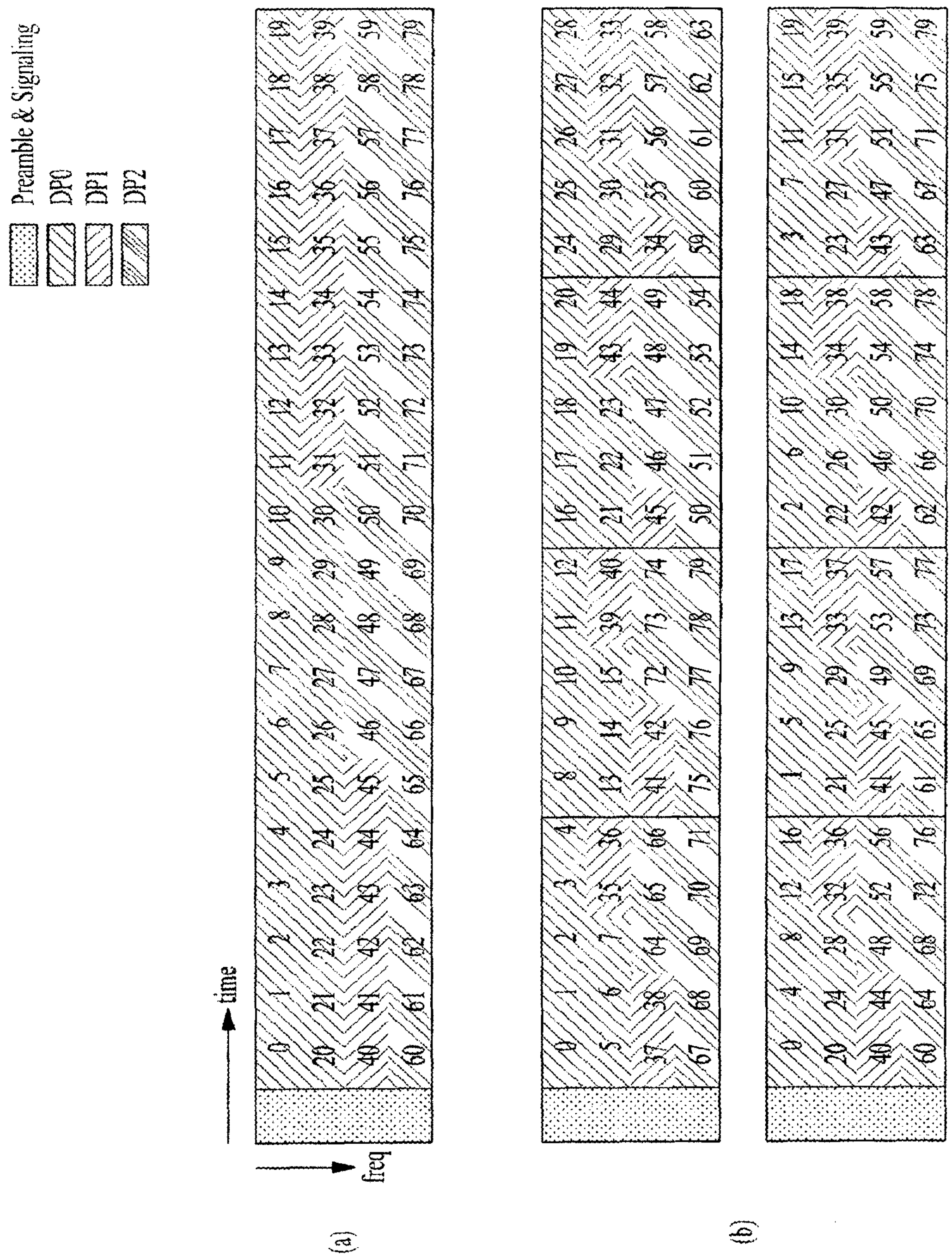
FIG. 64 is a view illustrating RB mapping of type2 DPs according to another embodiment of the present invention.

FIG. 64 is a view illustrating RB mapping of type2 DPs according to another embodiment of the present invention.

FIG. 64(*a*) illustrates an RB mapping order in a case when type2 DP0, DP1 and DP2 are allocated to available RBs in a signal frame, and FIG. 64(*b*) illustrates an RB mapping order in a case when each of type2 DP0, DP1 and DP2 is partitioned and allocated to RBs included in different slots in a signal frame. Numerals indicated in the signal frame refer to the order of allocating RBs. If the order of allocating RBs is determined, corresponding DPs may be mapped to ultimately allocated RBs in the order of time.

FIG. 64(*a*) illustrates an RB mapping order in a case when N_Slot=1 and {DP0, DP1, DP2}={31,15,34}.

Since RBs of type2 DPs are mapped to the end of a first frequency of the signal frame and then continuously mapped from a second frequency of a first OFDM symbol, time diversity may be achieved. Accordingly, if DP0 is mapped to RB0 to RB19 on a time axis and then continuously mapped to RB20 to RB30 of the second frequency, DP1 may be mapped to RB31 to RB45 in the same manner and DP2 may be mapped to RB46 to RB79.

To extract RBs to which a corresponding DP is mapped, the broadcast signal reception apparatus according to an embodiment of the present invention needs type information of each DP (DP_Type) and the number of equally partitioned slots (N_Slot), and needs signaling information including DP start address information of each DP (DP_RB_St), FEC block number information of each DP to be mapped to a signal frame (DP_N_Block), start address information of an FEC block mapped in a first RB (DP_FEC_St), etc.

Accordingly, the broadcast signal transmission apparatus according to an embodiment of the present invention may also transmit the above-described signaling information.

FIG. 64(*b*) illustrates an RB mapping order in a case when N_Slot=4 and {DP0, DP1, DP2}={31,15,34}.

A first signal frame of FIG. 64(*b*) shows a result of performing RB mapping according to the RB partitioning rule described above in relation to FIG. 61, and a second signal frame of FIG. 64(*b*) shows a result of performing RB mapping by equally applying the above-described RB mapping address of the type2 DPs. Although mapping methods and procedures of the above two cases are different, since mapping results thereof are the same, the same mapping characteristics may be achieved. In this case, RB mapping may be performed using a single equation irrespective of the value of N_Slot.

Figure 65:
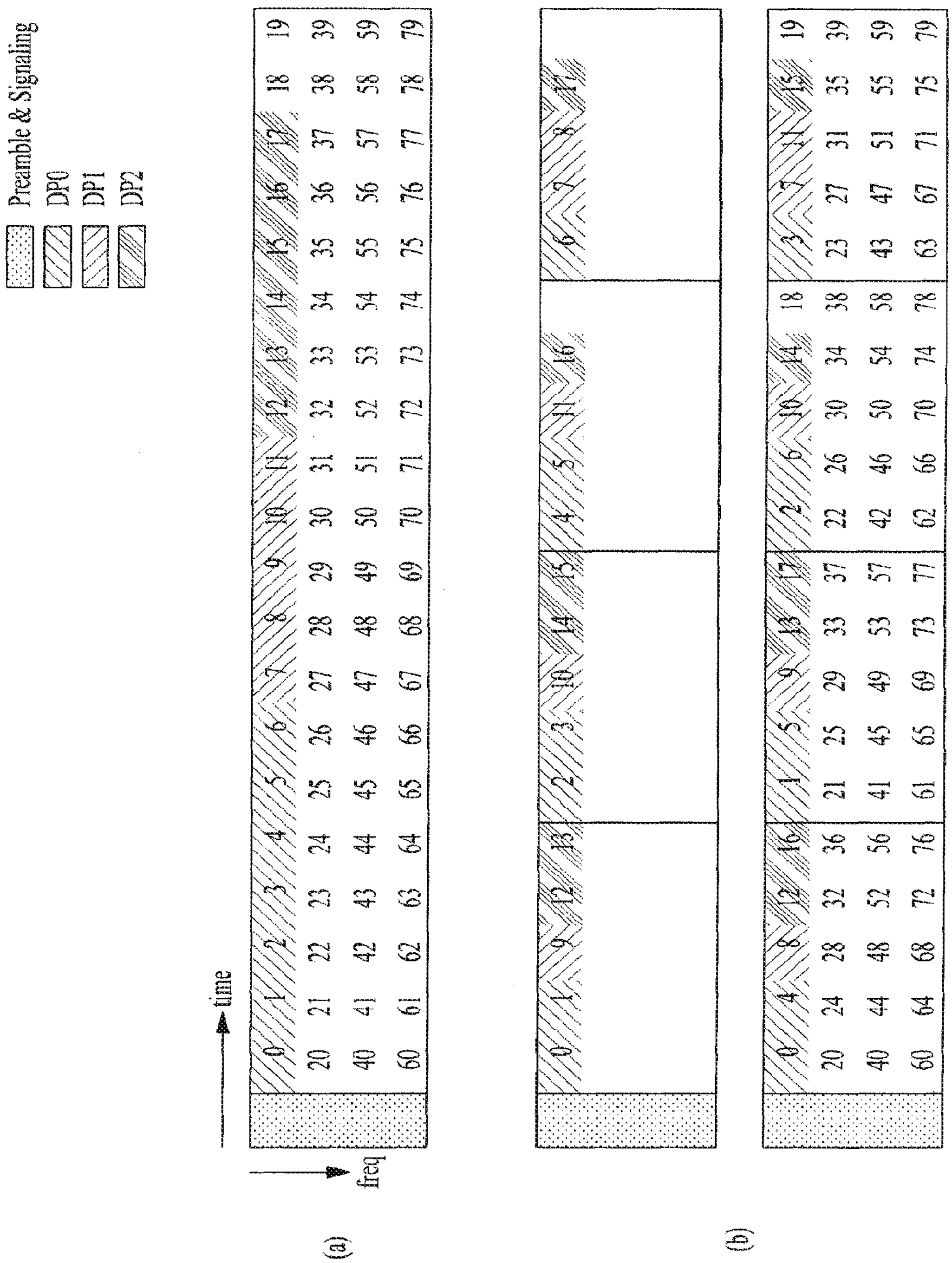
FIG. 65 is a view illustrating RB mapping of type2 DPs according to another embodiment of the present invention.

FIG. 65 is a view illustrating RB mapping of type2 DPs according to another embodiment of the present invention.

FIG. 65(*a*) illustrates an RB mapping order in a case when type2 DP0, DP1 and DP2 are allocated to only some RBs in a signal frame, and FIG. 65(*b*) illustrates an RB mapping order in a case when each of type2 DP0, DP1 and DP2 is partitioned and allocated to only some RBs included in different slots in a signal frame. Numerals indicated in the signal frame refer to the order of allocating RBs. If the order of allocating RBs is determined, corresponding DPs may be mapped to ultimately allocated RBs in the order of time.

FIG. 65(*a*) illustrates an RB mapping order in a case when N_Slot=1 and {DP0, DP1, DP2}={7,5,6}.

Specifically, DP0 may be mapped to RBs in a time axis direction according to the order of the RBs and, if DP0 is mapped to RB0 to RB6, DP1 may be continuously mapped to RB7 to RB11 and DP2 may be mapped to RB12 to RB17.

FIG. 65(*b*) illustrates an RB mapping order in a case when N_Slot=4 and {DP0, DP1, DP2}={7,5,6}.

FIG. 65(*b*) illustrates embodiments in which RBs of each DP are partitioned according to the RB partitioning rule described above in relation to FIG. 61 and are mapped to a signal frame. Detailed procedures thereof have been described above and thus are not described here.

Figure 66:
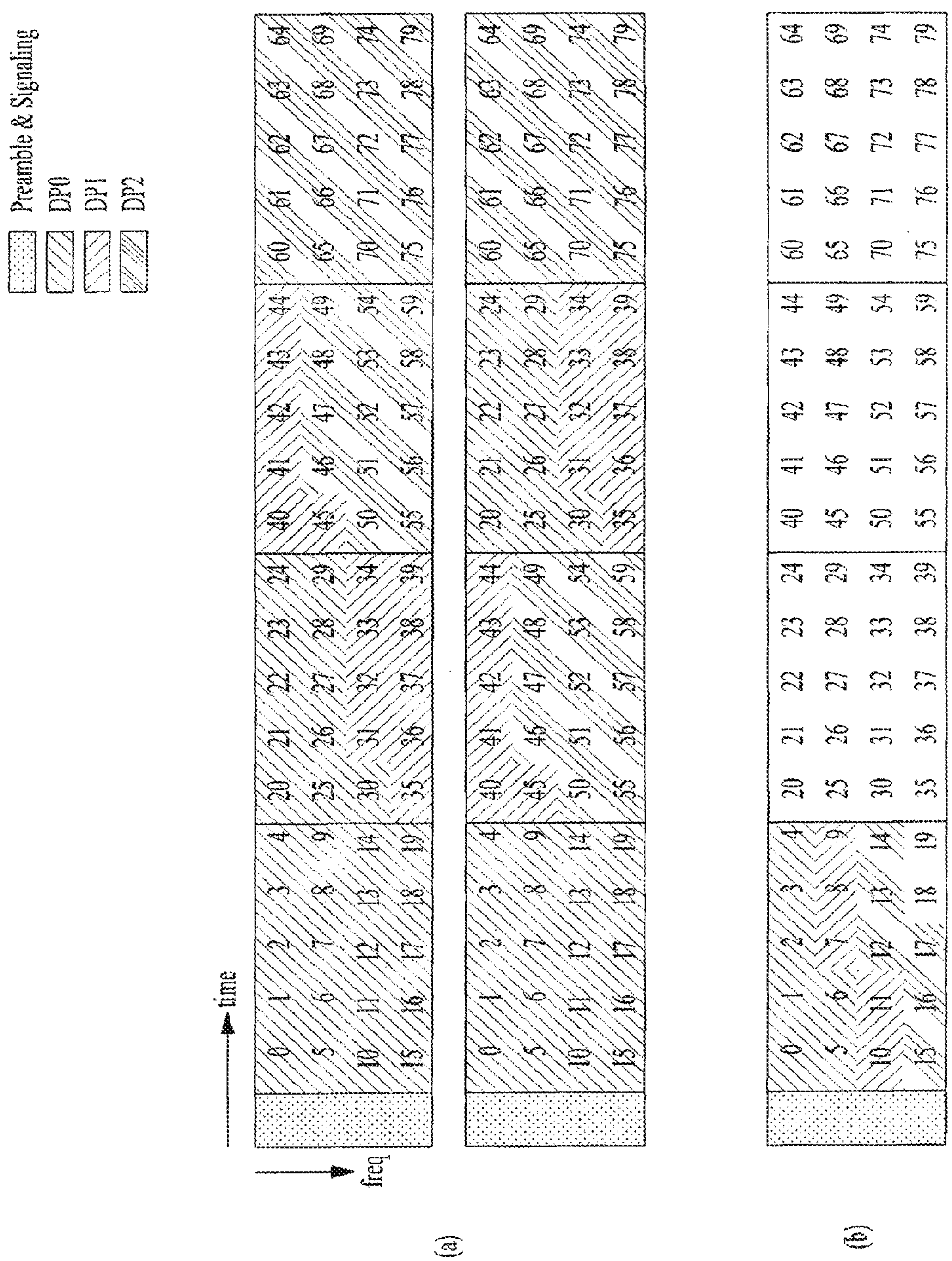
FIG. 66 is a view illustrating RB mapping of type3 DPs according to another embodiment of the present invention.

FIG. 66 is a view illustrating RB mapping of type3 DPs according to another embodiment of the present invention.

FIG. 66(*a*) illustrates an RB mapping order in a case when each of type3 DP0, DP1 and DP2 is partitioned and allocated to RBs included in different slots in a signal frame, and FIG. 66(*b*) illustrates an RB mapping order in a case when each of type3 DP0, DP1 and DP2 is partitioned and allocated to only some RBs included in a slot in a signal frame. Numerals indicated in the signal frame refer to the order of allocating RBs. If the order of allocating RBs is determined, corresponding DPs may be mapped to ultimately allocated RBs in the order of time.

FIG. 66(*a*) illustrates an RB mapping order in a case when N_Slot=4 and {DP0, DP1, DP2}={31,15,34}.

A first signal frame of FIG. 66(*a*) illustrates an embodiment in which the above-described RB mapping address of the type3 DPs is equally applied. A second signal frame of FIG. 66(*a*) illustrates an embodiment in which, when the number of RBs of a DP is greater than that of a slot, time diversity is achieved by changing a slot allocation order. Specifically, the second signal frame of FIG. 66(*a*) corresponds to an embodiment in which, when the number of RBs of DP0 allocated to a first slot of the first signal frame is greater than that of the first slot, the remaining RBs of DP0 are allocated to a third slot.

FIG. 66(*b*) illustrates an RB mapping order in a case when N_Slot=4 and {DP0, DP1, DP2}={7,5,6}.

Further, to extract RBs to which a corresponding DP is mapped, the broadcast signal reception apparatus according to an embodiment of the present invention needs type information of each DP (DP_Type) and the number of equally partitioned slots (N_Slot), and needs signaling information including DP start address information of each DP (DP_RB_St), FEC block number information of each DP to be mapped to a signal frame (DP_N_Block), start address information of an FEC block mapped in a first RB (DP_FEC_St), etc.

Accordingly, the broadcast signal transmission apparatus according to an embodiment of the present invention may also transmit the above-described signaling information.

Figure 67:
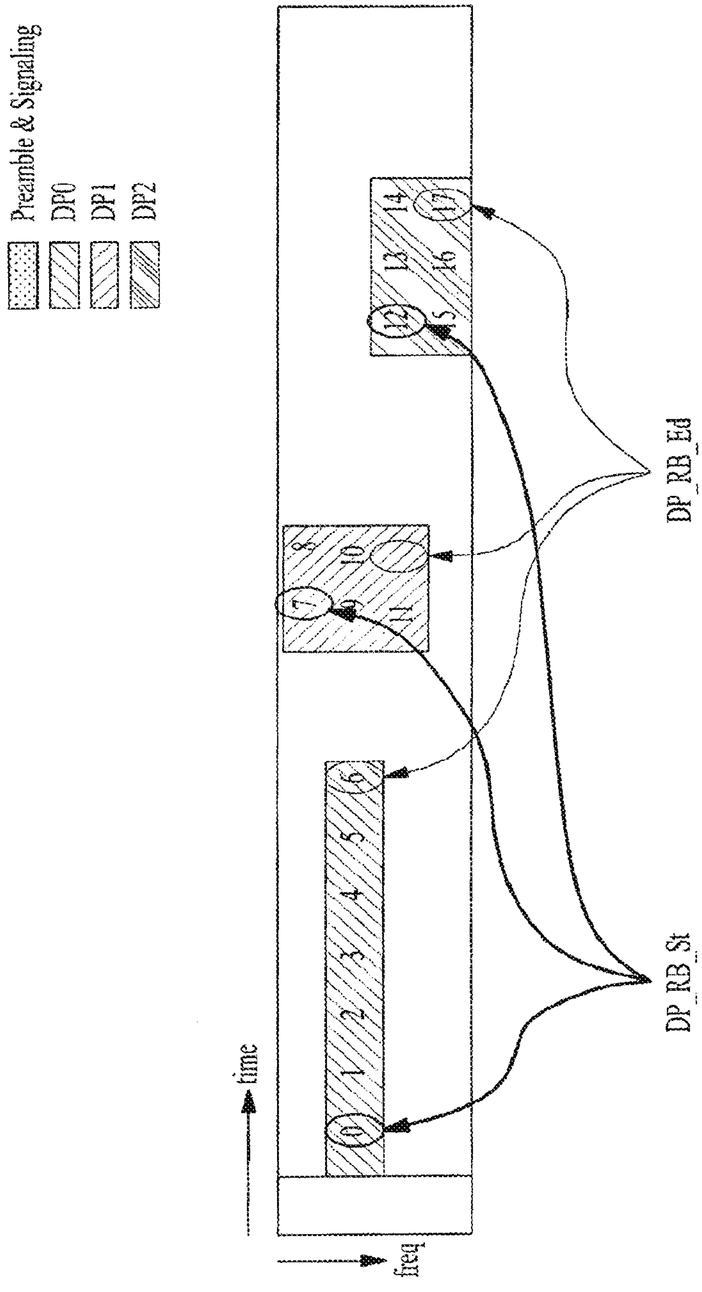
FIG. 67 is a view illustrating RB mapping of type3 DPs according to another embodiment of the present invention.

FIG. 67 is a view illustrating RB mapping of type3 DPs according to another embodiment of the present invention.

FIG. 67 illustrates RB mapping in a case when N_Slot=1 and {DP0, DP1, DP2}={7,5,6}. As illustrated in FIG. 67, RBs of each DP may be mapped on an arbitrary block basis in a signal frame. In this case, the broadcast signal reception apparatus according to an embodiment of the present invention needs additional signaling information as well as the above-described signaling information to extract RBs to which a corresponding DP is mapped.

As such, the present invention may exemplarily describe a case in which DP end address information of each DP (DP_RB_Ed) is additionally transmitted. Accordingly, the broadcast signal transmission apparatus according to an embodiment of the present invention may map RBs of the DP on an arbitrary block basis and transmit the above-described signaling information, and the broadcast signal reception apparatus according to an embodiment of the present invention may detect and decode the RBs of the DP mapped on an arbitrary block basis, using DP_RB_St information and DP_RB_Ed information included in the above-described signaling information. When this method is used, free RB mapping is enabled and thus DPs may be mapped with different RB mapping characteristics.

Specifically, as illustrated in FIG. 67, RBs of DP0 may be mapped in a corresponding block in a time axis direction to achieve time diversity like type2 DPs, RBs of DP1 may be mapped in a corresponding block in a frequency axis direction to achieve the power saving effect like type1 DPs. Besides, RBs of DP2 may be mapped in a corresponding block in consideration of time diversity and power saving like type3 DPs.

Further, even in a case when RBs are not mapped in the whole corresponding block like DP1, the broadcast signal reception apparatus may accurately detect the locations of RBs to be acquired, using the above-described signaling information, e.g., DP_FEC_St information, DP_N_Block information, DP_RB_St information and DP_RB_Ed information, and thus a broadcast signal may be efficiently transmitted and received.

FIG. 68 is a view illustrating signaling information according to an embodiment of the present invention.

FIG. 68 illustrates the above-described signaling information related to RB mapping according to DP types, and the signaling information may be transmitted using signaling through a PLS (hereinafter referred to as PLS signaling) or in-band signaling.

Specifically, FIG. 68(*a*) illustrates signaling information transmitted through a PLS, and FIG. 68(*b*) illustrates signaling information transmitted through in-band signaling.

As illustrated in FIG. 68, the signaling information related to RB mapping according to DP types may include N_Slot information, DP_Type information, DP_N_Block information, DP_RB_St information, DP_FEC_St information and DP_N_Block information.

The signaling information transmitted through PLS signaling is the same as the signaling information transmitted through in-band signaling. However, a PLS includes information about all DPs included in a corresponding signal frame for service acquisition and thus the signaling information other than N_Slot information and DP_Type information may be defined within a DP loop for defining information about every DP. On the other hand, in-band signaling is used to acquire a corresponding DP and thus is transmitted for each DP. As such, in-band signaling is different from PLS signaling in that a DP loop for defining information about every DP is not necessary. A brief description is now given of the signaling information.

N_Slot information: Information indicating the number of slots partitioned form a signal frame, which may have the size of 2 bits. According to an embodiment of the present invention, the number of slots may be 1, 2, 4, 8.

DP_Type information: Information indicating the type of a DP, which may be one of type 1, type 2 and type 3 as described above. This information is extensible according to the intention of a designer and may have the size of 3 bits.

DP_N_Block_Max information: Information indicating the maximum number of FEC blocks of a corresponding DP or a value equivalent thereto, which may have a size of 10 bits.

DP_RB_St information: Information indicating an address of a first RB of a corresponding DP, and the address of an RB may be expressed on an RB basis. This information may have a size of 8 bits.

DP_FEC_St information: Information indicating a first address of an FEC block of a corresponding DP to be mapped to a signal frame, and the address of an FEC block may be expressed on a cell basis. This information may have a size of 13 bits.

DP_N_Block information: Information indicating the number of FEC blocks of a corresponding DP to be mapped to a signal frame or a value equivalent thereto, which may have a size of 10 bits.

The above-described signaling information may vary name, size, etc. thereof according to the intention of a designer in consideration of the length of a signal frame, the size of time interleaving, the size of RB, etc.

Since PLS signaling and in-band signaling have a difference according to uses thereof as described above, for more efficient transmission, signaling information may be omitted for PLS signaling and in-band signaling as described below.

First, a PLS includes information about all DPs included in a corresponding signal frame. Accordingly, DPs are completely and sequentially mapped to the signal frame in the order of DP0, DP1, DP2, . . . , the broadcast signal reception apparatus may perform calculation to achieve DP_RB_St information. In this case, DP_RB_St information may be omitted.

Second, in the case of in-band signaling, the broadcast signal reception apparatus may acquire DP_FEC_St information of a next signal frame using DP_N_Block information of a corresponding DP. Accordingly, DP_FEC_St information may be omitted.

Third, in the case of in-band signaling, when N_Slot information, DP_Type information and DP_N_Block_Max information which influence mapping of a corresponding DP are changed, a 1-bit signal indicating whether the corresponding information is changed may be used, or the change may be signaled. In this case, additional N_Slot information, DP_Type information and DP_N_Block_Max information may be omitted.

That is, DP_RB_St information may be omitted in the PLS, and signaling information other than DP_RB_St information and DP_N_Block information may be omitted in in-band signaling. This is variable according to the intention of a designer.

Figure 69:
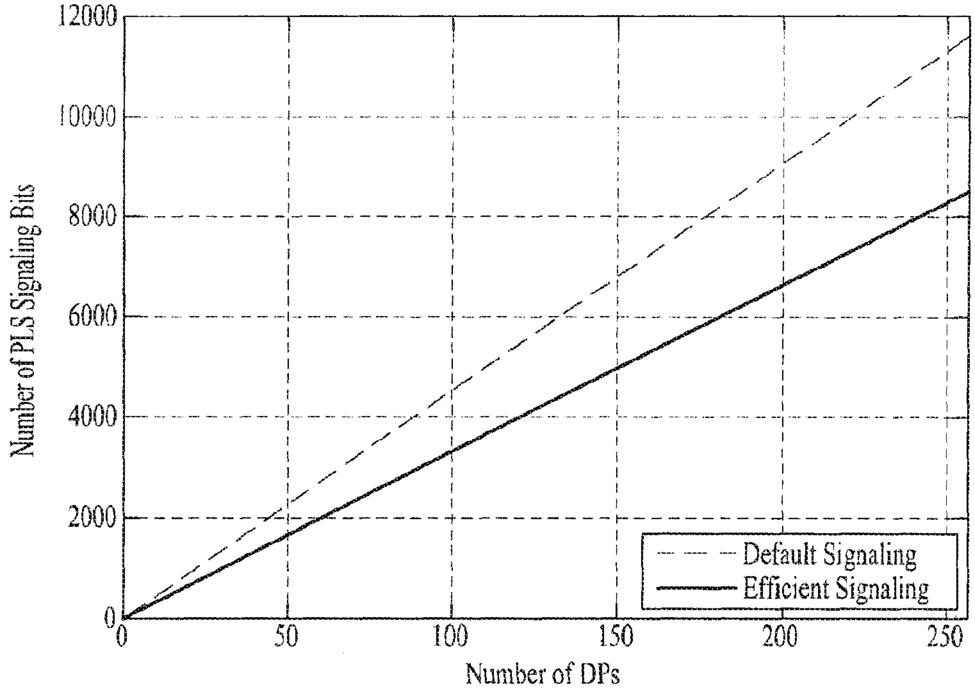
FIG. 69 is a graph showing the number of bits of a PLS according to the number of DPs according to an embodiment of the present invention.

FIG. 69 is a graph showing the number of bits of a PLS according to the number of DPs according to an embodiment of the present invention.

Specifically, FIG. 69 shows an increase in number of bits for PLS signaling in a case when signaling information related to RB mapping according to DP types is transmitted through a PLS, as the number of DPs is increased.

A dashed line refers to a case in which every related signaling information is transmitted (Default signaling), and a solid line refers to a case in which the above-described types of signaling information are omitted (Efficient signaling). As the number of DPs is increased, if certain types of signaling information are omitted, it is noted that the number of saved bits is linearly increased.

Figure 70:
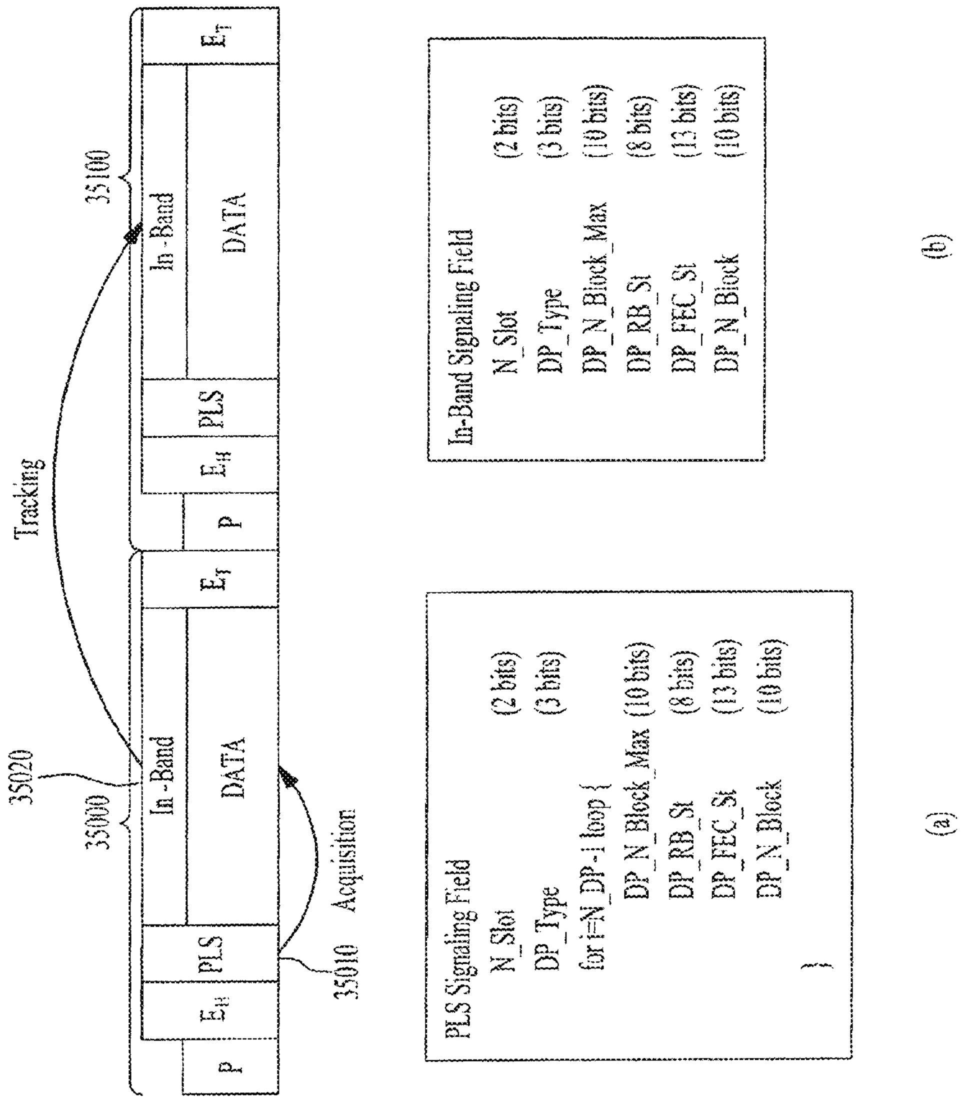
FIG. 70 is a view illustrating a procedure for demapping DPs according to an embodiment of the present invention.

FIG. 70 is a view illustrating a procedure for demapping DPs according to an embodiment of the present invention.

As illustrated in the top of FIG. 70, the broadcast signal transmission apparatus according to an embodiment of the present invention may transmit contiguous signal frames 35000 and 35100. The configuration of each signal frame is as described above.

As described above, when the broadcast signal transmission apparatus maps DPs of different types to a corresponding signal frame on an RB basis and transmits the signal frame, the broadcast signal reception apparatus may acquire a corresponding DP using the above-described signaling information related to RB mapping according to DP types.

As described above, the signaling information related to RB mapping according to DP types may be transmitted through a PLS 35010 of the signal frame or through in-band signal 35020. FIG. 70(*a*) illustrates signaling information related to RB mapping according to DP types, which is transmitted through the PLS 35010, and FIG. 70(*b*) illustrates signaling information related to RB mapping according to DP types, which is transmitted through in-band signaling 35020. In-band signaling 35020 is processed, e.g., coded, modulated, and time-interleaved, together with data included in the corresponding DP, and thus may be indicated as being included as parts of data symbols in the signal frame. Each type of signaling information has been described above and thus is not described here.

As illustrated in FIG. 70, the broadcast signal reception apparatus may acquire the signaling information related to RB mapping according to DP types, which is included in the PLS 35010, and thus may demap and acquire DPs mapped to the corresponding signal frame 35000. Further, the broadcast signal reception apparatus may acquire the signaling information related to RB mapping according to DP types, which is transmitted through in-band signaling 35020, and thus may demap DPs mapped to the next signal frame 35100.

PLS Protection & Structure (Repetition)

Figure 71:
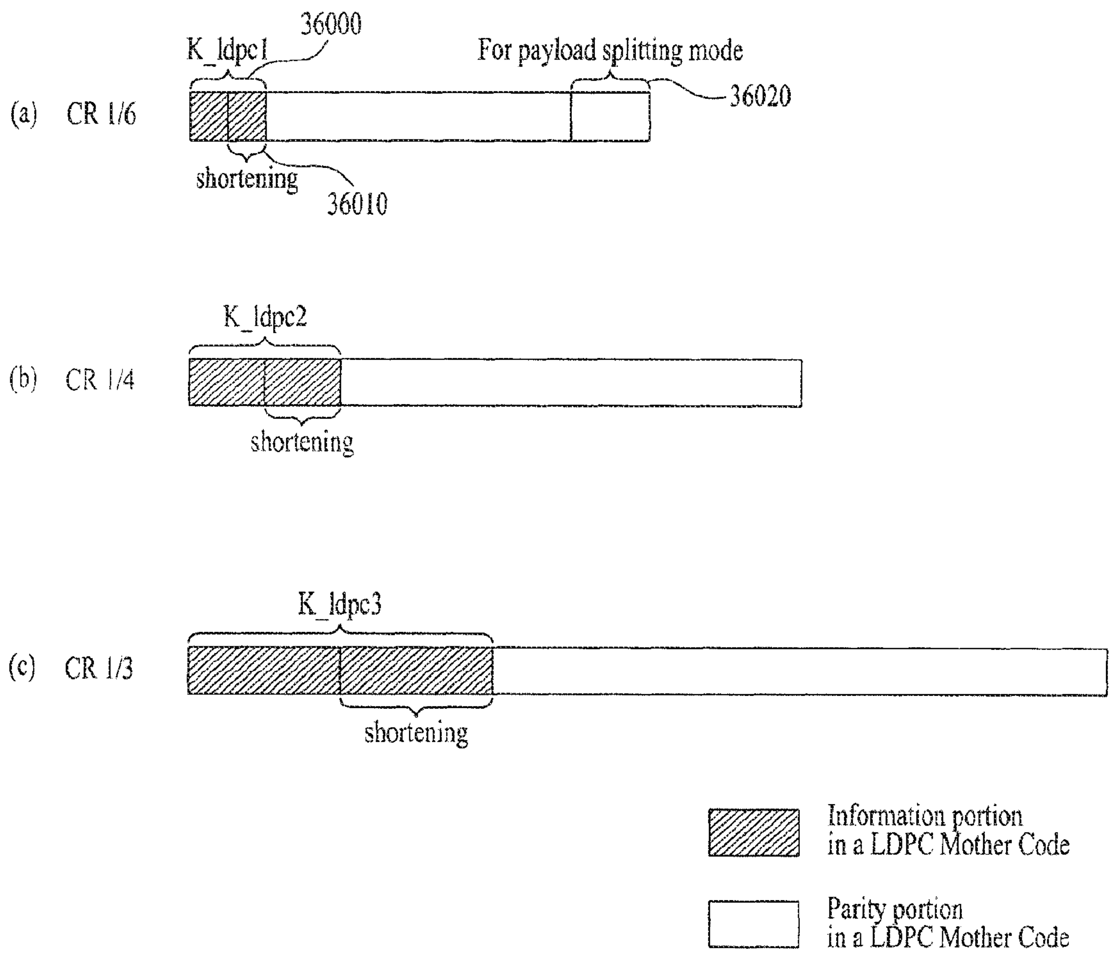
FIG. 71 is a view illustrating exemplary structures of three types of mother codes applicable to perform LDPC encoding on PLS data in an FEC encoder module according to another embodiment of the present invention.

FIG. 71 is a view illustrating exemplary structures of three types of mother codes applicable to perform LDPC encoding on PLS data in an FEC encoder module according to another embodiment of the present invention.

PLS-pre data and PLS-post data output from the above-described PLS generation module 4300 are independently input to the BB scrambler module 4400. In the following description, the PLS-pre data and the PLS-post data may be collectively called PLS data. The BB scrambler module 4400 may perform initialization to randomize the input PLS data. The BB scrambler module 4400 may initialize the PLS data located and to be transmitted in frame, on a frame basis.

If the PLS located and to be transmitted in frame includes information about a plurality of frames, the BB scrambler module 4400 may initialize the PLS data on a frame basis. An example thereof is the case of a PLS repetition frame structure to be described below. According to an embodiment of the present invention, PLS repetition refers to a frame configuration scheme for transmitting PLS data for a current frame and PLS data for a next frame together in the current frame. When PLS repetition is applied, the BB scrambler module 4400 may independently initialize the PLS data for the current frame and the PLS data for the next frame. A detailed description of PLS repetition will be given below.

The BB scrambler module 4400 may randomize the PLS-pre data and the PLS-post data initialized on a frame basis.

The randomized PLS-pre data and the PLS-post data are input to the coding & modulation module 5300. The randomized PLS-pre data and the randomized PLS-post data may be respectively input to the FEC encoder modules 5310 included in the coding & modulation module 5300. The FEC encoder modules 5310 may respectively perform BCH encoding and LDPC encoding on the input PLS-pre data and the PLS-post data. Accordingly, the FEC encoder modules 5310 may respectively perform LDPC encoding on the randomized PLS-pre data and the randomized PLS-post data input to the FEC encoder modules 5310.

BCH parity may be added to the randomized PLS data input to the FEC encoder modules 5310 due to BCH encoding, and then LDPC encoding may be performed on the BCH-encoded data. LDPC encoding may be performed based on one of mother code types having different sizes in information portion (hereinafter, the size of information portion is called K_ldpc) according to the size of input data including BCH parity (hereinafter, the size of data input to an LDPC encoder module is called N_BCH). The FEC encoder module 5310 may shorten data of an information portion of an LDPC mother code corresponding to the difference 36010 in size between K_ldpc and N_BCH, to 0 or 1, and may puncture a part of data included in a parity portion, thereby outputting a shortened/punctured LDPC code. The LDPC encoder module may perform LDPC encoding on the input PLS data or the BCH-encoded PLS data based on the shortened/punctured LDPC code and output the LDPC-encoded PLS data.

Here, BCH encoding is omittable according to the intention of a designer. If BCH encoding is omitted, the FEC encoder module 5310 may generate an LDPC mother code by encoding the PLS data input to the FEC encoder module 5310. The FEC encoder module 5310 may shorten data of an information portion of the generated LDPC mother code corresponding to the difference 36010 in size between K_ldpc and PLS data, to 0 or 1, and may puncture a part of data included in a parity portion, thereby outputting a shortened/punctured LDPC code. The FEC encoder module 5310 may perform LDPC encoding on the input PLS data based on the shortened/punctured LDPC code and output the LDPC-encoded PLS data.

FIG. 71(*a*) illustrates an exemplary structure of mother code type1. Here, mother code type1 has a code rate of 1/6. FIG. 71(*b*) illustrates an exemplary structure of mother code type2. Here, mother code type2 has a code rate of 1/4. FIG. 71(*c*) illustrates an exemplary structure of mother code type3. Here, mother code type3 has a code rate of 1/3.

As illustrated in FIG. 71, each mother code may include an information portion and a parity portion. According to an embodiment of the present invention, the size of data corresponding to an information portion 3600 of a mother code may be defined as K_ldpc. K_ldpc of mother code type1, mother code type2 and mother code type3 may be respectively called k_ldpc1, k_ldpc2 and k_ldpc3.

A description is now given of an LDPC encoding procedure performed by an FEC encoder module based on mother code type1 illustrated in FIG. 71(*a*). In the following description, encoding may refer to LDPC encoding.

When BCH encoding is applied, the information portion of the mother code may include BCH-encoded PLS data including BCH parity bits and input to the LDPC encoder module of the FEC encoder module.

When BCH encoding is not applied, the information portion of the mother code may include PLS data input to the LDPC encoder module of the FEC encoder module.

The size of the PLS data input to the FEC encoder module may vary according to the size of additional information (management information) to be transmitted and the size of data of transmission parameters. The FEC encoder module may insert "0" bits to the BCH-encoded PLS data. If BCH encoding is not performed, the FEC encoder module may insert "0" bits to the PLS data.

The present invention may provide three types of dedicated mother codes used to perform the above-described LDPC encoding according to another embodiment. The FEC encoder module may select a mother code according to the size of PLS data, and the mother code selected by the FEC encoder module according to the size of PLS data may be called a dedicated mother code. The FEC encoder module may perform LDPC encoding based on the selected dedicated mother code.

According to an embodiment of the present invention, the size 36000 of K_ldpc1 of mother code type1 may be assumed as ½ of the size of K_ldpc2 of mother code type2 and ¼ of the size of K_ldpc3 of mother code type3. The relationship among the sizes of K_ldpc of mother code types is variable according to the intention of a designer. The designer may design a mother code having a small size of K_ldpc to have a low code rate. To maintain a constant signaling protection level of PLS data having various sizes, an effective code rate after shortening and puncturing should be lowered as the size of PLS data is small. To reduce the effective code rate, a parity ratio of a mother code having a small size of K_ldpc may be increased.

If the PLS data has an excessively large size and thus cannot be encoded based on one of a plurality of mother code types by the FEC encoder module, the PLS data may be split into a plurality of pieces for encoding. Here, each piece of the PLS data may be called fragmented PLS data. The above-described procedure for encoding the PLS data by the FEC encoder module may be replaced with a procedure for encoding each fragmented PLS data if the PLS data has an excessively large size and thus cannot be encoded based on one of a plurality of mother code types by the FEC encoder module.

When the FEC encoder module encodes mother code type1, to secure a signaling protection level in a very low signal to noise ratio (SNR) environment, payload splitting may be performed. The length of parity of mother code type1 may be increased due to a portion 36020 for executing a payload splitting mode. A detailed description of the mother code selection method and the payload splitting mode will be given below.

If the FEC encoder module encodes PLS data having various sizes based on a single mother code type having a large size of K_ldpc, a coding gain may be rapidly reduced. For example, when the above-described FEC encoder module performs shortening using a method for determining a shortening data portion (e.g., K_ldpc−N_BCH), since K_ldpc is constant, small-sized PLS data is shortened more than large-sized PLS data.

To solve the above-described problem, the FEC encoder module according to an embodiment of the present invention may apply a mother code type capable of achieving an optimal coding gain among a plurality of mother code types differently according to the size of PLS data.

The FEC encoder module according to an embodiment of the present invention may restrict the size of a portion to be shortened by the FEC encoder module to achieve an optimal coding gain. Since the FEC encoder module restricts the size 36010 of a shortening portion to be shortened to a certain ratio of K_ldpc 36000 of each mother code, a coding gain of a dedicated mother code of each PLS data may be constantly maintained. The current embodiment shows an example in which shortening can be performed up to 50% of the size of K_ldpc. Accordingly, when the above-described FEC encoder module determines a shortening data portion as the difference between K_ldpc and N_BCH, if the difference between K_ldpc and N_BCH is greater than 1/2 of K_ldpc, the FEC encoder module may determine the size of a data portion to be shortened by the FEC encoder module as K_ldpc*½ instead of K_ldpc−N_BCH.

LDPC encoding procedures performed by the FEC encoder module based on mother code type2 and mother code type3 illustrated in FIGS. 36(*b*) and 36(*c*) may be performed in the same manner as the above-described LDPC encoding procedure performed by the FEC encoder module based on mother code type1 illustrated in FIG. 71(*a*).

The FEC encoder module may perform encoding based on an extended LDPC code by achieving an optimal coding gain by encoding PLS data having various sizes based on a single mother code.

However, a coding gain achievable when encoding is performed based on an extended LDPC code is approximately 0.5 dB lower than the coding gain achievable when encoding is performed based on dedicated mother codes optimized to different sizes of PLS data as described above. Thus, if the FEC encoder module according to an embodiment of the present invention encodes PLS data by selecting a mother code type structure according to the size of PLS data, redundancy data may be reduced and PLS signaling protection capable of ensuring the same reception performance may be designed.

Figure 72:
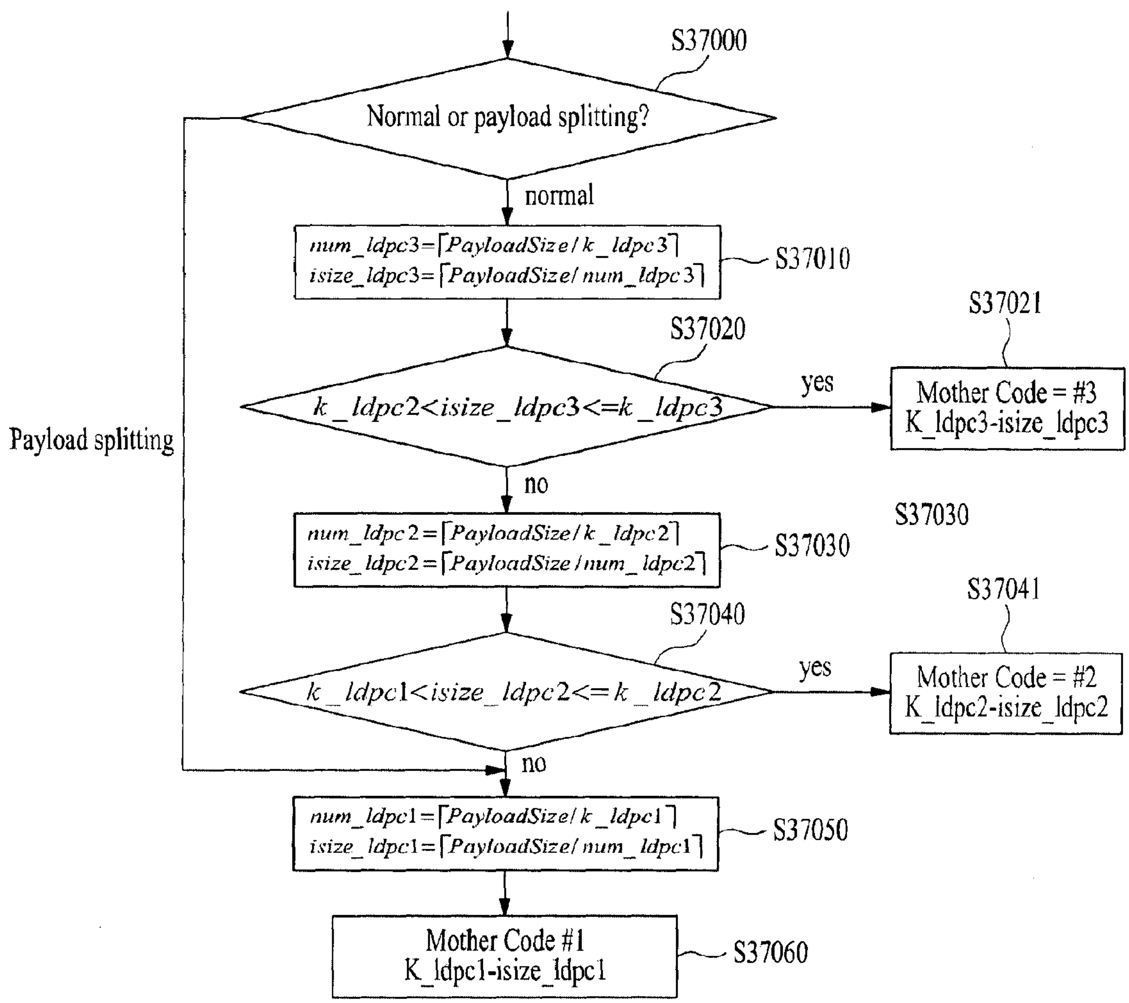
FIG. 72 is a flowchart of a procedure for selecting a mother code type used for LDPC encoding and determining the size of shortening according to another embodiment of the present invention.

FIG. 72 is a flowchart of a procedure for selecting a mother code type used for LDPC encoding and determining the size of shortening according to another embodiment of the present invention.

A description is now given of a procedure for selecting a mother code type according to the size of PLS data (payload size) to be LDPC-encoded and determining the size of shortening by the FEC encoder module. The following description is assumed that all operations below are performed by the FEC encoder module.

It is checked whether an LDPC encoding mode is a normal mode or a payload splitting mode (S37000). If the LDPC encoding mode is a payload splitting mode, mother code1 may be selected irrespective of the size of PLS data and the size of shortening is determined based on the size of K_ldpc of mother code type1 (k_ldpc1) (S37060). A detailed description of the payload splitting mode will be given below.

If the LDPC encoding mode is a normal mode, the FEC encoder module selects a mother code type according to the size of PLS data. A description is now given of the procedure for selecting a mother code type in the normal mode by the FEC encoder module.

Num_ldpc refers to the number of fragmented PLS data which can be included in a single piece of PLS data. Isize_ldpc refers to the size of fragmented PLS data input to the FEC encoder module. Num_ldpc3 may be determined as a rounded-up value of a value obtained by dividing the size of input PLS data (payload size) by k_ldpc3 for encoding. The value of isize_ldpc3 may be determined as a rounded-up value of a value obtained by dividing the size of PLS data (payload size) by the determined num_ldpc3 (S37010). It is determined whether the value of isize_ldpc3 is in a range greater than k_ldpc2 and equal to or less than k_ldpc3 (S37020). If the size of isize_ldpc3 is in a range greater than k_ldpc2 and equal to or less than k_ldpc3, mother code type3 is determined. In this case, the size of shortening may be determined based on a difference value between k_ldpc3 and isize_ldpc3 (S37021).

If the value of isize_ldpc3 is not in a range greater than k_ldpc2 and equal to or less than k_ldpc3, a rounded-up value of a value obtained by dividing the size of PLS data (marked as "payload size" in FIG. 72) by k_ldpc2 is determined as num_ldpc2. The value of isize_ldpc2 may be determined as a rounded-up value of a value obtained by dividing the size of PLS data (payload size) by the determined num_ldpc2 (S37030). It is determined whether the value of isize_ldpc2 is in a range greater than k_ldpc1 and equal to or less than k_ldpc2 (S37040). If the value of isize_ldpc2 is in a range greater than k_ldpc1 and equal to or less than k_ldpc2, mother code type2 is determined. In this case, the size of shortening may be determined based on a difference value between k_ldpc2 and isize_ldpc2 (S37041).

If the value of isize_ldpc2 is in not a range greater than k_ldpc1 and equal to or less than k_ldpc2, a rounded-up value of a value obtained by dividing the size of PLS data (payload size) by k_ldpc1 is determined as num_ldpc1. The value of isize_ldpc1 may be determined as a rounded-up value of a value obtained by dividing the size of PLS data (payload size) by the determined num_ldpc1 (S37050). In this case, mother code type1 is determined and the size of shortening may be determined based on a difference value between k_ldpc1 and isize_ldpc1 (S37060).

The above-described num_ldpc and isize_ldpc may have different values according to the size of PLS data. However, k_ldpc1, k_ldpc2 and k_ldpc3 according to the mother code type are not influenced by the size of PLS data and have constant values.

Figure 73:
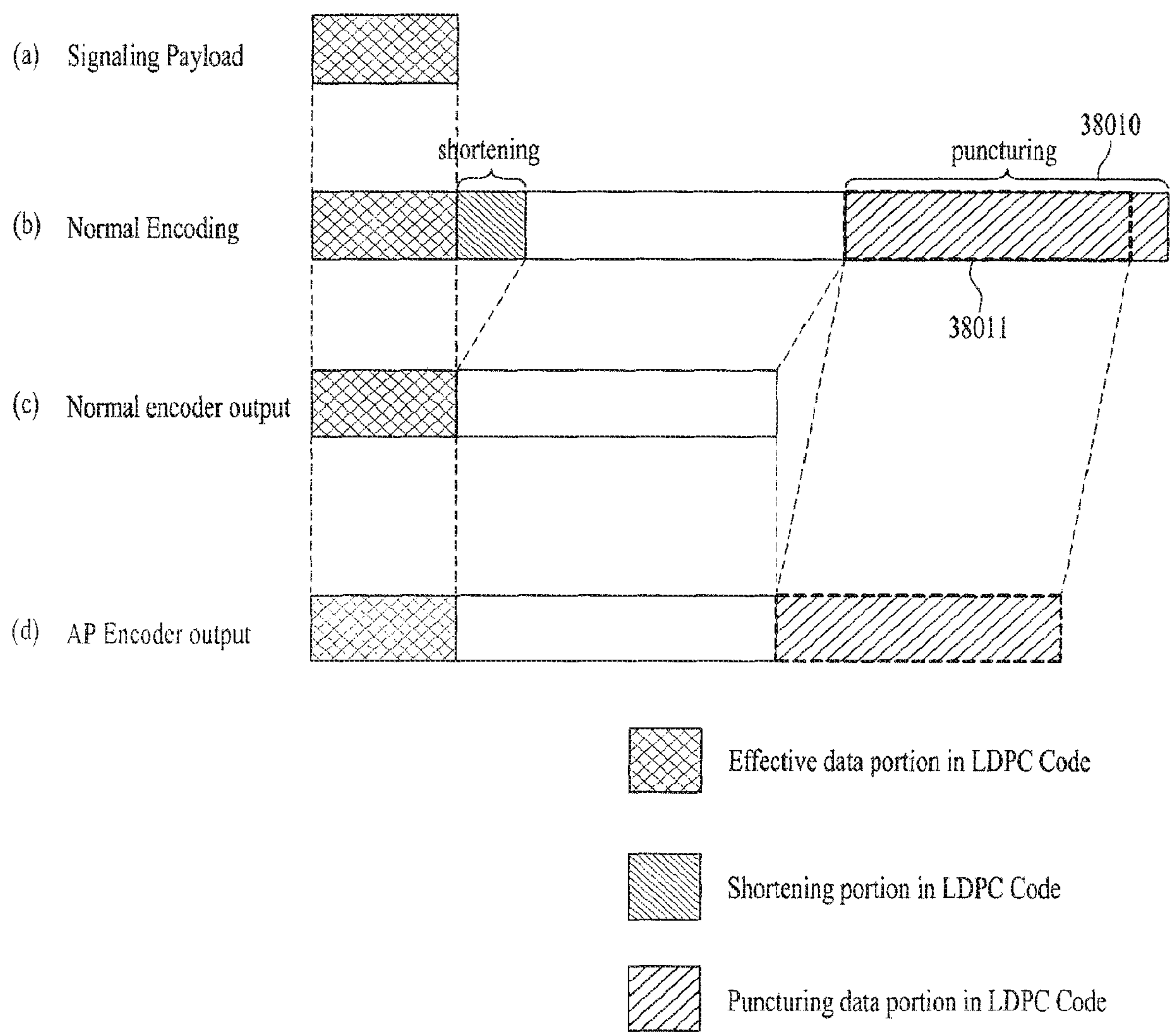
FIG. 73 is a view illustrating a procedure for encoding adaptation parity according to another embodiment of the present invention.

FIG. 73 is a view illustrating a procedure for encoding adaptation parity according to another embodiment of the present invention.

FIG. 73(*a*) illustrates an example of PLS data input to the FEC encoder module for LDPC encoding.

FIG. 73(*b*) illustrates an exemplary structure of an LDPC code after performing LDPC encoding and before performing shortening and puncturing.

FIG. 73(*c*) illustrates an exemplary structure of an LDPC code after performing LDPC encoding, shortening and puncturing (38010) (hereinafter referred to as a shortened/punctured LDPC code), which is output from the FEC encoder module.

FIG. 73(*d*) illustrates an exemplary structure of a code output by adding adaptation parity (38011) to the LDPC code which is LDPC-encoded, shortened and punctured by the FEC encoder module, according to another embodiment of the present invention. Here, a scheme for outputting the code by adding adaptation parity (38011) to the shortened/punctured LDPC code by the FEC encoder module is called an adaptation parity scheme.

To maintain a signaling protection level, the FEC encoder module may perform LDPC-encode and then shorten the PLS data, puncture (38010) some of parity bits, and thus output the shortened/punctured LDPC code. In a poor reception environment, the signaling protection level needs to be strengthened compared to the robustness constantly supported by a broadcast system, i.e., a constant target threshold of visibility (TOV). According to an embodiment of the present invention, to strengthen the signaling protection level, an LDPC code may be output by adding adaptation parity bits to the shortened/punctured LDPC code. The adaptation parity bits may be determined as some parity bits (38011) of the parity bits (38010) punctured after LDPC encoding.

FIG. 73(*c*) illustrates a basic target TOV in a case when an effective code rate is approximately ⅓. According to an embodiment of the present invention, if the FEC encoder module adds the adaptation parity bits (38011), actually punctured parity bits may be reduced. The FEC encoder module may adjust the effective code rate to approximately ¼ by adding adaptation parity bits as illustrated in FIG. 73(*d*). According to an embodiment of the present invention, a mother code used for LDPC encoding may additionally include a certain number of parity bits to acquire the adaptation parity bits 38011. Accordingly, the coding rate of a mother code used for adaptation parity encoding may be designed to be lower than the code rate of an original mother code.

The FEC encoder module may output the added parity (38011) included in the LDPC code by arbitrarily reducing the number of punctured parity bits. A diversity gain may be achieved by including the output added parity (38011) included in the LDPC code, in a temporally previous frame and transmitting the previous frame via a transmitter. The end of an information portion of a mother code is shortened and the end of a parity portion of the mother code is punctured in FIG. 73(*b*). However, this merely corresponds to an exemplary embodiment and the shortening and puncturing portions in the mother code may vary according to the intention of a designer.

Figure 74:
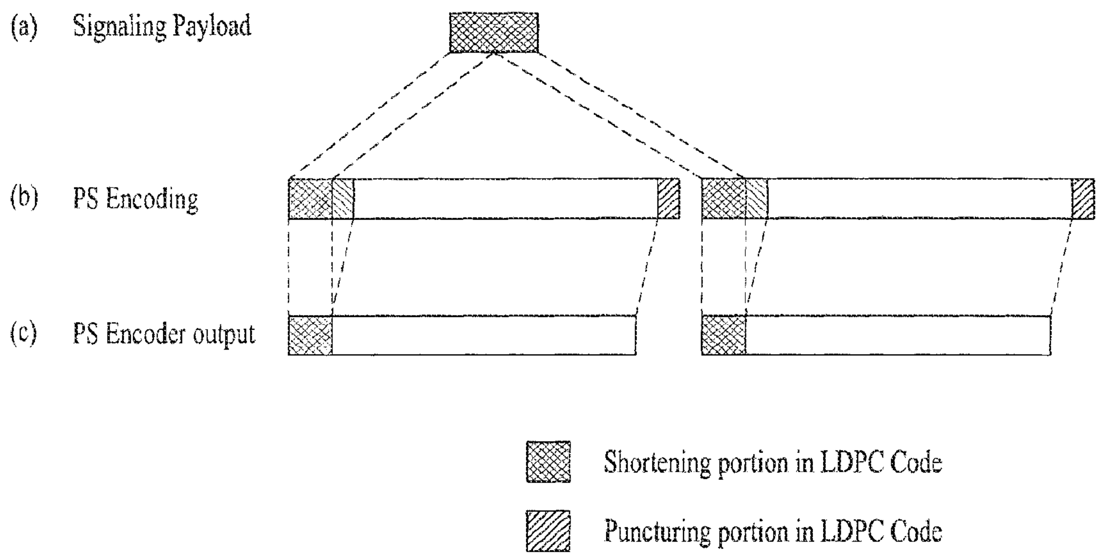
FIG. 74 is a view illustrating a payload splitting mode for splitting PLS data input to the FEC encoder module before LDPC-encoding the input PLS data according to another embodiment of the present invention.

FIG. 74 is a view illustrating a payload splitting mode for splitting PLS data input to the FEC encoder module before LDPC-encoding the input PLS data according to another embodiment of the present invention. In the following description, the PLS data input to the FEC encoder module may be called payload.

FIG. 74(*a*) illustrates an example of PLS data input to the FEC encoder module for LDPC encoding.

FIG. 74(*b*) illustrates an exemplary structure of an LDPC code obtained by LDPC-encoding each split piece of payload. The structure of the LDPC code illustrated in FIG. 74(*b*) is the structure before performing shortening/puncturing.

FIG. 74(*c*) illustrates an exemplary structure of a shortened/punctured LDPC code output from the FEC encoder module according to another embodiment of the present invention. The structure of the shortened/punctured LDPC code illustrated in FIG. 74(*c*) is the structure of the shortened/punctured LDPC code output when a payload splitting mode is applied to the FEC encoder module.

Payload splitting is performed by the FEC encoder module to achieve the robustness strengthened compared to a constant target TOV for signaling.

As illustrated in FIG. 74(*b*), the payload splitting mode is a mode for splitting PLS data before LDPC encoding and performing LDPC encoding on each split piece of the PLS data by the FEC encoder module.

As illustrated in FIG. 74(*c*), in the payload splitting mode, the input PLS data may be encoded and shortened/punctured using only a mother code type having the lowest code rate among mother code types provided by the FEC encoder module (e.g., mother code type1 according to the current embodiment).

A method for selecting one of three mother code types based on the size of PLS data and performing LDPC encoding on the LDPC encoding based on the selected mother code type to adjust a signaling protection level by FEC encoder module has been described above. However, if a mother code type having the highest code rate is selected among mother code types provided by the FEC encoder module (e.g., mother code type3 according to the current embodiment), the signaling protection level may be restricted. In this case, the FEC encoder module may apply the payload splitting mode to the PLS data and LDPC-encode every piece of the PLS data using only a mother code type having the lowest code rate among mother code types provided by the FEC encoder module, thereby adjusting the signaling protection level to be low. When the payload splitting mode is used, the FEC encoder module may adjust the size of punctured data according to a strengthened target TOV after shortening.

According to the previous embodiment of the present invention, when the FEC encoder module does not use the payload splitting mode for LDPC encoding, the effective code rate of the shortened/punctured LDPC code was approximately ⅓. However, in FIG. 74(*c*), the effective code rate of the output LDPC code to which the payload splitting mode is applied by the FEC encoder module is approximately $11/60$. Accordingly, the effective code rate of the output LDPC code to which the payload splitting mode is applied may be reduced.

The end of an information portion of an LDPC code is shortened and the end of a parity portion of the LDPC code is punctured in FIG. 74(*b*). However, this merely corresponds to an exemplary embodiment and the shortening and puncturing portions in the LDPC code may vary according to the intention of a designer.

Figure 75:
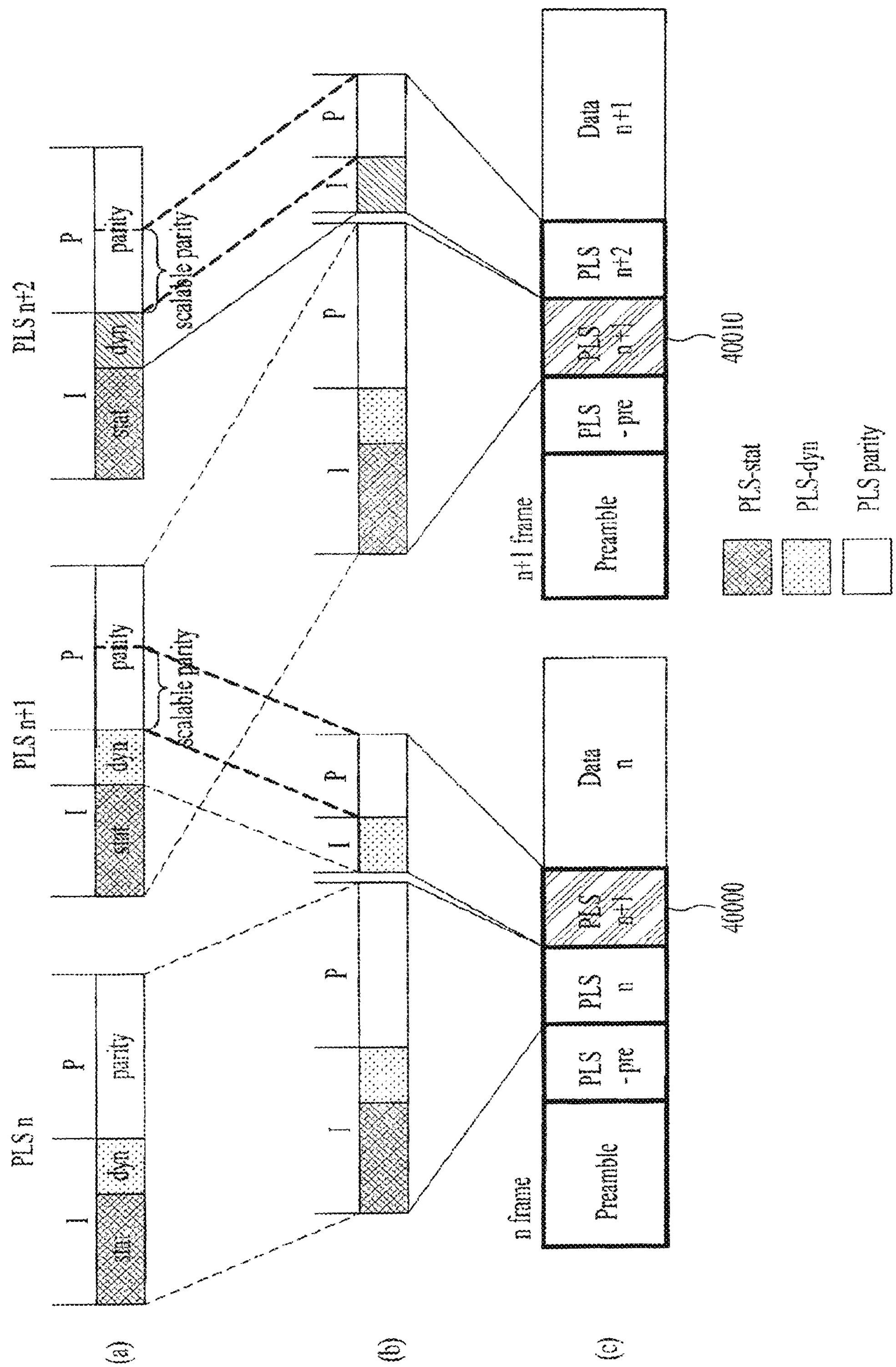
FIG. 75 is a view illustrating a procedure for performing PLS repetition and outputting a frame by the frame structure module 1200 according to another embodiment of the present invention.

FIG. 75 is a view illustrating a procedure for performing PLS repetition and outputting a frame by the frame structure module 1200 according to another embodiment of the present invention.

According to another embodiment of the present invention, PLS repetition performed by the frame structure module corresponds to a frame structure scheme for including two or more pieces of PLS data including information about two or more frames in a single frame.

A description is now given of PLS repetition according to an embodiment of the present invention.

FIG. 75(*a*) illustrates an exemplary structure of a plurality of pieces of PLS data encoded by the FEC encoder module.

FIG. 75(*b*) illustrates an exemplary structure of a frame including a plurality of pieces of encoded PLS data due to PLS repetition by the frame structure module.

FIG. 75(*c*) illustrates an exemplary structure of a current frame including PLS data of the current frame and PLS data of a next frame.

Specifically, FIG. 75(*c*) illustrates an exemplary structure of an nth frame (current frame) including PLS data (PLS n) of the nth frame and PLS data 40000 of an (n+1)th frame (next frame), and the (n+1)th frame (current frame) including PLS data (PLS n+1) of the (n+1)th frame and PLS data of an (n+2)th frame (next frame). A detailed description is now given of FIG. 75.

FIG. 75(*a*) illustrates the structure in which PLS n for the nth frame, PLS n+1 for the (n+1)th frame, and PLS n+2 for the (n+2)th frame are encoded. The FEC encoder module according to another embodiment of the present invention may output an LDPC code by encoding static PLS signaling data and dynamic PLS signaling data together. PLS n including physical signaling data of the nth frame may include static PLS signaling data (marked as “stat”), dynamic PLS signaling data (marked as “dyn”), and parity data (marked as “parity”). Likewise, each of PLS n+1 and PLS n+2 including physical signaling data of the (n+1)th frame and the (n+2)th frame may include static PLS signaling data (marked as “stat”), dynamic PLS signaling data (marked as “dyn”), and parity data (marked as “parity”). In FIG. 75(*a*), I includes static PLS signaling data and dynamic PLS signaling data, and P includes parity data.

FIG. 75(*b*) illustrates an example of PLS formatting for splitting the data illustrated in FIG. 75(*a*) to locate the data in frames.

If PLS data transmitted by a transmitter is split according to whether the PLS data is changed for each frame and then transmitted by excluding redundancy data which is not changed in every frame, a receiver may have a higher PLS decoding performance. Accordingly, PLS n and PLS n+1 are mapped to the nth frame using PLS repetition, the frame structure module according to an embodiment of the present invention may split PLS n+1 to include the dynamic PLS signaling data of PLS n+1 and the parity data of PLS n+1 excluding the static PLS signaling data of PLS n+1 which is repeated from the static PLS signaling data of PLS n. A splitting scheme for transmitting PLS data of a next frame in a current frame by the frame structure module may be called PLS formatting.

Here, when the frame structure module splits PLS n+1 to be mapped to the nth frame, the parity data of PLS n+1 may be determined as a part of parity data (marked as “P”) illustrated in FIG. 75(*a*), and the size thereof can scalably vary. Parity bits of PLS data of a next frame to be transmitted in a current frame, which are determined by the frame structure module due to PLS formatting, may be called scalable parity.

FIG. 75(*c*) illustrates an example in which data split in FIG. 75(*b*) is located in the nth frame and the (n+1)th frame.

Each frame may include a preamble, PLS-pre, PLS and service data (marked as "Data n"). A description is now given of the detailed stricture of each frame illustrated in FIG. 75(*c*). The nth frame illustrated in FIG. 75(*c*) may include a preamble, PLS-pre, encoded PLS n, a part of encoded PLS n+1 40000, and service data (marked as "Data n"). Likewise, the (n+1)th frame may include a preamble, PLS-pre, encoded PLS n+1 40010, a part of encoded PLS n+2, and service data (marked as "Data n+1"). In the following description according to an embodiment of the present invention, a preamble may include PLS-pre.

PLS n+1 included in the nth frame is different from that included in the (n+1)th frame in FIG. 75(*c*). PLS n+1 40000 included in the nth frame is split due to PLS formatting and does not include static PLS signaling data while PLS n+1 40010 includes static PLS signaling data.

When scalable parity is determined, the frame structure module may maintain the robustness of PLS n+1 40000 included in the nth frame in such a manner that a receiver can decode PLS n+1 included in the nth frame before receiving the (n+1)th frame and may consider a diversity gain achievable when PLS n+1 40000 included in the nth frame and PLS n+1 40010 included in the (n+1)th frame are decoded in the (n+1)th frame.

If parity bits of PLS n+1 40000 included in the nth frame are increased, data (Data n+1) included in the (n+1)th frame may be rapidly decoded based on data achieved by decoding PLS n+1 40000 included in the nth frame before the (n+1)th frame is received. On the other hand, scalable parity included in PLS n+1 40000 may be increased and thus data transmission may be inefficient. Further, if small scalable parity of PLS n+1 40000 is transmitted in the n frame to achieve a diversity gain for decoding PLS n+1 40010 included in the (n+1)th frame, the effect of rapidly decoding service data (Dana n+1) included in the (n+1)th frame by previously decoding PLS n+1 40000 included in the n frame before the (n+1)th frame is received may be reduced.

To achieve an improved diversity gain by a receiver, the frame structure module according to an embodiment of the present invention may determine the configuration of parity of PLS n+1 40000 included in the nth frame to be different from that of parity of PLS n+1 40010 included in the (n+1)th frame as much as possible in the PLS formatting procedure.

For example, if parity P of PLS n+1 includes 5 bits, the frame structure module may determine scalable parity of PLS n+1 which can be included in the nth frame as second and fourth bits and determine scalable parity of PLS n+1 which can be included in the (n+1)th frame as first, third and fifth bits. As such, if the frame structure module determines scalable parity bits not to overlap, a coding gain as well as a diversity gain may be achieved. According to another embodiment of the present invention, when the frame structure module performs PLS formatting, a diversity gain of a receiver may be maximized by soft-combining repeatedly transmitted information before LDPC decoding.

The frame structure illustrated in FIG. 75 is merely an exemplary embodiment of the present invention and may vary according to the intention of a designer. The order of PLS n and PLS n+1 40000 in the nth frame merely an example and PLS n+1 40000 may be located prior to PLS n according to the intention of a designer. This may be equally applied to the (n+1)th frame.

Figure 76:
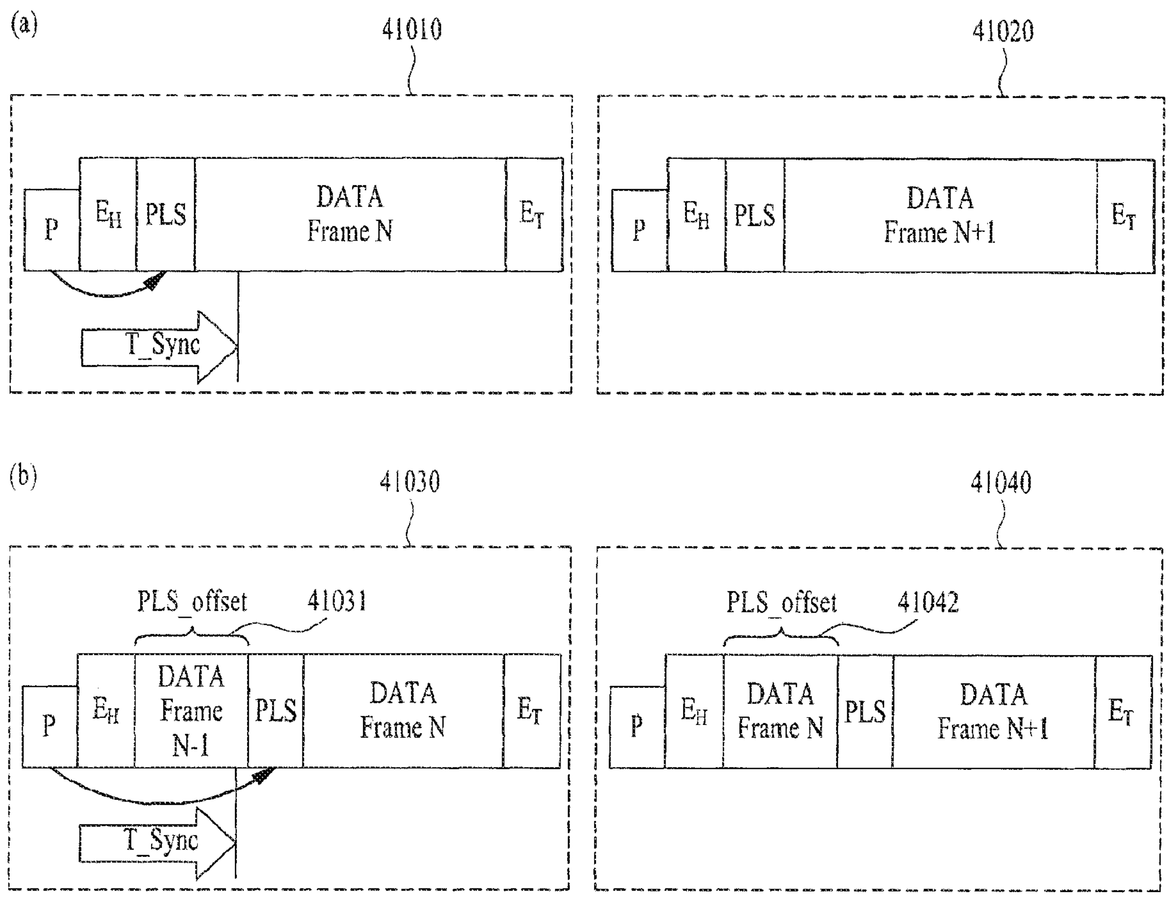
FIG. 76 is a view illustrating signal frame structures according to another embodiment of the present invention.

FIG. 76 is a view illustrating signal frame structures according to another embodiment of the present invention.

Each of signal frames 41010 and 41020 illustrated in FIG. 76(*a*) may include a preamble P, head/tail edge symbols $E_H/E_T$, one or more PLS symbols PLS and a plurality of data symbols (marked as "DATA Frame N" and "DATA Frame N+1"). This is variable according to the intention of a designer. "T_Sync" marked in each signal frame of FIGS. 41(*a*) and 41(*b*) refers to a time necessary to achieve stable synchronization for PLS decoding based on information acquired from a preamble by a receiver. A description is now given of a method for allocating a PLS offset portion by the frame structure module to ensure T_Sync time.

The preamble is located at the very front of each signal frame and may transmit a basic transmission parameter for identifying a broadcast system and the type of signal frame, information for synchronization, information about modulation and coding of a signal included in the frame, etc. The basic transmission parameter may include FFT size, guard interval information, pilot pattern information, etc. The information for synchronization may include carrier and phase, symbol timing and frame information. Accordingly, a broadcast signal reception apparatus according to another embodiment of the present invention may initially detect the preamble of the signal frame, identify the broadcast system and the frame type, and selectively receive and decode a broadcast signal corresponding to a receiver type.

Further, the receiver may acquire system information using information of the detected and decoded preamble, and may acquire information for PLS decoding by additionally performing a synchronization procedure. The receiver may perform PLS decoding based on the information acquired by decoding the preamble.

To perform the above-described function of the preamble, the preamble may be transmitted with a robustness several dB higher than that of service data. Further, the preamble should be detected and decoded prior to the synchronization procedure.

FIG. 76(*a*) illustrates the structure of signal frames in which PLS symbols are mapped subsequently to the preamble symbol or the edge symbol $E_H$. Since the receiver completes synchronization after a time corresponding to T_Sync, the receiver may not decode the PLS symbols immediately after the PLS symbols are received. In this case, a time for receiving one or more signal frames may be delays until the receiver decodes the received PLS data. Although a buffer may be used for a case in which synchronization is not completed before PLS symbols of a signal frame are received, a problem in which a plurality of buffers are necessary may be caused.

Each of signal frames 41030 and 41040 illustrated in FIG. 76(*b*) may also include the symbols P, $E_H$, $E_T$, PLS and DATA Frame N illustrated in FIG. 76(*a*).

The frame structure module according to another embodiment of the present invention may configure a PLS offset portion 41031 or 41042 between the head edge symbol $E_H$ and the PLS symbols PLS of the signal frame 41030 or 41040 for rapid service acquisition and data decoding. If the frame structure module configures the PLS offset portion 41031 or 41042 in the signal frame, the preamble may include PLS offset information PLS_offset. According to an embodiment of the present invention, the value of PLS_offset may be defined as the length of OFDM symbols used to configure the PLS_offset portion.

Due to the PLS offset portion configured in the signal frame, the receiver may ensure T_Sync corresponding to a time for detecting and decoding the preamble.

A description is now given of a method for determining the value of PLS_offset.

The length of an OFDM symbol in the signal frame is defined as T_Symbol. If the signal frame does not include the edge symbol $E_H$, the length of OFDM symbols including the PLS offset (the value of PLS_offset) may be determined as a value equal to or greater than a ceiling value (or rounded-up value) of T_Sync/T_Symbol.

If the signal frame includes the edge symbol $E_H$, the length of OFDM symbols including PLS_offset may be determined as a value equal to or greater than (a ceiling value (or rounded-up value) of T_Sync/T_Symbol)−1.

Accordingly, the receiver may know of the structure of the received signal frame based on data including the value of PLS_offset which is acquired by detecting and decoding the preamble. If the value of PLS_offset is 0, it can be noted that the signal frame according to an embodiment of the present invention has a structure in which the PLS symbols are sequentially mapped subsequently to the preamble symbol. Alternatively, if the value of PLS_offset is 0 and the signal frame includes the edge symbol, the receiver may know of the signal frame has a structure in which the edge symbol and the PLS symbols are sequentially mapped subsequently to the preamble symbol.

The frame structure module may configure the PLS offset portion 41031 to be mapped to the data symbols DATA Frame N or the PLS symbols PLS. Accordingly, as illustrated in FIG. 76(*b*), the frame structure module may allocate data symbols to which data of a previous frame (e.g., Frame N−1) is mapped, to the PLS offset portion. Alternatively, although not shown in FIG. 76(*b*), the frame structure module may allocate PLS symbols to which PLS data of a next frame is mapped, to the PLS offset portion.

The frame structure module may perform one or more quantization operations on PLS_offset to reduce signaling bits of the preamble.

A description is now given of an example in which the frame structure module allocates 2 bits of PLS_offset to the preamble to be signaled.

If the value of PLS_offset is "00", the length of the PLS offset portion is 0. This means that the PLS data is mapped in the signal frame immediately next to the preamble or immediately next to the edge symbol if the edge symbol is present.

If the value of PLS_offset is "01", the length of the PLS offset portion is ¼*L_Frame. Here, L_Frame refers to the number of OFDM symbols which can be included in a frame.

If the value of PLS_offset is "10", the length of the PLS offset portion is 2/4*L_Frame.

If the value of PLS_offset is "11", the length of the PLS offset portion is ¾*L_Frame.

The above-described method for determining the value of PLS_offset and the length of the PLS offset portion by the frame structure module is merely an exemplary embodiment, and terms and values thereof may vary according to the intention of a designer.

As described above, FIG. 76 illustrates a frame structure in a case when a time corresponding to a plurality of OFDM symbols (PLS_offset) is taken for synchronization after the preamble is detected and decoded. After the preamble is detected and decoded, the receiver may compensate integer frequency offset, fractional frequency offset and sampling frequency offset for a time for receiving a plurality of OFDM symbols (PLS_offset) based on information such as a continual pilot and a guard interval.

A description is now given of an effect achievable when the frame structure module according to an embodiment of the present invention ensures T_Sync by allocating the PLS offset portion to the signal frame.

If the signal frame includes the PLS offset portion, a reception channel scanning time and a service data acquisition time taken by the receiver may be reduced.

Specifically, PLS information in the same frame as the preamble detected and decoded by the receiver may be decoded within a time for receiving the frame, and thus the channel scanning time may be reduced. In future broadcast systems, various systems can transmit data in a physical frame using TDM and thus the complexity of channel scanning is increased. As such, if the structure of the signal frame to which the PLS offset portion is allocated according to an embodiment of the present invention is used, the channel scanning time may be reduced more.

Further, compared to the structure of the signal frame to which the PLS offset portion is not allocated (FIG. 76(*a*)), in the structure of the signal frame to which the PLS offset portion is allocated (FIG. 76(*b*)), the receiver may expect a service data acquisition time gain corresponding to the difference between the length of the signal frame and the length of the PLS_offset portion.

The above-described effect of allocating the PLS offset portion may be achieved in a case when the receiver cannot decode PLS data in the same frame as the received preamble symbol. If the frame structure module can be designed to decode the preamble and the edge symbol without allocating the PLS offset portion, the value of PLS_offset may be set to 0.

Figure 77:
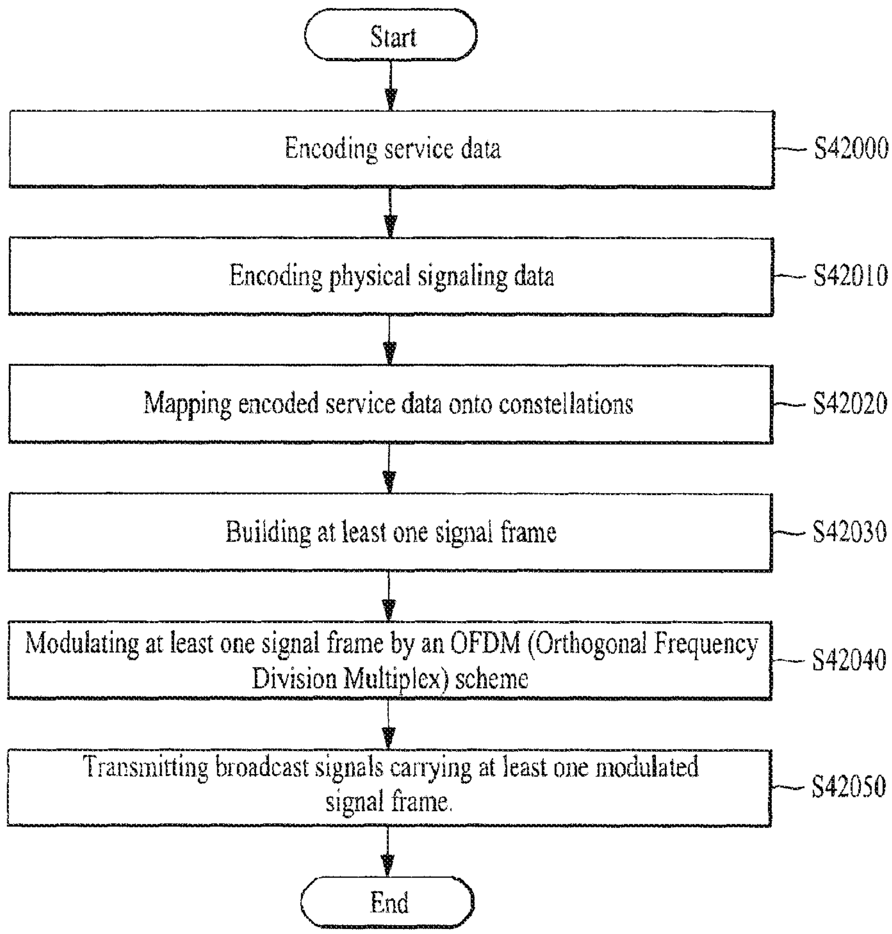
FIG. 77 is a flowchart of a broadcast signal transmission method according to another embodiment of the present invention.

FIG. 77 is a flowchart of a broadcast signal transmission method according to another embodiment of the present invention.

A broadcast signal transmission apparatus according to an embodiment of the present invention may encode service data for transmitting one or more broadcast service components (S42000). The broadcast service components may correspond to broadcast service components for a fixed receiver and each broadcast service component may be transmitted on a frame basis. The encoding method is as described above.

Then, the broadcast signal transmission apparatus according to an embodiment of the present invention may encode physical signaling data into an LDPC code based on shortening and puncturing. Here, the physical signaling data is encoded based on a code rate determined based on the size of physical signaling data (S42010). To determine the code rate and encode the physical signaling data by the broadcast signal transmission apparatus according to an embodiment of the present invention, as described above in relation to FIGS. 36 to 39, the LDPC encoder module may LDPC-encode input PLS data or BCH-encoded PLS data based on a shortened/punctured LDPC code and output the LDPC-encoded PLS data. LDPC encoding may be performed based on one of mother code types having different code rates according to the size of input physical signaling data including BCH parity.

Then, the broadcast signal transmission apparatus according to an embodiment of the present invention may map the encoded service data onto constellations (S42020). The mapping method is as described above in relation to FIGS. 16 to 35.

Then, the broadcast signal transmission apparatus according to an embodiment of the present invention builds at least one signal frame including preamble data, the physical signaling data and the mapped service data (S42030). To build the signal frame by the broadcast signal transmission apparatus according to an embodiment of the present invention, as described above in relation to FIGS. 40 and 41, PLS repetition for including two or more pieces of physical signaling data including information about two or more frames in a single frame may be used. Further, the broadcast signal transmission apparatus according to an embodiment of the present invention may configure an offset portion in a front part of physical signaling data for a current frame mapped to the signal frame, and map service data of a previous frame or physical signaling data of a next frame to the offset portion.

Then, the broadcast signal transmission apparatus according to an embodiment of the present invention may modulate the built signal frame using OFDM (S42040).

Then, the broadcast signal transmission apparatus according to an embodiment of the present invention may transmit one or more broadcast signals carrying the modulated signal frame (S42050).

Figure 78:
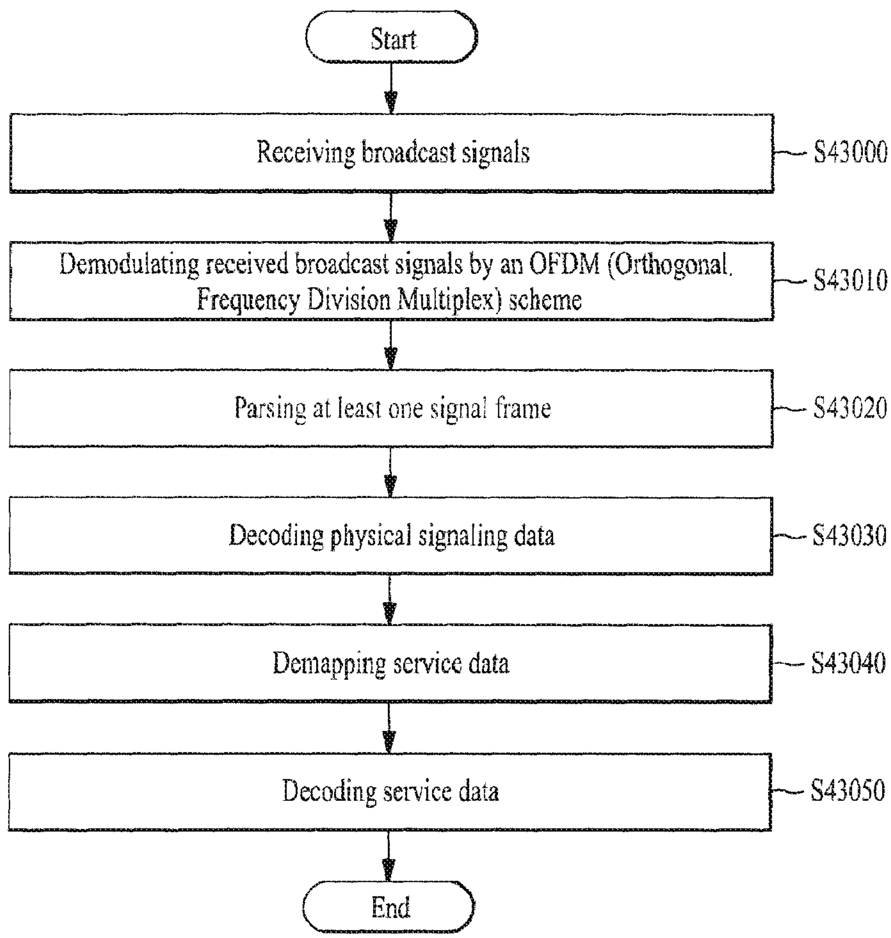
FIG. 78 is a flowchart of a broadcast signal reception method according to another embodiment of the present invention.

FIG. 78 is a flowchart of a broadcast signal reception method according to another embodiment of the present invention.

The broadcast signal reception method of FIG. 78 corresponds to an inverse procedure of the broadcast signal transmission method described above in relation to FIG. 77.

The broadcast signal reception apparatus according to an embodiment of the present invention may receive one or more broadcast signals (S43000). Then, the broadcast signal reception apparatus according to an embodiment of the present invention may demodulate the received broadcast signals using OFDM (S43010).

Then, the broadcast signal reception apparatus according to an embodiment of the present invention may parse at least one signal frame from the demodulated broadcast signals. Here, the signal frame parsed from the broadcast signals may include preamble data, physical signaling data and service data (S43020). To build the signal frame by the broadcast signal transmission apparatus according to an embodiment of the present invention, as described above in relation to FIGS. 75 and 76, PLS repetition for including two or more pieces of physical signaling data including information about two or more frames in a single frame may be used. Further, the broadcast signal transmission apparatus according to an embodiment of the present invention may configure an offset portion in a front part of physical signaling data for a current frame mapped to the signal frame, and map service data of a previous frame or physical signaling data of a next frame to the offset portion. Then, the broadcast signal reception apparatus according to an embodiment of the present invention may decode the physical signaling data based on LDPC. Here, the physical signaling data is a shortened/punctured LDPC code encoded based on a code rate determined based on the size of the physical signaling data (S43030). To determine the code rate and decode the physical signaling data, as described above in relation to FIGS. 71 to 74, the LDPC decoder module may LDPC-decode input PLS data or BCH-encoded PLS data based on a shortened/punctured LDPC code and output the LDPC-decoded PLS data. LDPC decoding may be performed based on different code rates according to the size of physical signaling data including BCH parity.

Then, the broadcast signal reception apparatus according to an embodiment of the present invention may demap the service data included in the signal frame (S43040).

Then, the broadcast signal reception apparatus according to an embodiment of the present invention may decode the service data for transmitting one or more broadcast service components (S43050).

Figure 79:
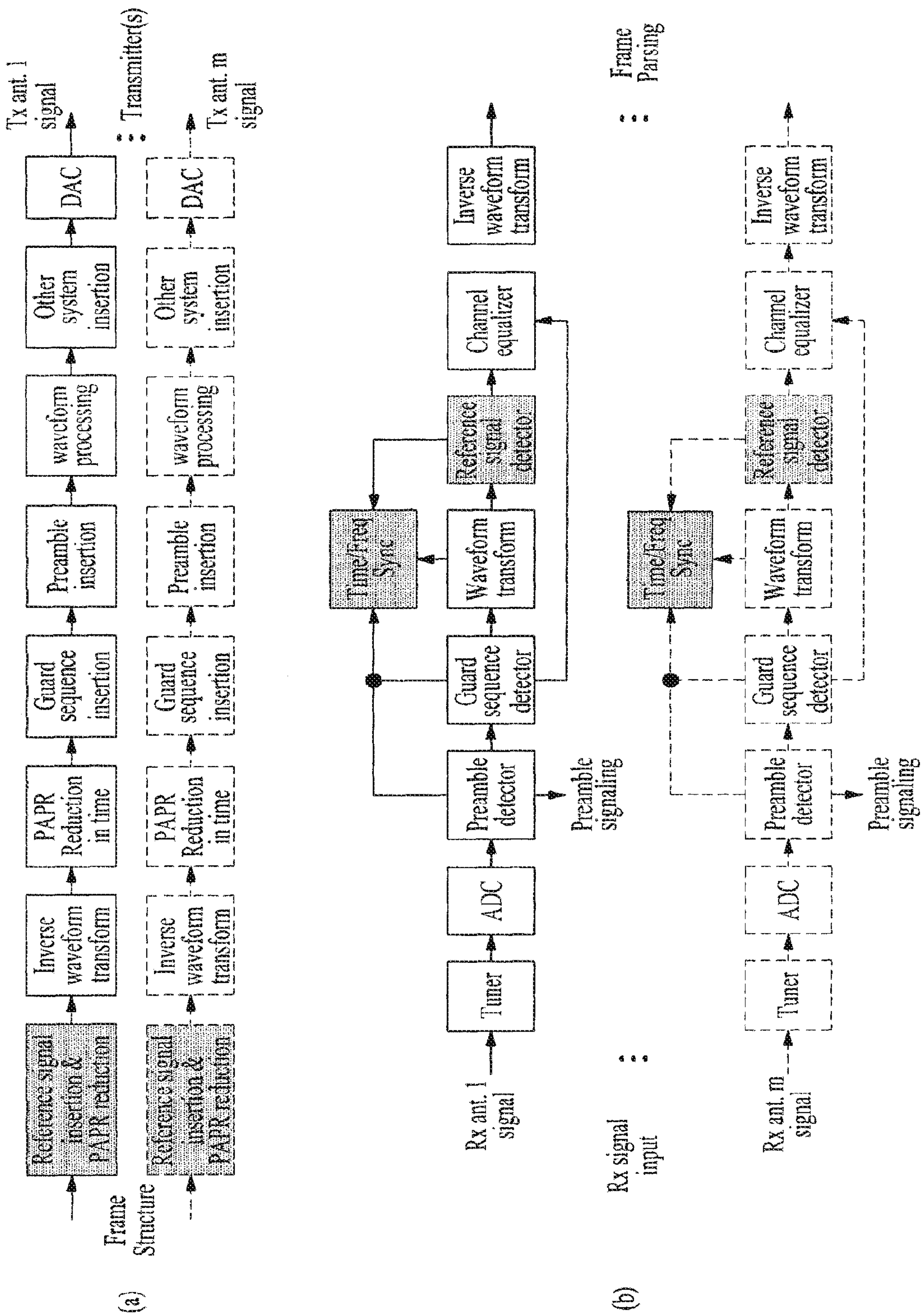
FIG. 79 illustrates a waveform generation module and a synchronization & demodulation module according to another embodiment of the present invention.

FIG. 79 illustrates a waveform generation module and a synchronization & demodulation module according to another embodiment of the present invention.

FIG. 79(*a*) shows the waveform generation module according to another embodiment of the present invention. The waveform generation module may correspond to the aforementioned waveform generation module. The wave form generation module according to another embodiment may include a new reference signal insertion & PAPR reduction block. The new reference signal insertion & PAPR reduction block may correspond to the aforementioned reference signal insertion & PAPR reduction block.

The present invention provides a method for generating a continuous pilot (CP) pattern inserted into predetermined positions of each signal block. In addition, the present invention provides a method for operating CPs using a small-capacity memory (ROM). The new reference signal insertion & PAPR reduction block according to the present invention may operate according to the methods for generating and operating a CP pattern provided by the present invention.

FIG. 79(*b*) illustrates a synchronization & demodulation module according to another embodiment of the present invention. The synchronization & demodulation module may correspond to the aforementioned synchronization & demodulation module. The synchronization & demodulation module may include a new reference signal detector. The new reference signal detector may correspond to the aforementioned reference signal detector.

The new reference signal detector according to the present invention may perform operation of a receiver using CPs according to the method for generating and operating CPs, provided by the present invention. CPs may be used for synchronization of the receiver. The new reference signal detector may detect a received reference signal to aid in synchronization or channel estimation of the receiver. Here, synchronization may be performed through coarse auto frequency control (AFC), fine AFC and/or common phase error correction (CPE).

At a transmitter, various cells of OFDM symbols may be modulated through reference information. The reference information may be called a pilot. Pilots may include a SP (scattered pilot), CP (continual pilot), edge pilot, FSS (frame signaling symbol) pilot, FES (frame edge symbol) pilot, etc. Each pilot may be transmitted at a specific boosted power level according to pilot type or pattern.

The CP may be one of the aforementioned pilots. A small quantity of CPs may be randomly distributed in OFDM symbols and operated. In this case, an index table in which CP position information is stored in a memory may be efficient. The index table may be referred to as a reference index table, a CP set, a CP group, etc. The CP set may be determined depending on FFT size and SP pattern.

CPs may be inserted into each frame. Specifically, CPs can be inserted into symbols of each frame. The CPs may be inserted in a CP pattern according to the index table. However, the size of the index table may increase as the SP pattern is diversified and the number of active carriers (NOC) increases.

To solve this problem, the present invention provides a method for operating CPs using a small-capacity memory. The present invention provides a pattern reversal method and a position multiplexing method. According to these methods, storage capacity necessary for the receiver can be decreased.

The design concept of a CP pattern may be as follows. The number of active data carriers (NOA) in each OFDM symbol is held constant. The constant NOA may conform to a predetermined NOC (or FFT mode) and SP pattern.

The CP pattern can be changed based on NOC and SP pattern to check the following two conditions: reduction of signaling information; and simplification of interaction between a time interleaver and carrier mapping.

Subsequently, CPs to be positioned in an SP-bearing carrier and a non-SP-bearing carrier can be fairly selected. This selection process may be carried out for a frequency selective channel. The selection process may be performed such that the CPs are randomly distributed with roughly even distribution over a spectrum. The number of CP positions may increase as the NOC increases. This may serve to preserve overhead of the CPs.

The pattern reversal method will now be briefly described. A CP pattern that can be used in an NOC or SP pattern may be generated based on the index table. CP position values may be arranged into an index table based on the smallest NOC. The index table may be referred to as a reference index table. Here, the CP position values may be randomly located. For a larger NOC, the index table can be extended by reversing the distribution pattern of the index table. Extension may not be achieved by simple repetition according to a conventional technique. Cyclic shifting may precede reversal of the distribution pattern of the index table according to an embodiment. According to the pattern reversal method, CPs can be operated even with a small-capacity memory. The pattern reversal method may be applied to NOC and SP modes. In addition, according to the pattern reversal method, CP positions may be evenly and randomly distributed over the spectrum. The pattern reversal method will be described in more detail later.

The position multiplexing method will now be briefly described. Like the pattern reversal method, a CP pattern that can be used in the NOC or SP pattern may be generated based on the index table. First, position values for randomly positioning CPs may be aligned into an index table. This index table may be referred to as a reference index table. The index table may be designed in a sufficiently large size to be used for/applied to all NOC modes. Then, the index table may be multiplexed through various methods such that CP positions are evenly and randomly distributed over the spectrum for an arbitrary NOC. The position multiplexing method will be described in more detail later.

Figure 80:
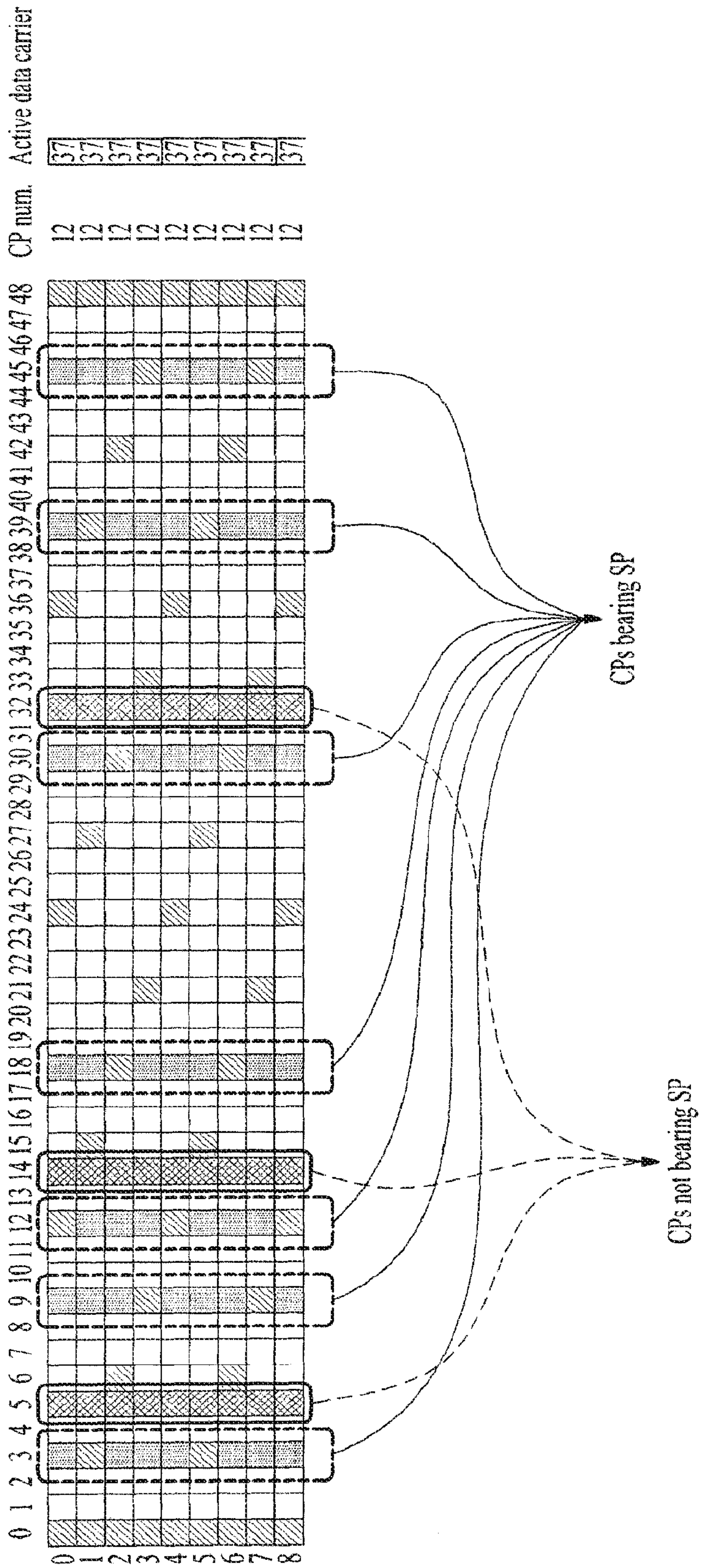
FIG. 80 illustrates definition of a CP bearing SP and a CP not bearing SP according to an embodiment of the present invention.

FIG. 80 illustrates definition of a CP bearing SP and a CP not bearing SP according to an embodiment of the present invention.

A description will be given of a random CP position generator prior to description of the pattern reversal method and the position multiplexing method. The pattern reversal method and the position multiplexing method may require the random CP position generator.

Several assumptions may be necessary for the random CP position generator. First, it can be assumed that CP positions are randomly selected by a PN generator at a predetermined NOC. That is, it can be assumed that the CP positions are randomly generated using a PRBS generator and provided to the reference index table. It can be assumed that the NOA in each OFDM symbol is constantly maintained. The NOA in each OFDM symbol may be constantly maintained by appropriately selecting CP bearing SPs and CP not bearing SPs.

In FIG. 80, uncolored portions represent CP not bearing SPs and colored portions represent CP bearing SPs.

Figure 81:
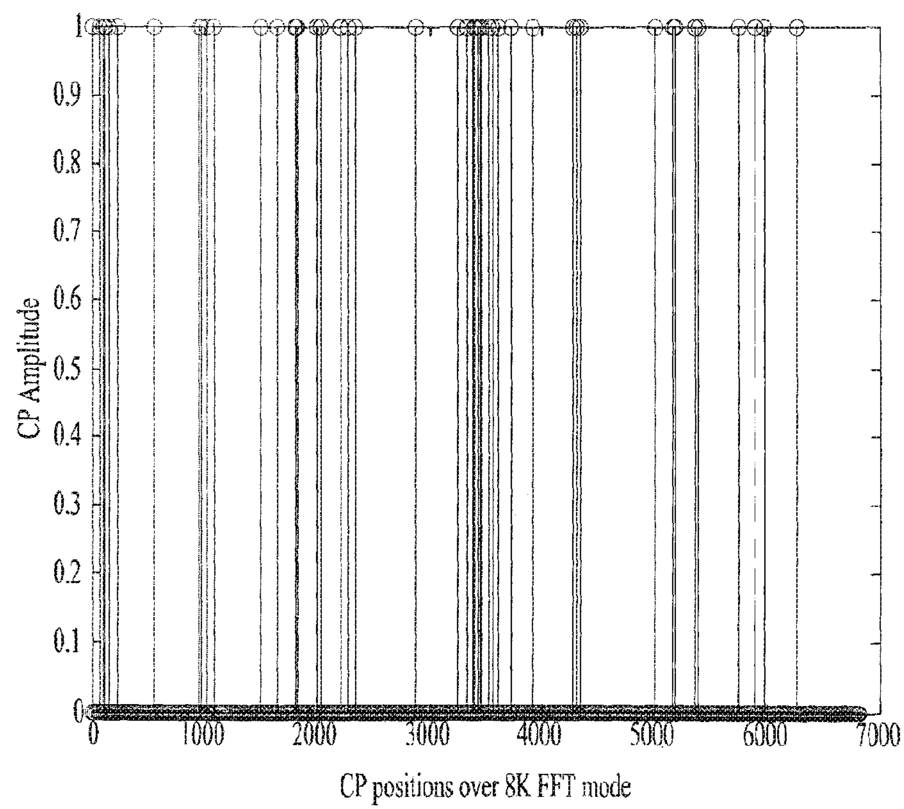
FIG. 81 shows a reference index table according to an embodiment of the present invention.

FIG. 81 shows a reference index table according to an embodiment of the present invention.

The reference index table shown in FIG. 81 may be a reference index table generated using the aforementioned assumptions. The reference index table considers 8K FFT mode (NOC: 6817) and SP mode (Dx:2, Dy:4). The index table shown in FIG. 81(*a*) may be represented as a graph shown in FIG. 81(*b*).

Figure 82:
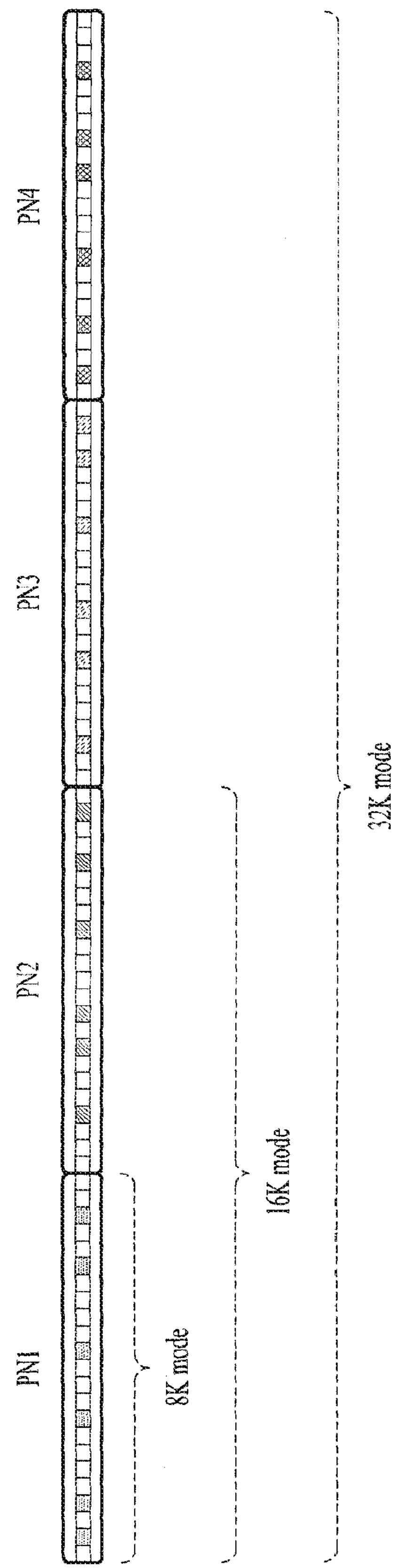
FIG. 82 illustrates the concept of configuring a reference index table in CP pattern generation method #1 using the position multiplexing method.

FIG. 82 illustrates the concept of configuring a reference index table in CP pattern generation method #1 using the position multiplexing method.

A description will be given of CP pattern generation method #1 using the position multiplexing method.

When a reference index table is generated, the index table can be divided into sub index tables having a predetermined size. Different PN generators (or different seeds) may be used for the sub index tables to generate CP positions. FIG. 82 shows a reference index table considering 8, 16 and 32K FFT modes. That is, in the case of 8K FFT mode, a single sub index table can be generated by PN1. In the case of 16K FFT mode, two sub index tables can be respectively generated by PN1 and PN2. The CP positions may be generated based on the aforementioned assumptions.

For example, when the 16K FFT mode is supported, CP position values obtained through a PN1 and PN2 generator can be sequentially arranged to distribute all CP positions. When the 32K FFT mode is supported, CP position values obtained through a PN3 and PN4 generator can be additionally arranged to distribute all CP positions.

Accordingly, CPs can be evenly and randomly distributed over the spectrum. In addition, a correlation property between CP positions can be provided.

Figure 83:
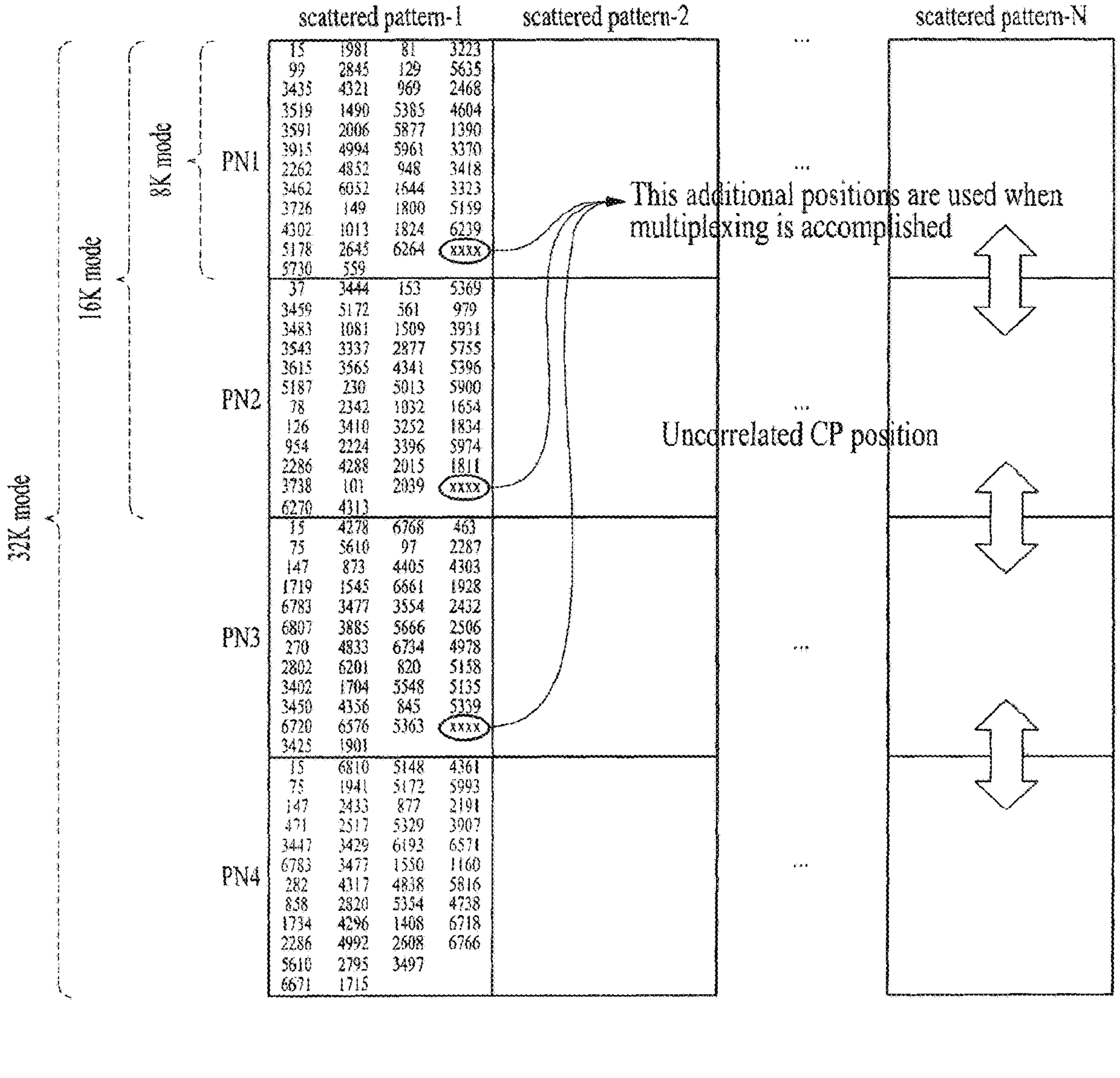
FIG. 83 illustrates a method for generating a reference index table in CP pattern generation method #1 using the position multiplexing method according to an embodiment of the present invention.

FIG. 83 illustrates a method for generating a reference index table in CP pattern generation method #1 using the position multiplexing method according to an embodiment of the present invention.

In the present embodiment, CP position information may be generated in consideration of an SP pattern with Dx=3 and Dy=4. In addition, the present embodiment may be implemented in 8K/16K/32K FFT modes (NOC: 1817/13633/27265).

CP position values may be stored in a sub index table using the 8K FFT mode as a basic mode. When 16K or higher FFT modes are supported, sub index tables may be added to the stored basic sub index table. Values of the added sub index tables may be obtained by adding a predetermined value to the stored basic sub index table or shifting the basic sub index table.

CP position values provided to the ends of sub index tables PN1, PN2 and PN3 may refer to values necessary when the corresponding sub index tables are extended. That is, the CP position values may be values for multiplexing. The CP position values provided to the ends of the sub index tables are indicated by ovals in FIG. 83.

The CP position values v provided to the ends of the sub index tables may be represented as follows.

$$v=i\cdot D_x\cdot D_y \quad \text{[Math Figure 11]}$$

Here, v can be represented as an integer multiple i of $D_x\cdot D_y$. When the 8K FFT mode is applied, the last position value of sub index table PN1 may not be applied. When the 16K FFT mode is applied, the last position value of sub index table PN1 is applied whereas the last position value of sub index table PN2 may not be applied. Similarly, when the 32K FFT mode is applied, all the last position values of sub index tables PN1, PN2 and PN3 may be applied.

In CP pattern generation method #1 using the position multiplexing method, the aforementioned multiplexing rule can be represented by the following equation. The following equation may be an equation for generating CP positions to be used in each FFT mode from a predetermined reference index table.

$$CP\_8K(k) = PN1(k), \quad \text{for } 1 \le k \le S_{PN1} - 1 \qquad \text{[Math Figure 12]}$$

$$CP\_16K(k) = \begin{cases} PN1(k), & \text{if } 1 \le k \le S_{PN1} \\ \alpha_1 + PN2(k - S_{PN1}), & elseif\ S_{PN1} + 1 \le k \le S_{PN12} - 1 \end{cases}$$

$$CP\_32K(k) = \begin{cases} PN1(k), & \text{if } 1 \le k \le S_{PN1} \\ \alpha_1 + PN2(k - S_{PN1}), & elseif\ S_{PN1} + 1 \le k \le S_{PN12} \\ \alpha_2 + PN3(k - S_{PN12}), & elseif\ S_{PN12} + 1 \le k \le S_{PN123} \\ \alpha_3 + PN4(k - S_{PN123}), & elseif\ S_{PN123} + 1 \le k \le S_{PN1234} \end{cases}$$

where $$S_{PN12} = S_{PN1} + S_{PN2}$$

$$S_{PN123} = S_{PN1} + S_{PN2} + S_{PN3}$$

$$S_{PN1234} = S_{PN1} + S_{PN2} + S_{PN3} + S_{PN4}$$

Math Figure 12 may be an equation for generating CP position values to be used in each FFT mode based on the predetermined reference index table. Here, CP_8/16/32K respectively denote CP patterns in 8K, 16K and 32K FFT modes and PN_1/2/3/4 denote sub index table names. $S_{PN\_1/2/3/4}$ respectively represent the sizes of sub index tables PN1, PN2, PN3 and PN4 and $\alpha_{1/2/3}$ represent shifting values for evenly distributing added CP positions.

In CP_8K(k) and CP_16K(k), k is limited to $S_{PN1}-1$ and $S_{PN12}-1$. Here, −1 is added since the last CP position value v is excluded, as described above.

Figure 84:
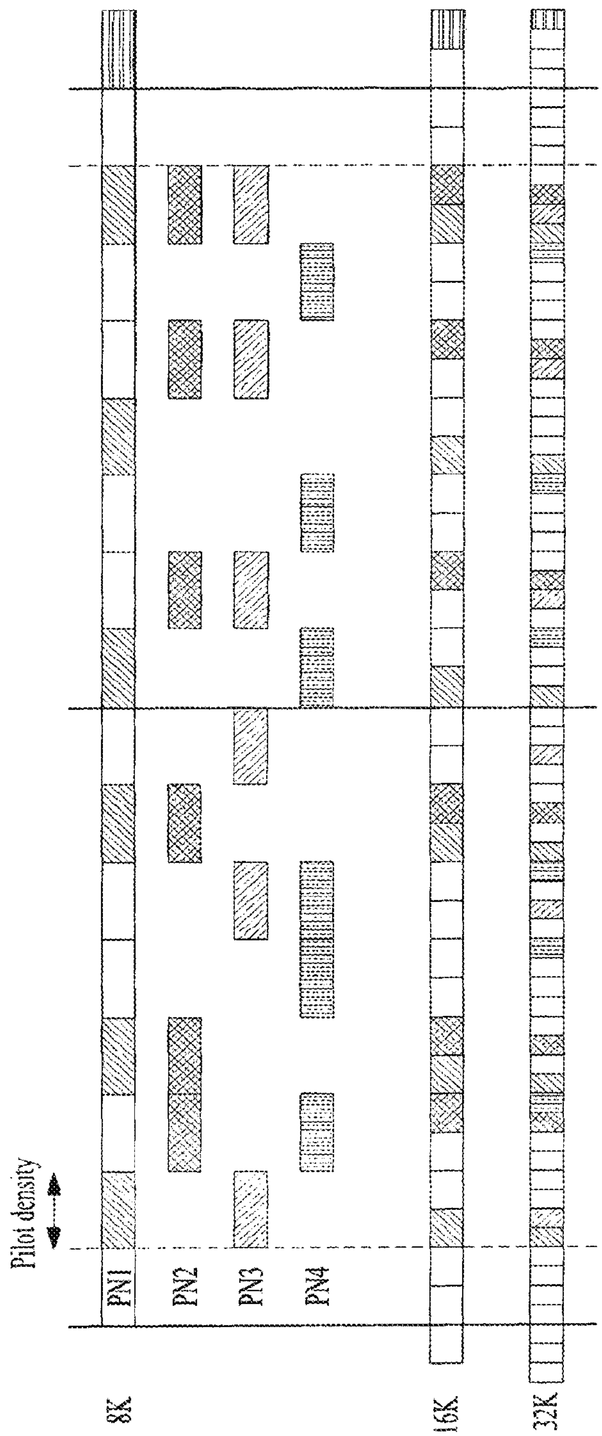
FIG. 84 illustrates the concept of configuring a reference index table in CP pattern generation method #2 using the position multiplexing method according to an embodiment of the present invention.

FIG. 84 illustrates the concept of configuring a reference index table in CP pattern generation method #2 using the position multiplexing method according to an embodiment of the present invention.

CP pattern generation method #2 using the position multiplexing method will now be described.

CP pattern generation method #2 using the position multiplexing method may be performed in a manner that a CP pattern according to FFT mode is supported. CP pattern generation method #2 may be performed in such a manner that PN1, PN2, PN3 and PN4 are multiplexed to support a CP suited to each FFT mode. Here, PN1, PN2, PN3 and PN4 are sub index tables and may be composed of CP positions generated by different PN generators. PN1, PN2, PN3 and PN4 may be assumed to be sequences in which CP position values are distributed randomly and evenly. While the reference index table may be generated through a method similar to the aforementioned CP pattern generation method #1 using the position multiplexing method, a detailed multiplexing method may differ from CP pattern generation method #1.

A pilot density block can be represented as $N_{blk}$. The number of allocated pilot density blocks $N_{blk}$ may depend on FFT mode in the same bandwidth. That is, one pilot density block $N_{blk}$ may be allocated in the case of 8K FFT mode, two pilot density blocks $N_{blk}$ may be allocated in the case of 16K FFT mode and four pilot density blocks $N_{blk}$ may be allocated in the case of 32K FFT mode. PN1 to PN4 may be multiplexed in an allocated region according to FFT mode to generate CP patterns.

PN1 to PN4 may be generated such that a random and even CP distribution is obtained. Accordingly, the influence of an arbitrary specific channel may be mitigated. Particularly, PN1 can be designed such that corresponding CP position values are disposed in the same positions in physical spectrums of 8K, 16K and 32K. In this case, a reception algorithm for synchronization can be implemented using simple PN1.

In addition, PN1 to PN4 may be designed such that they have excellent cross correlation characteristics and auto correlation characteristics.

In the case of PN2 in which CP positions are additionally determined in the 16K FFT mode, the CP positions can be determined such that PN2 has excellent auto correlation characteristics and even distribution characteristics with respect to the position of PN1 determined in the 8K FFT mode. Similarly, in the case of PN3 and PN4 in which CP positions are additionally determined in the 32K FFT mode, the CP positions can be determined such that auto correlation characteristics and even distribution characteristics are optimized based on the positions of PN1 and PN2 determined in 16K FFT mode.

CPs may not be disposed in predetermined portions of both edges of the spectrum. Accordingly, it is possible to mitigate loss of some CPs when an integral frequency offset (ICFO) is generated.

Figure 85:
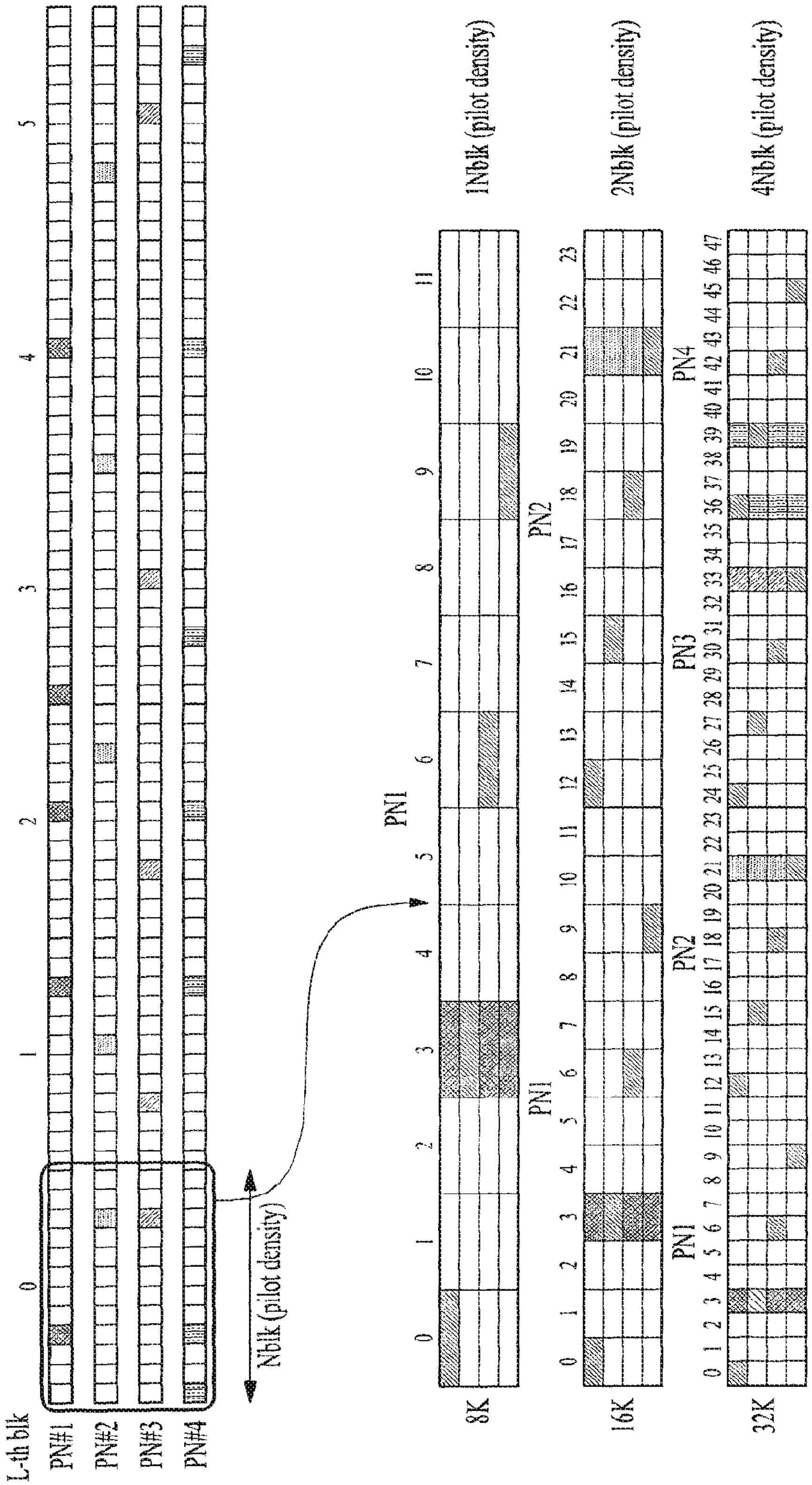
FIG. 85 illustrates a method for generating a reference index table in CP pattern generation method #2 using the position multiplexing method.

FIG. 85 illustrates a method for generating a reference index table in CP pattern generation method #2 using the position multiplexing method.

PN1 can be generated in case of the 8K FFT mode, PN1 and PN2 can be generated in case of the 16K FFT mode and PN1, PN2, PN3 and PN4 can be generated in case of the 32K FFT mode. The generation process may be performed according to a predetermined multiplexing rule.

FIG. 85 illustrates that two pilot density blocks $N_{blk}$ in case of the 16K FFT mode and four pilot density blocks $N_{blk}$ in case of the 32K FFT mode can be included in a region which can be represented by a single pilot density block $N_{blk}$ on the basis of the 8K FFT mode. PNs generated according to each FFT mode can be multiplexed to generate a CP pattern.

In the case of 8K FFT mode, a CP pattern can be generated using PN1. That is, PN1 may be a CP pattern in the 8K FFT mode.

In the case of 16K FFT mode, PN1 can be positioned in the first pilot density block (first $N_{blk}$) and PN2 can be disposed in the second pilot density block (second $N_{blk}$) to generate a CP pattern.

In the case of 32K FFT mode, PN1 can be disposed in the first pilot density block (first $N_{blk}$), PN2 can be disposed in the second pilot density block (second $N_{blk}$), PN3 can be disposed in the third pilot density block (third $N_{blk}$) and PN4 can be disposed in the fourth pilot density block (fourth $N_{blk}$) to generate a CP pattern. While PN1, PN2, PN3 and PN4 are sequentially disposed in the present embodiment, PN2 may be disposed in the third pilot density block (third $N_{blk}$) in order to insert CPs into similar positions of the spectrum as in the 16K FFT mode.

In CP pattern generation method #2 using the position multiplexing method, the aforementioned multiplexing rule can be represented by the following equation. The following equation may be an equation for generating CP positions to be used in each FFT mode from a predetermined reference index table.

[Math Figure 13]

$$CP\_8K(k) = PN1(k),$$

$$CP\_16K(k) = \begin{cases} PN1\left(\text{ceil}\left(\frac{k}{2N_{blk}}\right)\cdot N_{blk} + \text{mod}(k, 2N_{blk})\right), & 0 \le \text{mod}(k, 2N_{blk}) < N_{blk} \\ PN2\left(\text{ceil}\left(\frac{k}{2N_{blk}}\right)\cdot N_{blk} + \text{mod}((k - N_{blk}), 2N_{blk})\right), & N_{blk} \le \text{mod}(k, 2N_{blk}) < 2N_{blk} \end{cases}$$

$$CP\_32K(k) = \begin{cases} PN1\left(\text{ceil}\left(\frac{k}{4N_{blk}}\right)\cdot N_{blk} + \text{mod}(k, 4N_{blk})\right), & 0 \le \text{mod}(k, 4N_{blk}) < N_{blk} \\ PN2\left(\text{ceil}\left(\frac{k}{4N_{blk}}\right)\cdot N_{blk} + \text{mod}((k - N_{blk}), 4N_{blk})\right), & N_{blk} \le \text{mod}(k, 4N_{blk}) < 2N_{blk} \\ PN3\left(\text{ceil}\left(\frac{k}{4N_{blk}}\right)\cdot N_{blk} + \text{mod}((k - 2N_{blk}), 4N_{blk})\right), & 2N_{blk} \le \text{mod}(k, 4N_{blk}) < 3N_{blk} \\ PN4\left(\text{ceil}\left(\frac{k}{4N_{blk}}\right)\cdot N_{blk} + \text{mod}((k - 3N_{blk}), 4N_{blk})\right), & 3N_{blk} \le \text{mod}(k, 4N_{blk}) < 4N_{blk} \end{cases}$$

Math Figure 13 may be an equation for generating CP position values to be used in each FFT mode based on the predetermined reference index table. Here, CP_8/16/32K respectively denote CP patterns in 8K, 16K and 32K FFT modes and PN1 to PN4 denote sequences. These sequences may be four pseudo random sequences. In addition, ceil(X), ceiling function of X, represents a function outputting a minimum value from among integers equal to or greater than X and mod(X,N) is a modulo function capable of outputting a remainder obtained when X is divided by N.

For the 16K FFT mode and the 32K FFT mode, sequences PN1 to PN4 may be multiplexed in offset positions determined according to each FFT mode. In the above equation, offset values may be represented by modulo operation values of predetermined integer multiples of basic $N_{blk}$. The offset values may be different values.

Figure 86:
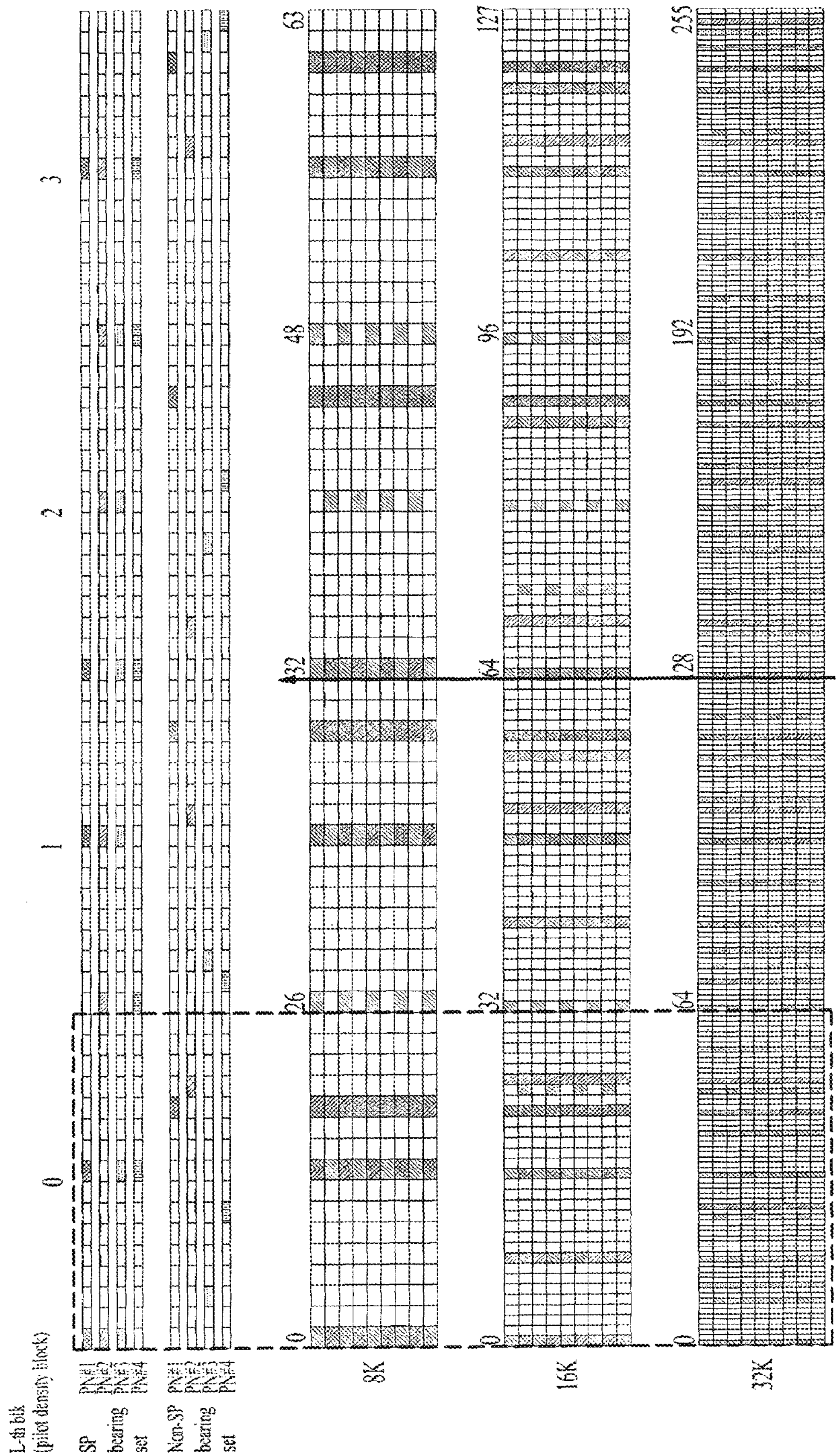
FIG. 86 illustrates a method for generating a reference index table in CP pattern generation method #3 using the position multiplexing method according to an embodiment of the present invention.

FIG. 86 illustrates a method for generating a reference index table in CP pattern generation method #3 using the position multiplexing method according to an embodiment of the present invention.

In the present embodiment, PN1 to PN4 may be assumed to be sequences in which CP position values are distributed randomly and evenly. In addition, PN1 to PN4 may be optimized to satisfy correlation and even distribution characteristics for 8K, 16K and 32K, as described above.

The present embodiment may relate to a scattered pilot pattern for channel estimation. In addition, the present embodiment may relate to a case in which distance Dx in the frequency direction is 8 and distance Dy in the time direction is 2. The present embodiment may be applicable to other patterns.

As described above, PN1 can be generated in the case of 8K FFT mode, PN1 and PN2 can be generated in the case of 16K FFT mode and PN1, PN2, PN3 and PN4 can be generated in the case of 32K FFT mode. The generation process may be performed according to a predetermined multiplexing rule.

FIG. 86 shows that two pilot density blocks $N_{blk}$ in case of the 16K FFT mode and four pilot density blocks $N_{blk}$ in case of the 32K FFT mode can be included in a region which can be represented by a single pilot density block $N_{blk}$ on the basis of the 8K FFT mode.

PNs generated according to each FFT mode can be multiplexed to generate a CP pattern. In each FFT mode, CPs may be disposed overlapping with SPs (SP bearing) or disposed not overlapping with SPs (non-SP bearing). In the present embodiment, a multiplexing rule for SP bearing or non-SP bearing CP positioning can be applied in order to dispose pilots in the same positions in the frequency domain.

In the case of SP bearing, PN1 to PN4 may be disposed such that CP positions are distributed randomly and evenly for an SP offset pattern. Here, PN1 to PN4 may be sequences forming an SP bearing set. PN1 to PN4 may be positioned according to the multiplexing rule for each FFT mode. That is, in the case of 16K FFT mode, PN2 added to PN1 can be disposed in positions other than an SP offset pattern in which PN1 is positioned. A position offset with respect to PN2 may be set such that PN2 is positioned in positions other than the SP offset pattern in which PN1 is positioned or PN2 may be disposed in a pattern determined through a relational expression. Similarly, in the case of 32K FFT mode, PN3 and PN4 may be configured to be disposed in positions other than SP offset patterns in which PN1 and PN2 are positioned.

In case of non-SP bearing, PN1 to PN4 may be positioned according to a relational expression. Here, PN1 to PN4 may be sequences forming a non-SP bearing set.

In CP pattern generation method #3 using the position multiplexing method, the aforementioned multiplexing rule can be represented by the following equations. The following equations may be equations for generating CP positions to be used in each FFT mode from a predetermined reference index table.

[Math Figure 14]

$$1)\ SP \text{ bearing set: } PN1_{sp}(k),\ PN2_{sp}(k),\ PN3_{sp}(k),\ PN4_{sp}(k)$$

$$CP_{sp}\_8K(k) = PN1_{sp}(k),$$

$$CP_{sp}\_16K(k) = \begin{cases} PN1_{sp}(k)\times 2, \\ PN2_{sp}(k)\times 2 + \alpha_{16k}, \end{cases}$$

$$CP_{sp}\_32K(k) = \begin{cases} CP_{sp}\_16K(k)*2 = \begin{cases} (PN1_{sp}(k)\times 2)\times 2 \\ (PN1_{sp}(k)\times 2 + \alpha_{16k})\times 2 \end{cases} \\ PN3_{sp}(k)*4 + \alpha 1_{32K} \\ PN4_{sp}(k)*4 + \alpha 2_{32K} \end{cases}$$

-continued

2) Non $SP$ bearing set: $PN1_{nonsp}(k)$, $PN2_{nonsp}(k)$, $PN3_{nonsp}(k)$, $PN4_{nonsp}(k)$ [Math Figure 15]

$$CP_{nonsp}\_8K(k) = PN1_{nonsp}(k),$$

$$CP_{nonsp}\_16K(k) = \begin{cases} PN1_{nonsp}(k)\times 2, \\ PN2_{nonsp}(k)\times 2+\beta_{16k}, \end{cases}$$

$$CP_{nonsp}\_32K(k) = \begin{cases} CP_{nonsp}\_16K(k)*2 = \begin{cases} (PN1_{nonsp}(k)\times 2)\times 2 \\ (PN1_{nonsp}(k)\times 2+\beta_{16k})\times 2 \end{cases} \\ PN3_{nonsp}(k)*4+\beta1_{32K} \\ PN4_{nonsp}(k)*4+\beta2_{32K} \end{cases}$$

[Math Figure 16]

$$CP\_8K(k) = \{CP_{sp}\_8K(k),\ CP_{nonsp}\_8K(k)\}$$

$$CP\_16K(k) = \{CP_{sp}\_16K(k),\ CP_{nonsp}\_16K(k)\}$$

$$CP\_32K(k) = \{CP_{sp}\_32K(k),\ CP_{nonsp}\_32K(k)\}$$

The above equations may be equations for generating CP position values to be used in each FFT mode based on the predetermined reference index table. Here, CP_8/16/32K respectively denote CP patterns in 8K, 16K and 32K FFT modes and $CP_{sp}$_8/16/32K respectively denote SP bearing CP patterns in 8K, 16K and 32K FFT modes. $CP_{nonsp}$_8/16/32K respectively represent non-SP bearing CP patterns in 8K, 16K and 32K FFT modes and $PN1_{sp}$, $PN2_{sp}$, $PN3_{sp}$ and $PN4_{sp}$, represent sequences for SP bearing pilots. These sequences may be four pseudo random sequences. These sequences may be included in an SP being set. $PN1_{nonsp}$, $PN2_{nonsp}$, $PN3_{nonsp}$ and $PN4_{nonsp}$ denote sequences for non-SP bearing pilots. These sequences may be four pseudo random sequences and may be included in a non-SP bearing set. In addition, $\alpha_{16K}$, $\alpha1_{32K}$, $\alpha2_{32K}$, $\beta_{16K}$, $\beta1_{32K}$ and $\beta2_{32K}$ represent CP position offsets.

Respective SP bearing CP patterns can be generated using $PN1_{sp}$, $PN2_{sp}$, $PN3_{sp}$ and $PN4_{sp}$, as represented by Math Figure 14. Respective non-SP bearing patterns can be generated using $PN1_{nonsp}$, $PN2_{nonsp}$, $PN3_{nonsp}$ and $PN4_{nonsp}$, as represented by Math Figure 15. As represented by Math Figure 16, the CP pattern of each FFT mode can be composed of an SP bearing CP pattern and a non-SP bearing CP pattern. That is, an SP bearing CP index table can be added to a non-SP bearing CP index table to generate a reference index table. Consequently, CP insertion can be performed according to the non-SP bearing CP index table and the SP bearing CP index table. Here, non-SP bearing CP position values may be called a common CP set and SP bearing CP position values may be called an additional CP set.

CP position offsets may be values predetermined for multiplexing, as described above. The CP position offsets may be allocated to the same frequency irrespective of FFT mode or used to correct CP characteristics.

Figure 87:
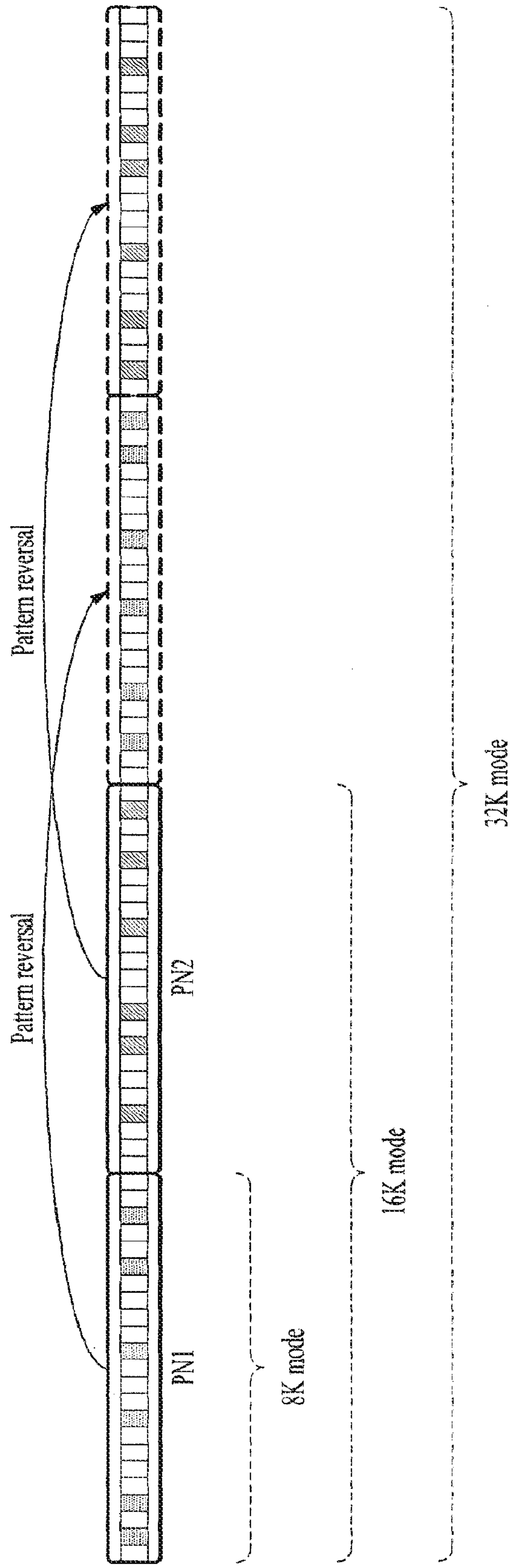
FIG. 87 illustrates the concept of configuring a reference index table in CP pattern generation method #1 using the pattern reversal method.

FIG. 87 illustrates the concept of configuring a reference index table in CP pattern generation method #1 using the pattern reversal method.

CP pattern generation method #1 using the pattern reversal method will now be described.

As described above, when the reference index table is generated, the table can be divided into sub index tables having a predetermined size. The sub index tables may include CP positions generated using different PN generators (or different seeds).

In the pattern reversal method, two sub index tables necessary in the 8K, 16K and 32K FFT modes can be generated by two different PN generators. Two sub index tables additionally necessary in the 32K FFT mode can be generated by reversing the pre-generated two sub index tables.

That is, when the 16K FFT mode is supported, CP positions according to PN1 and PN2 can be sequentially arranged to obtain a CP position distribution. When the 32K FFT mode is supported, however, CP positions according to PN1 and PN2 can be reversed to obtain a CP position distribution.

Accordingly, a CP index table in the 32K FFT mode can include a CP index table in the 16K FFT mode. In addition, the CP index table in the 16K FFT mode can include a CP index table in the 8K FFT mode. According to an embodiment, the CP index table in the 32K FFT mode may be stored and the CP index tables in the 8K and 16K FFT modes may be selected/extracted from the CP index table in the 32K FFT mode to generate the CP index tables in the 8K and 16K FFT modes.

According to the aforementioned pattern reversal method, CP positions can be distributed evenly and randomly over the spectrum. In addition, the size of a necessary reference index table can be reduced compared to the aforementioned position multiplexing method. Furthermore, memory storage capacity necessary for the receiver can be decreased.

Figure 88:
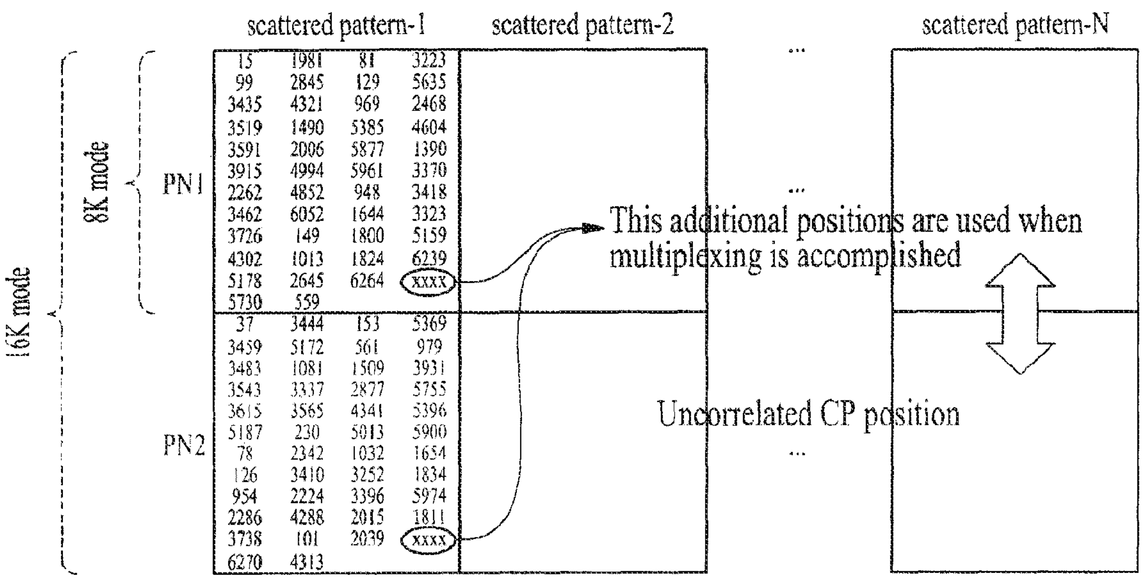
FIG. 88 illustrates a method for generating a reference index table in CP pattern generation method #1 using the pattern reversal method according to an embodiment of the present invention.

FIG. 88 illustrates a method for generating a reference index table in CP pattern generation method #1 using the pattern reversal method according to an embodiment of the present invention.

In the present embodiment, CP position information may be generated in consideration of an SP pattern with Dx=3 and Dy=4. In addition, the present embodiment may be implemented in 8K/16K/32K FFT modes (NOC: 1817/13633/27265).

CP position values may be stored in a sub index table using the 8K FFT mode as a basic mode. When 16K or higher FFT modes are supported, sub index tables may be added to the stored basic sub index table. Values of the added sub index tables may be obtained by adding a predetermined value to the stored basic sub index table or shifting the basic sub index table.

The 32K FFT mode index table can be generated using sub index tables obtained by reversing sub index tables of PN1 and PN2.

CP position values provided to the ends of sub index tables PN1 and PN2 may refer to values necessary when the corresponding sub index tables are extended. That is, the CP position values may be values for multiplexing. The CP position values provided to the ends of the sub index tables are indicated by ovals in FIG. 83.

The CP position values v provided to the ends of the sub index tables may be represented as follows.

$$v=i\cdot D_x\cdot D_y \quad \text{[Math Figure 17]}$$

Here, v can be represented as an integer multiple i of $D_x\cdot D_y$. When the 8K FFT mode is applied, the last position value of sub index table PN1 may not be applied. When the 16K FFT mode is applied, the last position value of sub index table PN1 is applied whereas the last position value of sub index table PN2 may not be applied.

The index table for the 32K FFT mode can be generated using the index table for the 16K FFT mode and an index table obtained by reversing the index table for the 16K FFT mode. Accordingly, the last position value of sub index table PN1 can be used twice and the last position value of sub index table PN2 can be used only once.

In the extension of a sub index table, extension according to v may be necessary or unnecessary according to embodiment. That is, there may be an embodiment of extending/reversing a sub index table without v.

In CP pattern generation method #1 using the pattern reversal method, the aforementioned multiplexing rule can be represented by the following equation. The following equation may be an equation for generating CP positions to be used in each FFT mode from a predetermined reference index table.

[Math FIG. 18]

$$\mathrm{CP\_8}K(k) = PN1(k),\ \text{for } 1 \le k \le S_{PN1} - 1$$

$$\mathrm{CP\_16}K(k) = \begin{cases} PN1(k), & \text{if } 1 \le k \le S_{PN1} \\ \alpha_1 + PN2(k - S_{PN1}), & elseif\ S_{PN1} + 1 \le k \le S_{PN12} - 1 \end{cases}$$

$$\mathrm{CP\_32}K(k) = \begin{cases} PN1(k), & \text{if } 1 \le k \le S_{PN1} \\ \alpha_1 + PN2(k - S_{PN1}), & elseif\ S_{PN1} + 1 \le k \le S_{PN12} - 1 \\ \alpha_2 + \boxed{(\beta - PN1(k - S_{PN12} + 1)),} & elseif\ S_{PN12} \le k \le S_{PN12} - 1 \\ \alpha_3 + \boxed{(\beta - PN2(k - S_{PN121} + 1)),} & elseif\ S_{PN121} \le k \le S_{PN1212} - 1 \end{cases}$$

$$\text{where } S_{PN12} = S_{PN1} + S_{PN2}$$
$$S_{PN121} = 2S_{PN1} + S_{PN2}$$
$$S_{PN1212} = 2S_{PN1} + 2S_{PN2}$$
$$\beta = aD_xD_y$$

A CP pattern in each FFT mode can be generated according to Math Figure 18. Here, symbols may be the same as the above-described ones. A denotes an integer closest to the NOA of the 8K FFT mode. That is, when the NOA is 6817, N may be 6816.

In CP_8K(k), CP_16K(k) and CP_32K(k), k may be respectively limited to $S_{PN1}-1$, $S_{PN12}-1$, $S_{PN121}-1$ and $S_{PN1212}-1$. Here, −1 is added since the last CP position value v may be excluded according to situation, as described above. In Math Figure 18, $$(\beta - PN1(k - S_{PN12}+1)),$$

$$(\beta - PN2(k - S_{PN121}+1)),$$

in a box represents pattern reversal.

Figure 89:
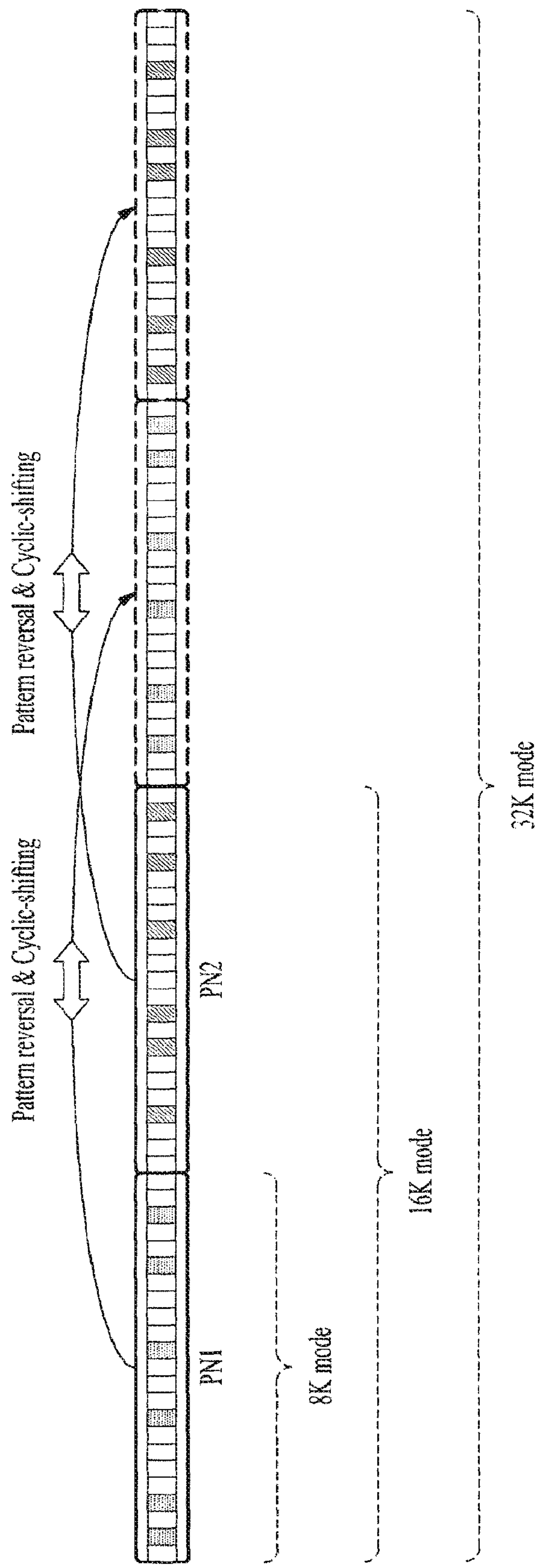
FIG. 89 illustrates the concept of configuring a reference index table in CP pattern generation method #2 using the pattern reversal method according to an embodiment of the present invention.

FIG. 89 illustrates the concept of configuring a reference index table in CP pattern generation method #2 using the pattern reversal method according to an embodiment of the present invention.

CP pattern generation method #2 using the pattern reversal method will now be described.

As described above, when the reference index table is generated, the table can be divided into sub index tables having a predetermined size. The sub index tables may include CP positions generated using different PN generators (or different seeds).

Two sub index tables necessary in the 8K, 16K and 32K FFT modes can be generated by two different PN generators, as described above. Two sub index tables additionally necessary in the 32K FFT mode can be generated by reversing the pre-generated two sub index tables. However, CP pattern generation method #2 using the pattern reversal method can generate two necessary sub index tables by cyclic-shifting patterns and then reversing the patterns rather than simply reversing the previously generated two sub index tables. Reversing operation may precede cyclic shifting operation according to embodiment. Otherwise, simple shifting instead of cyclic shifting may be performed according to embodiment.

Accordingly, a CP index table in the 32K FFT mode can include a CP index table in the 16K FFT mode. In addition, the CP index table in the 16K FFT mode can include a CP index table in the 8K FFT mode. According to an embodiment, the CP index table in the 32K FFT mode may be stored and the CP index tables in the 8K and 16K FFT modes may be selected/extracted from the CP index table in the 32K FFT mode to generate the CP index tables in the 8K and 16K FFT modes.

As described above, when the 16K FFT mode is supported, CP position values according to PN1 and PN2 can be sequentially arranged to obtain a CP position distribution. However, according to CP pattern generation method #2 using the pattern reversal method, CP position values according to PN1 and PN2 can be cyclically shifted and then reversed to obtain a CP position distribution when the 32K FFT mode is supported.

According to CP pattern generation method #2 using the pattern reversal method, CP positions can be distributed evenly and randomly over the spectrum. In addition, the size of a necessary reference index table can be reduced compared to the aforementioned position multiplexing method. Furthermore, memory storage capacity necessary for the receiver can be decreased.

In CP pattern generation method #2 using the pattern reversal method, the aforementioned multiplexing rule can be represented by the following equation. The following equation may be an equation for generating CP positions to be used in each FFT mode from a predetermined reference index table.

[Math FIG. 19]

$$\mathrm{CP\_8}K(k) = PN1(k),\ \text{for } 1 \le k \le S_{PN1} - 1$$

$$\mathrm{CP\_16}K(k) = \begin{cases} PN1(k), & \text{if } 1 \le k \le S_{PN1} \\ \alpha_1 + PN2(k - S_{PN1}), & elseif\ S_{PN1} + 1 \le k \le S_{PN12} - 1 \end{cases}$$

$$\begin{cases} PN1(k), \text{ if } 1 \le k \le S_{PN1} \\ \alpha_1 + PN2(k - S_{PN1}),\ elseif\ S_{PN1} + 1 \le k \le S_{PN12} - 1 \\ \boxed{\begin{matrix} \mathrm{mod}(\gamma_1 + \alpha_2 + (\beta - PN1 \\ (k - S_{PN12} + 1)), \beta) \\ \mathrm{mod}(\gamma_2 + \alpha_3 + (\beta - PN2 \\ (k - S_{PN121} + 1)), \beta, \end{matrix}} \\ elseif\ S_{PN12} \le k \le S_{PN121} - 1 \\ elseif\ S_{PN121} \le k \le S_{PN1212} - 1 \end{cases}$$

$$\text{where } S_{PN12} = S_{PN1} + S_{PN2}$$
$$S_{PN121} = 2S_{PN1} + S_{PN2}$$
$$S_{PN1212} = 2S_{PN1} + 2S_{PN2}$$
$$\beta = aD_xD_y$$

A CP pattern in each FFT mode can be generated according to Math Figure 19. Here, symbols may be the same as the above-described ones. β denotes an integer closest to the NOA of the 8K FFT mode. That is, when the NOA is 6817, β may be 6816. $\gamma_{1/2}$ is a cyclic shift value.

In CP_8K(k), CP_16K(k) and CP_32K(k), k may be respectively limited to $S_{PN1}-1$, $S_{PN12}-1$, $S_{PN121}-1$ and $S_{PN1212}-1$. Here, −1 is added since the last CP position value v may be excluded according to situation, as described above. In Math Figure 19, $$\mathrm{mod}(\gamma_1+\alpha_2+(\beta-PN1(k-S_{PN12}+1)),\beta),$$

$$\mathrm{mod}(\gamma_1+\alpha_2+(\beta-PN2(k-S_{PN121}+1)),\beta),$$

in a box represents pattern reversal and cyclic shifting.

The CP pattern can be generated by a method other than aforementioned CP pattern generation methods. According to other embodiments, a CP set (CP pattern) of certain FFT size can be generated from a CP set of other FFT size, organically and dependently. In this case, a whole CP set or a part of the CP set can be base of generation process. For example, a CP set of 16K FFT mode can be generated by selecting/extracting CP positions from a CP set of 32K FFT mode. In same manner, a CP set of 8K FFT mode can be generated by selecting/extracting CP positions from a CP set of 32K FFT mode.

According to other embodiments, CP set can include SP bearing CP positions and/or non SP bearing CP positions. Non SP bearing CP positions can be referred to as common CP set. SP bearing CP positions can be referred to as additional CP set. That is, CP set can include a common CP set and/or an additional CP set. A case that only a common CP set is included in the CP set can be referred to as normal CP mode. A case that the CP set includes both a common CP set and an additional CP set can be referred to as extended CP mode.

Values of common CP sets can be different based on FFT size. According to embodiments, the common CP set can be generated by aforementioned Pattern reversal method and/or Position multiplexing method.

Values of additional CP sets can be different based on transmission methods, such as SISO or MIMO. In situation that additional robustness is needed, such as mobile reception, or for any other reasons, additional CP positions can be added to the CP set, by adding an additional CP set.

Consequently, CP insertion can be performed according to the CP set (reference index table).

As described above, the broadcast signal transmission apparatus according to an embodiment or the above-mentioned waveform transform block 7200 may insert pilots into a signal frame generated from a frame structure module 1200, and may OFDM-modulate broadcast signals using transmission (Tx) parameters. Tx parameters according to the embodiment may also be called OFDM parameters.

The present invention proposes Tx parameters that can satisfy a spectrum mask reference contained in a transmission (Tx) band for the next generation broadcast transmission/reception (Tx/Rx) system, can maximize Tx efficiency, and can be applied to a variety of Rx scenarios.

FIG. 90 shows a table illustrating information related to a reception mode according to an embodiment of the present invention.

A Table shown in FIG. 90 may include a network configuration according to a reception mode of the next generation broadcast Tx/Rx system.

As described above, the reception modes according to the embodiment can be classified into a Fixed Rooftop environment and a Handheld portable environment, and a representative channel for each environment can be decided.

In addition, the broadcast signal transmission apparatus according to the embodiment can decide the transmission (Tx) mode according to the above-mentioned reception mode. That is, the broadcast signal transmission apparatus according to the embodiment may process broadcast service data using the non-MIMO schemes (MISO and SISO schemes) or the MIMO scheme according to the broadcast service characteristics (i.e., according to the reception mode). Accordingly, the broadcast signal for each Tx mode may be transmitted and received through a Tx channel corresponding to the corresponding processing scheme.

In this case, according to one embodiment of the present invention, broadcast signals of individual Tx modes can be identified and transmitted in units of a signal frame. In addition, each signal frame may include a plurality of OFDM symbols. Each OFDM symbol may be comprised of the above-mentioned preamble (or preamble symbols) and a plurality of data symbols configured to transmit data corresponding to a broadcast signal.

A left column of the Table shown in FIG. 90 shows the above-mentioned three reception modes.

In case of the fixed rooftop environment, the broadcast signal reception apparatus may receive broadcast signals through the rooftop antenna located at the height of 10 ms or higher above the ground. Accordingly, since a direct path can be guaranteed, a Rician channel is representatively used, the Rician channel is less affected by Doppler, and the range of a delay spread may be limited according to the use of a directional antenna.

In case of the handheld portable environment and the handheld mobile environment, the broadcast signal reception apparatus may receive broadcast signals through the omni-directional antenna located at the height of 1.5 m or less above the ground. In this case, a Rayleigh channel may be representatively used as the Tx channel environment based on reflected waves, and may obtain the range of a delay spread of a channel longer than the directional antenna.

In case of the handheld portable environment, a low-level Doppler environment can be supported as the indoor/outdoor reception environments in consideration of mobility such as an adult walking speed. The handheld portable environment shown in FIG. 90 can be classified into the fixed environment and the pedestrian environment.

On the other hand, the handheld mobile environment must consider not only the walking speed of a receiving user, but also the moving speed of a vehicle, a train, etc. such that the handheld mobile environment can support the high Doppler environment.

A right column of the Table shown in FIG. 90 shows the network configuration for each reception mode.

The network configuration may indicate the network structure. The network configuration according to the embodiment can be classified into a Multi Frequency Network (MFN) composed of a plurality of frequencies and a Single Frequency Network (SFN) composed of a single frequency according to a frequency management method within the network.

MFN may indicate a network structure for transmitting a broadcast signal using many frequencies in a wide region. A plurality of transmission towers located at the same region or a plurality of broadcast signal transmitters may transmit the broadcast signal through different frequencies. In this case, the delay spread caused by a natural echo may be formed by a topography, geographic features, etc. In addition, the broadcast signal receiver is designed to receive only one radio wave, such that the reception quality can be determined according to the magnitude of a received radio wave.

SFN may indicate a network structure in which a plurality of broadcast signal transmitters located at the same region can transmit the same broadcast signal through the same frequency. In this case, the maximum delay spread of a transmission (Tx) channel becomes longer due to the additional man-made echo. In addition, the reception (Tx) quality may be affected not only by a mutual ratio between a radio wave to be received and a radio wave of the jamming frequency, but also by a delay time, etc.

When deciding the Tx parameters, the guard interval value may be decided in consideration of the maximum delay spread of the Tx channel so as to minimize the inter symbol interference. The guard interval may be a redundant data additionally inserted into the transmitted broadcast signal, such that it is necessary to design the entire symbol duration to minimize the loss of SNR in consideration of the entire Tx power efficiency.

Figure 91:
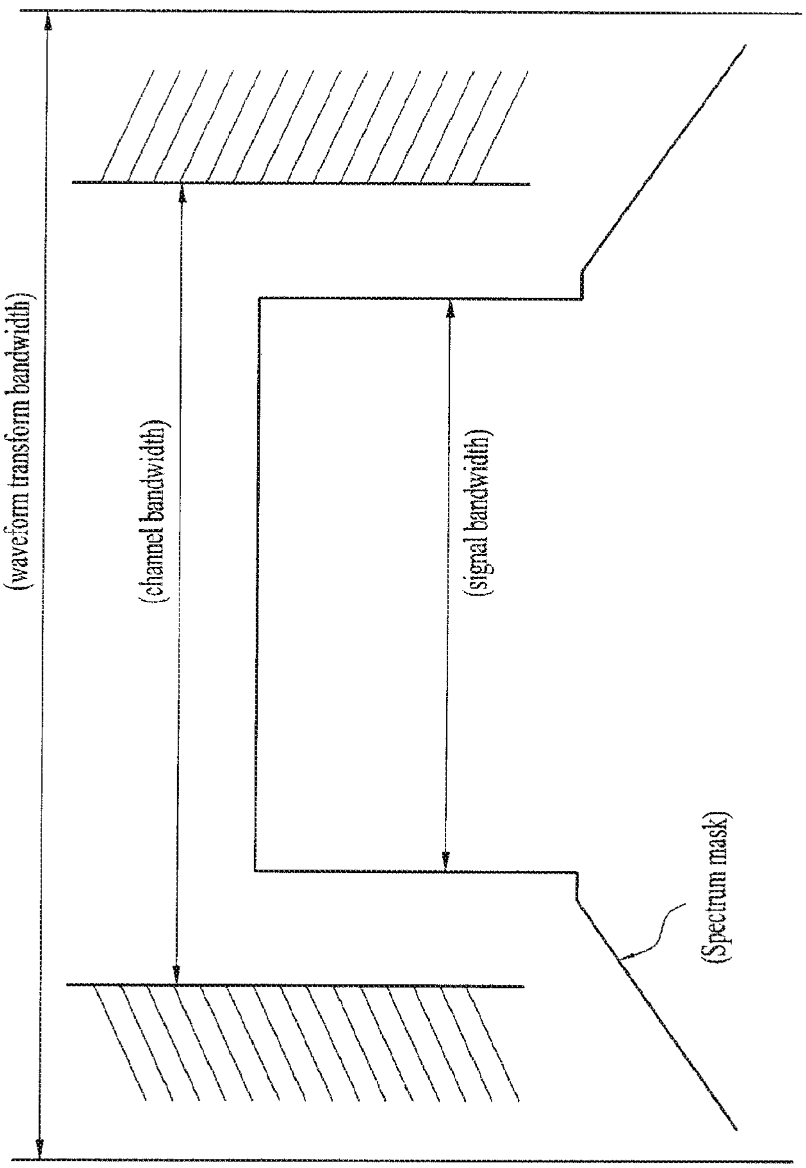
FIG. 91 shows a bandwidth of the broadcast signal according to an embodiment of the present invention.

FIG. 91 shows a bandwidth of the broadcast signal according to an embodiment of the present invention.

Referring to FIG. 91, the bandwidth of the broadcast signal is identical to a waveform transform bandwidth, the waveform transform bandwidth may include a channel bandwidth and a spectrum mask, and the channel bandwidth may include a signal bandwidth. The transmission (Tx) parameters according to the embodiment need to satisfy the spectrum mask requested for minimizing interference of a contiguous channel within the corresponding channel bandwidth allocated to the next generation broadcast Tx/Rx system, and need to be designed for maximizing the Tx efficiency within the bandwidth of the corresponding broadcast signal. In addition, a plurality of carriers can be used when the above-mentioned waveform generation module 1300 converts input signals, the Tx parameters may coordinate or adjust the spacing among subcarriers according to the number of subcarriers used in the waveform transform bandwidth, the length of an entire symbol in a time domain is decided, and a transmission (Tx) mode appropriate for the Rx scenario of the next generation broadcast Tx/Rx system is classified, such that the Tx parameters can be designed according to the Rx scenario.

FIG. 92 shows tables including Tx parameters according to the embodiment.

FIG. 92(A) is a Table that shows guard interval values to be used as Tx parameters according to the above-mentioned reception mode and the network configuration. FIG. 92(B) is a Table that shows vehicle speed values to be used as Tx parameters according to the above-mentioned reception mode and the network configuration.

As described above, the guard interval may be designed in consideration of the maximum delay spread based on the network configuration and the Rx antenna environment according to the reception (Rx) scenario.

The vehicle speed used as the Tx parameter may be designed and decided in consideration of the network configuration and the Rx antenna environment according to Rx scenario categories types.

In order to implement the optimal design of the next generation broadcast Tx/Rx system, the present invention provides a method for establishing the guard interval (or elementary guard interval) and the vehicle speed, and optimizing Tx parameters using the optimization scaling factor.

Symbols (or OFDM symbols) contained in the signal frame according to the embodiment may be transmitted for a specific duration. In addition, each symbol may include not only a guard interval region corresponding to the useful part corresponding to the active symbol duration length, but also the guard interval. In this case, the guard interval region may be located ahead of the useful part.

As shown in FIG. 92(A), the guard interval according to the embodiment may be set to $N_{G\_a1}$, $N_{G\_a2}$, . . . , $N_{G\_b1}$, $N_{G\_b2}$, . . . , $N_{G\_c1}$, $N_{G\_c2}$, . . . , $N_{G\_d1}$, $N_{G\_d2}$, . . . , $N_{G\_e1}$, $N_{G\_e2}$, . . . , $N_{G\_f1}$, $N_{G\_f2}$, . . . , $N_{G\_g1}$, $N_{G\_g2}$, . . . , $N_{G\_h1}$, $N_{G\_h2}$, . . . according to the above-mentioned reception modes.

The guard intervals (a) and (b) shown in FIG. 92(A) may show exemplary guard intervals applicable to the next generation broadcast Tx/Rx system. In more detail, the guard interval (a) shows one embodiment in which the elementary guard interval is set to 25 μs, and the guard interval (b) shows another embodiment in which the elementary guard interval is set to 30 μs. In the above-mentioned embodiments, the optimization scaling factor for implementing optimization based on a network structure while simultaneously optimizing Tx efficiency of Tx signals and SNR damage is set to $L_{alpha1}$, $L_{alpha2}$, $L_{beta1}$, or $L_{beta2}$.

As shown in FIG. 92(B), the vehicle speed according to the embodiment may be set to quasi static, $<V_{p\_a1}$ km/h, $<V_{p\_b1}$ km/h, $V_{m\_a1}$ km/h~$V_{m\_a2}$ km/h, or $V_{m\_b1}$ km/h~$V_{m\_b2}$ km/h according to the above-mentioned reception modes.

The vehicle speed (a) shown in FIG. 92(B) shows an example of the vehicle speed applicable to the next generation broadcast Tx/Rx system according to the embodiment.

In accordance with this embodiment, the elementary vehicle speed may be set to 'quasi-static', '3 km/h', and '3 km/h~200 km/h' according to the respective reception scenarios, and the optimization scaling factor for implementing optimization based on the network structure and optimizing Tx efficiency of Tx signals and time-variant channel estimation may be set to $V_{alpha1}$, $V_{alpha2}$, $V_{beta1}$, and $V_{beta1}$.

The following equation may be used to decide an effective signal bandwidth (hereinafter referred to as eBW) of the optimized Tx signals according to the present invention $$eBW=\{N_{waveform\_scaling}\times(N_{pilotdensy}\times N_{eBW})+\alpha\}\times Fs \text{ (Hz)} \quad \text{[Math Figure 20].}$$

In Math Figure 20, $N_{waveform\_scaling}$ may denote a waveform scaling factor, $N_{pilotdensity}$ may denote a pilot density scaling factor, $N_{eBW}$ may denote an effective signal bandwidth scaling factor, and a may denote an additional bandwidth factor. In addition, Fs may denote a sampling frequency.

In order to decide the effective signal bandwidth (eBW) optimized for a spectrum mask based on a channel bandwidth, the present invention may use the above-mentioned factors as the optimization parameters (or optimum parameters). Specifically, according to the equation of the present invention, Tx efficiency of Tx parameters can be maximized by coordinating the waveform transform bandwidth (sampling frequency). The individual factors shown in Equation will hereinafter be described in detail.

The waveform scaling factor is a scaling value depending upon a bandwidth of a carrier to be used for waveform transform. The waveform scaling factor according to the embodiment may be set to an arbitrary value proportional to the length of nonequispaced fast Fourier transform (NFFT) in case of OFDM.

The pilot density scaling factor may be established according to a predetermined position of a reference signal inserted by a reference signal insertion and PAPR reduction block 7100, and may be established by the density of the reference signal.

The effective signal bandwidth scaling factor may be set to an arbitrary value that can satisfy a specification of a spectrum mask contained in the Tx channel bandwidth and at the same time can maximize the bandwidth of the Tx signals. As a result, the optimum eBW can be designed.

The additional bandwidth factor may be set to an arbitrary value for coordinating additional information and structures needed for the Tx signal bandwidth. In addition, the additional bandwidth factor may be used to improve the edge channel estimation throughput of spectrums through reference signal insertion.

Number of Carrier (NoC) may be a total number of carriers transmitted through the signal bandwidth, and may be denoted by an equation contained in a brace of the equation.

The broadcast signal transmission apparatus according to the present invention may use Tx parameters that are capable of optimizing the effective signal bandwidth (eBW) according to the number of subcarriers used for transform. In addition, the broadcast signal transmission apparatus according to the present invention can use the above-mentioned effective signal bandwidth scaling factor as a transmission (Tx) parameter capable of optimizing the effective signal bandwidth (eBW).

The effective signal bandwidth (eBW) scaling factor is extended in units of a pilot density of a predetermined reference signal, such that the eBW scaling factor may be set to a maximum value optimized for the spectrum mask. In this case, the broadcast signal transmission apparatus according to the present invention coordinates the waveform transform bandwidth (i.e., sampling frequency) of vague parts capable of being generated according to the pilot density unit, such that the eBW scaling factor for the spectrum mask can be decided.

FIG. 93 shows a table including Tx parameters capable of optimizing the effective signal bandwidth (eBW) according to the embodiment.

The Tx parameters shown in FIG. 93 can satisfy the Federal Communications Commission (FCC) spectrum mask for the 6 MHz channel bandwidth, and can optimize the effective signal bandwidth (eBW) of the next generation broadcast system based on the OFDM scheme.

FIG. 93(A) shows Tx parameters (See Example A) established with respect to the guard interval (a) and the vehicle speed (a). FIG. 93(B) shows Tx parameters (See Example B) established with respect to the guard interval (b) and the vehicle speed (b).

FIG. 93(A') shows a table indicating an embodiment of a GI duration for combination of FFT and GI modes established by the concept of FIG. 93(A). FIG. 93(B') shows a table indicating an embodiment of a GI duration for combination of FFT (NFFT) and GI modes established by the concept of FIG. 93(B).

Although the Tx parameters shown in FIGS. 93(A) and 93(B) are established for three FFT modes (i.e., 8K, 16K and 32K FFT modes), it should be noted that the above Tx parameters can also be applied to other FFT modes (i.e., 1K/2K/4K/64K FFT modes) as necessary. In addition, FIG. 93(A) and FIG. 93(B) show various embodiments of the optimization scaling factors applicable to the respective FFT modes.

The broadcast signal transmission apparatus according to the embodiment can insert the reference signal into the time and frequency domains in consideration of the Tx parameters shown in (A) and (B), the reception scenario, and the network configuration, and the reference signal can be used as additional information for synchronization and channel estimation.

The broadcast signal transmission apparatus according to the embodiment may establish the density (Npilotdensity) of a reference signal and the optimized eBW in consideration the ratio of a channel estimation range of the guard interval. In addition, the waveform scaling factor according to the embodiment may be determined in proportion to the FFT size for each FFT mode.

If a total number of the remaining carriers other than a null carrier used as a guard band during IFFT is decided by the waveform transform scheme, the broadcast signal transmission apparatus according to the embodiment may coordinate the waveform transform bandwidth (i.e., sampling frequency) so as to determine a maximum signal bandwidth not exceeding the spectrum mask. The sampling frequency may decide the optimized signal bandwidth, and may be sued to decide the OFDM symbol duration and the subcarrier spacing. Accordingly, the sampling frequency may be determined in consideration of not only the guard interval, a Tx channel of the vehicle speed, and the reception scenario, but also the Tx signal efficiency and the SNR damage. In FIG. 93, (A) shows an embodiment in which 'Fs' is set to 221/32 MHz, and (B) shows an embodiment in which 'Fs' is set to (1753/256) MHz.

'fc' in FIGS. 93(A) and 93(B) may denote the center frequency of the RF signal, and 'Tu' may denote an active symbol duration.

FIG. 94 shows a table including Tx parameters for optimizing the effective signal bandwidth (eBW) according to another embodiment of the present invention.

FIG. 94(A) shows a table indicating the same Tx parameters (See Example A) as in FIG. 93(A). FIG. 94(B) shows another embodiment of the Table of FIG. 93(B). Table of FIG. 94(B) shows Tx parameters (See Example B-1) established with respect to the guard interval (b) and the vehicle speed (b).

FIG. 94(A') shows a table indicating an embodiment of a GI duration for combination of FFT and GI modes established by the concept of FIG. 94(A). FIG. 94(B') shows a table indicating an embodiment of a GI duration for combination of FFT and GI modes established by the concept of FIG. 94(B).

Although the Tu value of the center column of FIG. 94(B) is changed to 2392.6 differently from the concept of FIG. 93(B), the remaining functions and values of the respective Tx parameters shown in FIG. 94 are identical to those of FIG. 93, and as such a detailed description thereof will herein be omitted for convenience of description.

FIG. 95 shows a Table including Tx parameters for optimizing the effective signal bandwidth (eBW) according to another embodiment of the present invention.

FIG. 95(A) shows a Table indicating another embodiment of the concept of FIG. 94(B). In more detail, FIG. 95(A) is a Table including Tx parameters (See Example B-2) in case that 'Fs' is set to 219/32 MHz. FIG. 95(B) shows a Table indicating an embodiment of a GI duration for combination of FFT and GI modes established by the concept of FIG. 95(A).

Tx parameters shown in FIG. 95(A) has a lower eBW value whereas they have higher values of fc and Tu, differently from the Tx parameters shown in FIG. 94(B). In this case, according to one embodiment of the present invention, the eBW value may be set to a specific value that is capable of being established as a factor with respect to the channel bandwidth.

FIG. 96 shows Tx parameters according to another embodiment of the present invention.

As can be seen from FIG. 96(A), when establishing the scaling factor and the Fs value corresponding to a channel bandwidth of 5, 7, or 8 MHz, the resultant scaling factor can be obtained by the product (multiplication) of a scaling factor having been calculated on the basis of the 6 MHz Fs value. The scaling factor may correspond to the rate of the channel bandwidth.

FIG. 96(B) is a Table including Tx parameters capable of optimizing the effective signal bandwidth (eBW) shown in FIGS. 93 to 95.

In more detail, a Table located at an upper part of FIG. 96(B) shows Tx parameters corresponding to the 5, 6, 7, 8 MHz channel bandwidths of FIGS. 93(A) and 94(B).

The table located at the center part of FIG. 96(B) shows Tx parameters corresponding to the 5, 6, 7, 8 MHz channel bandwidths of the example (B-1) of FIG. 94.

The table located at the lower part of FIG. 96(B) shows Tx parameters corresponding to the channel bandwidth shown in the example (B-2) of FIG. 95.

Referring to the second row of FIG. 96(A), the Fs value corresponding to each channel bandwidth in the upper end of FIG. 96(B) is calculated by the product of the scaling factor having been calculated on the basis of the 6 MHz Fs value.

Referring to the third row of FIG. 96(A), the Fs value corresponding to each channel bandwidth in the center part of FIG. 96(B) is calculated by the product of the scaling factor having been calculated on the basis of the 6 MHz Fs value. Referring to the third row of FIG. 96(A), the Fs value corresponding to each channel bandwidth in the lower part of FIG. 96(B) is calculated by the product of the scaling factor having been calculated on the basis of the 6 MHz Fs value.

Figure 97:
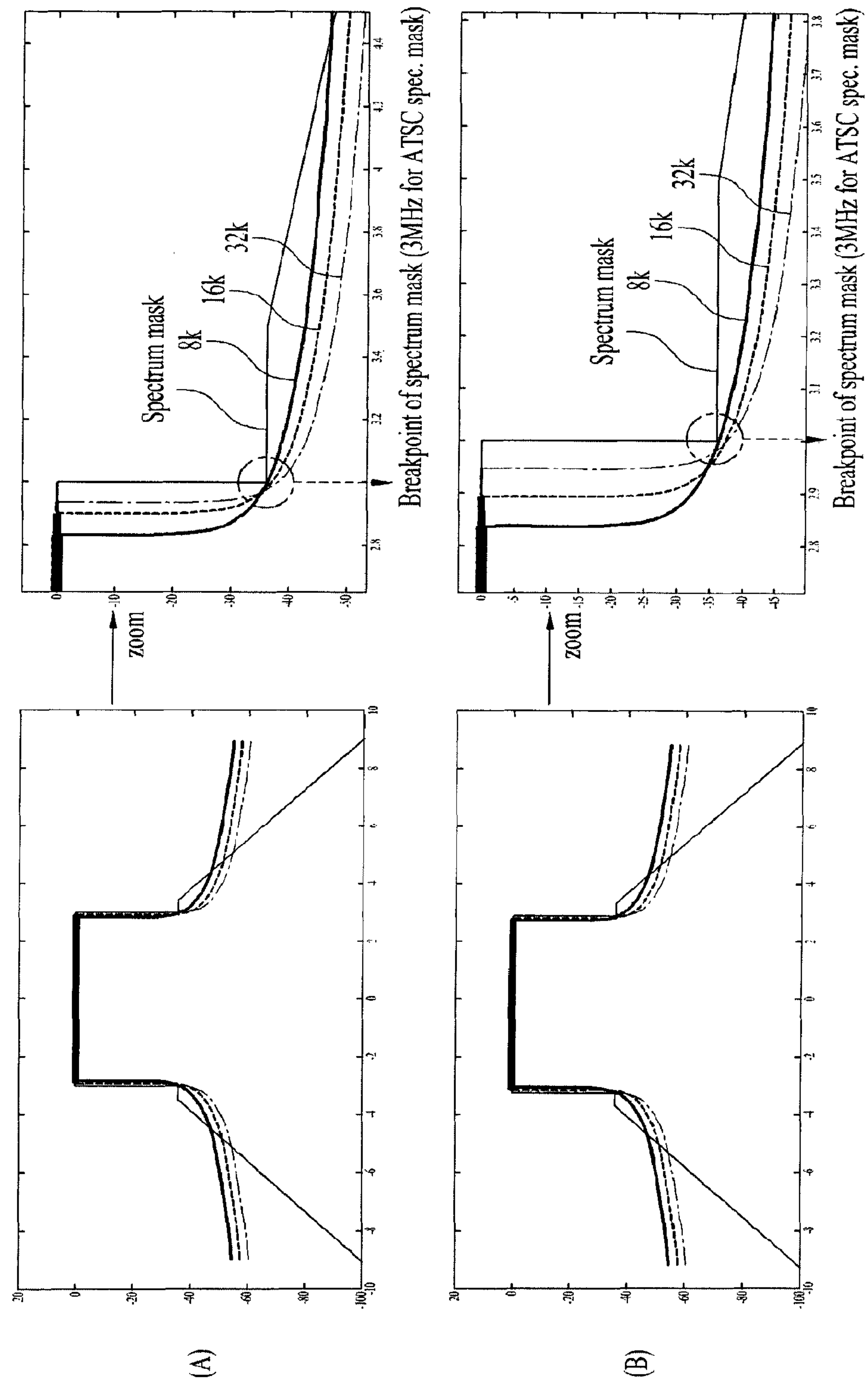
FIG. 97 is a graph indicating Power Spectral Density (PSD) of a transmission (Tx) signal according to an embodiment of the present invention.

FIG. 97 is a graph indicating Power Spectral Density (PSD) of a transmission (Tx) signal according to an embodiment of the present invention.

FIG. 97 shows the Power Spectral Density (PSD) calculated using the above-mentioned Tx parameters when the channel bandwidth is set to 6 MHz.

The left graph of FIG. 97(A) shows the PSD of the Tx signal optimized for the FCC spectrum mask of the example (A) of FIGS. 93 and 94. The right graph of FIG. 97(A) shows the enlarged result of some parts of the left graph.

The left graph of FIG. 97(B) shows the PSD of the Tx signal optimized for the FCC spectrum mask of the example (B) of FIG. 93. The right graph of FIG. 97(B) shows the enlarged result of some parts of the left graph.

As shown in the right graph of (A) and (B), individual graphs show not only lines for designating the FCC spectrum mask specification, but also lines indicating PSD of the Tx signal derived using Tx parameters corresponding to 8K, 16K and 32K.

In order to optimize the Tx signal efficiency as shown in FIG. 97, the PSD of each Tx signal need not exceed a threshold value of the spectrum mask at a breakpoint of the target spectrum mask. In addition, a band of the PSD of an out-of-band emission Tx signal may be limited by a baseband filter as necessary.

FIG. 98 is a table showing information related to the reception mode according to another embodiment of the present invention.

FIG. 98 shows another embodiment of the Table showing information related to the reception mode of FIG. 90. Table of FIG. 98 shows a network configuration, an FFT value (NFFT), a guard interval, and a vehicle speed, that correspond to each reception mode. The guard interval and the vehicle speed of FIG. 98 are identical to those of FIG. 92.

Since the fixed rooftop environment corresponds to a time-variant Tx channel environment, it is less affected by Doppler, such that a large-sized FFT such as 16K, 32K, etc. can be used. In addition, data transmission can be carried out in a manner that a higher data Tx efficiency can be achieved in the redundancy ratio such as the guard interval, the reference signal, etc. appropriate for the network configuration.

In case of the handheld portable environment, a low-level Doppler environment can be supported as the indoor/outdoor reception environments in consideration of mobility such as an adult walking speed, and FFT such as 8K, 16K, 32K, etc. capable of supporting a high frequency sensitivity can be used.

The handheld mobile environment must consider not only the walking speed of a receiving user, but also the moving speed of a vehicle, a train, etc. such that the handheld mobile environment can support the high Doppler environment, and can use 4K-, 8K-, and 16K-FFT capable of supporting a relatively low frequency sensitivity.

The guard interval according to an embodiment of the present invention may be established to support the same-level coverage in consideration of the network configuration for each reception.

The following description proposes the pilot pattern used as a reference signal for Tx channel estimation and the pilot mode for the same Tx channel estimation on the basis of the above embodiments of the above-mentioned Tx parameters.

The broadcast signal transmission apparatus or the above-mentioned waveform transform block 7200 according to the embodiment can insert a plurality of pilots into a signal frame generated from the frame structure module 1200, and can OFDM-modulate the broadcast signals using the Tx parameters. Various cells contained in the OFDM symbol may be modulated using reference information (i.e., pilots). In this case, the pilots may be used to transmit information known to the broadcast signal receiver, and the individual pilots may be transmitted at a power level specified by a pilot pattern.

The pilots according to the embodiment of the present invention may be used for frame synchronization, frequency and time synchronization, channel estimation, etc.

The pilot mode according to the embodiment of the present invention may be specific information for indicating pilots which reduce overhead of Tx parameters and are established to transmit the optimized broadcast signal. The above-mentioned pilot pattern and pilot mode may equally be applied to the above-mentioned reception mode and network configuration. In addition, the pilot pattern and pilot mode according to the embodiment can be applied to data symbols contained in the signal frame.

Figure 99:
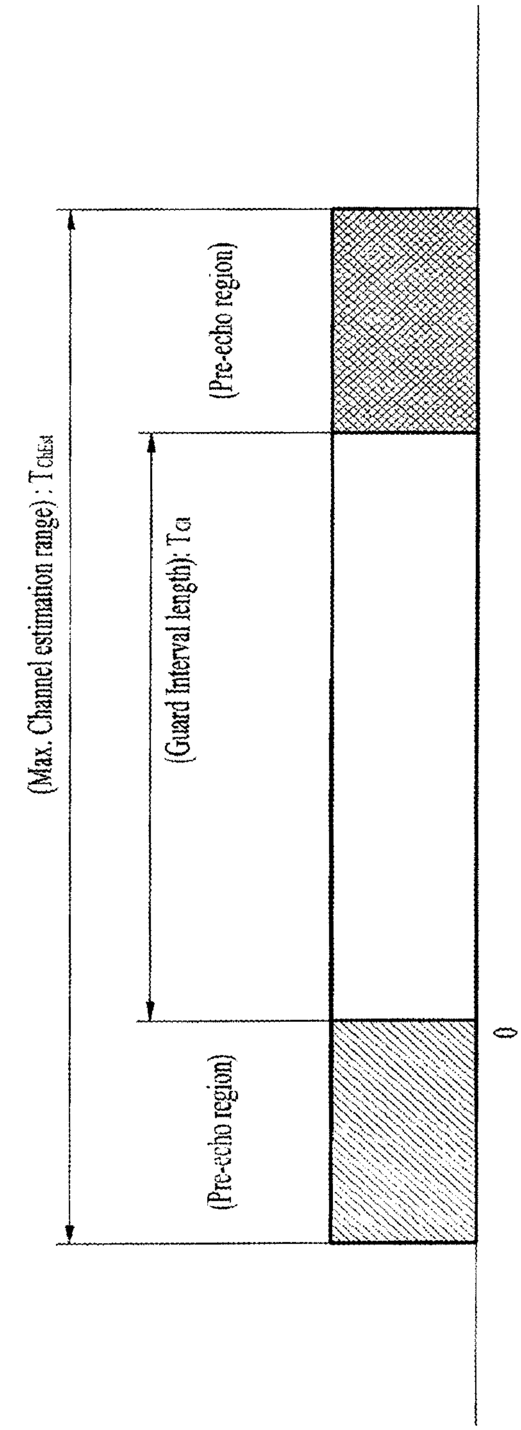
FIG. 99 shows the relationship between a maximum channel estimation range and a guard interval according to the embodiment.

FIG. 99 shows the relationship between a maximum channel estimation range and a guard interval according to the embodiment.

As described above, Math Figure 20 is used to decide the effective signal bandwidth (eBW) of the Tx signal, and may use the pilot density scaling factor as an optimization parameter. In this case, Math Figure 20 may be decided by optimizing time- and frequency-arrangement of the pilot signal for SISO channel estimation, a pilot density related to data efficiency, and Dx and Dy values.

The pilot density may correspond to the product of a distance between pilots of the time and frequency domains, and pilot overhead occupied by pilots of the symbol may correspond to an inverse number of the pilot density.

Dx may denote a distance between pilots in a frequency domain, and Dy may denote a distance between pilots in a time domain. Dy may be used to decide the maximum tolerable Doppler speed. Accordingly, Dy may be set to a specific value that is optimized in consideration of the vehicle speed decided according to Rx scenario categories.

As described above, the pilot density may be used to decide the pilot overhead, and the Dx and Dy values may be decided in consideration of the Tx channel state and the Tx efficiency.

The maximum channel estimation range (TChEst) shown in FIG. 99 may be decided by dividing the Tx parameter (Tu) by the Dx value.

The guard interval having a predetermined length, the pre-echo region, and the post-echo region may be contained in the maximum channel estimation range.

The ratio of a given guard interval and a maximum channel estimation range may indicate a margin having a channel estimation range for estimating the guard interval. If the margin value of the channel estimation range exceeds the guard interval length, values exceeding the guard interval length may be assigned to the pre-echo region and the post-echo region. The pre-echo region and the post-echo region may be used to estimate the channel impulse response exceeding the guard interval length, and may be used as a region to be used for estimation and compensation of a timing error generable in a synchronization process. However, if the margin is increased in size, the pilot overhead is unavoidably increased so that Tx efficiency can be reduced.

FIGS. 100 and 101 show Tables in which pilot parameters depending on the guard intervals (A) and (B) and the vehicle speed are defined, and the tables shown in FIGS. 100 and 101 will hereinafter be described in detail.

FIG. 100 shows a Table in which pilot parameters are defined according to an embodiment of the present invention.

FIG. 100 shows the pilot parameters according to the guard interval (A) and the vehicle speed. FIG. 100(A) is a table indicating pilot patterns for use in the SISO and MIXO Tx channels, FIG. 100(B) shows the configuration of a pilot pattern for use in the SISO and MIXO Tx channels, and FIG. 100(C) is a table indicating the configuration of a pilot pattern for use in the MIXO Tx channel.

In more detail, FIG. 100(A) shows the pilot pattern decided for each pilot density value and the Dx and Dy values defined in each of the SISO and MIXO Tx channels. The pilot pattern according to this embodiment may be denoted by PP5-4 in which a first number denotes the Dx value and a second number denotes the Dy value. If the Dx value in the same pilot density is reduced, the pilot pattern can support a longer delay spread. If the Dy value is reduced, the pilot pattern can adaptively cope with a faster Doppler environment.

FIG. 100(B) and FIG. 100(C) show Tables including the guard interval duration and the pilot pattern configuration depending on the FFT value. In more detail, numbers shown in the first row of each table shown in (B) and (C) may denote the guard interval duration. The first column may denote FFT (NFFT) values described in FIGS. 93 to 96. However, although FIGS. 100(B) and 100(C) equally show the configuration of the pilor pattern for use in the MIXO case, there is a difference in FIGS. 100(B) and 100(C) in that FIG. 100(B) shows the MIXO-1 pilot pattern having a larger pilot overhead, and FIG. 100(C) shows the MIXO-2 pilot pattern having a lower mobility.

The duration of the guard interval shown in FIGS. 100(B) and 100(C) is conceptually identical to the guard interval length shown in FIG. 99. In accordance with the embodiment of the present invention, 25 μs, 50 μs, 100 μs, 200 μs, and 400 μs values may be used in consideration of the maximum delay spread, and the FFT size may be set to 8K, 16K and 32K.

As can be seen from (A), the Dx value may be set to 5, 10, 20, 40, 80, or 160 in consideration of the guard interval duration and the FFT size. In this case, an elementary Dx value (5) acting as a basic value may be defined as a changeable value depending on each Tx mode, and may be established in consideration of about 20% of the margin value of the above-mentioned channel estimation range. In addition, according to one embodiment of the present invention, the margin value of the channel estimation range may be coordinated or adjusted using the $L_{alpha1}$ value in MFN and using the $L_{alpha2}$ value in SFN as shown in FIGS. 92(A) and 92(B).

The Dy value may be established according to a reception (Rx) scenario and the Tx mode dependent upon the Rx scenario. Accordingly, the Dy value may be assigned different values according to the SISO or MIXO Tx channel. As shown in the drawing, Dy may be set to 2, 4 or 8 in case of the SISO Tx channel according to an embodiment of the present invention.

The MIXO Tx channel is classified into the MIXO-1 version having large pilot overhead and the MIXO-2 version having lower mobility, such that the Dy value can be established in different ways according to individual versions.

The MIXO-1 version having large overhead increases the pilot overhead, so that I can support the same maximum delay spread and the same maximum mobile speed in the same network configuration as in the SISO Tx channel. In this case, the Dy value may be set to 2, 4 or 8 in the same manner as in the SISO Tx channel. That is, the MIXO-1 Tx channel can be applied not only to the above-mentioned handheld portable environment but also the handheld mobile environment.

The MIXO-2 version having low mobility is designed to guarantee the same coverage and capacity as in the SISO Tx channel although the MIXO-2 version has a little damage in terms of the mobile speed support. In this case, the Dy value may be set to 4, 8, or 16.

FIG. 101 shows a Table in which pilot parameters of another embodiment are defined.

In more detail, FIG. 101 shows the pilot parameters according to the guard interval (B) and the vehicle speed. FIG. 101(A) is a table indicating pilot patterns for use in the SISO and MIXO Tx channels, FIG. 101(B) shows the configuration of a pilot pattern for use in the SISO and MIXO Tx channels, and FIG. 101(C) is a table indicating the configuration of a pilot pattern for use in the MIXO Tx channel.

Functions and contents of the pilot parameters shown in FIG. 101 are identical to those of FIG. 100, and as such a detailed description thereof will herein be omitted for convenience of description.

The structure and location of pilots for MIXO (MISO, MIMO) Tx channel estimation may be established through the above-mentioned pilot patterns. The nulling encoding and the Hadamard encoding scheme may be used as the pilot encoding scheme for isolating each Tx channel according to one embodiment of the present invention.

The following Math Figure 21 may be used to indicate the nulling encoding scheme.

$$\begin{bmatrix} y_{t\times 1} \\ y_{t\times 2} \end{bmatrix} = \begin{bmatrix} 1 & 0 \\ 0 & 1 \end{bmatrix} \begin{bmatrix} p_{t\times 1} \\ p_{t\times 2} \end{bmatrix}$$ [Math Figure 21]

The nulling encoding scheme has no channel interference in estimating respective channels, the channel estimation error can be minimized, and an independent channel can be easily estimated in the case of using symbol timing synchronization. However, since the pilot gain must be amplified to derive a channel estimation gain, the influence of Inter Channel Interference (ICI) of contiguous data caused by the pilot based on a time-variant channel is relatively high. In addition, if the pilots to be allocated to individual channels according to the pilot arrangement have different locations, the SNR of effective data may be changed per symbol. The MIXO-1 pilot pattern according to the above-mentioned embodiment may also be effectively used even in the nulling encoding scheme, and a detailed description thereof will hereinafter be described in detail.

The following equation may be used to indicate the nulling encoding scheme.

$$\begin{bmatrix} y_{t\times 1} \\ y_{t\times 2} \end{bmatrix} = \begin{bmatrix} 1 & 1 \\ 1 & -1 \end{bmatrix} \begin{bmatrix} p_{t\times 1} \\ p_{t\times 2} \end{bmatrix} \quad \text{[Math Figure 22]}$$

In case of the Hadamard encoding scheme, the Hadamard encoding scheme can perform channel estimation through simple linear calculation, and can obtain a gain caused by the noise average effect as compared to the nulling encoding scheme. However, the channel estimation error encountered in the process for obtaining an independent channel may unexpectedly affect other channels, and there may occur ambiguity in the symbol timing synchronization using pilots.

The broadcast signal transmission apparatus according to the embodiment of the present invention may establish the above-mentioned two encoding schemes described as the MIXO pilot encoding scheme according to the reception (Rx) scenario and the Tx channel condition in response to a predetermined mode. The broadcast signal reception apparatus according to the embodiment may perform channel estimation through a predetermined mode.

Figure 102:
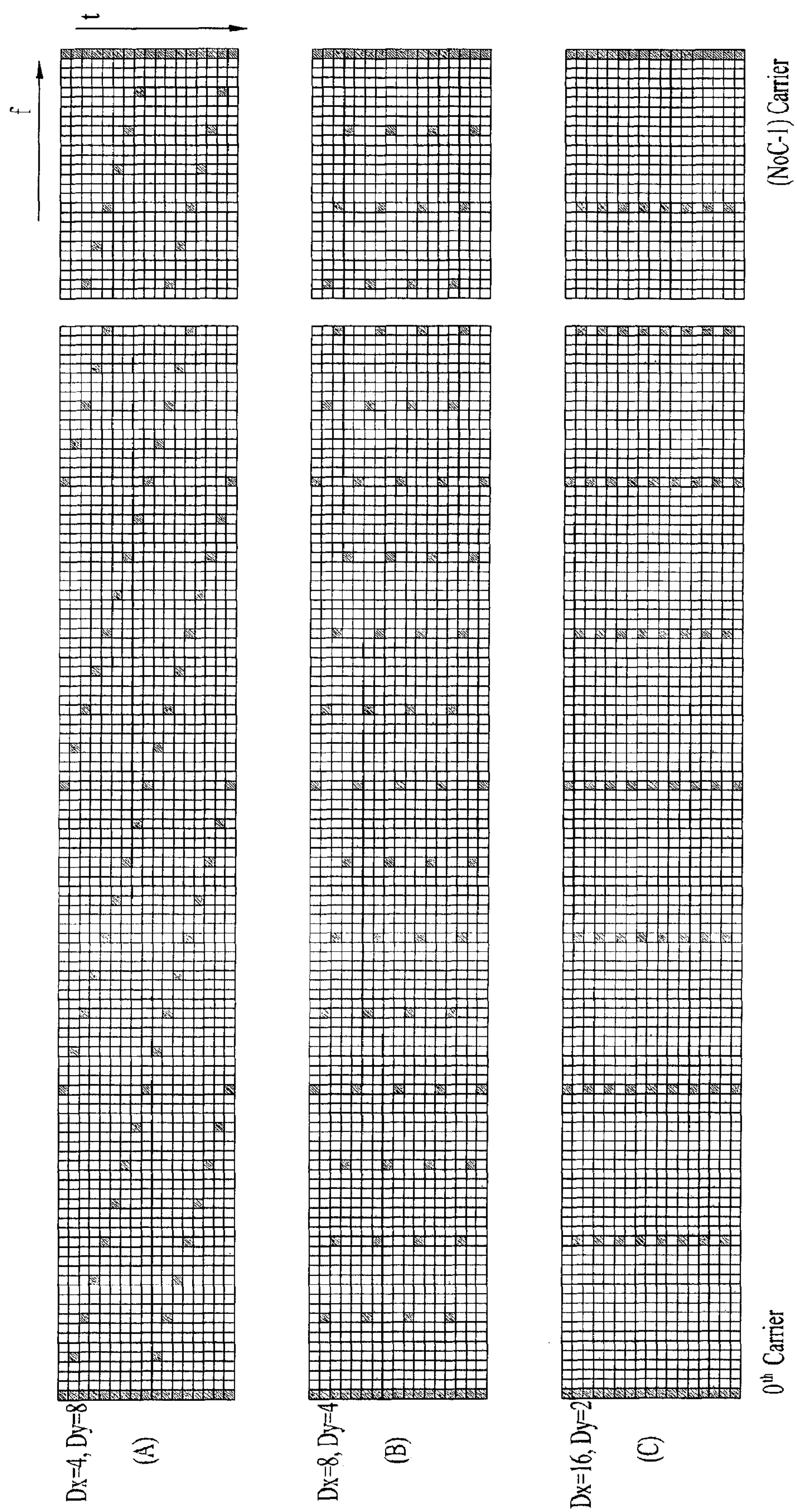
FIG. 102 shows the SISO pilot pattern according to an embodiment of the present invention.

FIG. 102 shows the SISO pilot pattern according to an embodiment of the present invention.

The pilot pattern shown in FIG. 102 indicates the SISO pilot pattern for use in the case in which the pilot density of FIG. 101 is set to 32.

As described above, the pilots may be inserted into a data symbol region of the signal frame. In FIG. 102, a horizontal axis of the pilot pattern may denote a frequency axis, and a vertical axis thereof may denote a time axis. In addition, pilots successively arranged at both ends of the pilot pattern may indicate reference signals that are inserted to compensate for distortion at the edge of a spectrum generated by channel estimation.

In more detail, FIG. 102(A) shows an exemplary pilot pattern denoted by PP4-8, FIG. 102(B) shows an exemplary pilot pattern denoted by PP8-4, and FIG. 102(C) shows an exemplary pilot pattern denoted by PP16-2. In other words, as can be seen from FIG. 102(A), pilots may be periodically input in units of 4 carriers on the frequency axis, and each pilot may be input in units of 8 symbols on the time axis. FIG. 102(B) and FIG. 102(C) may also illustrate the pilot patterns having been input in the same manner.

The pilot pattern of another pilot density shown in FIG. 101 may be denoted by coordination of the Dx and Dy values.

Figure 103:
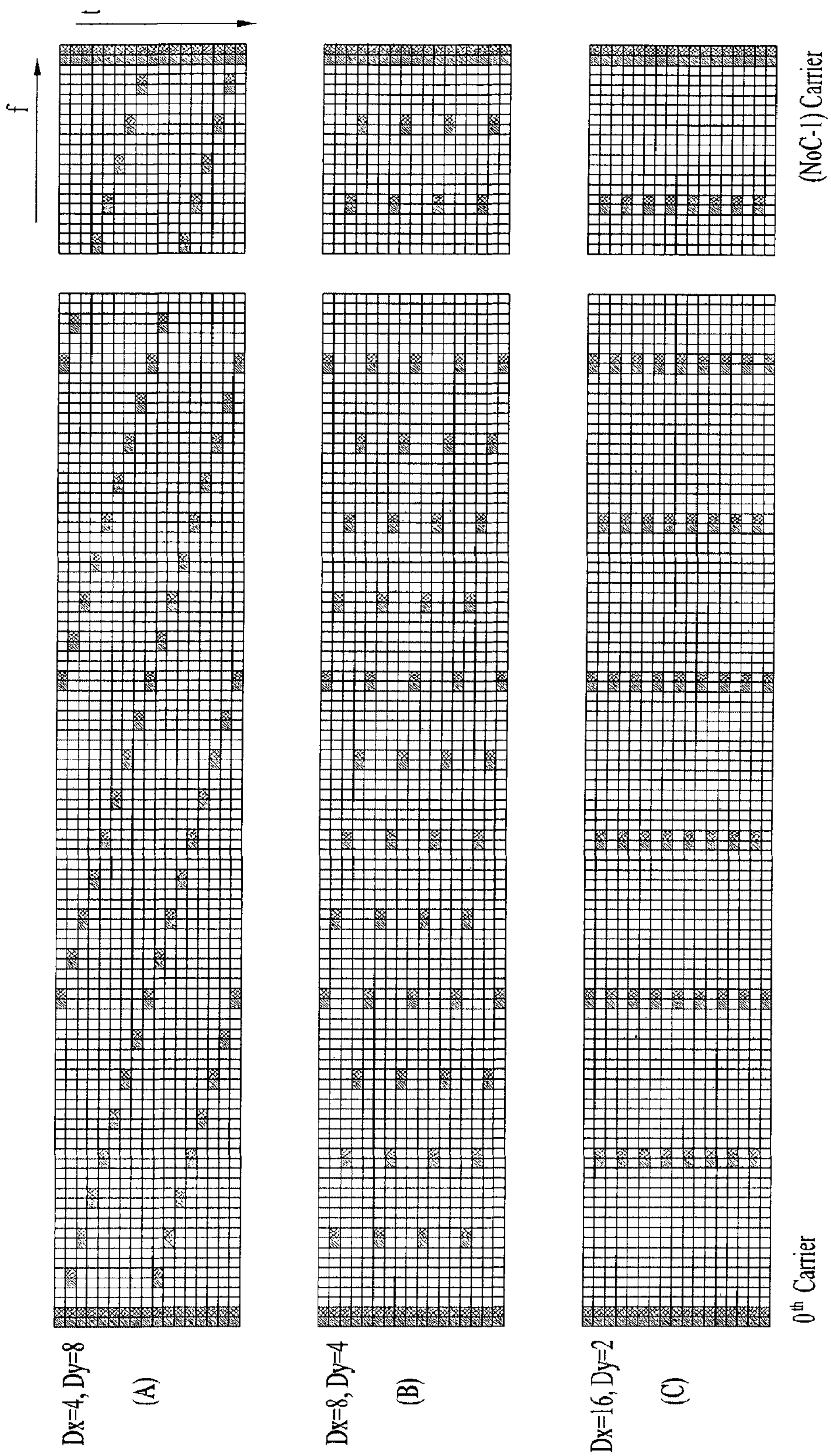
FIG. 103 shows the MIXO-1 pilot pattern according to an embodiment of the present invention.

FIG. 103 shows the MIXO-1 pilot pattern according to an embodiment of the present invention.

The pilot pattern of FIG. 103 shows the MIXO-1 pilot pattern for use in the case that the pilot density of FIG. 101 is set to 32. The pilot pattern of FIG. 103 is used in the case that two Tx antennas exist.

As described above, a horizontal axis of the pilot pattern may denote a frequency axis, and a vertical axis of the pilot pattern may denote a time axis. The pilots successively arranged at both edges of the pilot pattern may be reference signals that have been inserted to compensate for distortion at a spectrum edge encountered in the channel estimation process.

In more detail, (A) may denote an exemplary case in which the pilot pattern is denoted by PP4-8, (B) may denote an exemplary case in which the pilot pattern is denoted by PP8-4, and (C) may denote an exemplary case in which the pilot pattern is denoted by PP16-2.

In order to discriminate among the individual MIXO Tx channels, pilots transmitted to the respective Tx channels may be arranged contiguous to each other in the frequency domain according to an embodiment of the present invention. In this case, the number of pilots allocated to two Tx channels within one OFDM symbol is set to the same number.

As shown in the drawing, the MIXO-1 pilot pattern according to an embodiment has an advantage in that a data signal is arranged at the next position of a channel estimation pilot even when a reference signal for synchronization estimation is arranged, so that correlation between signals is reduced at the same carrier and the synchronization estimation throughput is not affected by the reduced correlation.

In case of the MIXO-1 pilot pattern according to an embodiment, even when the broadcast signal transmission apparatus performs pilot encoding using the above-mentioned nulling encoding scheme, broadcast signals having the same Tx power can be transmitted to the individual Tx antennas, such that the broadcast signals can be transmitted without additional devices or modules for compensating for variation of Tx signals. That is, in case of using the MIXO-1 pilot pattern according to an embodiment, the MIXO-1 pilot pattern is not affected by the pilot encoding scheme, and pilot power is coordinated by the pilot encoding scheme, such that the channel estimation throughput of the broadcast signal reception apparatus can be maximized.

The pilot pattern of another pilot density shown in FIG. 101 may be denoted by coordination of the Dx and Dy values.

Figure 104:
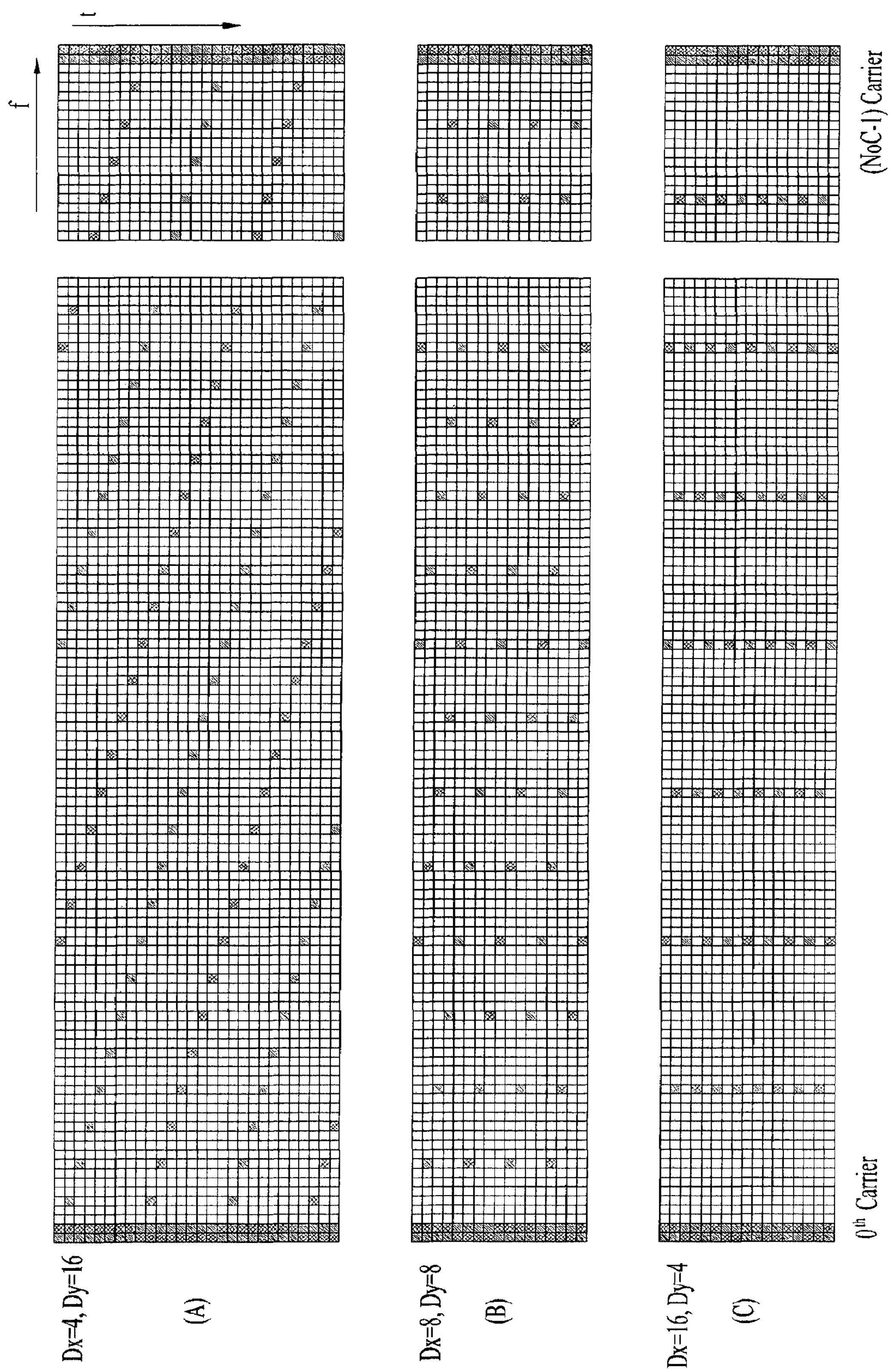
FIG. 104 shows the MIXO-2 pilot pattern according to an embodiment of the present invention.

FIG. 104 shows the MIXO-2 pilot pattern according to an embodiment of the present invention.

The pilot pattern of FIG. 104 shows the MIXO-2 pilot pattern for use in the case that the pilot density of FIG. 101 is set to 32. The pilot pattern of FIG. 104 is used in the case that two Tx antennas exist.

As described above, a horizontal axis of the pilot pattern may denote a frequency axis, and a vertical axis of the pilot pattern may denote a time axis. The pilots successively arranged at both edges of the pilot pattern may be reference signals that have been inserted to compensate for distortion at a spectrum edge encountered in the channel estimation process.

In more detail, (A) may denote an exemplary case in which the pilot pattern is denoted by PP4-16, (B) may denote an exemplary case in which the pilot pattern is denoted by PP8-8, and (C) may denote an exemplary case in which the pilot pattern is denoted by PP16-4.

As described above, the MIXO-2 pilot pattern is designed to cut the supported mobility in half, instead of supporting the same capacity, the same pilot overhead, and the same coverage as those of the SISO Tx channel.

Tx channels are semi-statically used in the reception scenario in which the UHDTV service must be supported so that the serious problem does not occur. The MIXO-2 pilot pattern according to an embodiment can be used to maximize the data Tx efficiency in the reception scenario in which the UHDTV service must be supported.

The pilot pattern of another pilot density shown in FIG. 101 may be denoted by coordination of the Dx and Dy values.

Figure 105:
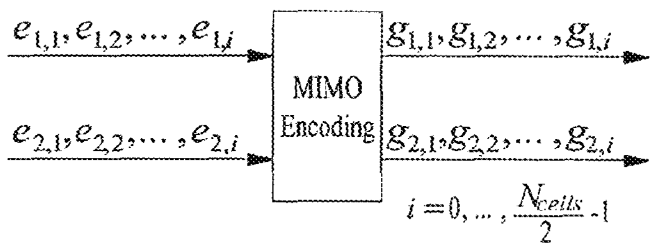
FIG. 105 illustrates a MIMO encoding block diagram according to an embodiment of the present invention.

FIG. 105 illustrates a MIMO encoding block diagram according to an embodiment of the present invention.

The MIMO encoding scheme according to an embodiment of the present invention is optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics can make it difficult to get capacity gain from MIMO. The MIMO encoding scheme according to an embodiment of the present invention overcomes this problem using a rotation-based pre-coding and phase randomization of one of the MIMO output signals. MIMO encoding can be intended for a 2×2 MIMO system requiring at least two antennas at both the transmitter and the receiver.

MIMO processing can be required for the advanced profile frame, which means all DPs in the advanced profile frame are processed by the MIMO encoder (or MIMO encoding module). MIMO processing can be applied at DP level. Pairs of the Constellation Mapper outputs NUQ ($e_{1,i}$ and $e_{2,i}$) can be fed to the input of the MIMO Encoder. Paired MIMO Encoder output ($g_{1,i}$ and $g_{2,i}$) can be transmitted by the same carrier k and OFDM symbol l of their respective TX antennas.

The illustrated diagram shows the MIMO Encoding block, where i is the index of the cell pair of the same XFECBLOCK and Ncells is the number of cells per one XFECBLOCK.

Figure 106:
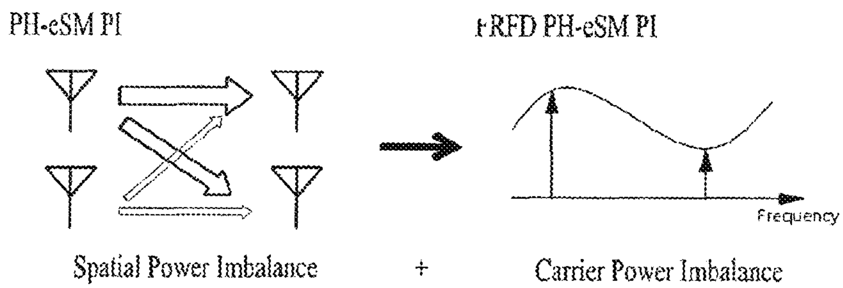
FIG. 106 shows a MIMO encoding scheme according to one embodiment of the present invention.

FIG. 106 shows a MIMO encoding scheme according to one embodiment of the present invention.

If MIMO is used, a broadcast/communication system may transmit more data. However, channel capacity of MIMO may be changed according to channel environment. In addition, if Tx and Rx antennas are different in terms of power or if correlation between channel is high, MIMO performance may deteriorate.

If dual polar MIMO is used, two components may reach a receiver at different power ratios according to propagation property of vertical/horizontal polarity. That is, if dual polar MIMO is used, power imbalance may occur between vertical and horizontal antennas. Here, dual polar MIMO may mean MIMO using vertical/horizontal polarity of an antenna.

In addition, correlation between channel components may increase due to LOS environment between Tx and Rx antennas.

The present invention proposes a MIMO encoding/decoding technique for solving problems occurring upon using MIMO, that is, a technique suitable for a correlated channel environment or a power imbalanced channel environment. Here, the correlated channel environment may be an environment in which channel capacity is lowered and system operation is interrupted if MIMO is used.

In particular, in a MIMO encoding scheme, a PH-eSM PI method and a full-rate full-diversity (FRFD) PH-eSM PI method are proposed in addition to an existing PH-eSM method. The proposed methods may be MIMO encoding methods considering complexity of a receiver and a power imbalanced channel environment. These two MIMO encoding schemes have no restriction on the antenna polarity configuration.

The PH-eSM PI method can provide capacity increase with relatively low complexity increase at the receiver side. The PH-eSM PI method may be referred to as a full-rate spatial multiplexing (FR-SM), FR-SM method, a FR-SM encoding process, etc. In the PH-eSM PI method, rotation angle is optimized to overcome power imbalance with complexity of O (M2). In the PH-eSM PI method, it is possible to effectively cope with spatial power imbalance between Tx antennas.

The FRFD PH-eSM PI method can provide capacity increase and additional diversity gain with a relatively great complexity increase at the receiver side. The FRFD PH-eSM PI method may be referred to as a full-rate full-diversity spatial multiplexing (FRFD-SM), an FRFD-SM method, FRFD-SM encoding process, etc. In the FRFD PH-eSM PI method, additional Frequency diversity gain is achieved by adding complexity of O (M4). In the FRFD PH-eSM PI method, unlike the PH-eSM PI method, it is possible to effectively cope not only with power imbalance between Tx antennas and but also with power imbalance between carriers.

In addition, the PH-eSM PI method and the FRFD PH-eSM PI method may be MIMO encoding schemes applied to symbols mapped to non-uniform QAM, respectively. Here, mapping to non-uniform QAM may mean that constellation mapping is performed using non-uniform QAM. Non-uniform QAM may be referred to as NU QAM, NUQ, etc. PH-eSM PI method and FRFD PH-eSM PI method can also be applied to symbols mapped onto either QAM (uniform QAM) or Non-uniform constellation. The MIMO encoding scheme applied to symbols mapped to non-uniform QAM may have better BER performance than the MIMO encoding scheme applied to symbols mapped to QAM (uniform QAM) per code rate in a power imbalanced situation. However, with certain code rate and bit per channel use, applying MIMO encoding to symbols mapped onto QAM performs better.

In addition, the PH-eSM method may also be applied to non-uniform QAM. Therefore, the present invention further proposes a PH-eSM method applied to symbols mapped to non-uniform QAM.

Hereinafter, constellation mapping will be described.

In constellation mapper, each cell word ($c_{0,l}$, $c_{1,l}$, . . . , $c_{\eta\ mod-1,l}$) from the Bit Interleaver in the base and the handheld profiles, or cell word ($d_{i,0,l}$, $d_{i,1,l}$, . . . , $d_{i,\eta\ mod-1,l}$, where i=1, 2) from the Cell-word Demultiplexer in the advanced profile can be modulated using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, $e_l$.

This constellation mapping is applied only for DPs. The constellation mapping for PLS1 and PLS2 can be different.

QAM-16 and NUQs are square shaped, while NUCs have arbitrary shape. When each constellation is rotated by any multiple of 90 degrees, the rotated constellation overlaps with its original one. This 'rotation-sense' symmetric property makes the capacities and the average powers of the real and imaginary components equal to each other. Both NUQs and NUCs are defined specifically for each code rate and the particular one used is signaled by the parameter DP_MOD in PLS2. The constellation shapes for each code rate mapped onto the complex plane will be described below. Hereinafter, the PH-eSM method and the PH-eSM PI method will be described. A MIMO encoding equation used for the PH-eSM method and the PH-eSM PI method is expressed as follows.

[Math figure 23]

$$\begin{bmatrix} X_1(f_1) \\ X_2(f_1) \end{bmatrix} = \frac{1}{\sqrt{1+a^2}} \begin{bmatrix} 1 & 0 \\ 0 & e^{j\phi(q)} \end{bmatrix} \begin{bmatrix} 1 & a \\ a & -1 \end{bmatrix} \begin{bmatrix} S_1 \\ S_2 \end{bmatrix}$$

or $$\underbrace{\begin{bmatrix} X_1(f_1) \\ X_2(f_1) \end{bmatrix}}_{X} = \underbrace{\frac{1}{\sqrt{1+a^2}} \begin{bmatrix} 1 & 0 \\ 0 & e^{j\phi(q)} \end{bmatrix} \begin{bmatrix} 1 & a \\ a & -1 \end{bmatrix}}_{P} \underbrace{\begin{bmatrix} S_1 \\ S_2 \end{bmatrix}}_{S}$$

That is, the above equation may be expressed as X=PS. Here, S1 and $S_2$ may denote a pair of input symbols. Here, P may denote a MIMO encoding matrix. Here, $X_1$ and $X_2$ may denote paired MIMO encoder outputs subjected to MIMO encoding.

In the above equation, e ( ) may be expressed as follows.

[Math figure 24]

$$e^{j\phi(q)} = \cos\phi(q) + j\sin\phi(q),$$

$$\phi(q) = \frac{2\pi}{N}q,$$

$$q = 0, \ldots , N_{data} - 1, (N = 9)$$

According to another embodiment, the MIMO encoding equation used for the PH-eSM method and the PH-eSM PI method may be expressed as follows.

[Math figure 25]

$$\begin{bmatrix} g_{1,i} \\ g_{2,i} \end{bmatrix} = \frac{1}{\sqrt{1+a^2}} \begin{bmatrix} 1 & 0 \\ 0 & e^{j\phi(i)} \end{bmatrix} \begin{bmatrix} 1 & a \\ a & -1 \end{bmatrix} \begin{bmatrix} e_{1,i} \\ e_{2,i} \end{bmatrix},$$

$$\phi(i) = \frac{2\pi}{N}i, (N = 9), i = 0, \ldots , \frac{N_{cells}}{2} - 1$$

The PH-eSM PI method can include two steps. The first step can be multiplying the rotation matrix with the pair of the input symbols for the two TX antenna paths, and the second step can be applying complex phase rotation to the symbols for TX antenna 2.

The signals $X_1$ and $X_2$ to be transmitted may be generated using two transmitted symbols (e.g., QAM symbols) $S_1$ and $S_2$. In case of a transmission and reception system using OFDM, $X_1(f_1)$, $X_2(f_2)$ may be carried on a frequency carrier $f_1$ to be transmitted. $X_1$ may be transmitted via a Tx antenna 1 and $X_2$ may be transmitted via a Tx antenna 2. Accordingly, even when power imbalance is present between two Tx antennas, efficient transmission with minimum loss is possible.

At this time, if the PH-eSM method is applied to symbols mapped to QAM, a value a may be determined according to QAM order as follows. This may be a value a when the PH-eSM method is applied to symbols mapped to uniform QAM.

[Math figure 26]

$$a = \frac{\sqrt{2} + 2^{\frac{n}{2}}}{\sqrt{2} + 2^{\frac{n}{2}} - 2} \text{ for } 2^nQAM + 2^nQAM,$$

-continued $$a = \begin{cases} \sqrt{2}+1 & \text{for } QPSK + QPSK \\ \frac{\sqrt{2}+4}{\sqrt{2}+2} & \text{for } 16QAM + 16QAM \\ \frac{\sqrt{2}+8}{\sqrt{2}+6} & \text{for } 64QAM + 64QAM \\ \frac{\sqrt{2}+16}{\sqrt{2+14}} & \text{for } 256QAM + 256QAM \end{cases}$$

At this time, if the PH-eSM PI method is applied to symbols mapped to QAM, a value a may be determined according to QAM order as follows. This may be a value a when the PH-eSM PI method is applied to symbols mapped to QAM (uniform QAM).

[Math figure 27]

$$a = \sqrt{2} + \left(2^{\frac{n}{2}} - 1\right) \text{ for } 2^nQAM + 2^nQAM,$$

$$a = \begin{cases} \sqrt{2}+1 & \text{for } QPSK + QPSK \\ \sqrt{2}+3 & \text{for } 16QAM + 16QAM \\ \sqrt{2}+7 & \text{for } 64QAM + 64QAM \\ \sqrt{2}+15 & \text{for } 256QAM + 256QAM \end{cases}$$

At this time, the value a may enable a broadcast/transmission system to obtain good BER performance when considering Euclidean distance and Hamming distance if $X_1$ and $X_2$ are received through a fully correlated channel and are decoded. In addition, the value a may enable the broadcast/communication system to obtain good BER performance when considering Euclidean distance and Hamming distance if $X_1$ and $X_2$ are independently decoded at the receiver side (that is, if S1 and $S_2$ are decoded using $X_1$ and $S_1$ and $S_2$ are decoded using $X_2$).

The PH-eSM PI method is different from the PH-eSM method in that the value a is optimized in a power imbalanced situation. That is, in the PH-eSM PI method, a rotation angle value is optimized in a power imbalance situation. In particular, when the PH-ESM PI method is applied to symbols mapped to non-uniform QAM, the value a may be optimized as compared to the PH-eSM method.

The above-described value a is merely exemplary and may be changed according to embodiment.

The receiver used for the PH-eSM method and the PH-eSM PI method may decode a signal using the above-described MOMI encoding equation. At this time, the receiver may decode a signal using ML, Sub-ML (Sphere) decoding, etc.

Hereinafter, an FRFD PH-eSM PI method will be described. The MIMO encoding equation used for the FRFD PH-eSM PI method is as follows.

[Math figure 28]

$$\begin{bmatrix} X_1(f_1) & X_1(f_2) \\ X_2(f_1) & X_2(f_2) \end{bmatrix} =$$

$$\frac{1}{\sqrt{1+a^2}} \begin{bmatrix} 1 & 0 \\ 0 & e^{j\phi(q)} \end{bmatrix} \overbrace{\begin{bmatrix} S_1 + aS_2 & aS_3 - S_4 \\ S_3 + aS_4 & aS_1 - S_2 \end{bmatrix}}^{\text{Frequency diversity}} \Big\} \text{Spatial diversity}$$

-continued or $$\begin{bmatrix} X_1(f_1) & X_1(f_2) \\ X_2(f_1) & X_2(f_2) \end{bmatrix} = \frac{1}{\sqrt{1+a^2}} \begin{bmatrix} 1 & 0 \\ 0 & e^{j\phi(q)} \end{bmatrix} \begin{bmatrix} S_1 - aS_2 & aS_3 + S_4 \\ S_3 - aS_4 & aS_1 + S_2 \end{bmatrix}$$

By using two antennas $X_1$ and $X_2$, it is possible to obtain spatial diversity. In addition, by utilizing two frequencies $f_1$ and $f_2$, it is possible to obtain frequency diversity.

According to another embodiment of the present invention, a MIMO encoding scheme used for the FRFD PH-eSM PI method may be expressed as follows.

[Math figure 29]

$$\begin{bmatrix} g_{1,2i} & g_{1,2i+1} \\ g_{2,2i} & g_{2,2i+1} \end{bmatrix} = \frac{1}{\sqrt{1+a^2}} \begin{bmatrix} 1 & 0 \\ 0 & e^{j\phi(i)} \end{bmatrix} \begin{bmatrix} e_{1,2i} + ae_{2,2i} & ae_{1,2i+1} - e_{2,2i+1} \\ e_{1,2i+1} + ae_{2,2i+1} & ae_{1,2i} - e_{2,2i} \end{bmatrix},$$

$$\phi(i) = \frac{2\pi}{N} i, \ (N = 9), \ i = 0, \ldots, \frac{N_{cells}}{4} - 1$$

The FRFD PH-eSM PI method can take two pairs of NUQ symbols (or Uniform QAM symbols or NUC symbols) as input to provide two pairs of MIMO output symbols.

The FRFD PH-eSM PI method requires more decoding complexity of a receiver but may have better performance. According to the FRFD PH-eSM PI method, a transmitter generates signals $X_1(f_1)$, $X_2(f_1)$, $X_1(f_2)$ and $X_2(f_2)$ to be transmitted using four transmit symbols $S_1$, $S_2$, S3, $S_4$. At this time, the value a may be equal to the value a used for the above-described PH-eSM PI method. This may be a value a when the FRFD PH-eSM method is applied to symbols mapped to QAM (uniform QAM).

The MIMO encoding equation of the FRFD PH-eSM PI method may use frequency carriers $f_1$ and $f_2$ unlike the MIMO encoding equation of the above-described PH-eSM PI method. Therefore, the FRFD PH-eSM PI method may efficiently cope not only with power imbalance between Tx antennas but also with power imbalance between carriers.

In association with MIMO encoding, a structure for additionally obtaining frequency diversity may include Golden code, etc. The FRFD PH-eSM PI method according to the present invention can obtain frequency diversity with complexity lower than that of Golden code.

Figure 107:
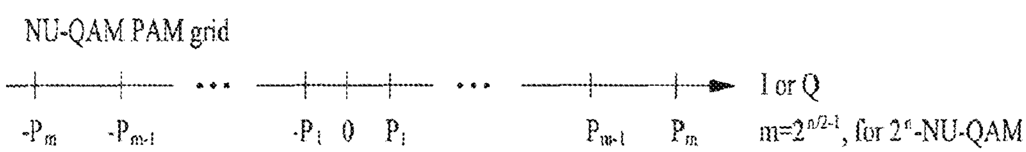
FIG. 107 is a diagram showing a PAM grid of an I or Q side according to non-uniform QAM according to one embodiment of the present invention.

FIG. 107 is a diagram showing a PAM grid of an I or Q side according to non-uniform QAM according to one embodiment of the present invention.

The above-described PH-eSM PI and FRFD PH-eSM PI methods are applicable to symbols mapped to non-uniform QAM. Non-uniform QAM is a modulation scheme which obtains higher capacity by adjusting a PAM grid value per SNR unlike QAM (uniform QAM). It is possible to obtain more gain by applying MIMO to symbols mapped to non-uniform QAM. In this case, the encoding equations of the PH-eSM PI and FRFD PH-eSM PI methods are not changed but a new value "a" may be necessary when the PH-eSM PI and FRFD PH-eSM PI methods are applied to symbols mapped to non-uniform QAM. This new value "a" may be obtained using the following equation.

[Math figure 30]

$$a = b(P_m - P_{m-1}) + P_m$$

for $$2^n QAM + 2^n QAM, \quad m = 2^{\frac{n}{2}-1}$$

for $$2^n QAM$$

This new value "a" may be a value a when the PH-eSM PI and FRFD PH-eSM PI methods are applied to symbols mapped to non-uniform QAM.

As shown in this figure, the PAM grid of the I or Q side used for non-uniform QAM is defined and the new value "a" may be obtained using a largest value $P_m$ and a second largest value $P_{m-1}$ of this grid. A signal transmitted via the Tx antenna may be suitably decoded using this new value "a" alone.

In the equation for generating the new value "a", b denotes a sub-constellation separation factor. By adjusting the value b, a distance between sub-constellations present in a MIMO encoded signal may be adjusted. In case of non-uniform AM, since a distance between constellations (or a distance between sub-constellations) is changed, a variable b may be necessary. Examples of the value b may include $$\frac{\sqrt{2}}{2}.$$

This value may be obtained by Hamming distance and Euclidean distance based on a point having highest power on a constellation and points adjacent thereto.

In case of non-uniform QAM, since a grid value optimized per SNR (or code-rate of FEC) is used, the sub-constellation separation factor "b" may also use a value optimized per SNR (or code-rate of FEC). That is, capacity of constellation transmitted after MIMO encoding may be analyzed according to the value "b" and the SNR (or code-rate of FEC) to find the value "B" for providing maximum capacity at a specific SNR (target SNR).

For example, if NU-16 QAM+NU-16 QAM MIMO and P={1, 3.7}, the new value "a" may be computed by $$a = \frac{\sqrt{2}}{2}(3.7 - 1) + 3.7.$$

At this time, the value b is set to $$\frac{\sqrt{2}}{2}.$$

For example, NU-64 QAM+NU-64 QAM MIMO and P={1, 3.27, 5.93, 10.27}, the new value "a" may be computed by $$a = \frac{\sqrt{2}}{2}(10.27 - 5.93) + 10.27.$$

At this time, the value b is set to $$\frac{\sqrt{2}}{2}.$$

For example, if NU-256 QAM+NU-256 QAM MIMO and P={1, 1.02528, 3.01031, 3.2249, 5.2505, 6.05413, 8.48014, 11.385}, the new value "a" may be computed by $$a = \frac{\sqrt{2}}{2}(11.385 - 8.48014) + 11.385.$$

At this time, the value b is set to $$\frac{\sqrt{2}}{2}.$$

As described above, the PH-eSM PI and FRFD PH-eSM PI methods may be applied to symbols mapped to non-uniform QAM. Similarly, the PH-eSM method may also be applied to symbols mapped to non-uniform QAM. In this case, the value "a" may be determined according to the PH-eSM method. An equation for determining the value "a" is as follows.

$$a = \frac{b(P_m - P_{m-1}) + P_m + 1}{b(P_m - P_{m-1}) + P_m - 1} \quad \text{[Math figure 31]}$$

$$\text{for } 2^n QAM + 2^n QAM,$$

$$m = 2^{\frac{n}{2}-1} \text{ for } 2^n QAM$$

This new value "a" may be a value a when the PH-eSM method is applied to symbols mapped to non-uniform QAM.

b is a sub-constellation separation factor as described above. As described above, the value "b" may be optimized to suit each SNR (or code-rate of FEC) by analyzing capacity of the encoded constellation.

For example, if NU-16 QAM+NU-16 QAM MIMO and P={1, 3.7}, the new value "a" may be computed by $$a = \frac{\frac{\sqrt{2}}{2}(3.7 - 1) + 3.7 + 1}{\frac{\sqrt{2}}{2}(3.7 - 1) + 3.7 - 1}.$$

At this time, the value b is set to $$\frac{\sqrt{2}}{2}.$$

For example, if NU-64 QAM+NU-64 QAM MIMO and P={1, 3.27, 5.93, 10.27}, the new value "a" may be computed by $$a = \frac{\frac{\sqrt{2}}{2}(10.27 - 5.93) + 10.27 + 1}{\frac{\sqrt{2}}{2}(10.27 - 5.93) + 10.27 - 1}.$$

At this time, the value b is set to $$\frac{\sqrt{2}}{2}.$$

For example, if NU-256 QAM+NU-256 QAM MIMO and P={1, 1.02528, 3.01031, 3.2249, 5.2505, 6.05413, 8.48014, 11.385}, the new value "a" may be computed by $$a = \frac{\frac{\sqrt{2}}{2}(11.385 - 8.48014) + 11.385 + 1}{\frac{\sqrt{2}}{2}(11.385 - 8.48014) + 11.385 - 1}.$$

At this time, the value b is set to $$\frac{\sqrt{2}}{2}.$$

Hereinafter, a method of determining NU-QAN and MIMO encoding parameter "a" in the MIMO encoding method (the PH-eSM PI method and the FRFD PH-eSM PI method) applied to symbols mapped to NU-QAM optimized per SNR (or code-rate of FEC) will be described.

In order to apply the PH-eSM PI method and the FRFD PH-eSM PI method to symbols mapped to NU-QAM per SNR (or code-rate of FEC), the following two elements should be considered. First, in order to obtain shaping gain, NU-QAM optimized per SNR should be found. Second, the MIMO encoding parameter "a" should be determined in each NU-QAM optimized per SNR.

The MIMO encoding scheme (the PH-eSM PI method and the FRFD PH-eSM PI method), NU-QAM and MIMO encoding parameter suitable for each SNR may be determined through capacity analysis as follows. Here, capacity may mean BICM capacity. The process of determining a NU-QAM and MIMO encoding parameter suitable for each SNR may be performed in consideration of correlated channel and power imbalanced channel.

If computation for capacity analysis at MIMO channel is acceptable, it is possible to determine NU-QAM for optimized MIMO, which provides maximum capacity at a target SNR.

If computation is not acceptable, NU-QAM for MIMO may be determined using NU-QAM optimized for SISO. First, with respect to NU-QAM optimized for SISO per SNR (or code-rate of FEC), BER performance comparison may be performed in a non-power imbalanced MIMO channel environment. Through BER performance comparison, NU-QAM for MIMO may be determined from NU-QAM (FEC code rate 5/15, 6/15, . . . 13/15) optimized for SISO. For example, constellation for MIMO at code-rate 5/15 of 12 bpcu (NU-64QAM+NU-64QAM) may be set to NU-64QAM corresponding to SISO code-rate 5/15. In addition, for example, constellation of MIMO FEC code rate 6/15 may be constellation of SISO FEC code rate 5/15. That is, constellation of SISO FEC code rate 5/15 may suitable for MIMO FEC code rate 6/15.

Once NU-QAM is determined, the MIMO encoding parameter "a" optimized per SNR may be determined at a power imbalanced MIMO channel through capacity analysis based on the determined NU-QAM. For example, in the 12 bpcu and 5/15 code rate environment, the value a may be 0.1571.

Hereinafter, measurement for performance of MIMO encoding according to the value a will be described. For performance measurement, BICM capacity may be measured. Through this operation, the value a capable of maximizing BICM capacity is determined.

BICM capacity may be expressed by the following equations.

[Math figure 32]

$$BICM\ cap. = \int_{\varphi}\left(\sum_i\left(\int_Y p(b_i=0,Y)\log_2\frac{p(b_i=0,Y)}{p(b_i=0)p(Y)}dy + \int_Y p(b_i=1,Y)\log_2\frac{p(b_i=1,Y)}{p(b_i=1)p(Y)}dY\right)p(\varphi)\right)d\varphi$$

[Math figure 33]

$$p(b_i=j,Y) = p(Y\,|\,b_i=j)\cdot p(b_i=j) = \sum_{M_i} p(Y\,|\,S=M_j)\cdot\frac{1}{M^2} = \sum_{M_i}\frac{1}{\pi\sigma^2}e^{\frac{-\|Y-H_{PI}PM_j\|}{\sigma^2}}\cdot\frac{1}{M^2}$$

[Math figure 34]

$$\frac{p(b_i=j,Y)}{p(b_i=j)p(Y)} = \frac{p(Y\,|\,b_i=j)}{p(Y)} = \frac{p(Y\,|\,b_i=j)}{\sum_j p(b_i=j,Y)} = \frac{\sum_{M_i}\frac{1}{\pi\sigma^2}e^{\frac{-\|Y-H_{PI}PM_j\|^2}{\sigma^2}}\cdot\frac{1}{M^2}}{\sum_j\sum_{M_i}\frac{1}{\pi\sigma^2}e^{\frac{-\|Y-H_{PI}PM_j\|^2}{\sigma^2}}\cdot\frac{1}{M^2}}$$

Here, $p(b_i=0)=p(b_i=1)=0.5$. In addition, $p(S=Mj)=1/M^2$, $p(\varphi)=1/\pi$. Here, SE {constellation set} and M may mean a constellation size.

Here, Y may be expressed as follows.

[Math figure 35]

$$\begin{bmatrix} Y_1(f_1) \\ Y_2(f_1) \end{bmatrix} = \frac{1}{\sqrt{1+\alpha^2}}\begin{bmatrix} 1 & \alpha\cdot e^{j\varphi} \\ e^{j\varphi} & \alpha \end{bmatrix}\begin{bmatrix} X_1(f_1) \\ X_2(f_1) \end{bmatrix} + \begin{bmatrix} n_1 \\ n_2 \end{bmatrix}$$

$$Y = \begin{bmatrix} Y_1(f_1) \\ Y_2(f_1) \end{bmatrix}$$

$$H_{PI} = \frac{1}{\sqrt{1+\alpha^2}}\begin{bmatrix} 1 & \alpha\cdot e^{j\varphi} \\ e^{j\varphi} & \alpha \end{bmatrix}$$

$$X = \begin{bmatrix} X_1(f_1) \\ X_2(f_1) \end{bmatrix}$$

$$n = \begin{bmatrix} n_1 \\ n_2 \end{bmatrix}$$

That is, $Y=H_{PI}X+n$. Here, n may be AWGN. X may be expressed by X=PS as described above. BICM capacity may assume AWGN and individually identically distributed (IID) input. In addition, (p may mean a uniform random variable U(0, π). In order to consider a correlated channel environment and a power imbalanced channel environment which may occur upon using MIMO, $H_{PI}$ of the above-described equation may be assumed. At this time, an alpha value is a power imbalance (PI) factor and may be PI 9 dB: 0.354817, PI 6 dB: 0.501187 or PI 3 dB: 0.70711 according to PI. Here, $Mj\in\{\text{constellation set}|b_i=j\}$.

Through this equation, BICM capacity according to the value a may be measured to determine an optimal value a.

That is, the method for determining the MIMO encoding parameter may include two steps as follows.

Step 1. Through BER performance comparison for constellation of SISO FEC code rate, NU-QAM having optimal performance of MIMO FEC code-rate to be found is selected.

Step 2. Based on NU-QAM obtained in Step 1, an encoding parameter "a" having optimal performance may be determined through the above-described BICM capacity analysis.

The value a according to constellation per code rate is shown in the following table. This is merely an example of the value a according to the present invention.

TABLE 5

| | 8 bpcu | | 12 bpcu | |
|---|---|---|---|---|
| Code rate | Constellation | a | Constellation | a |
| 5/15 | QAM-16 | 0 | NUQ-64 for CR = 5/15 | 0.1571 |
| 6/15 | QAM-16 | 0.0035 | NUQ-64 for CR = 5/15 | 0.1396 |
| 7/15 | QAM-16 | 0.1222 | NUQ-54 for CR = 6/15 | 0.2129 |
| 8/15 | QAM-16 | 0.1571 | NUQ-64 for CR = 8/15 | 0.2548 |
| 9/15 | QAM-16 | 0.1710 | NUQ-64 for CR = 11/15 | 0.2653 |
| 10/15 | QAM-16 | 0.1780 | NUQ-64 for CR = 12/15 | 0.2566 |
| 11/15 | QAM-16 | 0.1798 | NUQ-64 for CR = 12/15 | 0.2548 |
| 12/15 | QAM-16 | 0.1315 | NUQ-64 for CR = 13/15 | 0.2583 |
| 13/15 | QAM-16 | 0.1815 | NUQ-64 for CR = 13/15 | 0.2583 |

The PH-eSM PI method can be applied for 8 bpcu and 12 bpcu with 16K and 64K FECBLOCK. PH-eSM PI method can use the MIMO encoding parameters defined in the above table for each combination of a value of bits per channel use and code rate of an FECBLOCK. Detailed constellations corresponding to the illustrated MIMO parameter table are described below.

The above table shows constellation and MIMO encoding parameter a optimized per code rate. For example, in case of 12 bpcu and code rate of 6/15 of MIMO encoding, constellation of NUQ-64 which is used in case of code rate of 5/15 of SISO encoding may be used. That is, in case of 12 bpcu and code rate of 6/15 of MIMO encoding, constellation of code rate of 5/15 of SISO encoding may be an optimal value. At this time, the value "a" may be 0.1396.

TABLE 6

| | 10 bpcu | |
|---|---|---|
| Code rate | Constellation | a |
| 5/15 | QAM-16/NUQ-64 for CR = 5/15 | 0 |
| 6/15 | QAM-16/NUQ-64 for CR = 5/15 | 0 |
| 7/15 | QAM-16/NUQ-64 for CR = 6/15 | 0 |

TABLE 6-continued

| | 10 bpcu | |
|---|---|---|
| Code rate | Constellation | a |
| 8/15 | QAM-16/NUQ-64 for CR = 8/15 | 0 |
| 9/15 | QAM-16/NUQ-64 for CR = 11/15 | 0 |
| 10/15 | QAM-16/NUQ-64 for CR = 12/15 | 0 |
| 11/15 | QAM-16/NUQ-64 for CR = 12/15 | 0 |
| 12/15 | QAM-16/NUQ-64 for CR = 13/15 | 0 |
| 13/15 | QAM-16/NUQ-64 for CR = 13/15 | 0 |

For the 10 bpcu MIMO case, PH-eSM PI method can use the MIMO encoding parameters defined in the above table. These parameters are especially useful when there is a power imbalance between horizontal and vertical transmission (e.g. 6 dB in current U.S. Elliptical pole network). The QAM-16 can be used for the TX antenna of which the transmission power is deliberately attenuated. Detailed constellations corresponding to the illustrated MIMO parameter table are described below.

The FRFD PH-eSM PI method can use the MIMO encoding parameters of the PH-eSM PI method defined in the above tables for each combination of a value of bit per channel use and code rate of an FECBLOCK.

The values "a" of the above table may be determined in consideration of Euclidean distance and Hamming distance and are optimal in code rate and constellation. Accordingly, it is possible to obtain excellent BER performance.

Figure 108:
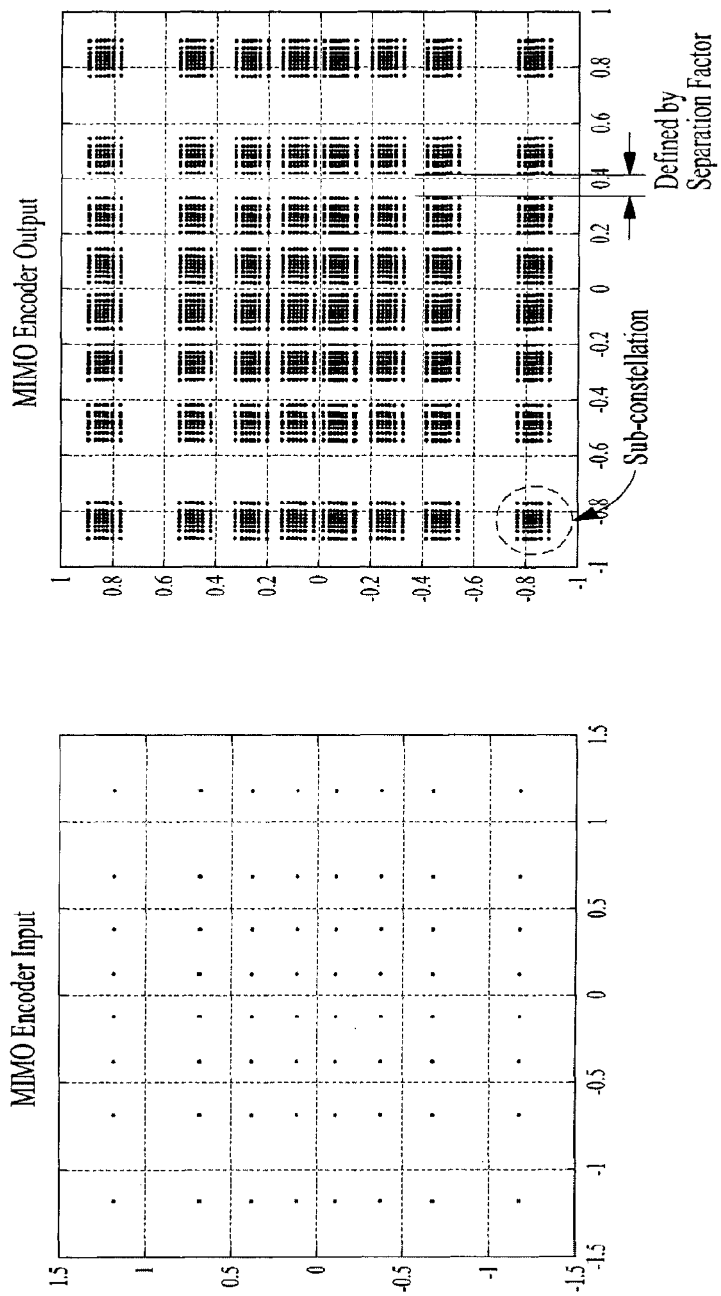
FIG. 108 is a diagram showing MIMO encoding input/output when the PH-eSM PI method is applied to symbols mapped to non-uniform 64 QAM according to one embodiment of the present invention.

FIG. 108 is a diagram showing MIMO encoding input/output when the PH-eSM PI method is applied to symbols mapped to non-uniform 64 QAM according to one embodiment of the present invention.

Even when the FRFD PH-eSM PI according to one embodiment of the present invention is applied to symbols mapped to non-uniform QAM, an input/output diagram similar to this figure may be obtained. If the above-described new value "a" and the encoding matrix of the MIMO encoding equation are used, the constellation shown in this figure may be obtained by the MIMO encoder input and output.

In the MIMO encoder output of this figure, sub-constellations may be located. At this time, a distance between sub-constellations may be determined by the above-described sub-constellation separation factor "b". The MIMO encoded constellations may maintain a non-uniform property.

Figure 109:
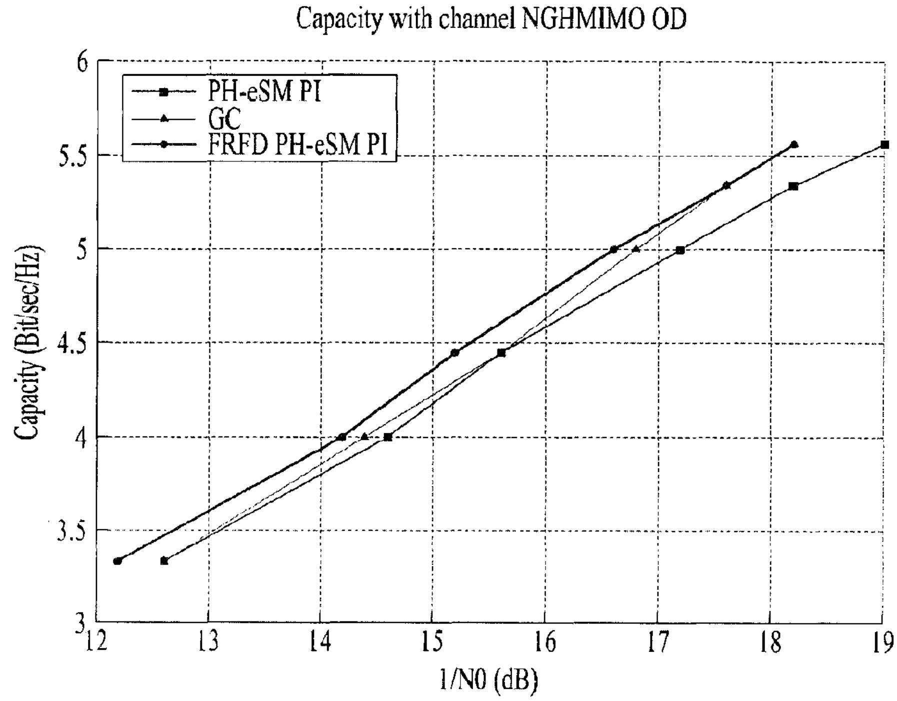
FIG. 109 is a graph for comparison in performance of MIMO encoding schemes according to the embodiment of the present invention.

FIG. 109 is a graph for comparison in performance of MIMO encoding schemes according to the embodiment of the present invention.

This graph shows comparison in capacity between MIMO encoding schemes in an 8-bpcu/outdoor environment. The PH-eSM PI and FRFD PH-eSM PI methods of the present invention exhibit better performance than an existing MIMO encoding scheme (GC, etc.) in terms of capacity. This means that more efficient transmission is possible in the same environment as compared with other MIMO techniques.

Figure 110:
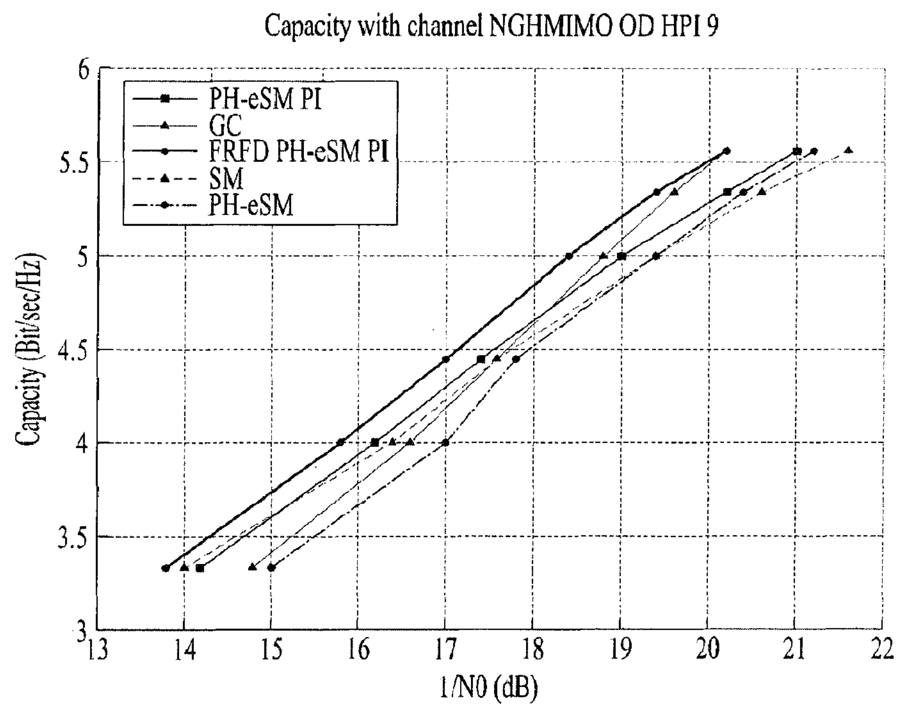
FIG. 110 is a graph for comparison in performance of MIMO encoding schemes according to the embodiment of the present invention.

FIG. 110 is a graph for comparison in performance of MIMO encoding schemes according to the embodiment of the present invention.

This graph shows comparison in capacity according to MIMO encoding schemes in an 8-bpcu/outdoor/HPI9 environment. The PH-eSM PI and FRFD PH-eSM PI methods of the present invention exhibits better performance than an existing MIMO encoding scheme (SM, GC, PH-eSM, etc.) in terms of capacity. This means that more efficient transmission is possible in the same environment as compared with other MIMO techniques.

Figure 111:
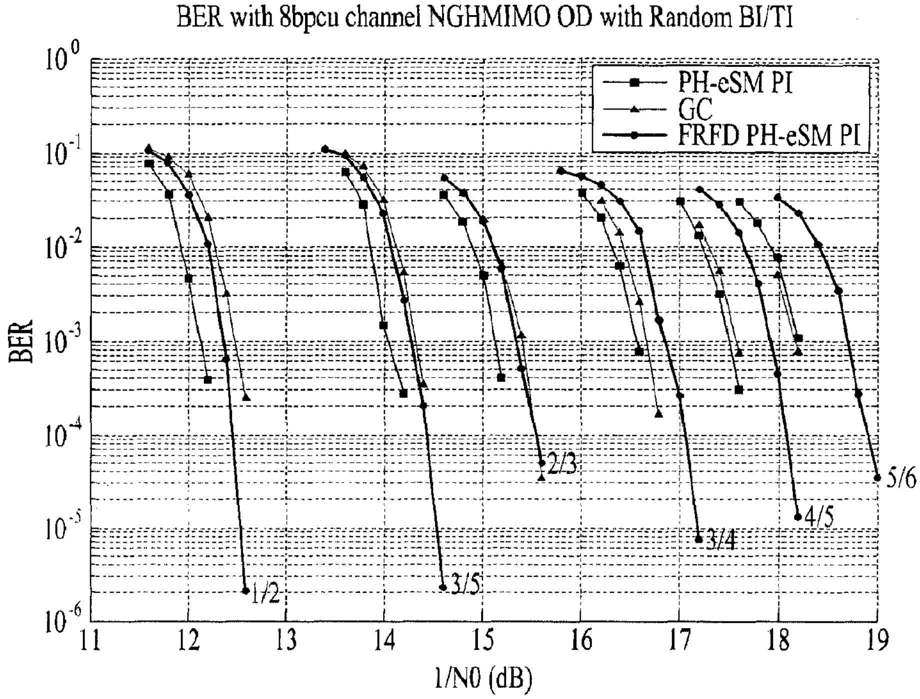
FIG. 111 is a graph for comparison in performance of MIMO encoding schemes according to the embodiment of the present invention.

FIG. 111 is a graph for comparison in performance of MIMO encoding schemes according to the embodiment of the present invention.

This graph shows comparison in BER according to MIMO encoding schemes in an 8-bpcu/outdoor/random BI, TI environment. The PH-eSM PI and FRFD PH-eSM PI methods of the present invention exhibits better performance than an existing MIMO encoding scheme (GC, etc.) in terms of BER. This means that more efficient transmission is possible in the same environment as compared with other MIMO techniques.

Figure 112:
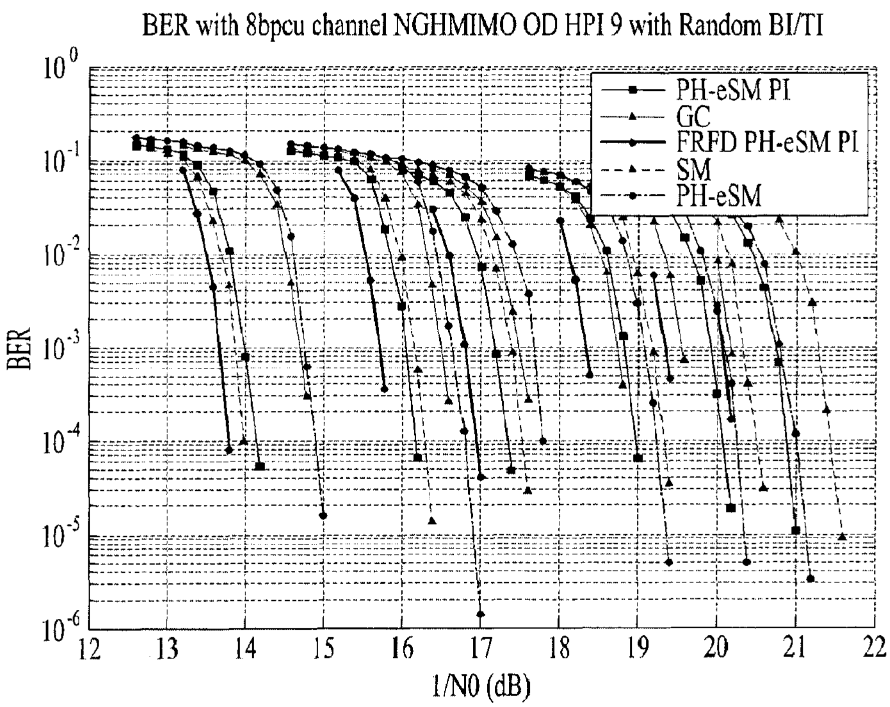
FIG. 112 is a graph for comparison in performance of MIMO encoding schemes according to the embodiment of the present invention.

FIG. 112 is a graph for comparison in performance of MIMO encoding schemes according to the embodiment of the present invention.

This graph shows comparison in BER according to MIMO encoding schemes in an 8-bpcu/outdoor/HPI9/random BI, TI environment. BER Performance of the PH-eSM PI and FRFD PH-eSM PI methods of the present invention is better than that of existing MIMO encoding (SM, GC, PH-eSM, etc.) in terms of capacity. This means that more efficient transmission is possible in the same environment as compared other MIMO techniques.

Figure 113:
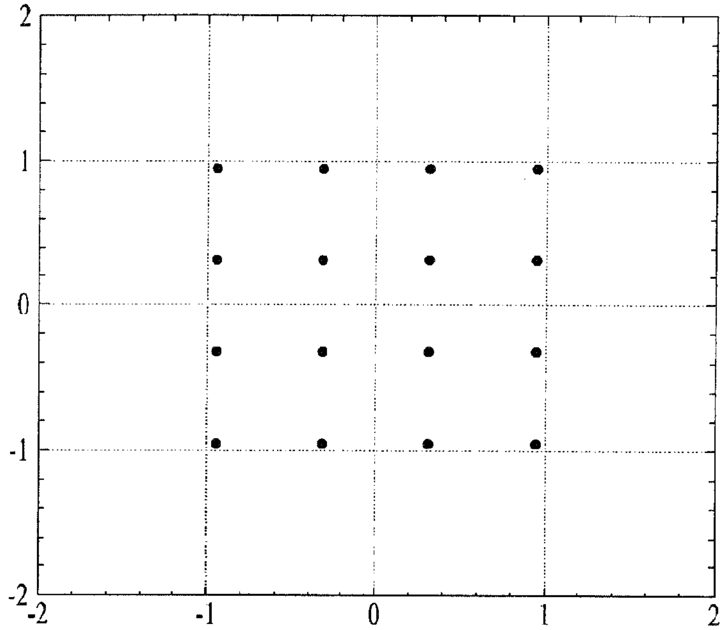
FIG. 113 is a diagram showing an embodiment of QAM-16 according to the present invention.

FIG. 113 is a diagram showing an embodiment of QAM-16 according to the present invention.

This figure shows a constellation shape of QAM-16 on a complex plane. This figure shows the constellation shape of QAM-16 for all code rates.

Figure 114:
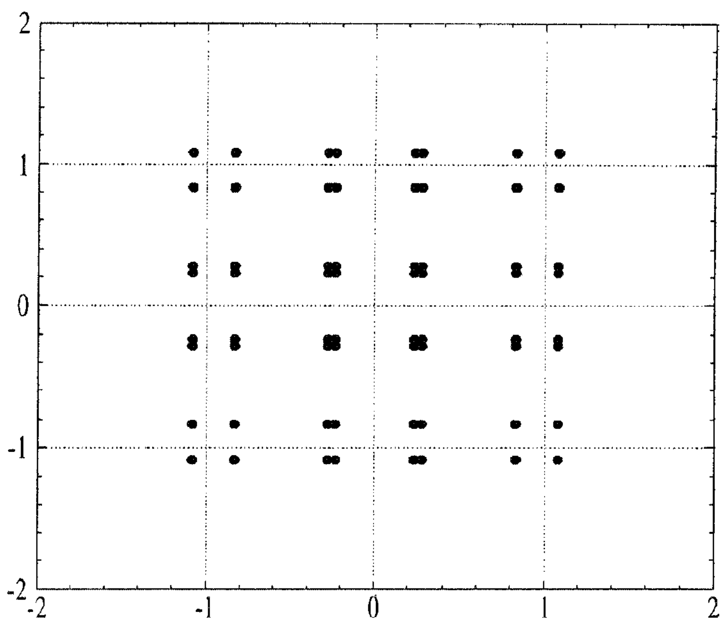
FIG. 114 is a diagram showing an embodiment of NUQ-64 for 5/15 code rate according to the present invention.

FIG. 114 is a diagram showing an embodiment of NUQ-64 for 5/15 code rate according to the present invention.

This figure shows the constellation shape of QAM-64 for 5/15 code rate on a complex plane.

Figure 115:
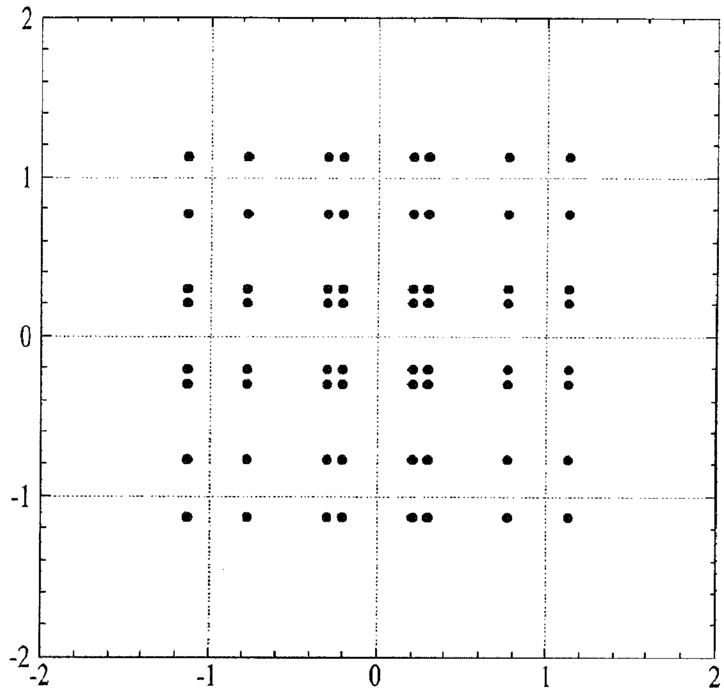
FIG. 115 is a diagram showing an embodiment of NUQ-64 for 6/15 code rate according to the present invention.

FIG. 115 is a diagram showing an embodiment of NUQ-64 for 6/15 code rate according to the present invention.

This figure shows the constellation shape of QAM-64 for 6/15 code rate on a complex plane.

Figure 116:
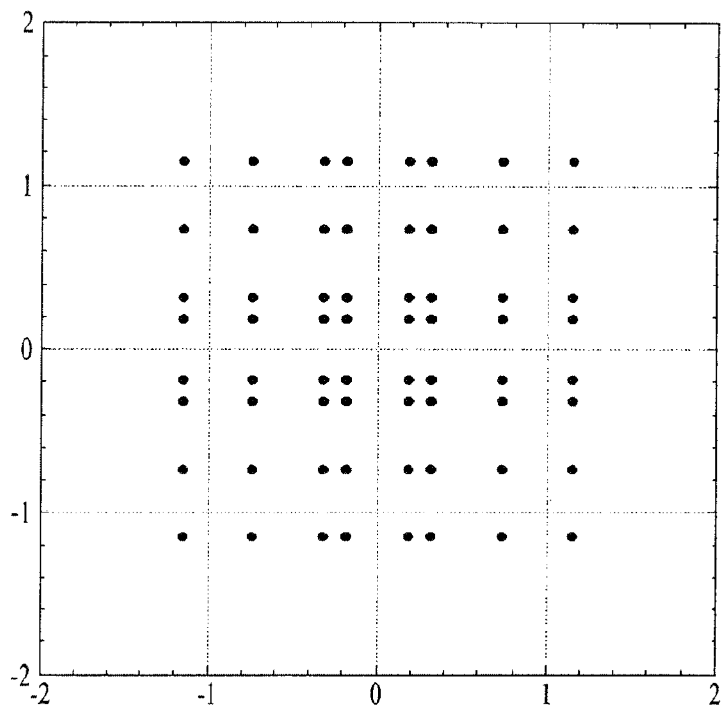
FIG. 116 is a diagram showing an embodiment of NUQ-64 for 7/15 code rate according to the present invention.

FIG. 116 is a diagram showing an embodiment of NUQ-64 for 7/15 code rate according to the present invention.

This figure shows the constellation shape of QAM-64 for 7/15 code rate on a complex plane.

Figure 117:
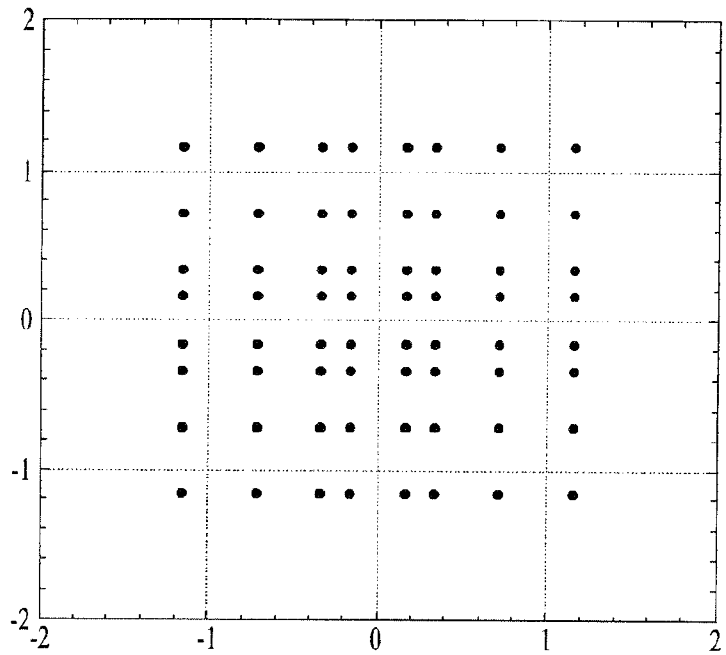
FIG. 117 is a diagram showing an embodiment of NUQ-64 for 8/15 code rate according to the present invention.

FIG. 117 is a diagram showing an embodiment of NUQ-64 for 8/15 code rate according to the present invention.

This figure shows the constellation shape of QAM-64 for 8/15 code rate on a complex plane.

Figure 118:
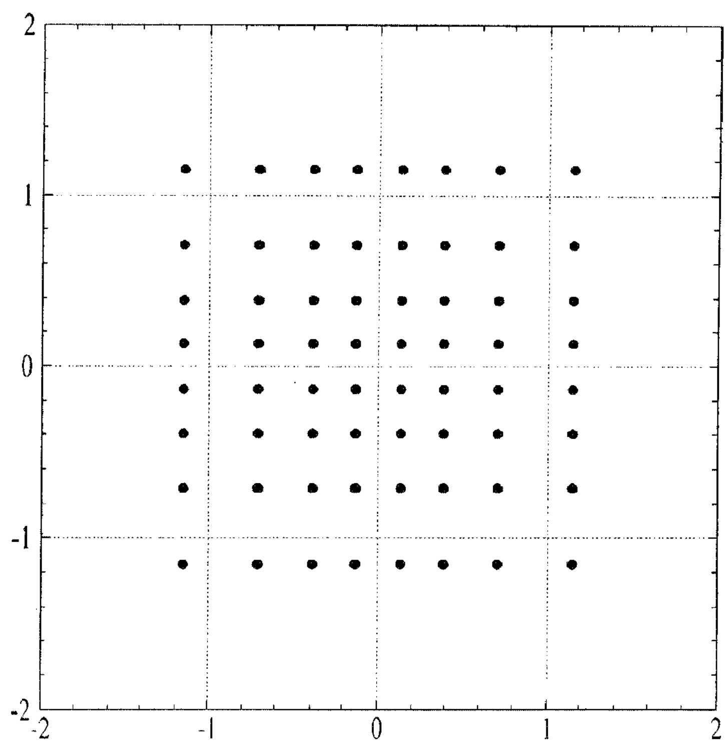
FIG. 118 is a diagram showing an embodiment of NUQ-64 for 9/15 and 10/15 code rates according to the present invention.

FIG. 118 is a diagram showing an embodiment of NUQ-64 for 9/15 and 10/15 code rates according to the present invention.

This figure shows the constellation shape of QAM-64 for 9/15 and 10/15 code rates on a complex plane.

Figure 119:
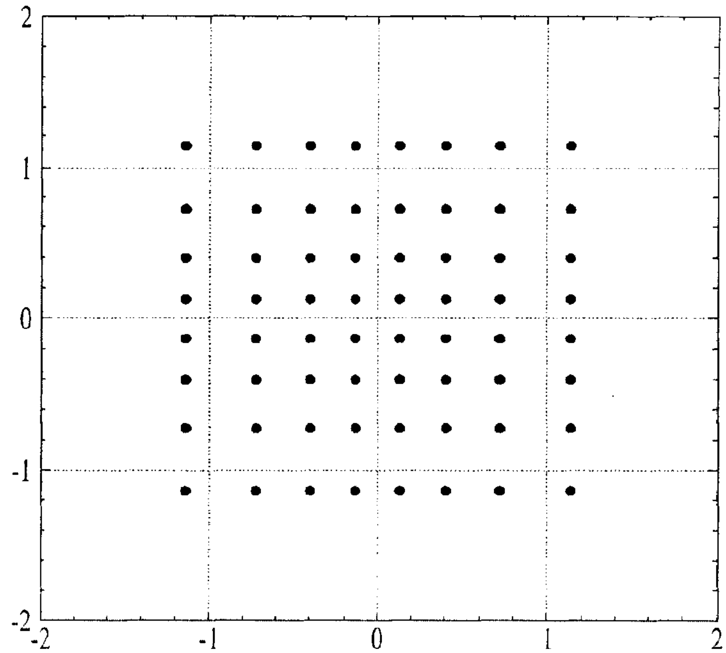

FIG. 119 is a diagram showing an embodiment of NUQ-64 for 11/15 code rate according to the present invention.

This figure shows the constellation shape of QAM-64 for 11/15 code rate on a complex plane.

Figure 120:
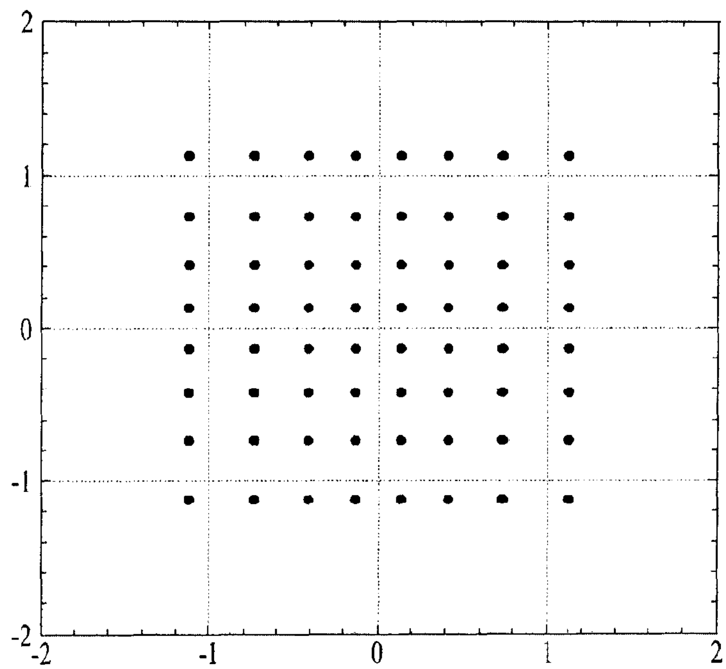

FIG. 120 is a diagram showing an embodiment of NUQ-64 for 12/15 code rate according to the present invention.

This figure shows the constellation shape of QAM-64 for 12/15 code rate on a complex plane.

Figure 121:
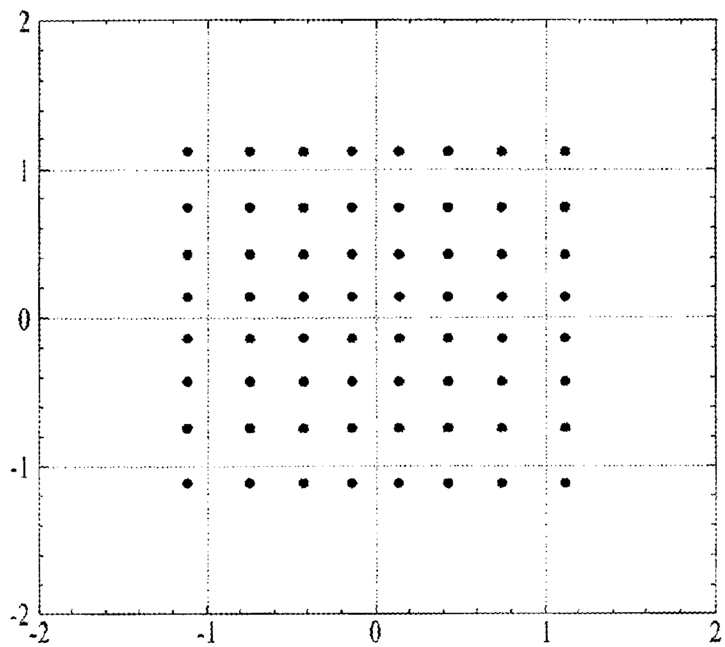

FIG. 121 is a diagram showing an embodiment of NUQ-64 for 13/15 code rate according to the present invention.

This figure shows the constellation shape of QAM-64 for 13/15 code rate on a complex plane.

Figure 122:
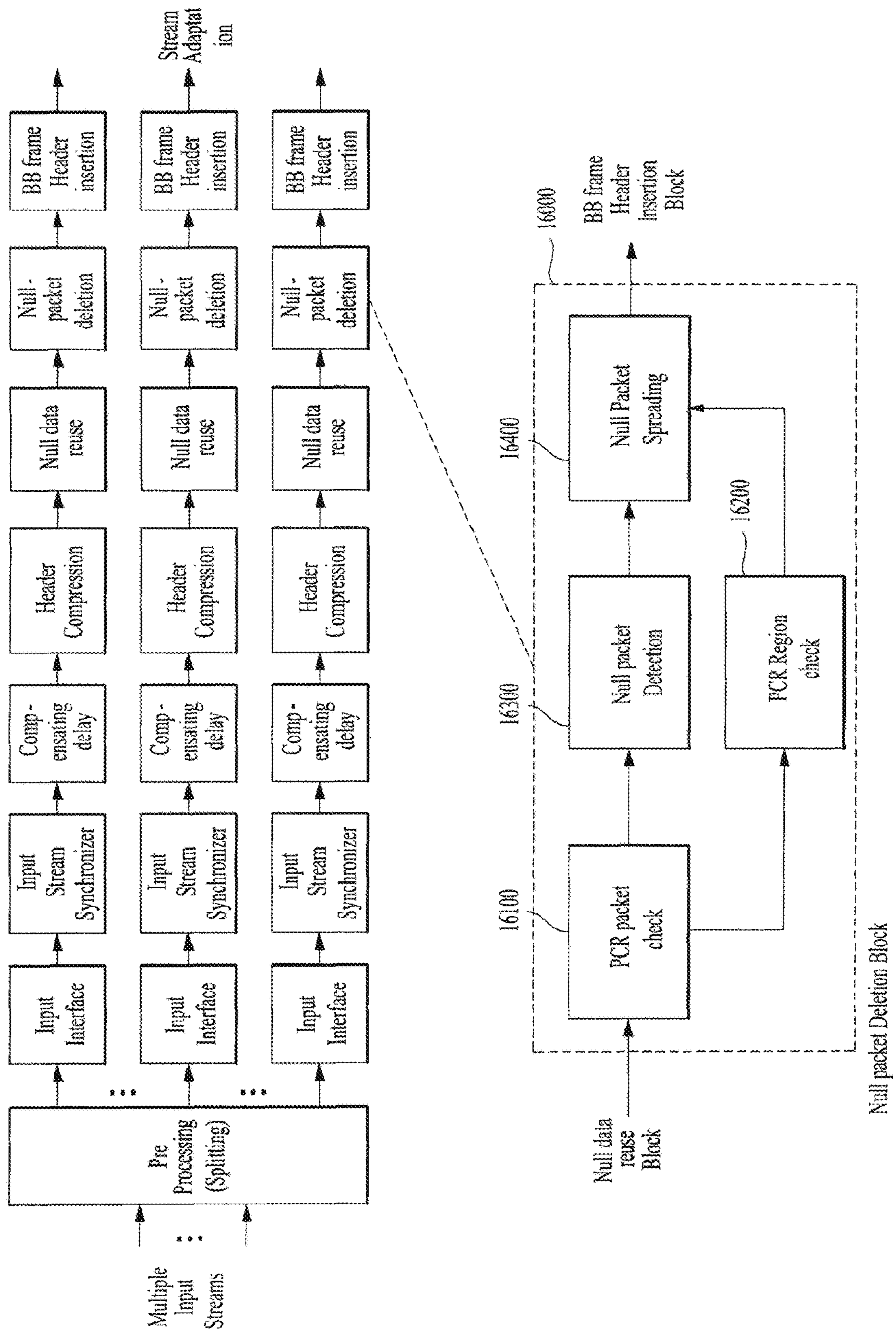

FIG. 122 is a view illustrating a null packet deletion block 16000 according to another embodiment of the present invention.

An upper part of FIG. 122 is a view illustrating another embodiment of the mode adaptation module of the input formatting module described above in relation to FIG. 3, and a lower part of FIG. 122 is a view illustrating specific blocks of the null packet deletion block 16000 included in the mode adaptation module.

As described above, the mode adaptation module of the input formatting module for processing multiple input streams may independently process the input streams.

As illustrated in FIG. 122, the mode adaptation module for processing each of the multiple input streams may include a pre-processing block (splitter), input interface blocks, input stream synchronizer blocks, compensating delay blocks, header compression blocks, null data reuse blocks, null packet deletion blocks, and BB frame header insertion blocks. Operations of the input interface blocks, the input stream synchronizer blocks, the compensating delay blocks and the BB frame header insertion blocks are the same as those described above in relation to FIG. 3 and thus detailed descriptions thereof are omitted here.

The pre-processing block may split the input TS, IP, GS streams into multiple service or service component (audio, video, etc.) streams. In addition, the header compression block may compress a header of an input signal based on a header compression mode. The null packet deletion block 16000 according to an embodiment of the present invention may delete input null packets and insert information about the number of deleted null packets based on positions thereof, before transmission. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted DNP field that is inserted in the transmission, thus guaranteeing constant bit-rate and avoiding the need for time-stamp (PCR) updating.

As illustrated in the lower part of FIG. 122, the null packet deletion block 16000 according to an embodiment of the present invention may include a PCR packet check block 16100, a PCR region check block 16200, a null packet detection block 16300 and a null packet spreading block 16400. A description is now given of operation of each block.

The PCR packet check block 16100 may determine whether input TS packets include a PCR for synchronizing a decoding timing. In the present invention, a TS packet including a PCR may be called a PCR packet.

If the position of a PCR is detected as a result of determination, the PCR packet check block 16100 may change the positions of null packets without changing the position of the PCR.

The PCR region check block 16200 may check a TS packet including a PCR packet and determine whether null packets exist within a range of the same cycle (i.e., PCR region). In the present invention, a period for determining whether a PCR is included may be called a null packet position reconfigurable region.

The null packet detection block 16300 may check null packets included between input TS packets.

The null packet spreading block 16400 may spread null packets within PCR region information output from the PCR region check block 16200.

The present invention proposes a method for collecting null packets and a method for distributing null packets as examples of a method for changing the positions of null packets.

Figure 123:
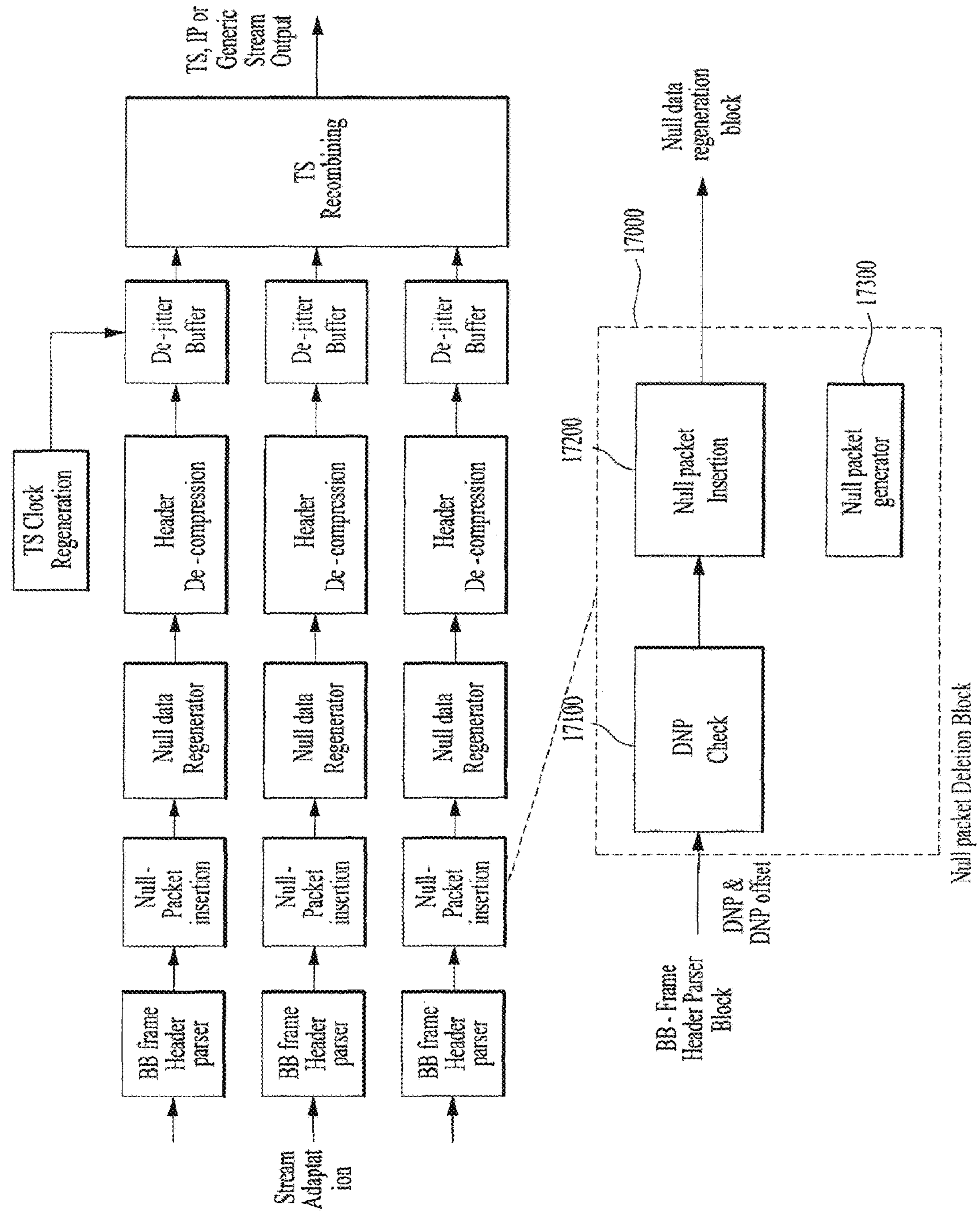

FIG. 123 is a view illustrating a null packet insertion block 17000 according to another embodiment of the present invention.

An upper part of FIG. 123 is a view illustrating another embodiment of the output processor described above in relation to FIG. 13, and a lower part of FIG. 123 is a view illustrating specific blocks of the null packet insertion block 17000 included in the output processor.

The output processor illustrated in FIG. 123 may perform a reverse procedure of the operation performed by the mode adaptation module described above in relation to FIG. 122.

As illustrated in FIG. 123, the output processor according to an embodiment of the present invention may include BB frame header parser blocks, null packet insertion blocks, null data regenerator blocks, header de-compression blocks, de-jitter buffer blocks, a TS clock regeneration block and a TS recombining block. Operations of the blocks correspond to reverse procedures of those of the blocks of FIG. 122 and thus detailed descriptions thereof are omitted here.

The null packet insertion block 17000 illustrated in the lower part of FIG. 123 may perform a reverse procedure of the above-described operation performed by the null packet deletion block 16000 of FIG. 122.

As illustrated in FIG. 123, the null packet insertion block 17000 may include a DNP check block 17100, a null packet insertion block 17200 and a null packet generator block 17300.

The DNP check block 17100 may check DNP and acquire information about the number of deleted null packets. The null packet insertion block 17200 may receive the information about the number of deleted null packets output from the DNP check block 17100 and insert the deleted null packets. In this case, the null packets to be inserted may be previously generated by the null packet generator block 17300.

Figure 124:
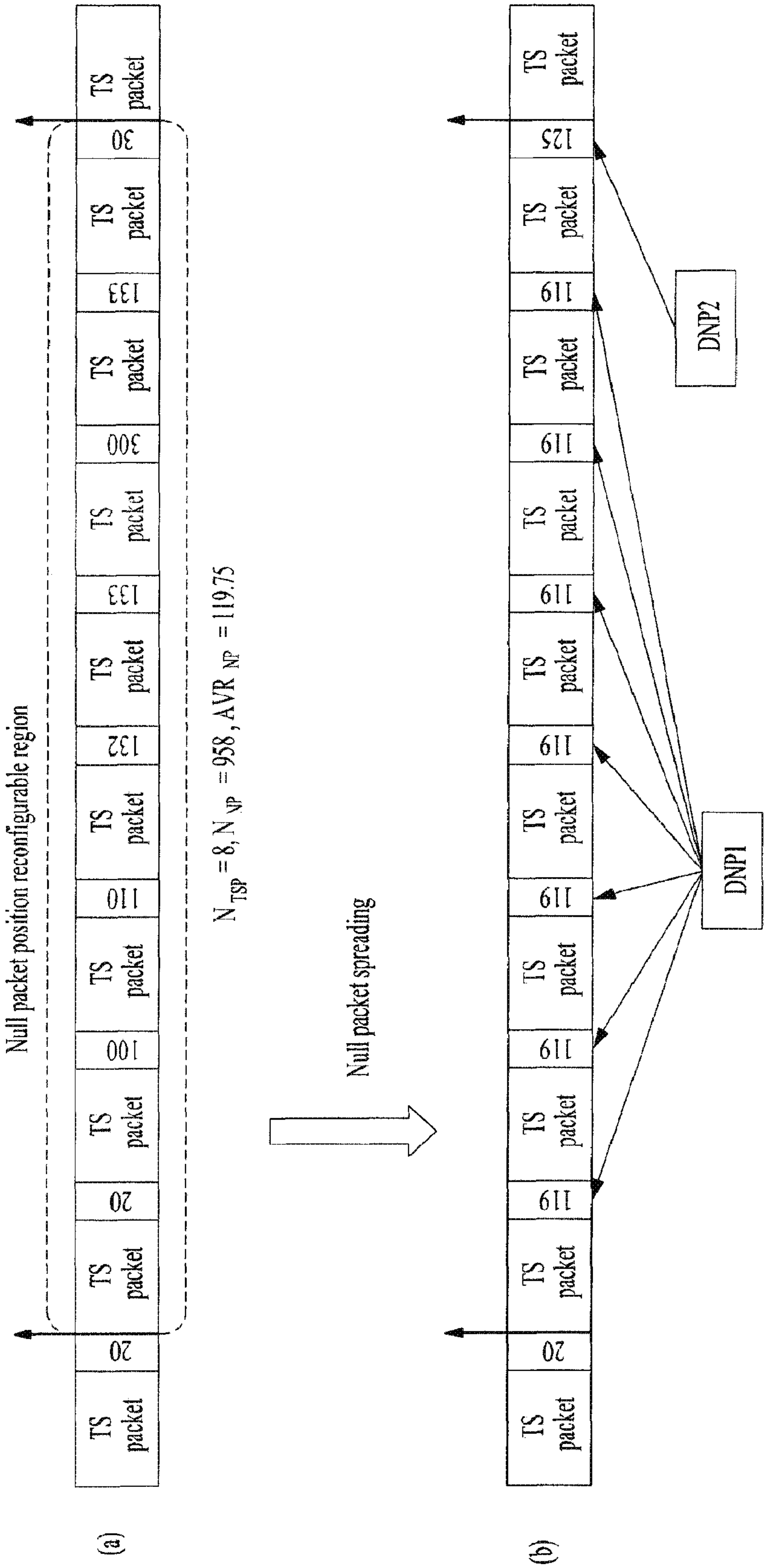

FIG. 124 is a view illustrating a null packet spreading method according to an embodiment of the present invention.

FIG. 124(*a*) illustrates TS packets before the null packet spreading method is used, and FIG. 124(*b*) illustrates TS packets after the null packet spreading method is used.

FIG. 124(*c*) illustrates Math Figures which express DNP1 and DNP2 based on the null packet spreading method.

As illustrated in FIG. 124(*a*), the null packet deletion block 16000 according to an embodiment of the present invention may determine whether input TS packets include a PCR for synchronizing a decoding timing. That is, if null packet position reconfigurable region information is acquired, a broadcast signal transmission apparatus according to an embodiment of the present invention may count a total number of null packets ($N_N P$) included in a corresponding period and a total number of data packets ($N_{TSP}$) to be transmitted. As illustrated in FIG. 124(*a*), the total number of data packets is 8 and the total number of null packets corresponds to 958. AVRnP refers to an average number of null packets spreadable between the data packets within the corresponding period. As illustrated in FIG. 124(*a*), AVRnP of the corresponding period is 119.75.

After that, the null packet deletion block 16000 according to an embodiment of the present invention may spread null packets within output PCR region information. That is, if null packets are deleted, DNP indicating the number of null packets is inserted to a position from which the null packets are deleted. The broadcast signal transmission apparatus according to an embodiment of the present invention may perform null packet spreading by calculating DNP1 and DNP2. FIG. 124(*b*) illustrates null packets spread based on DNP1 and DNP2. DNP1 may be calculated using DNP values inserted to correspond to 1 to NTSP−1 TS packets and the total number of data packets ($N_{TSP}$) to be transmitted, based on the Math Figure illustrated in FIG. 124(*c*). DNP1 may have an integer value of the above-described average number of null packets.

In addition, DNP2 may be calculated as a remainder not processed by DNP1, based on the Math Figure illustrated in FIG. 124(*c*). DNP2 may have a value greater than or equal to the value of DNP1 and may be inserted before the last TS packet or at the end of the null packet position reconfigurable region.

The null packet spreading method illustrated in FIG. 124 may be more effective to solve the above-described problem in a case when the maximum DNP value for null packets generated due to TS packet splitting exceeds 300.

Figure 125:
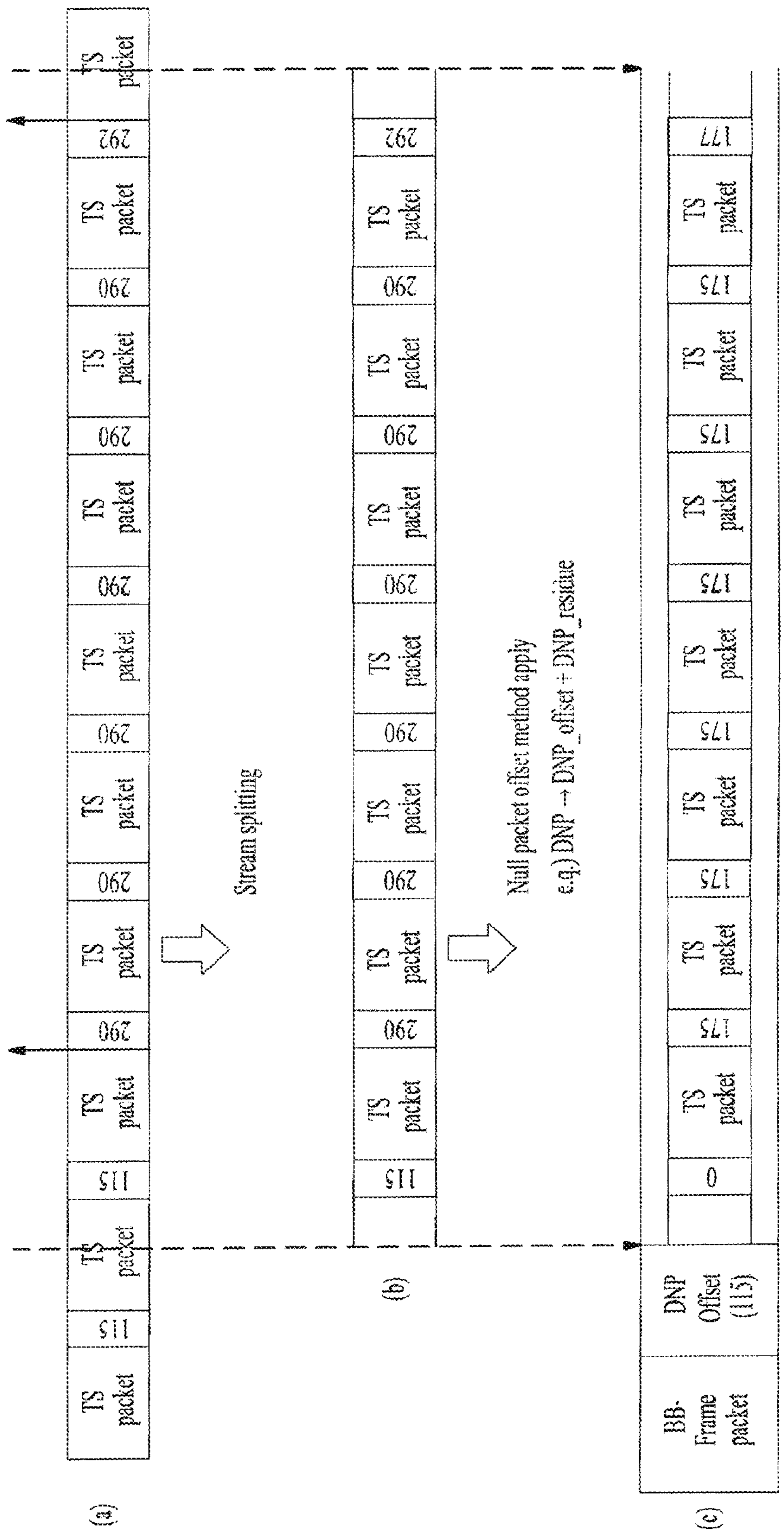

FIG. 125 is a view illustrating a null packet offset method according to an embodiment of the present invention.

If the number of null packets is excessively large, the number can exceed the maximum DNP value even when the null packet spreading method described above in relation to FIG. 124 is used.

That is, when an input TS stream is split as illustrated in FIG. 125(*a*), multiple null packets may be generated. Specifically, in a case when multiple TS streams are combined into a big TS stream, when a single TS stream is split based on component levels, or when and a big TS stream is split into video packets and audio packets as in UD service, null packets may be periodically inserted. TS input streams or split TS streams having consecutive TS packets and deleted null packets may be mapped into a payload of BB frame. The BB frame includes a BB frame header and the payload.

In this case, as described above, if the number of null packets is large as illustrated in FIG. 125(*b*), the value of DNP can be equal to or greater than 290 in some cases.

Accordingly, as illustrated in FIG. 125(*c*), the null packet deletion block 16000 according to an embodiment of the present invention may determine TS packets to be inserted into the payload of the BB frame and determine the most basic DNP value as DNP-offset.

According to an embodiment of the present invention, DNP-offset is the minimum number of DNPs belonging to the same BBF. DNP-offset can be transmitted through the BB frame header. As such, the number of DNPs inserted in front of a TS packet may be reduced to implement efficient TS packet transmission, and a larger number of null packets may be deleted.

Accordingly, as illustrated in FIG. 125(*c*), the value of DNP-offset is 115, and the first DNP has a value of 0 while the second DNP has a value of 175 obtained by subtracting 115 from an original value 290. The same principle can also be applied sequentially to the other DNPs.

Figure 126:
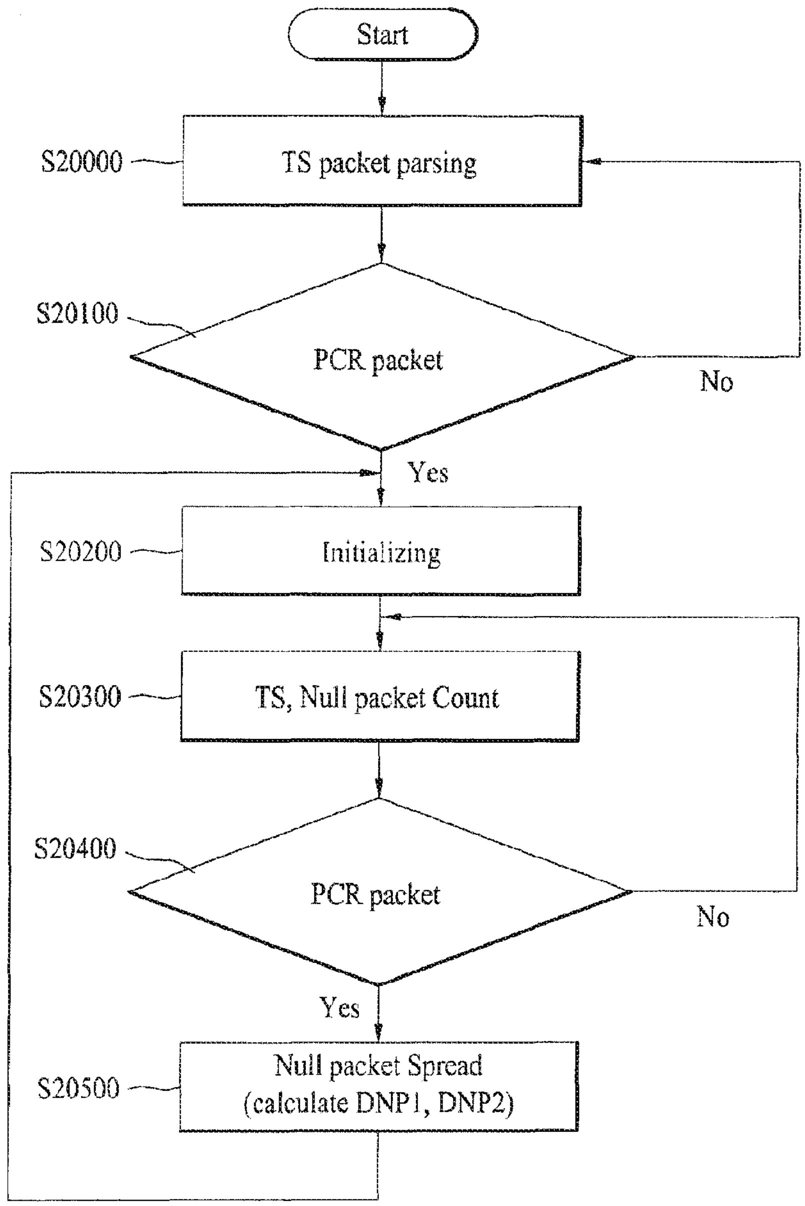

FIG. 126 is a flowchart illustrating a null packet spreading method according to an embodiment of the present invention.

The null packet deletion block 16000 according to an embodiment of the present invention may parse input TS packets for analysis (S20000). In this case, the null packet deletion block 16000 according to an embodiment of the present invention may parse the TS packets in units of the above-described null packet position reconfigurable region.

After that, the null packet deletion block 16000 according to an embodiment of the present invention may determine whether PCR information exists in a corresponding null packet position reconfigurable region (S20100). In this case, the null packet deletion block 16000 according to an embodiment of the present invention may determine the presence of PCR information by checking a PCR flag of an adaptation field in a header of an input TS packet.

If a PCR value exists as a result of determination, the null packet deletion block 16000 according to an embodiment of the present invention may initialize a counter and related values for null packet spreading (S20200), and count the number of input data TS packets and the number of null packets (S20300). After that, the null packet deletion block 16000 according to an embodiment of the present invention may determine whether a PCR packet exists (S20400). If a PCR value is not present as a result of determination, the null packet deletion block 16000 according to an embodiment of the present invention may continue to count the number of null packets and the number of data TS packets (S20300).

If a PCR value exists as a result of determination, the null packet deletion block 16000 according to an embodiment of the present invention may perform null packet spreading (S20500). In this case, the null packet deletion block 16000 according to an embodiment of the present invention may calculate the above-described DNP1 and DNP2 values, and may use the above-described null packet offset method if a corresponding value exceeds the maximum DNP value.

Figure 127:
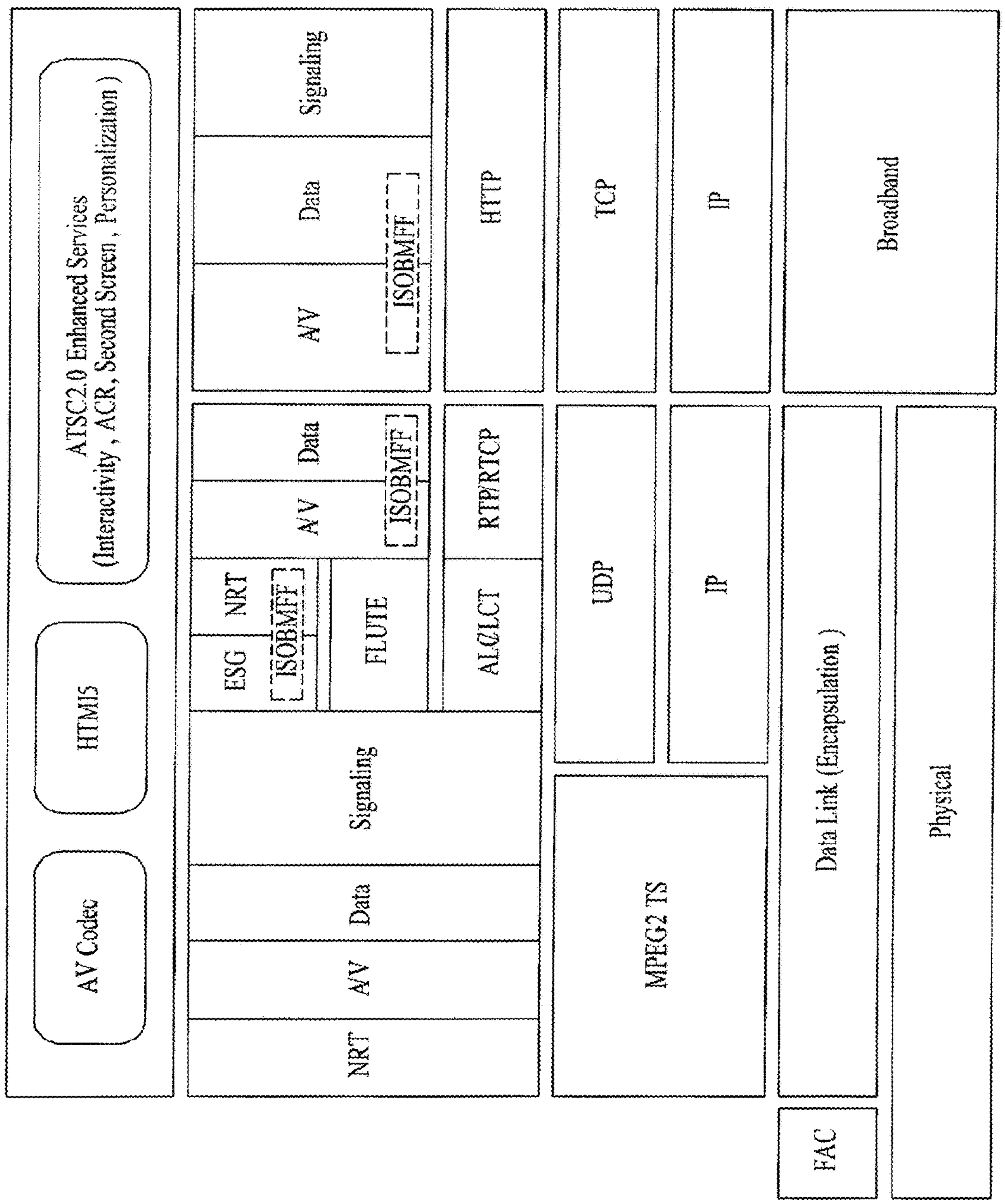

FIG. 127 is a conceptual diagram illustrating a protocol stack for the next generation broadcast system based on hybrid according to an embodiment of the present invention.

The present invention proposes a data link (encapsulation) part shown in FIG. 127, and proposes a method for transmitting MPEG-2 TS (Transport Stream) and/or IP (Internet Protocol) packets received from an upper layer over a physical layer. In addition, the present invention provides a signaling transmission method needed to operate a physical layer. In addition, when transmission of a new packet type is considered in an upper layer in the future, the present invention can implement a method for transmitting the new packet transmission information to a physical layer.

The corresponding protocol layer may also be referred to as a data link layer, an encapsulation layer, a Layer 2, or the like. For convenience of description and better understanding of the present invention, the protocol layer will hereinafter be referred to as a link layer. When the term “protocol layer” is actually applied to the present invention, it should be noted that the term “protocol layer” may be replaced with the term ‘link layer’ or may also be called a new name as necessary.

The broadcast system according to the present invention may correspond to a hybrid broadcast signal implemented by combination of an IP (Internet Protocol) centric broadcast network and a broadband network.

The broadcast system according to the present invention may be designed to be compatible with the legacy MPEG-2 based broadcast system.

The broadcast system according to the present invention may correspond to a hybrid broadcast system based on a combination of the IP centric broadcast network, a broadband network, and/or a mobile communication network or cellular network.

Referring to FIG. 127, a physical layer may use a physical protocol adopted by a broadcast system such as the ATSC and/or DVB system.

In an encapsulation layer, an IP datagram may be obtained from specific information acquired from a physical layer, or the obtained IP datagram may be converted into a specific frame (e.g., RS frame, GSE-lite, GSE or signal frame). In this case, the frame may include an aggregate of IP datagrams.

A fast access channel (FAC) may include specific information (e.g., mapping information between a service ID and a frame) used for access to a service and/or contents.

A broadcast system according to the present invention may use a variety of protocols, for example, Internet Protocol (IP), User Datagram Protocol (UDP), Transmission Control Protocol (TCP), ALC/LCT (Asynchronous Layered Coding/Layered Coding Transport), RCP/RTCP (Rate Control Protocol/RTP Control Protocol), HTTP (Hypertext Transfer Protocol), FLUTE (File Delivery over Unidirectional Transport), etc. A stack between protocols may refer to the structure of FIG. 127.

In the broadcast system of the present invention, data may be transmitted in the form of ISOBMFF (ISO base media file format). ESG (Electrical Service Guide), NRT (Non Real Time), A/V (Audio/Video) and/or general data may be transmitted in the form of ISOBMFF.

Data transmission caused by the broadcast network may include linear content transmission and/or non-linear content transmission.

RTP/RTCP based A/V, and data (closed caption, emergency alert message, etc.) transmission may correspond to linear content transmission.

RTP payload may be encapsulated and transmitted in the form of an RTP/AV stream including a Network Abstraction Layer (NAL) and/or in the form of an ISO based media file format. RTP payload transmission may correspond to linear content transmission. If the RTP payload is encapsulated and transmitted in the form of an ISO based media file format, the RTP payload may include MPEG DASH media segments for A/V or the like.

FLUTE based ESG transmission, non-timed data transmission, and NRT content transmission may correspond to non-linear content transmission. The above-mentioned information may be encapsulated and transmitted in the form of a MIME type file and/or an ISO based media file format. If data is encapsulated and transmitted in the form of an ISO based media file format, this data transmission may conceptually include an MPEG DASH media segment for A/V or the like.

Data transmission over the broadband network may be classified into transmission of contents and transmission of the signaling data.

Content transmission may include transmission of linear content (A/V, data (closed caption, emergency alert messages, etc.), transmission of non-linear content (ESG, non-timed data, etc.), and transmission of an MPEG DASH based Media segment (A/V, data).

Transmission of the signaling data may include transmission of data including a signaling table (including MPD of MPEG DASH) transmitted on the broadcast network.

The broadcast system of the present invention may support not only synchronization between linear/non-linear contents having been transmitted over the broadcast network, but also synchronization between content transmitted over the broadcast network and content transmitted over the broadband network. For example, if one UD content is divided into the broadcast network and the broadband network and then simultaneously transmitted over the broadcast and broadband networks, the receiver may coordinate a timeline dependent upon a transmission (Tx) protocol, may synchronize contents of the broadcast network and the broadband contents, and may reconstruct the synchronized contents into one piece of UE content.

An application layer of the broadcast system may implement technical characteristics, for example, interactivity, personalization, second screen, ACR (automatic content recognition), etc. The above-mentioned technical characteristics are of importance to the North American broadcast standard evolved from ATSC 2.0 to ATSC 3.0. For example, HTML5 may be used to implement interactivity.

In a presentation layer of the broadcast system of the present invention, HTML and/or HTML may be used to identify the space and time relationship between components or between bidirectional applications.

The broadcast system according to another embodiment may be implemented by addition or modification of the above-mentioned broadcast system, and a detailed description of the individual constituent elements will be replaced with that of the above-mentioned broadcast system.

The broadcast system according to another embodiment of the present invention may include a system structure compatible with the MPEG-2 system. For example, the linear/non-linear contents transmitted in the legacy MPEG-2 system can be received or operated in the ATSC 3.0 system, and the A/V and data processing may be adaptively coordinated according to whether data received by the ATSC 3.0 system is an MPEG-2 TS or IP datagram.

In an encapsulation layer of the broadcast system according to another embodiment of the present invention, information/data obtained from a physical layer may be converted into the MPEG-2 TS or IP datagram, or may be converted into a specific frame (e.g., RS frame, GSE-lite, GSE or signal frame, etc.) using the IP datagram.

The broadcast system according to another embodiment may include signaling information capable of being adaptively obtained according to whether MPEG-2 TS or IP datagram is used to acquire the service/content through the broadcast network. That is, when obtaining signaling information from the broadcast system, the signaling information may be obtained on the basis of MPEG-2 TS, or may be obtained from data based on a UDP protocol.

The broadcast system of the present invention may support synchronization between the linear/non-linear contents based on the broadcast network encapsulated by MPEG-2 TS and/or IP datagram. Alternatively, the broadcast system can support synchronization between content fragments that are respectively transmitted through the broadcast network and the broadband network. For example, if one UD content is divided into the broadcast network and the broadband network and then simultaneously transmitted over the broadcast and broadband networks, the receiver may coordinate a timeline dependent upon a transmission (Tx) protocol, may synchronize contents of the broadcast network and the broadband contents, and may reconstruct the synchronized contents into one piece of UE content.

Figure 128:
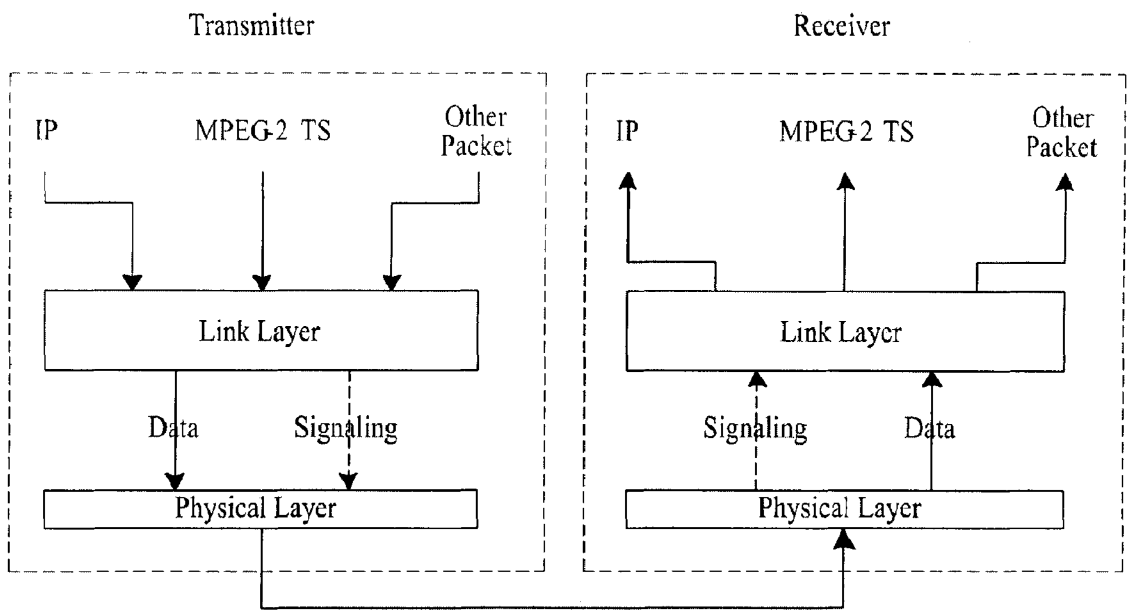

FIG. 128 is a conceptual diagram illustrating an interface of a link layer according to an embodiment of the present invention.

Referring to FIG. 128, the transmitter may consider an exemplary case in which IP packets and/or MPEG-2 TS packets mainly used in the digital broadcasting are used as input signals. The transmitter may also support a packet structure of a new protocol capable of being used in the next generation broadcast system. The encapsulated data of the link layer and signaling information may be transmitted to a physical layer. The transmitter may process the transmitted data (including signaling data) according to the protocol of a physical layer supported by the broadcast system, such that the transmitter may transmit a signal including the corresponding data.

On the other hand, the receiver may recover data and signaling information received from the physical layer into other data capable of being processed in a higher layer. The receiver may read a header of the packet, and may determine whether a packet received from the physical layer indicates signaling information (or signaling data) or recognition data (or content data).

The signaling information (i.e., signaling data) received from the link layer of the transmitter may include first signaling information that is received from an upper layer and needs to be transmitted to an upper layer of the receiver; second signaling information that is generated from the link layer and provides information regarding data processing in the link layer of the receiver; and/or third signaling information that is generated from the upper layer or the link layer and is transferred to quickly detect specific data (e.g., service, content, and/or signaling data) in a physical layer.

Figure 129:
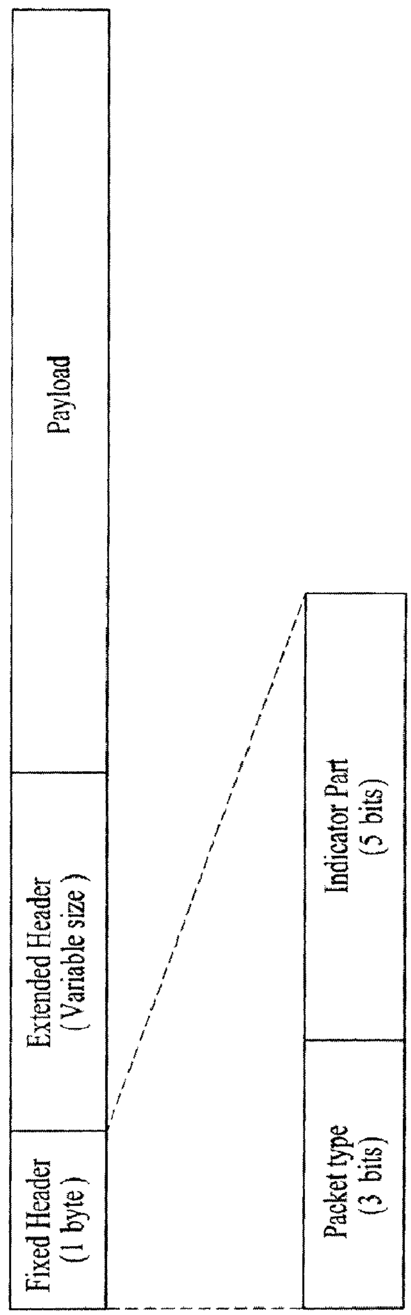

FIG. 129 is a conceptual diagram illustrating a packet structure of a link elayer according to an embodiment of the present invention.

In accordance with an embodiment of the present invention, the packet of the link layer may include a fixed header, an extended header, and/or payload.

A fixed header is designed to have a fixed size. For example, the fixed header may be 1 byte long. The extended header can be changed in size. Payload including data received from the higher layer may be located behind the fixed header and the extended header.

The fixed header may include a packet type element and/or an indicator part element.

The packet type element may be 3 bits long. The packet type element may identify a packet type of a higher layer (i.e., a higher layer of the link layer). The packet type identified by the packet type element value will hereinafter be described in detail.

The indicator part element may include information regarding a payload construction method and/or construction information of the extended header. The construction method and/or the construction information indicated by the indicator part element may be changed according to packet types.

FIG. 130 shows packet types dependent upon the packet type element values according to an embodiment of the present invention.

Referring to FIG. 130, if the packet type element is set to '000', this means that a packet transferred from the higher layer to the link layer is an IPv4 (Internet Protocol version 4) packet.

If the packet type element value is set to '001', this means that a packet transferred from the higher layer to the link layer is an IPv6 (Internet Protocol version 6) packet.

If the packet type element value is set to '010', this means that a packet transferred from the higher layer to the link layer is a Compressed IP packet.

If the packet type element value is set to '011', this means that a packet transferred from the higher layer to the link layer is an MPEG-2 TS packet.

If the packet type element value is set to '101', this means that a packet transferred from the higher layer to the link layer is a Packetized Stream packet. For example, the Packetized Stream may correspond to an MPEG media transport packet.

If the packet type element value is set to '110', this means that a packet transferred from the higher layer to the link layer is a packet for transmitting signaling information (signaling data).

If the packet type element value is set to '111', this means that a packet transferred from the higher layer to the link layer is a Framed Packet type.

FIG. 131 is a conceptual diagram illustrating a header structure of a link layer packet when an IP packet is transmitted to the link layer according to an embodiment of the present invention.

Referring to FIG. 131, if the IP packet is input to the link layer, the packet type element value may be 000B (3 bits of 000) or 001B (3 bits of 001).

Referring to a packet header of the link layer when an IP packet is input, the indicator part element located next to the packet type element may include a C/S (Concatenation/Segmentation) field and/or an additional bit of 3 bits (hereinafter referred to as an additional field).

In case of the packet of the link layer, an additional field of the fixed header and information of the extended header may be decided according to the CS (Concatenation/Segmentation) field of 2 bits located behind the packet type element.

The C/S field indicates the processing type of the input IP packet, and may include information regarding the extended header length.

In accordance with an embodiment of the present invention, the case in which the C/S field is set to 00B (2 bits of 00) may indicate that payload of the link layer packet includes a normal packet. The normal packet may indicate that the input IP packet is used as payload of the link layer packet without change. In this case, the additional field of the fixed header part is not in use, and may be reserved for a subsequent use. In this case, the extended header may not be used.

If the C/S field is set to '01B' (2 bits of '01'), this means that payload of the link layer packet includes a concatenated packet. The concatenated packet includes one or more IP packets. That is, one or more IP packets may be contained in payload of the link layer packet. In this case, the extended header is not used, and the additional field located subsequent to the C/S field may be used as the count field. A detailed description of the count field will hereinafter be described in detail.

If the C/S field is set to '10B' (2 bits of '10'), this means that payload is composed of segmented packets. The segmented packet is obtained by dividing one IP packet into a few segments. Specifically, the segmented packet may include one segment from among the divided segments. That is, payload of the link layer packet may include any one of a plurality of packets contained in the IP packet. The additional field located behind the C/S field is used as the segment ID. The segment ID may uniquely identify the segment. The segment ID is assigned when the IP packet is segmented. In more detail, if segments to be respectively transmitted in the future are integrated, the segment ID can indicate the presence of a constituent element of the same IP packet. The segment ID may be 3 bits long, and at the same time can support segmentation of the IP packet. For example, the divided segments obtained by one IP packet may have the same segment ID. In this case, the extended header may be 1 byte long. In this case, the extended header may include the Seg_SN (Segment Sequence Number) field and/or the Seg_Len_ID (Segment Length ID) field.

The Seg_SN field may be 4 bits long, and may indicate a sequence number of the corresponding segment for use in the IP packet. When the Seg_SN field IP packet is segmented, the Seg_SN field may be used to confirm the order or sequence of each segment. Accordingly, although the link layer packets including a payload segmented from one IP packet may have the same segment ID (Seg_ID), the link layer packets may have different Seg_SN field values. The Seg_SN field may be 4 bits long. In this case, one IP packet can be segmented into a maximum of 16 segments. If a user desires to divide the IP packet into many more segments, the Seg_SN field is increased in size so that the Seg_SN field may indicate each order of the segment and/or the number of segments.

The Seg_Len_ID (Segment Length ID) field may be 4 bits long, and may be used to identify the segment length. The actual segment length according to the Seg_Len_ID field value may be identified by a table to be described later. If the length value of an actual segment is signaled instead of the Seg_Len_ID field, the Seg_Len_ID field of 4 bits may be extended to the segment length field of 12 bits. In this case, the extended header of 2 bytes may be contained in the link layer packet.

If the C/S field value is set to 11B (2 bits of '11'), this means an exemplary case in which payload includes the segmented packet as in the case in which the C/S field value is set to 10B. However, the C/S field of 11B may also indicate that the last segment from among several segments divided in one IP packet may be contained in a payload. When segments are collected to reconstruct one IP packet, the receiver may identify the link layer packet configured to transmit the last segment using the C/S field value, and the segment contained in the payload of the corresponding packet may be recognized as the last segment. The additional field located behind the C/S field may be used as the segment ID. In this case, the extended header may be 2 bytes long. The extended header may include the Seg_SN (Segment Sequence Number) field and/or the L_Seg_Len (Last Segment Length) field.

The L_Seg_Len field may indicate the actual length of the last segment. If data is segmented to generate the same-sized data segments in the order from the front part of the IP packet using the Seg_Len_ID field, the last segment may have a different size as compared to another previous segment. Accordingly, the segment length may be directly indicated using the L_Seg_Len field. The segment length may be changed according to the number of allocated bits of the L_Seg_Len field. However, when allocating the number of bits according to the present invention, the L_Seg_Len field may indicate that the last segment is 1-4095 bytes long.

That is, if one IP packet is divided into a plurality of segments, the IP packet can be divided into a plurality of segments having a predetermined length. However, the length of the last segment may be changed according to the length of the IP packet. Accordingly, the length of the last segment needs to be signaled independently. A detailed description of the field having the same name may be replaced with the above-mentioned description.

FIG. 132 is a conceptual diagram illustrating the meaning and header structures according to C/S field values.

Referring to FIG. 132, if the C/S field is set to '00', this means that a normal packet is contained in the payload of the link layer packet and the additional field is reserved. On the other hand, the extended header may not be contained in the link layer packet. In this case, a total length of the header of the link layer packet may be 1 byte.

If the C/S field is set to '01', a concatenated packet is contained in the payload of the link layer packet and the additional field may be used as the count field. A detailed description of the count field will be given later. In the meantime, the extended header may not be contained in the link layer packet. In this case, a total length of the header of the link layer packet may be 1 byte.

If the C/S field is set to '10', the segmented packet may be contained in the payload of the link layer packet, and the additional field may be used as the segment ID. In the meantime, the extended header may be contained in the link layer packet, and the extended header may include the Seg_SN field and/or the Seg_Len_ID field. A detailed description of the Seg_SN field or the Seg_Len_ID field may be replaced with the above-mentioned description or a description to be given later. A total length of the link layer packet may be 2 bytes.

If the C/S field is set to '11', the segmented packet (i.e., packet including the last segment) may be contained in the payload of the link layer packet, and the additional field may be used as the segment ID. Meanwhile, the extended header may be contained in the link layer packet, and the extended header may include the Seg_SN field and/or the L_Seg_Len field. A detailed description of the Seg_SN field or the L_Seg_Len field may be replaced with the above-mentioned description or a description to be described given. A total length of the link layer packet may be 3 bytes.

FIG. 133 is a conceptual diagram illustrating the meaning according to the count field values.

Referring to FIG. 133, the count field may be used in the case in which the payload of the link layer packet includes a concatenated packet. The count field may indicate how many IP packets are contained in one payload. The value of the count field may indicate the number of concatenated IP packets. However, zero or one concatenation has no meaning, such that the count field may indicate that the IP packets, the number of which is denoted by "count field value+2", are contained in the payload. In accordance with one embodiment, 3 bits may be allocated to the count field, so that this means that a maximum of 9 IP packets has been contained in the payload of the link layer packet. If there is a need to include many more IP packets in one payload, the length of the count field may be extended, or 9 or more IP packets of the extended header may be additionally signaled.

FIG. 134 is a conceptual diagram illustrating the meaning and segment lengths according to values of Seg_Len_ID field.

Referring to FIG. 134, the Seg_Len_ID field may be used to indicate the length of segments other than the last segment from among several segments. In order to reduce overhead of the header needed for indicating the segment length, an available segment size may be limited to 16 segments.

The segment length is decided in response to the packet input size predetermined by a code rate of Forward Error Correction (FEC) processed by a physical layer, and the decided segment length may be designated as a length for each value of the Seg_Len_ID field. For example, in association with each value assigned to the Seg_Len_ID field, the segment length may be predetermined. In this case, information regarding the segment length dependent upon each value of the Seg_Len_ID field is generated by the transmitter and transmitted to the receiver, such that the receiver may store the received information therein. In the meantime, the segment length established to have each value of the Seg_Len_ID field may be changed. In this case, the transmitter may generate new information and transmit the new information to the receiver, and the receiver may update stored information on the basis of the above new information.

In the meantime, if the physical layer processing is performed irrespective of the segment length, the segment length may be calculated as shown in the equation of FIG. 134.

In Equation of FIG. 134, Len_Unit (Length Unit) may be a basic unit for indicating the segment length, and min_Len may be a minimum value of the segment length. Len_Unit and min_Len may be set to the same value not only in the transmitter but also in the receiver. After the above-mentioned parameters of Equation have been decided once, it is preferable that the above parameters remain unchanged in terms of system throughput. This value may be decided in consideration of the FEC processing throughput of the physical layer during an initiation process of the system. For example, as shown in FIG. 134, the Len_Unit or min_Len value may indicate the segment length differently represented in response to the Seg_Len_ID field value. At this time, the parameter 'Len_Unit' may be 256, and the parameter 'min_Len' may be 512.

FIG. 135 is a conceptual diagram illustrating an equation for encapsulating a normal packet and an equation for calculating a link layer packet length.

Referring to FIG. 135, if the input IP packet is not concatenated or segmented within the processing range of the physical layer as described above, the IP packet may be encapsulated into a normal packet. The following contents may be equally applied to IPv4 and IPv6 IP packets. One IP packet may be used as payload of the link layer packet without change, the packet type element value may be set to 000B (IPv4) or 001B (IPv6), and the C/S field value may be set to 00B (Normal Packet). The remaining three bits of the fixed header may be set to a reserved field to be used for another usage in future.

The link layer packet length can be identified as follows. A specific field indicating the IP packet length may be contained in the header of the IP packet. The field indicating the length is always located at the same position, such that the receiver may confirm the field located at a specific position spaced apart from an initial part (start part) of the link layer packet by a predetermined offset, such that the payload length of the link layer packet can be recognized.

The receiver can read the length field having the length of 2 bytes at a specific position spaced apart from the start point of the payload by 2 bytes in case of IPv4, and can read the length field having the length of 2 bytes at a specific position spaced apart from the start point of the payload by 4 bytes in case of IPv6.

Referring to FIG. 135, assuming that the IPv4 length field is set to LIPv4, LIPv4 indicates a total length of IPv4. In this case, if the header length LH (1 byte) of the link layer packet is added to LIPv4, the length of the entire link layer packet is obtained. In this case, LT may indicate the length of the link layer packet.

Referring to the equation of FIG. 135, assuming that the IPv6 length field is denoted by LIPv6, LIPv6 indicates only the payload length of the IPv6 IP packet. Accordingly, if the header length LH (1 byte) of the link layer packet is added and the fixed header length (40 bytes) of IPv6 is additionally added, the length of the link layer packet is obtained. Here, LT may denote the length of the link layer packet.

FIG. 136 is a conceptual diagram illustrating a process for encapsulating a concatenated packet and an equation for calculating a link layer packet length.

Referring to FIG. 136, if the input IP packet does not arrive within the processing range of the physical layer, some IP packets are concatenated and encapsulated into one link layer packet. The following description can also be applied to IP packets of IPv4 and IPv6.

Some IP packets may be used as the payload of the link layer packet, the packet type element value may be set to 000B (IPv4) or 001B (IPv6), and the C/S field may be set to 01B (Concatenated Packet). In addition, the count field of 3 bits indicating how many IP packets are contained in one payload may be concatenated to the C/S field of 01B.

In order to calculate the length of the concatenated packet by the receiver, a similar way to the normal packet case may be used. Assuming that the number of concatenated IP packets indicated by the count field is denoted by n, the header length of the link layer packet is denoted by LH, and the length of each IP packet is denoted by Lk (where $1 \leq k \leq n$), the entire link layer packet length (LT) can be calculated as shown in the equation.

Since the concatenated packet has the fixed header information only, LH=1 (byte) is achieved, and each Lk (where $1 \leq k \leq n$) value can be confirmed by reading the value of the length field contained in the header of each IP packet contained in the concatenated packet. The receiver may parse the length field of a first IP packet at a specific position that has a predetermined offset on the basis of a payload start position after the link layer packet header has ended, and may identify the length of a first IP packet using this length field. The receiver may parse the length field of a second IP packet at a specific position that has a predetermined offset on the basis of a length end point of the first IP packet, and may identify the length of the second IP packet using this length field. The above-mentioned operation is repeated a predetermined number of times corresponding to the number of IP packets contained in the payload of the link layer packet, so that the payload length of the link layer packet can be identified.

FIG. 137 is a conceptual diagram illustrating a process for calculating the length of a concatenated packet including an IPv4 packet and an equation for calculating an offset value at which a length field of the IP packet is located.

When the IP packet is input to the transmitter, the transmitter has no difficulty in reading the length field of the IP packet. However, the receiver can recognize only the number of IP packets constructing the link layer packet through the header, such that the position of each length field is not well known in the art. However, since the length field is always located at the same position of the header of the IP packet, the position of the length field is detected using the following method, so that the length of each IP packet contained in the payload of the concatenated packet can be calculated and recognized.

Assuming that n IP packets contained in the payload of the concatenated packet are respectively denoted by IP1, IP2, . . . , IPk, . . . , IPn, the position of the length field corresponding to IPk may be spaced apart from a start point of the payload of the concatenated packet by Pk bytes. In this case, Pk (where $1 \leq k \leq n$) may be an offset value at which the length field of the k-th IP packet is located on the basis of a start point of the payload of the concatenated packet, and the Pk value can be calculated as shown in the equation of FIG. 137.

In this case, P1 of the IPv4 packet is 2 bytes. Therefore, the Pk value is successively updated from P1, and the Lk value corresponding to the Pk value is read. If Lk is applied to the equation of FIG. 136, the length of concatenated packet can be finally calculated.

FIG. 138 is a conceptual diagram illustrating a process for calculating the length of a concatenated packet including an IPv6 packet and an equation for calculating an offset value at which a length field of the IP packet is located.

If the IPv6 packets are concatenated and contained in the payload of the link layer packet, a method for calculating the payload length is as follows. The length field contained in the IPv6 packet indicates information regarding the payload length of the IPv6 packet, and 40 bytes indicating the length of a fixed header of IPv6 are added to the payload length of the IPv6 packet indicated by the length field, such that the length of IPv6 packet can be calculated.

Assuming that n IP packets contained in the payload of the concatenated packet are respectively denoted by IP1, IP2, . . . , IPk, . . . , IPn, the position of the length field corresponding to IPk may be spaced apart from the start position of the payload of the concatenated packet by Pk bytes. In this case, Pk (wherein 1≤k≤n) may be an offset value at which the length field of the k-th IP packet is located on the basis of a start point of the payload of the concatenated packet, and may be calculated by the equation shown in FIG. 138. In this case, P1 in case of IPv6 has 4 bytes. Accordingly, the Pk value is successively updated from P1, and Lk corresponding to the Pk value is read. If this Lk value is applied to the equation of FIG. 136, the length of concatenated packet can be finally calculated.

FIG. 139 is a conceptual diagram illustrating an encapsulation process of a segmented packet according to an embodiment of the present invention.

The following description can be equally be applied to the IPv4 IP packet and the IPv6 IP packet. One IP packet is segmented to result in a payload of several link layer packets. The packet type element value may be set to 000B (IPv4) or 001B (IPv6), and the C/S field value may be 10B or 11B according to the segment construction.

The C/S field may be set to 11B only in a specific segment corresponding to the last part of the IP packet, and may be set to 10B in the remaining segments other than the above specific segment. The C/S field value may also indicate information of the extended header of the link layer packet as described above. That is, if the C/S field is set to 10B, the header is 2 bytes long. If the C/S field is set to 11B, the header is 3 bytes long.

In order to indicate the segmentation state from the same IP packet, the Seg_ID (segment ID) values contained in the headers of the individual link layer packets must have the same value. In order to allow the receiver to indicate the order (sequence) information of segments for recombination of normal IP packets, the sequentially increasing Seg_SN values are recorded in the header of each link layer packet.

When the IP packet is segmented, the segment length is decided as described above, and the segmentation process based on the same length is carried out. Thereafter, the Seg_Len_ID value appropriate for the corresponding length information is recorded in the header. In this case, the length of the last segment may be changed as compared to the previous segment, so that the length information may be directly designated using the L_Seg_Len field.

The length information designated by the Seg_Len_ID field and the L_Seg_Len field may indicate only payload information of the segment (i.e., link layer packet), such that the receiver may identify the length information of the entire link layer packet by adding the header length of the link layer packet to the payload length of the link layer packet using the C/S field.

FIG. 140 is a conceptual diagram illustrating a segmentation process of an IP packet and header information of a link layer packet according to an embodiment of the present invention.

When the IP packet is segmented and encapsulated into the link layer packet, the field values allocated to the header of respective link layer packets are shown in FIG. 14.

For example, if the IP packet having the length of 5500 bytes in the IP layer is input to the link layer, this IP packet is divided into 5 segments (S1, S2, S3, S4, S5), and headers (H1, H2, H3, H4, H5) are added to the 5 segments, so that the added results are encapsulated into the individual link layer packets.

Assuming that the case of using the IPv4 packet is used, the packet type element value may be set to 000B. The C/S field value is set to 10B in the range of H1~H4, and the C/S field value of H5 is set to 11B. All the segment IDs (Seg_IDs) indicating the same IP packet structure may be set to 000B, and the Seg_SN field is sequentially denoted by 0000B 0100B in the range of H1~H5.

The resultant value obtained when 5500 bytes is divided by 5 is 1100 bytes. Assuming that the segment is composed of the length of 1024 bytes located closest to the 1100 bytes, the length of the last segment S5 is denoted by 1404 bytes (010101111100B). In this case, the Seg_Len_ID field may be set to 0010B as shown in the above-mentioned example.

FIG. 141 is a conceptual diagram illustrating a segmentation process of an IP packet including a cyclic redundancy check (CRC) according to an embodiment of the present invention.

When the IP packet is segmented and transmitted to the receiver, the transmitter may attach the CRC to the rear of the IP packet in such a manner that integrity of combined packets can be confirmed by the receiver, and finally the segmentation process may be carried out. Generally, since CRS is added to the last part of the packet, the CRS is contained in the last segment after completion of the segmentation process.

When the receiver receives data having a length exceeding the length of the last segment, the received data may be recognized as CRC. Alternatively, the length including the CRC length may be signaled as the length of the last segment.

FIG. 142 is a conceptual diagram illustrating a header structure of a link layer packet when MPEG-2 TS (Transport Stream) is input to a link layer according to an embodiment of the present invention.

The packet type element may identify that the MPEG-2 TS packet is input to the link layer. For example, the packet type element value may be set to 01B.

If the MPEG-2 TS is input, the header structure of the link layer packet is shown in FIG. 16. If the MPEG-2 TS packet is input to the link layer, the header of the link layer packet may include the packet type element, the count field, the PI (PID Indicator) field, and/or the DI (Deleted Null Packet Indicator) field.

For example, the 2-bit or 3-bit count field, the 1-bit PI (PID Indicator) field, and the 1-bit DI (Deleted Null Packet Indicator) field may be arranged subsequent to the packet type of the header of the link layer packet. If the count field has 2 bits, the remaining 1 bit may be used as a reserved field to be used for a subsequent use in future. The fixed header part may be constructed in various ways as shown in FIGS. 16(*a*) to 16(*d*) according to locations of the reserved field. Although the present invention will be disclosed on the basis of the header of (*a*) for convenience of description and better understanding of the present invention, the same description may also be applied to other types of headers.

If the MPEG-2 TS packet is input to the link layer (packet type=011), the extended header may not be used.

The count field may indicate how many MPEG-2 TS packets are contained in the payload of the link layer packet. The size of one MPEG-2 TS packet is greatly less than the size of LDPC (Low-density parity-check) input indicating the FEC scheme having a high-selection possibility in the physical layer of the next generation broadcast system, and concatenation of the link layer can be basically considered.

That is, one or more MPEG-2 TS packets may be contained in the payload of the link layer packet. However, the number of concatenated MPEG-2 TS packets is limited to some numbers, so that this information may be identified by 2 bits or 3 bits. Since the length of the MPEG-2 T packet is fixed to a predetermined size (e.g., 188 bytes), the receiver may also estimate the payload size of the link layer packet using the count field. An example of indicating the number of MPEG-2 TS packets according to the count field will hereinafter be described in detail.

PI (Common PID indicator) field is set to '1' when the MPEG-2 TS packets contained in the payload of one link layer packet have the same PIDs (Packet Identifiers). On the contrary, if the MPEG-2 TS packets contained in the payload of one link layer packet have different PIDs, the PI field is set to '0'. The PID field may be 1 bit long.

DI (Null Packet Deletion Indicator) field is set to 1 when a null packet contained in the MPEG-2 TS packet and then transmitted is deleted. If the null packet is not deleted, the DI field is set to 'O'. The DI field may be 1 bit long. If the DI field is set to 1, the receiver may reuse some fields of the MPEG-2 TS packet so as to support null packet deletion in the link layer.

FIG. 143 shows the number of MPEG-2 TS packets contained in a payload of the link layer packet according to values of a count field.

If the count field is 2 bits long, the concatenated MPEG-2 TS packets may be present in four cases. The payload size of the link layer packet other than synchronous bytes (Sync Bytes) (47H) may also be identified by the count field.

The number of MPEG-2 TS packets to be allocated according to the count field value may be changed according to system designers.

FIG. 144 is a conceptual diagram illustrating a header of the MPEG-2 TS packet according to an embodiment of the present invention.

Referring to FIG. 144, the header of the MPEG-2 TS packet may include a Sync Byte field, a Transport Error Indicator field, a payload unit start indicator field, a transport priority field, a PID field, a transport scrambling control field, an adaptation field control field, and/or a continuity counter field.

The Sync Byte field may be used for packet synchronization, and may be excluded in the case of encapsulation at the link layer. A transport error indicator (EI) located next to the Sync Byte field is not used by the transmitter, and may be used to inform a higher layer of the presence of an error incapable of being recovered by the receiver. As a result, the Transport Error Indicator field is not used by the transmitter.

The Transport Error Indicator field is established in a demodulation process on the condition that it is impossible to correct errors of the stream. In more detail, the Transport Error Indicator field may indicate the presence of errors incapable of being corrected in the packet.

The payload unit start indicator field may identify whether PES (Packetized elementary stream) or PSI (Program-specific information) is started.

The transport priority field may indicate whether the corresponding packet has a higher priority than other packets having the same PID.

The PID field may identify each packet.

The transport scrambling control field may indicate whether or not a scramble is used, and/or may indicate whether a scramble is used using an odd or even key.

The adaptation field control field may indicate the presence or absence of the adaptation field.

The continuity counter field may indicate an order number (or sequence number (of the payload packet.

FIG. 145 is a conceptual diagram illustrating a process for allowing a transceiver to change a usage of a transport error indicator field according to an embodiment of the present invention.

If the DI field is set to 1, the Transport Error Indicator field may be used as a Deletion Point Indicator (DPI) field in the link layer of the transmitter as shown in FIG. 19. The Deletion Point Indicator (DPI) field may be recovered to the Transport Error Indicator field after completion of the null packet-related processing in the link layer of the receiver. That is, the DI field may indicate whether the null packet is deleted, and at the same time may indicate whether the usage of the Transport Error Indicator field of the MPEG-2 TS header is changed.

FIG. 146 is a conceptual diagram illustrating an encapsulation process of the MPEG-2 TS packet according to an embodiment of the present invention.

Basically, the MPEG-2 TS packet concatenation is being considered, so that a plurality of MPEG-2 TS packets may be contained in the payload of one link layer packet, and the number of MPEG-2 TS packets may be decided as described above. Assuming that the number of MPEG-2 TS packets contained in payload of one link layer packet is denoted by N, respective MPEG-2 TS packets may be denoted by Mk (wherein $1 \le k \le n$).

The MPEG-2 TS packet may include a fixed header of 4 bytes and a payload of 184 bytes. 1 byte from among the header of 4 bytes is used as the Sync Byte, and is always assigned the same value (47H). Accordingly, one MPEG-2 TS packet 'Mk' may include the sync part (S) of 1 byte, a fixed header part (Hk) of 3 bytes other than the sync byte, and/or the payload part (Pk) of 184 bytes (wherein $1 \le k \le n$).

If the adaptation field is used in the header of the MPEG-2 TS packet, the fixed header part is extended even to the front part of the adaptation field, and the remaining adaptation parts are contained in the payload part.

Assuming that N MPEG-2 TS packets are denoted by [M1, M2, M3, . . . , Mn], the N MPEG-2 TS packets are arranged in the form of [S, H1, P1, S, H2, P2, . . . , S, Hn, Pn]. The Sync Part is always set to the same value, such that the receiver can detect the corresponding position without receiving any signal from the transmitter, and can perform the insertion action at the detected position. Accordingly, when the payload of the link layer packet is constructed, the sync part is excluded so that the packet can be reduced in size. When an aggregate of the MPEG-2 TS packets having the above arrangement is constructed as the payload of the link layer packet, the sync part is excluded, and the header part and the payload part are separated from each other, so that the MPEG-2 TS packets are arranged in the form of [H1, H2, . . . , Hn, P1, P2, . . . , Pn].

If the PI field value is set to zero '0' and the DI field is set to zero '0', the payload length of the link layer packet has '$(n \times 3)+(n \times 184)$' bytes. Thereafter, if 1 byte indicating the header length of the link layer packet is added to the resultant bytes, the entire link layer packet length can be calculated and obtained. That is, the receiver can identify the length of the link layer packet through the above-mentioned process.

FIG. 147 is a conceptual diagram illustrating an encapsulation process of the MPEG-2 TS packet having the same PID according to an embodiment of the present invention.

If broadcast data is being successively streamed, the MPEG-2 TSs contained in one link layer packet may have the same PDI value. In this case, repeated PID values are simultaneously indicated so that the link layer packet can be reduced in size. In this case, the PI (PID indicator) field contained in the header of the link layer packet may be used as necessary.

The PI (Common PID Indicator) value of the header of the link layer packet may be set to '1'. As described above, in the case of using N MPEG-2 TS packets [M1, M2, M3, . . . , Mn] within the payload of the link layer packet, the sync part is excluded, and the header part and the payload part are separated from each other, so that the MPEG-2 TS packets may be arranged in the form of [H1, H2, . . . , Hn, P1, P2, . . . , Pn]. In this case, the header parts [H1, H2, . . . , Hn] of the MPEG-2 TS may have the same PID. Although the PID value is indicated and transmitted only once, the receiver can recover the corresponding data to an original header. Assuming that a common PID is referred to as a Common PID (CPID) and the header obtained when the PID is excluded from the MPEG-2 TS packet header (Hk) is denoted by H'k (where $1 \le k \le n$), the header parts [H1, H2, . . . , Hn] of the MPEG-2 TS constructing the payload of the link layer packet may be reconstructed in the form of [CPID, H'1, H'2, . . . , H'n]. This process may be referred to as Common PID reduction.

FIG. 148 is a conceptual diagram illustrating an equation for calculating the length of a link layer packet through a Common PID reduction process and a Common PID reduction process.

Referring to FIG. 148, the header part of the MPEG-2 TS packet may include a PID of 13 bits. If the MPEG-2 TS packets configured to construct the payload of the link layer packet have the same PID values, PID is repeated a predetermined number of times corresponding to the number of concatenated packets. Accordingly, the PID part is excluded from the header parts [H1, H2, . . . , Hn] of the original MPEG-2 TS packet, so that the MPEG-2 TS packets are reconstructed in the form of [H'1, H'2, . . . , H'n], the common PID value is set to the CPID value, and the CIPD may be located at the front of the reconstructed header part.

The PID value has the length of 13 bits, and the stuffing bit may be added in a manner that the entire packet is configured in the form of a byte unit. The stuffing bits may be located at the front or rear part of the CPID. The stuffing bits may be properly arranged according to the structure of concatenated protocol layer or the system implementation.

In the case of encapsulating the MPEG-2 TS packets having the same PID, the PID is excluded from the header part of the MPEG-2 TS packets and then encapsulated, and the payload length of the link layer packet can be calculated as described above.

As shown in FIG. 148, the header of the MPEG-2 TS packet other than the Sync Byte is 3 bytes long. If the PID part of 13 bits is excluded, resulting in the implementation of 11 bits. Accordingly, if N packets are concatenated to implement ($n \times 11$) bits, and if the number of concatenated packets is set to a multiple of 8, the ($n \times 11$) bits have the length of a byte unit. The stuffing bits having the length of 3 bits are added to the common PID length of 13 bits, so that the CPID part having the length of 2 bytes can be constructed.

Therefore, in the case of using the link layer packet obtained when N MPEG-2 TS packets having the same PID are encapsulated, assuming that the length of the header of the link layer packet is denoted by LH, the CPID part has the length of LCPID, and a total length of the link layer packet is denoted by LT, the LT value can be calculated as shown in the equation of FIG. 148.

In the embodiment of FIG. 21, LH is 1 byte, and LCPID is 2 bytes.

FIG. 149 is a conceptual diagram illustrating the number of concatenated MPEG-2 TS packets and the length of a link layer packet according to count field values when Common PID reduction is used.

If the number of concatenated MPEG-2 TS packets is decided, and if all packets have the same PID, the above-mentioned common PID reduction process can be applied, and the receiver can calculate the length of the link layer packets according to the above-mentioned equation.

FIG. 150 is a conceptual diagram illustrating a process for encapsulating the MPEG-2 TS packet including a null packet according to an embodiment of the present invention.

In order to transmit the MPEG-2 TS packet at a fixed transfer rate, the null packet may be contained in the transmission (Tx) stream. The null packet is used as overhead in terms of a transmission aspect, and thus, although the transmitter does not the null packet, the receiver can recover this null packet. When the transmitter deletes the null packet and transmits data and the receiver searches for the number of deleted null packets and the location of deleted null packets so as to perform data recovery, the null packet deletion indicator (DI) field located in the header of the link layer packet may be used. In this case, the DI value of the header of the link layer packet may be set to 1.

The encapsulation action when the null packet is located at an arbitrary position between input Tx streams may be carried in a manner that n packets other than the null packet are sequentially concatenated. The count value indicating how many null packets are successively excluded may be contained in the payload of the link layer packet, and the receiver may generate the null packet at an original position on the basis of this count value so that the original position is filled with the null packet.

Assuming that N MPEG-2 TS packets other than the null packet are denoted by [M1, M2, M3, . . . , Mn], the null packet may appear at any position between the MPEG-2 TS packets (M1~Mn). The part at which the null packet is counted a predetermined number of times from among 0~n times may appear in a single link layer packet. That is, assuming that the appearance number of times of the above part at which the null packet is counted within one link layer packet is denoted by 'p', the range of p is denoted by 0 to n.

If the count value of each null packet is denoted by Cm, the range of m is denoted by $1 \le m \le p$, and Cm does not exist in case of p=0. Specific information indicating where each Cm is located between the MPEG-2 TS packets may be denoted using a specific field in which the usage of EI (transport error indicator) is changed to DPI (Deletion Point Indicator) in the header of the MPEG-2 TS packet.

In the present invention, Cm may have the length of 1 byte. If the packet to be used later has a margin in length, the 1-byte Cm may also be extended. Cm of 1 byte may count a maximum of 256 null packets. The indicator field of the null packets is located at the header of the MPEG-2 TS packet, and the exclusion of a predetermined number of null packets corresponding to "(value denoted by Cm)+1" can be calculated. For example, in case of Cm=0, one null packet may be excluded. In case of Cm=123, 124 null packets are excluded. If the number of contiguous null packets is higher than 256, the 257-th null packets are processed as normal packets, and the subsequent null packets can be processed as such null packets according to the above-mentioned method.

As shown in FIG. 24, the null packet is located between the MPEG-2 TS packets corresponding to Mi and Mi+1. The count value of the MPEG-2 TS packets is denoted by C1, and the null packet is located between the MPEG-2 TS packets corresponding to Mj and Mj+1. If the count value of the MPEG-2 TS packets may be denoted by Cp, the actual transmission order may be denoted by [ . . . , Mi, C1, Mi+1, . . . , Mj, Cp, Mj+1, . . . ].

When the header part and the payload part of the MPEG-2 TS packet, instead of the null packet, are separated from each other and rearranged to construct the payload of the link layer packet, the count value Cm (1≤m≤p) of the null packets is located between the header part and the payload part of the MPEG-2 TS packet. That is, the payload of the link layer packets are arranged in the form of [H1, H2, . . . , Hn, C1, . . . , Cp, P1, P2, . . . , Pn], and the receiver confirms the count value one byte by one byte in the order shown in the DPI field located at Hk, and recovers as many null packets as the number of confirmed value according to the order of original MPEG-2 TS packets.

FIG. 151 is a conceptual diagram illustrating a step for processing an indicator configured to count a removed null packet and an equation for calculating the length of a link layer packet in the processing step.

The DPI field may be established to indicate deletion of the null packet and the presence of a count value associated with the deleted null packet. As shown in FIG. 25, if the DPI field present at Hi from among the header of a plurality of MPEG-2 TS packets is set to 1, this means that the null packet located between Hi and Hi+1 is excluded and encapsulated, and its associated 1-byte count value is located between the header part and the payload part.

In the above-mentioned process, the length of the link layer packet can be calculated by the equation shown in FIG. 151. Therefore, in case of the link layer packet that has been obtained by encapsulation of n MPEG-2 TS packets through the null packet exclusion process, assuming that the header length of the link layer packet is denoted by LH, the count value Cm (1≤m≤p) of the null packets is denoted by LCount, and the total length of the link layer packet is denoted by LT, LT can be calculated by the equation of FIG. 151.

FIG. 152 is a conceptual diagram illustrating a process for encapsulating the MPEG-2 TS packet including a null packet according to another embodiment of the present invention.

In accordance with another embodiment of the encapsulation method excluding the null packets, payload of the link layer packet can be constructed. In accordance with another embodiment of the present invention, when the header part and payload part of the MPEG-2 TS packets are rearranged to construct the link layer packet payload, the count value Cm (1≤m≤p) of the null packets can be located at the header part and the order or sequence of the null packets may remain unchanged. That is, the count value of the null packets may be contained at a specific point at which individual MPEG-2 TS headers are ended. Accordingly, when the receiver reads a value of the DPI field contained in each MPEG-2 TS header, the receiver determines completion of the deletion of null packets, the receiver reads the count value contained at the last part of the corresponding header, and regenerates as many null packets as the corresponding count value, such that the regenerated null packets may be contained in the stream.

FIG. 153 is a conceptual diagram illustrating a process for encapsulating the MPEG-2 TS packets including the same packet identifiers (PIDs) in a stream including a null packet according to an embodiment of the present invention.

The encapsulation process of MPEG-2 TS packets including the same PID (packet identifier) in the stream including the null packet may be carried out by combination of a first process for encapsulating the link layer packets other than the above null packets and a second process for encapsulating the MPEG-2 TS packets having the same ID into the link layer packet.

Since an additional PID indicating the null packet is allocated, the case in which the null packet is contained in the actual transmission stream is not processed by the same PID. However, after completion of the exclusion process of the null packets, only the count value related to the null packet is contained in the payload of the link layer packet, the remaining N MPEG-2 TS packets have the same PID, such that the N MPEG-2 TS packets can be processed by the above-mentioned method FIG. 154 is a conceptual diagram illustrating an equation for calculating the length of a link layer packet when the MPEG-2 TS packets having the same PIDs are encapsulated in a stream including a null packet according to an embodiment of the present invention.

In the stream including the null packet, when MPEG-2 TS packets having the same PID are encapsulated, the length of the link layer packet can be calculated through FIG. 148 and/or FIG. 151. The above equations can be represented by an equation of FIG. 28.

FIG. 155 is a conceptual diagram illustrating a link layer packet structure for transmitting signaling information according to an embodiment of the present invention.

In order to transmit signaling information before the receiver receives the IP packet or the MPEG-2 TS packet in the same manner as in the update process of IP header compression information or broadcast channel scan information, the present invention provides packet formats capable of transmitting signaling data (i.e., signaling data) to the link layer.

In accordance with the embodiment of the present invention, if the packet type element contained in the header of the link layer packet is set to 110B, a section table (or a descriptor) for signaling may be contained in the payload of the link layer packet and then transmitted. The signaling section table may include a signaling table/table section contained in conventional DVB-SI (service information), PSI/PSIP, NRT (Non Real Time), ATSC 2.0, and MH (Mobile/Handheld).

FIG. 156 is a conceptual diagram illustrating a link layer packet structure for transmitting the framed packet according to an embodiment of the present invention.

Besides the IP packet or the MPEG-2 TS packet, the packet used in a general network can be transmitted through the link layer packet. In this case, the packet type element of the header of the link layer packet may be set to 111B, and may indicate that the framed packet is contained in the payload of the link layer packet.

FIG. 157 shows a syntax of the framed packet according to an embodiment of the present invention.

The syntax of framed packet may include ethernet type, length, and/or packet( ).

The ethernet type which is a 16-bit field shall identify the type of packet in the packet( ) field according to the IANA registry. Only registered values shall be used.

The length which is a 16-bit field shall be set to the total length in bytes of the packet( ) structure.

The packet( ) which is variable length field shall contain a network packet.

FIG. 158 is a block diagram illustrating a receiver of the next generation broadcast system according to an embodiment of the present invention.

Referring to FIG. 158, the receiver according to an embodiment of the present invention may include a receiver (not shown), a Channel Synchronizer 32010, a Channel Equalizer 32020, a Channel Decoder 32030, a Signaling Decoder 32040, a Baseband Operation Controller 32050, a Service Map DB 32060, a Transport Packet Interface 32070, a Broadband Packet Interface 32080, a Common Protocol Stack 32090, a Service Signaling Channel Processing Buffer & Parser 32100, an A/V Processor 32110, a Service Guide Processor 32120, an Application Processor 32130, and/or a Service Guide DB 32140.

The receiver (not shown) may receive broadcast signals.

The channel synchronizer 32010 may synchronize a symbol frequency with timing in a manner that signals received at baseband can be decoded. In this case, the baseband may indicate a Tx/Rx region of the broadcast signal.

The channel equalizer 32020 may perform channel equalization of the received (Rx) signal. The channel equalizer 32020 may compensate for signal distortion encountered when the Rx signals are distorted by multipath, Doppler effect, etc.

The Channel Decoder 32030 may recover the received (Rx) signal into a meaningful transport frame. The channel decoder 32030 may perform forward error correction (FEC) of data or transport frame contained in the Rx signal.

The signaling decoder 32040 may extract and decode signaling data contained in the received (Rx) signal. Here, the signaling data may include signaling data and/or service information (SI) to be described later.

The baseband operation controller 32050 may control baseband signal processing.

The Service Map DB 32060 may store signaling data and/or service information. The service Map DB 32060 may store signaling data contained/transmitted in the broadcast signal and/or signaling data contained/transmitted in the broadband packet.

The transport packet interface 32070 may extract the transport packet from the transmission (Tx) frame or the broadcast signal. The transport packet interface 32070 may extract the signaling data or the IP datagram from the transport packet.

The broadband packet interface 32080 may receive broadcast-related packets through the Internet. The broadband packet interface 32080 may extract a packet obtained through the Internet, and combine or extract the signaling data or A/V data from the corresponding packet.

The common protocol stack 32090 may process the received packet according to the protocol contained in the protocol stack. For example, the common protocol stack 32090 may perform processing for each protocol, such that it can process the received packet.

The service signaling channel processing buffer & parser 32100 may extract signaling data contained in the received packet. The service signaling channel processing buffer & parser 32100 may scan services and/or contents from the IP datagram or the like, and may extract signaling information related to acquisition of the services and/or contents, and parse the extracted signaling information. The signaling data may be located at a predetermined position or channel within the received packet. This position or channel may be referred to as a service signaling channel. For example, the service signaling channel may have a specific IP address, a UDP Port number, a transmission session ID, etc. The receiver may recognize data being transmitted as the specific IP address, the UDP port number, and the transmission session, etc. as signaling data.

The A/V Processor 32110 may perform decoding of the received audio and video data, and presentation processing thereof.

The service guide processor 32120 may extract announcement information from the Rx signal, may manage the service guide DB 32140, and provide the service guide.

The application processor 32130 may extract application data contained in the received packet and/or application-associated information, and may process the extracted data or information.

The service guide DB 32140 may store the service guide data therein.

The above-described steps can be omitted or replaced by steps executing similar or identical functions according to design.

Although the description of the present invention is explained with reference to each of the accompanying drawings for clarity, it is possible to design new embodiment(s) by merging the embodiments shown in the accompanying drawings with each other. And, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention may be non-limited by the configurations and methods of the embodiments mentioned in the foregoing description. And, the embodiments mentioned in the foregoing description can be configured in a manner of being selectively combined with one another entirely or in part to enable various modifications.

In addition, a method according to the present invention can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved and executed according to a distributive system.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

Various embodiments have been described in the best mode for carrying out the invention.

The present invention is available in a series of broadcast signal provision fields. It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for receiving a broadcast signal, the apparatus comprising:

a receiver configured to receive the broadcast signal;

a parser configured to parse signaling information included in the broadcast signal;

a link layer processor configured to process a link layer packet included in the broadcast signal, wherein the link layer packet includes a header and a payload, further the header includes packet type information for indicating a type of data, wherein the packet type information is 3-bit, further the packet type information is used to represent an IPv4 packet, a compressed IP (internet protocol) packet or an MPEG-2 (moving picture experts group-2) transport stream, wherein the link layer processor is further configured to process the header including C/S (Concatenation/Segmentation) information following the packet type information, further the C/S information is used to represent that the payload carries a segment of an input packet or a plurality of concatenated input packets, wherein the link layer processor is further configured to process the header including count information for representing a number of the plurality of the concatenated input packets when the payload carries the plurality of concatenated input packets, further a value of the count information is set to the number of the plurality of the concatenated input packets minus two, further the minimum possible number of the plurality of the concatenated input packets is 2 and the maximum possible number of the plurality of the concatenated input packets is 9 in the link layer packet, wherein the link layer processor is further configured to process the header including segment sequence number information for representing an order of a corresponding segment carried by the payload when the payload carries the segment of the input packet; and an audio/video (A/V) processor configured to present broadcast contents based on the signaling information and the link layer packet.

2. The apparatus of claim 1, further comprising:

a memory configured to store channel information after parsing the signaling information, wherein the signaling information has a specific value.

3. The apparatus of claim 2, wherein the apparatus is a television or a set top box.

4. The apparatus of claim 1, wherein when the packet type information is used to represent the MPEG-2 TS (transport stream), the header includes both of additional count information for representing a number of MPEG-2 TS packets carried by the payload and header deletion indication information for the link layer packet.

5. The apparatus of claim 4, wherein the header deletion indication information is used to indicate whether common elements of the MPEG-2 TS packets carried by the payload are deleted or not.

6. A method for receiving a broadcast signal, the method comprising:

receiving the broadcast signal;

parsing signaling information included in the broadcast signal;

processing, by a link layer processor, a link layer packet included in the broadcast signal, wherein the link layer packet includes a header and a payload, further the header includes packet type information for indicating a type of data, wherein the packet type information is 3-bit, further the packet type information is used to represent an IPv4 packet, a compressed IP (internet protocol) packet or an MPEG-2 (moving picture experts group-2) transport stream, wherein the link layer processor is further configured to process the header including C/S (Concatenation/Segmentation) information following the packet type information, further the C/S information is used to represent that the payload carries a segment of an input packet or a plurality of concatenated input packets, wherein the link layer processor is further configured to process the header including count information for representing a number of the plurality of the concatenated input packets when the payload carries the plurality of concatenated input packets, further a value of the count information is set to the number of the plurality of the concatenated input packets minus two, further the minimum possible number of the plurality of the concatenated input packets is 2 and the maximum possible number of the plurality of the concatenated input packets is 9 in the link layer packet, wherein the link layer processor is further configured to process the header including segment sequence number information for representing an order of a corresponding segment carried by the payload when the payload carries the segment of the input packet; and presenting broadcast contents based on the signaling information and the link layer packet.

7. The method of claim 6, further comprising:

storing channel information after parsing the signaling information, wherein the signaling information has a specific value.

8. The method of claim 7, wherein the method is performed by a television or a set top box.

9. The method of claim 6, wherein when the packet type information is used to represent the MPEG-2 TS (transport stream), the header includes both of additional count information for representing a number of MPEG-2 TS packets carried by the payload and header deletion indication information for the link layer packet.

10. The method of claim 9, wherein the header deletion indication information is used to indicate whether common elements of the MPEG-2 TS packets carried by the payload are deleted or not.

11. A method for transmitting a broadcast signal in a transmitter, the method comprising:

generating a link layer packet, wherein the link layer packet includes a header and a payload, and the header includes packet type information for indicating a type of data, wherein the packet type information is 3-bit, further the packet type information is used to represent an IPv4 packet, a compressed IP (internet protocol) packet or an MPEG-2 (moving picture experts group-2) transport stream, wherein the header includes C/S (Concatenation/Segmentation) information following the packet type information, further the C/S information is used to represent that the payload carries a segment of an input packet or a plurality of concatenated input packets, wherein when the payload carries the plurality of concatenated input packets, the header includes count information for representing a number of the plurality of the concatenated input packets, further a value of the count information is set to the number of the plurality of the concatenated input packets minus two, further the minimum possible number of the plurality of the concatenated input packets is 2 and the maximum possible number of the plurality of the concatenated input packets is 9 in the link layer packet, wherein when the payload carries the segment of the input packet, the header includes segment sequence number information for representing an order of a corresponding segment carried by the payload; and transmitting the broadcast signal including the link layer packet.

12. The method of claim 11, wherein when the packet type information is used to represent the MPEG-2 TS (transport stream), the header includes both of additional count information for representing a number of MPEG-2 TS packets carried by the payload and header deletion indication information for the link layer packet.

13. The method of claim 12, wherein the header deletion indication information is used to indicate whether common elements of the MPEG-2 TS packets carried by the payload are deleted or not.

14. An apparatus for transmitting a broadcast signal, the apparatus comprising:

a data processor configured to generate a link layer packet, wherein the link layer packet includes a header and a payload, and the header includes packet type information for indicating a type of data, wherein the packet type information is 3-bit, further the packet type information is used to represent an IPv4 packet, a compressed IP (internet protocol) packet or an MPEG-2 (moving picture experts group-2) transport stream, wherein the header includes C/S (Concatenation/Segmentation) information following the packet type information, further the C/S information is used to represent that the payload carries a segment of an input packet or a plurality of concatenated input packets, wherein when the payload carries the plurality of concatenated input packets, the header includes count information for representing a number of the plurality of the concatenated input packets, further a value of the count information is set to the number of the plurality of the concatenated input packets minus two, further the minimum possible number of the plurality of the concatenated input packets is 2 and the maximum possible number of the plurality of the concatenated input packets is 9 in the link layer packet, wherein when the payload carries the segment of the input packet, the header includes segment sequence number information for representing an order of a corresponding segment carried by the payload; and a transmitter configured to transmit the broadcast signal including the link layer packet.

15. The apparatus of claim 14, wherein when the packet type information is used to represent the MPEG 2 TS (transport stream), the header includes both of additional count information for representing a number of MPEG-2 TS packets carried by the payload and header deletion indication information for the link layer packet.

16. The apparatus of claim 15, wherein the header deletion indication information is used to indicate whether common elements of the MPEG-2 TS packets carried by the payload are deleted or not.

* * * * *